United States Patent
Yamasaki et al.

(10) Patent No.: US 7,738,540 B2
(45) Date of Patent: Jun. 15, 2010

(54) WIRELESS TRANSMISSION SYSTEM, WIRELESS STATION USED THEREIN AND METHOD USED THEREFOR

(75) Inventors: Hidetoshi Yamasaki, Hyogo (JP); Hitoshi Takai, Osaka (JP); Hideki Nakahara, Hyogo (JP); Kenji Miyanaga, Osaka (JP)

(73) Assignee: Panasonic Corporation, Osaka (JP)

( * ) Notice: Subject to any disclaimer, the term of this patent is extended or adjusted under 35 U.S.C. 154(b) by 754 days.

(21) Appl. No.: 11/663,066

(22) PCT Filed: Sep. 26, 2005

(86) PCT No.: PCT/JP2005/017621

§ 371 (c)(1),
(2), (4) Date: Mar. 16, 2007

(87) PCT Pub. No.: WO2006/035707

PCT Pub. Date: Apr. 6, 2006

(65) Prior Publication Data

US 2007/0248038 A1    Oct. 25, 2007

(30) Foreign Application Priority Data

Sep. 28, 2004 (JP) ............................. 2004-282700
Feb. 8, 2005 (JP) ............................. 2005-032239

(51) Int. Cl.
*H04L 5/16* (2006.01)

(52) U.S. Cl. ................... 375/219; 375/141; 375/133; 375/299

(58) Field of Classification Search ................. 375/133, 375/141, 299, 347, 130

See application file for complete search history.

(56) References Cited

U.S. PATENT DOCUMENTS

2002/0054620 A1 * 5/2002 Maruyama .................. 375/147

(Continued)

FOREIGN PATENT DOCUMENTS

JP    08-265306    10/1996

(Continued)

OTHER PUBLICATIONS

H. Takai, "BER Performance of Anti-multipath Modulation Scheme PSK-VP and its Optimum Phase-Waveform", IEEE, Trans. Veh. Technol., vol. VT-42, Nov. 1993, p. 625-639.

(Continued)

*Primary Examiner*—Emmanuel Bayard
(74) *Attorney, Agent, or Firm*—Wenderoth, Lind & Ponack, L.L.P.

(57) ABSTRACT

A wireless transmission system capable of performing a multi-station simultaneous transmission of data, that is, simultaneously transmitting data by wireless to a plurality of stations. The wireless transmission system includes a plurality of wireless stations for transmitting/receiving data and it constitutes a system for path diversity by use of a wireless station at the transmitting end, a multipath transmission path, and a wireless station at the receiving end. At least one of the plurality of wireless stations decides, in accordance with a response packet responsive to a multi-station simultaneous transmission request packet transmitted by the wireless station or other stations, a plurality of delay amounts relative to a reference timing during the multi-station simultaneous transmission in the wireless transmission system. It is arranged that each difference between the plurality of delay amounts be greater than a predetermined delay resolution and that the difference between the maximum and minimum values in the plurality of delay amounts be smaller than a predetermined maximum delay.

26 Claims, 88 Drawing Sheets

U.S. PATENT DOCUMENTS

2004/0080462 A1* 4/2004 Apostolos et al. ............ 343/741
2006/0121945 A1* 6/2006 Sarresh et al. .............. 455/561

FOREIGN PATENT DOCUMENTS

| JP | 2000-115181 | 4/2000 |
|----|-------------|--------|
| JP | 3325890 | 7/2002 |
| JP | 2004-165935 | 6/2004 |

OTHER PUBLICATIONS

S. Ariyavisitakul, S. Yoshida, F. Ikegami, K. Tanaka, T. Takeuchi, "A Power-efficient linear digital modulator and its application to an anti-multipath modulation PSK-RZ scheme", Proceedings of IEEE Vehicular Technology Conference 1987, Jun. 1987, p. 66-71.

S. Ariyavisitakul, S. Yoshida, F. Ikegami, T. Takeuchi, "A Novel Anti-Multipath Modulation Technique DSK)", IEEE Trans. Communications, vol. COM-35, No. 12, Dec. 1987, p. 1252-1264.

* cited by examiner

FIG. 16C
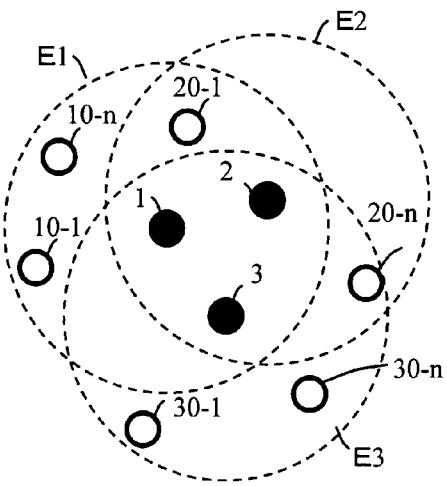
FIG. 17A
| | DELAY AMOUNT ALLOCATED TO EACH MANAGEMENT STATION | | |
|---|---|---|---|
| TRANSMISSION SOURCE MANAGEMENT STATION ID \ MANAGEMENT STATION ID | 1 | 2 | 3 |
| 1 | — | 0 | $\tau$ |
| 2 | 0 | — | $\tau$ |
| 3 | 0 | $\tau$ | — |
FIG. 17B
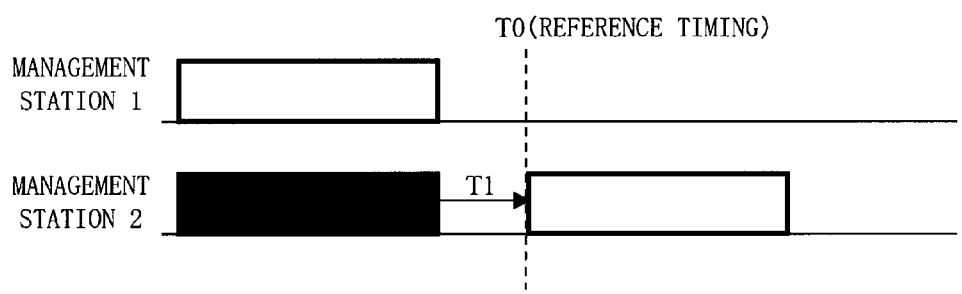

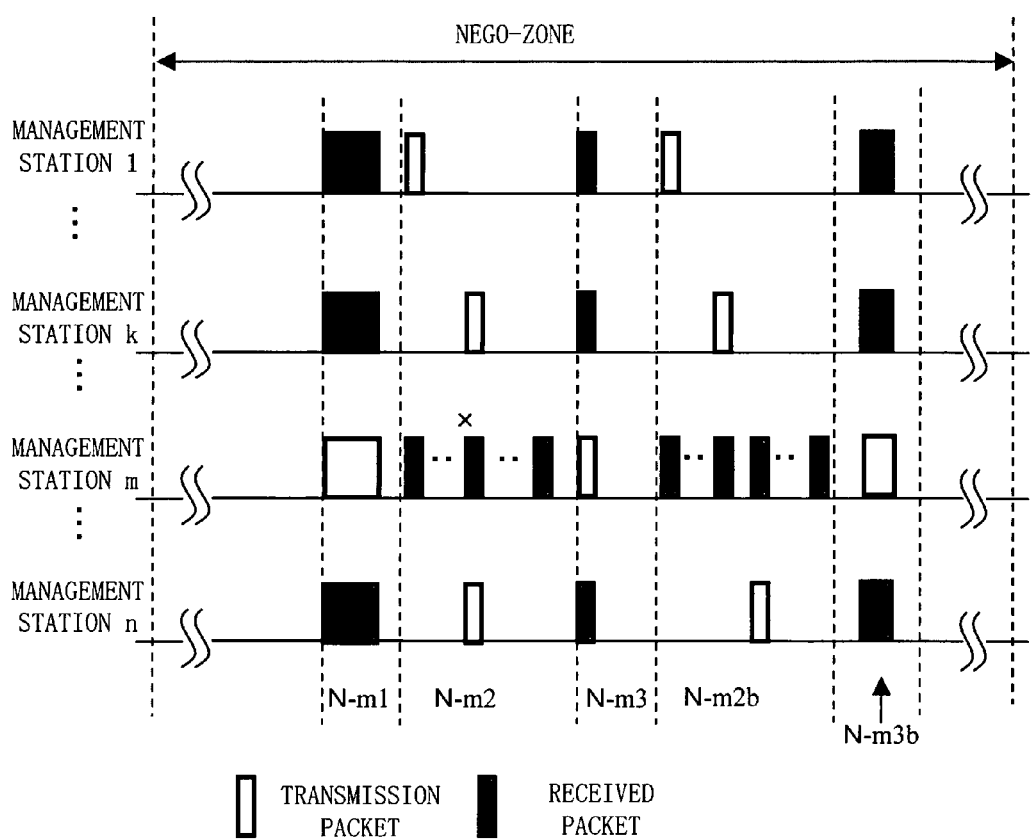

FIG. 27C
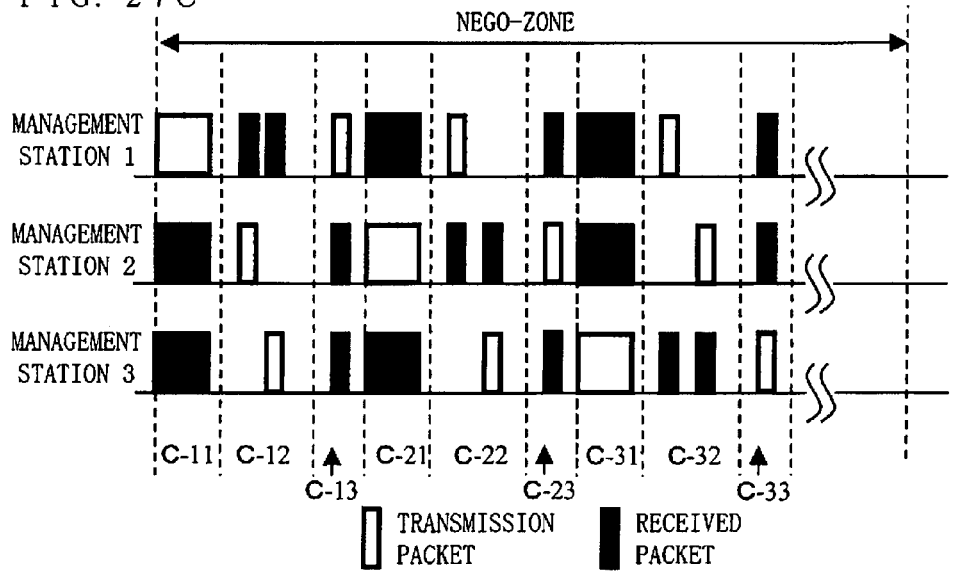
FIG. 28A
| DELAY AMOUNT RECORD TABLE IN STATE OF FIG. 16B |
| TRANSMISSION SOURCE MANAGEMENT STATION ID / MANAGEMENT STATION ID | DELAY AMOUNT OF EACH MANAGEMENT STATION | |
|---|---|---|
| | 1 | 2 |
| 1 | 0 | $\tau$ |
| 2 | 0 | $\tau$ |
FIG. 28B
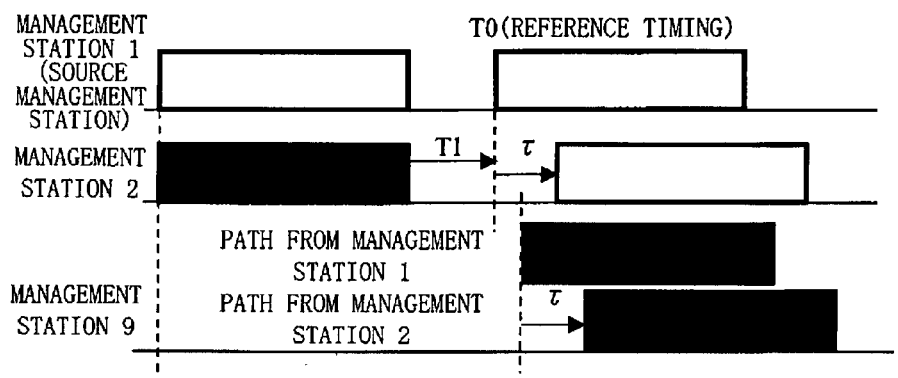

| DELAY AMOUNT RECORD TABLE |||||
|---|---|---|---|---|
| | | DELAY AMOUNT OF EACH MANAGEMENT STATION ||||
| TRANSMISSION SOURCE MANAGEMENT STATION ID | MANAGEMENT STATION ID | 1 | 2 | 3 |
| 1 || 0 | $\tau$ | $\tau/2$ |
| 2 || 0 | $\tau$ | $\tau/2$ |
| 3 || 0 | $\tau$ | $\tau/2$ |

FIG. 29B
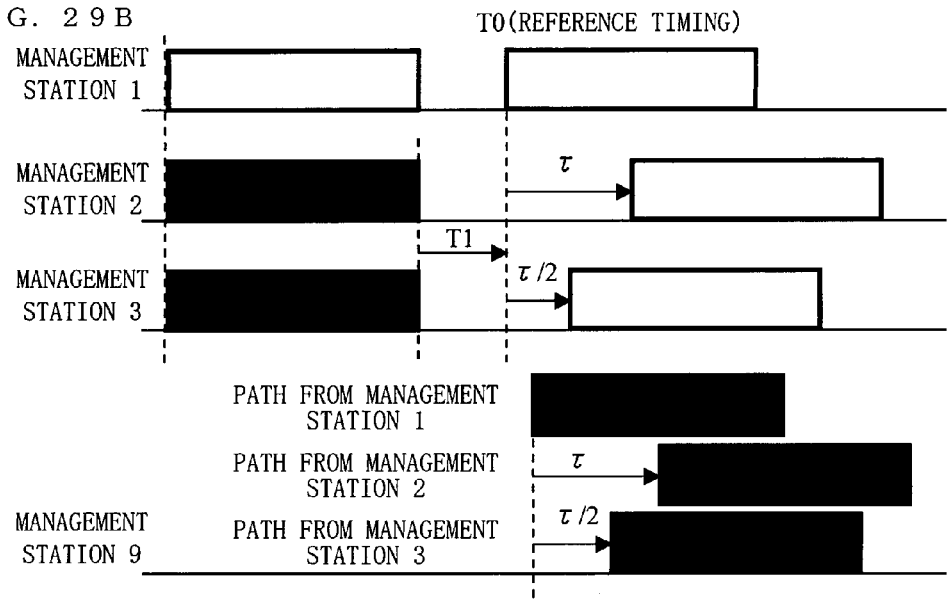
FIG. 30A
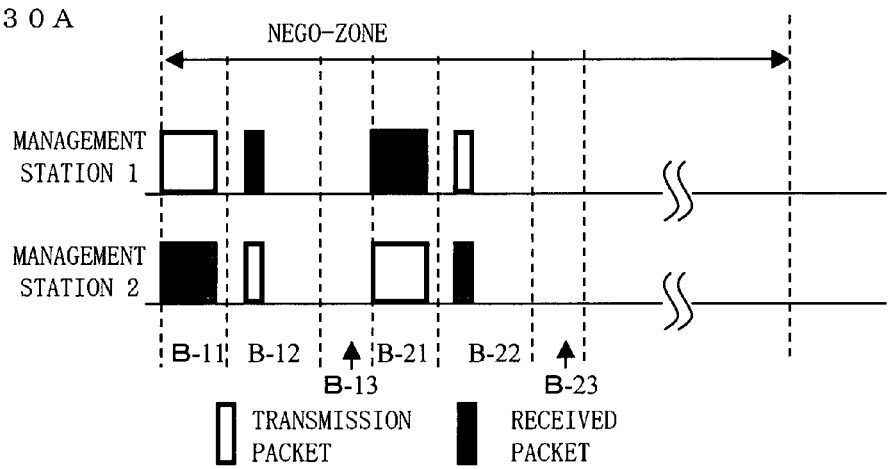
FIG. 30B
| DELAY AMOUNT RECORD TABLE IN STATE OF FIG. 16B |||
|---|---|---|
| | DELAY AMOUNT OF EACH MANAGEMENT STATION ||
| MANAGEMENT STATION ID / TRANSMISSION SOURCE MANAGEMENT STATION ID | 1 | 2 |
| 1 | $\tau$ | 0 |
| 2 | 0 | $\tau$ |

FIG. 31B

| DELAY AMOUNT RECORD TABLE OF EACH MANAGEMENT STATION ||
|---|---|
| DELAY AMOUNT OF EACH MANAGEMENT STATION ||
| WHEN OWN-STATION IS SOURCE MANAGEMENT STATION | WHEN OTHER STATION IS SOURCE MANAGEMENT STATION |
| $\tau$ | 0 |

FIG. 32A

|  | DELAY AMOUNT OF EACH MANAGEMENT STATION | | |
|---|---|---|---|
| MANAGEMENT STATION ID / TRANSMISSION SOURCE MANAGEMENT STATION ID | 1 | 2 | 3 |
| 1 | $\tau$ | 0 | $\tau/2$ |
| 2 | 0 | $\tau$ | $\tau/2$ |
| 3 | 0 | $\tau/2$ | $\tau$ |

FIG. 32B

MANAGEMENT STATION 1

| TRANSMISSION SOURCE MANAGEMENT STATION ID | DELAY AMOUNT |
|---|---|
| 1 | $\tau$ |
| 2 | 0 |
| 3 | 0 |

MANAGEMENT STATION 2

| TRANSMISSION SOURCE MANAGEMENT STATION ID | DELAY AMOUNT |
|---|---|
| 1 | 0 |
| 2 | $\tau$ |
| 3 | $\tau/2$ |

MANAGEMENT STATION 3

| TRANSMISSION SOURCE MANAGEMENT STATION ID | DELAY AMOUNT |
|---|---|
| 1 | $\tau/2$ |
| 2 | $\tau/2$ |
| 3 | $\tau$ |

FIG. 35A

| DELAY AMOUNT RECORD TABLE AT TIME OF FIG. 34A |||||
|---|---|---|---|---|
| | DELAY AMOUNT OF EACH MANAGEMENT STATION ||||
| MANAGEMENT STATION ID / TRANSMISSION SOURCE MANAGEMENT STATION ID | 1 | 2 | 3 | 4 |
| 1 | $\tau$ | 0 | $\tau/2$ | 0 |
| 2 | 0 | $\tau$ | $\tau/2$ | 0 |
| 3 | 0 | $\tau/2$ | $\tau$ | 0 |
| 4 | 0 | $\tau/2$ | 0 | $\tau$ |

FIG. 35B

| (WHEN MANAGEMENT STATION 1 DISAPPEARS) ||||
|---|---|---|---|
| | DELAY AMOUNT OF EACH MANAGEMENT STATION |||
| MANAGEMENT STATION ID / TRANSMISSION SOURCE MANAGEMENT STATION ID | 2 | 3 | 4 |
| 2 | $\tau$ | $\tau/2$ | 0 |
| 3 | $\tau/2$ | $\tau$ | 0 |
| 4 | $\tau/2$ | 0 | $\tau$ |

F I G. 3 5 C

| | (WHEN MANAGEMENT STATION 2 DISAPPEARS) | | |
|---|---|---|---|
| | DELAY AMOUNT OF EACH MANAGEMENT STATION | | |
| TRANSMISSION SOURCE MANAGEMENT STATION ID \ MANAGEMENT STATION ID | 1 | 3 | 4 |
| 1 | $\tau$ | $\tau/2$ | 0 |
| 3 | 0 | $\tau$ | $\tau/2$ |
| 4 | 0 | $\tau/2$ | $\tau$ |

FIG. 35D

| | DELAY AMOUNT OF EACH MANAGEMENT STATION | | |
|---|---|---|---|
| MANAGEMENT STATION ID  /  TRANSMISSION SOURCE MANAGEMENT STATION ID | 1 | 2 | 4 |
| 1 | $\tau$ | 0 | $\tau/2$ |
| 2 | 0 | $\tau$ | $\tau/2$ |
| 4 | 0 | $\tau/2$ | $\tau$ |

(WHEN MANAGEMENT STATION 3 DISAPPEARS)

FIG. 35E

| | DELAY AMOUNT OF EACH MANAGEMENT STATION | | |
|---|---|---|---|
| MANAGEMENT STATION ID / TRANSMISSION SOURCE MANAGEMENT STATION ID | 1 | 2 | 3 |
| 1 | $\tau$ | 0 | $\tau/2$ |
| 2 | 0 | $\tau$ | $\tau/2$ |
| 3 | 0 | $\tau/2$ | $\tau$ |

(WHEN MANAGEMENT STATION 4 DISAPPEARS)

| DELAY AMOUNT RECORD TABLE AT TIME OF FIG. 34A |||||
|---|---|---|---|---|
| | DELAY AMOUNT OF EACH MANAGEMENT STATION ||||
| TRANSMISSION SOURCE MANAGEMENT STATION ID / MANAGEMENT STATION ID | 1 | 2 | 3 | 4 |
| 1 | $\tau$ | 0 | $\tau/2$ | — |
| 2 | 0 | $\tau$ | $\tau/2$ | — |
| 3 | 0 | $\tau/2$ | $\tau$ | — |
| 4 | 0 | $\tau/2$ | — | $\tau$ |

FIG. 39B

| | DELAY AMOUNT OF EACH MANAGEMENT STATION | | |
|---|---|---|---|
| MANAGEMENT STATION ID / TRANSMISSION SOURCE MANAGEMENT STATION ID | 2 | 3 | 4 |
| 2 | $\tau$ | $\tau/2$ | 0 |
| 3 | $\tau/2$ | $\tau$ | 0 |
| 4 | $\tau/2$ | 0 | $\tau$ |

(WHEN MANAGEMENT STATION 1 DISAPPEARS)

F I G. 39C

| | (WHEN MANAGEMENT STATION 2 DISAPPEARS) | | |
|---|---|---|---|
| | DELAY AMOUNT OF EACH MANAGEMENT STATION | | |
| TRANSMISSION SOURCE MANAGEMENT STATION ID \ MANAGEMENT STATION ID | 1 | 3 | 4 |
| 1 | $\tau$ | $\tau/2$ | 0 |
| 3 | 0 | $\tau$ | $\tau/2$ |
| 4 | 0 | $\tau/2$ | $\tau$ |

FIG. 39D

| | DELAY AMOUNT OF EACH MANAGEMENT STATION | | |
|---|---|---|---|
| (WHEN MANAGEMENT STATION 3 DISAPPEARS) | | | |
| MANAGEMENT STATION ID<br>TRANSMISSION SOURCE MANAGEMENT STATION ID | 1 | 2 | 4 |
| 1 | $\tau$ | 0 | $\tau/2$ |
| 2 | 0 | $\tau$ | $\tau/2$ |
| 4 | 0 | $\tau/2$ | $\tau$ |

FIG. 39E

| (WHEN MANAGEMENT STATION 4 DISAPPEARS) | | | |
|---|---|---|---|
| | DELAY AMOUNT OF EACH MANAGEMENT STATION | | |
| TRANSMISSION SOURCE MANAGEMENT STATION ID \ MANAGEMENT STATION ID | 1 | 2 | 3 |
| 1 | $\tau$ | 0 | $\tau/2$ |
| 2 | 0 | $\tau$ | $\tau/2$ |
| 3 | 0 | $\tau/2$ | $\tau$ |

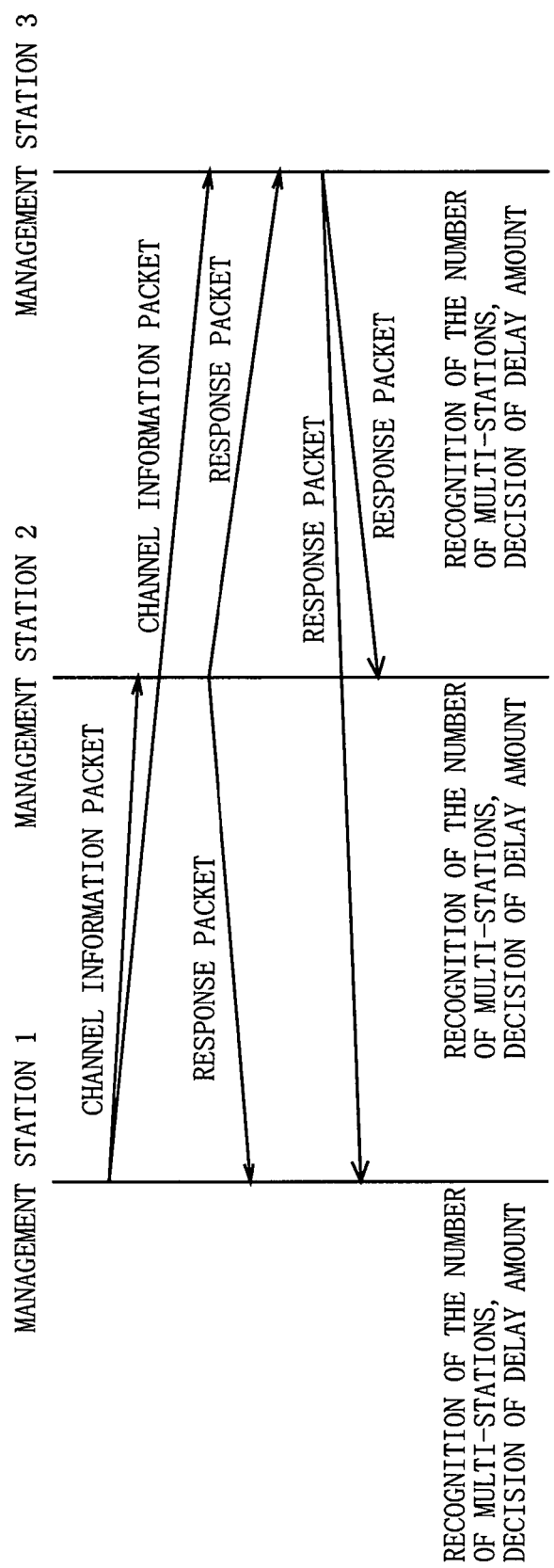

WIRELESS SYSTEM OF HOME A

WIRELESS SYSTEM OF NEIGHBORING HOUSE

F I G. 4 5
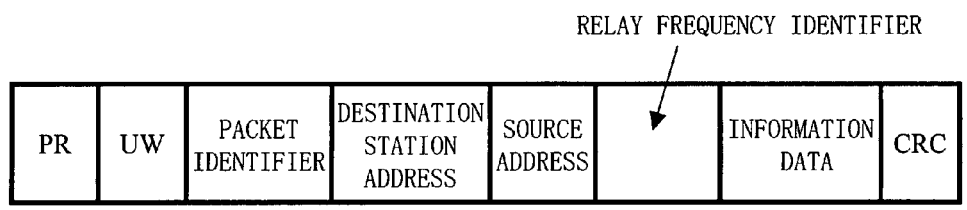

FIG. 55C
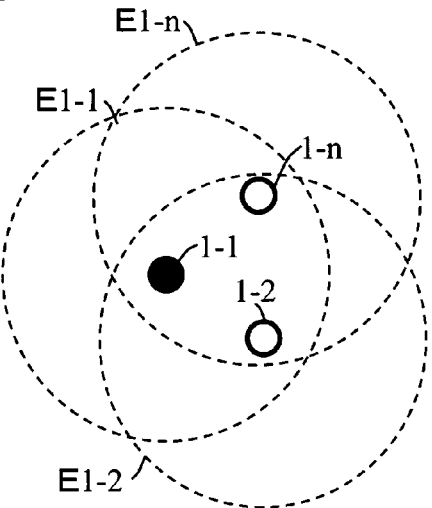
FIG. 56A
| DELAY AMOUNT RECORD TABLE | | | |
|---|---|---|---|
| | DELAY AMOUNT OF EACH STATION | | |
| WIRELESS STATION ID / SOURCE STATION ID | 1 | 2 | n |
| 1 | — | 0 | $\tau$ |
FIG. 56B
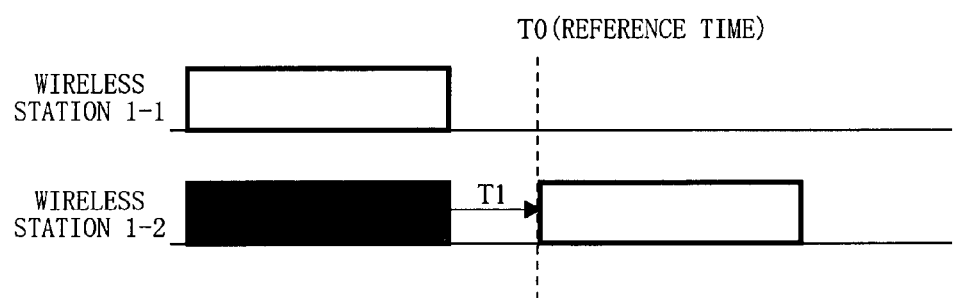

| | DELAY AMOUNT OF EACH STATION | |
|---|---|---|
| SOURCE STATION ID \ WIRELESS STATION ID | 1 | 2 |
| 1 | 0 | $\tau$ |

DELAY AMOUNT RECORD TABLE IN STATE OF FIG. 55B

| | DELAY AMOUNT OF EACH STATION | | |
|---|---|---|---|
| SOURCE STATION ID \ WIRELESS STATION ID | 1 | 2 | n |
| 1 | 0 | $\tau$ | $\tau/2$ |

DELAY AMOUNT RECORD TABLE

FIG. 62C
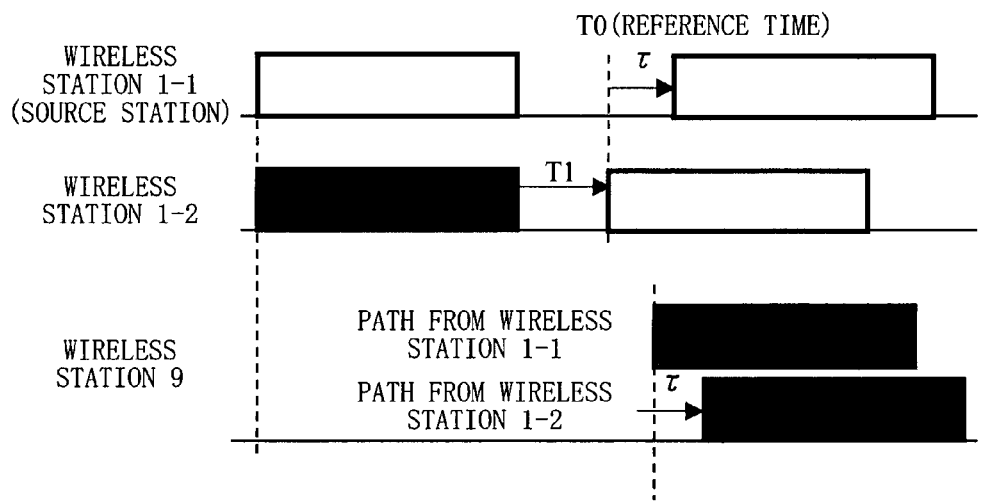
FIG. 63A
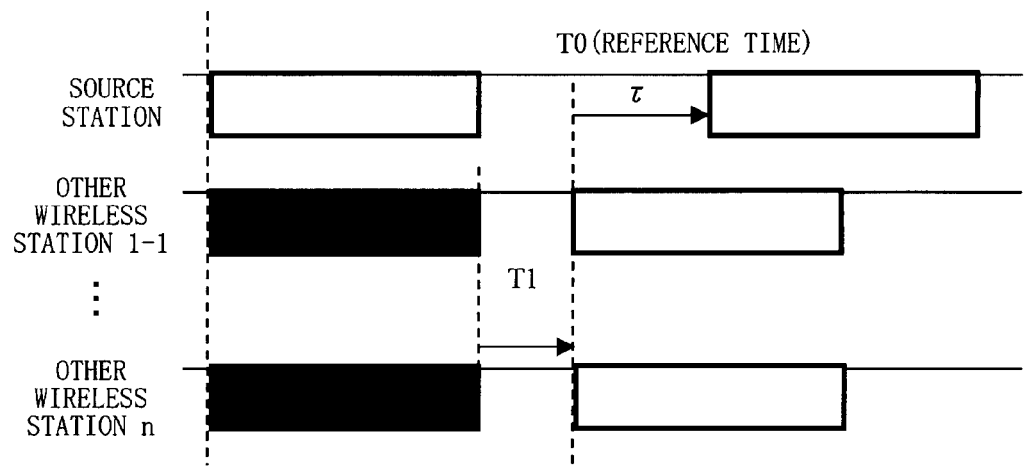
FIG. 63B
| DELAY AMOUNT RECORD TABLE OF EACH WIRELESS STATION |  |
|---|---|
| DELAY AMOUNT FROM REFERENCE TIME, DELAY VALUE | |
| WHEN OWN-STATION IS SOURCE | WHEN OTHER STATION IS SOURCE |
| $\tau$ | 0 |

|  | DELAY AMOUNT OF EACH STATION | | |
|---|---|---|---|
| SOURCE STATION ID \ WIRELESS STATION ID | 1 | 2 | n |
| 1 | $\tau$ | 0 | $\tau/2$ |

| WIRELESS STATION 1-1 | |
|---|---|
| SOURCE STATION ID | DELAY AMOUNT |
| 1 | $\tau$ |

| WIRELESS STATION 1-2 | |
|---|---|
| SOURCE STATION ID | DELAY AMOUNT |
| 1 | 0 |

| WIRELESS STATION 1-n | |
|---|---|
| SOURCE STATION ID | DELAY AMOUNT |
| 1 | $\tau/2$ |

FIG. 67A

| DELAY AMOUNT RECORD TABLE AT TIME OF FIG. 66A ||||| 
|---|---|---|---|---|
| | DELAY AMOUNT OF EACH STATION ||||
| SOURCE STATION ID \ WIRELESS STATION ID | 1-1 | 1-2 | 1-3 | 1-n (n≧4) |
| 1-1 | $\tau$ | 0 | $\tau/2$ | 0 |
| 1-2 | 0 | $\tau$ | $\tau/2$ | 0 |
| 1-3 | 0 | $\tau/2$ | $\tau$ | 0 |
| 1-n | 0 | $\tau/2$ | 0 | $\tau$ |

FIG. 67B

| (WHEN WIRELESS STATION 1-1 IS DISAPPEARED) ||||
|---|---|---|---|
| | DELAY AMOUNT OF EACH STATION |||
| SOURCE STATION ID \ WIRELESS STATION ID | 1-2 | 1-3 | 1-n |
| 1-2 | $\tau$ | $\tau/2$ | 0 |
| 1-3 | $\tau/2$ | $\tau$ | 0 |
| 1-n | $\tau/2$ | 0 | $\tau$ |

FIG. 67C (WHEN WIRELESS STATION 1-2 IS DISAPPEARED)

| SOURCE STATION ID \ WIRELESS STATION ID | 1-1 | 1-3 | 1-n |
|---|---|---|---|
| 1-1 | $\tau$ | $\tau/2$ | 0 |
| 1-3 | 0 | $\tau$ | $\tau/2$ |
| 1-n | 0 | $\tau/2$ | $\tau$ |

FIG. 67D (WHEN WIRELESS STATION 1-3 IS DISAPPEARED)

| SOURCE STATION ID \ WIRELESS STATION ID | 1-1 | 1-2 | 1-n |
|---|---|---|---|
| 1-1 | $\tau$ | 0 | $\tau/2$ |
| 1-2 | 0 | $\tau$ | $\tau/2$ |
| 1-n | 0 | $\tau/2$ | $\tau$ |

FIG. 67E

| (WHEN WIRELESS STATION 1-n IS DISAPPEARED) | | | |
|---|---|---|---|
| | DELAY AMOUNT OF EACH STATION | | |
| WIRELESS STATION ID / SOURCE STATION ID | 1-1 | 1-2 | 1-3 |
| 1-1 | $\tau$ | 0 | $\tau/2$ |
| 1-2 | 0 | $\tau$ | $\tau/2$ |
| 1-3 | 0 | $\tau/2$ | $\tau$ |

FIG. 68A

| DELAY AMOUNT RECORD TABLE AT TIME OF FIG. 66A | | | | |
|---|---|---|---|---|
| | DELAY AMOUNT OF EACH STATION | | | |
| WIRELESS STATION ID / SOURCE STATION ID | 1-1 | 1-2 | 1-3 | 1-n ($n \geq 4$) |
| 1-1 | $\tau$ | 0 | $\tau/2$ | — |
| 1-2 | 0 | $\tau$ | $\tau/2$ | — |
| 1-3 | 0 | $\tau/2$ | $\tau$ | — |
| 1-n | 0 | $\tau/2$ | — | $\tau$ |

FIG. 68B

| (WHEN WIRELESS STATION 1-1 IS DISAPPEARED) | | | |
|---|---|---|---|
| | DELAY AMOUNT OF EACH STATION | | |
| WIRELESS STATION ID / SOURCE STATION ID | 1-2 | 1-3 | 1-n |
| 1-2 | $\tau$ | $\tau/2$ | 0 |
| 1-3 | $\tau/2$ | $\tau$ | 0 |
| 1-n | $\tau/2$ | 0 | $\tau$ |

FIG. 68C

| (WHEN WIRELESS STATION 1-2 IS DISAPPEARED) | | | |
|---|---|---|---|
| | DELAY AMOUNT OF EACH STATION | | |
| WIRELESS STATION ID / SOURCE STATION ID | 1-1 | 1-3 | 1-n |
| 1-1 | $\tau$ | $\tau/2$ | 0 |
| 1-3 | 0 | $\tau$ | $\tau/2$ |
| 1-n | 0 | $\tau/2$ | $\tau$ |

FIG. 68D

| (WHEN WIRELESS STATION 1-3 IS DISAPPEARED) | | | |
|---|---|---|---|
| | DELAY AMOUNT OF EACH STATION | | |
| SOURCE STATION ID \ WIRELESS STATION ID | 1-1 | 1-2 | 1-n |
| 1 | $\tau$ | 0 | $\tau/2$ |
| 2 | 0 | $\tau$ | $\tau/2$ |
| n | 0 | $\tau/2$ | $\tau$ |

FIG. 68E

| (WHEN WIRELESS STATION 1-n IS DISAPPEARED) | | | |
|---|---|---|---|
| | DELAY AMOUNT OF EACH STATION | | |
| SOURCE STATION ID \ WIRELESS STATION ID | 1-1 | 1-2 | 1-3 |
| 1 | $\tau$ | 0 | $\tau/2$ |
| 2 | 0 | $\tau$ | $\tau/2$ |
| 3 | 0 | $\tau/2$ | $\tau$ |

WIRELESS GROUP OF HOME A

WIRELESS GROUP OF NEIGHBORING HOUSE

WIRELESS TRANSMISSION SYSTEM, WIRELESS STATION USED THEREIN AND METHOD USED THEREFOR

TECHNICAL FIELD

The present invention relates to a wireless transmission system in which a plurality of wireless stations transmit data, a wireless station used therein, and a method used therefore, and relates more specifically to a wireless transmission system in which a plurality of wireless stations which are adjacent to each other perform a multi-station simultaneous transmission of data, a wireless station used therein and a method therefore.

BACKGROUND ART

Generally, in a wireless communication, transmitted signals arrive at a receiver at different propagation times via a plurality of propagation paths, thus causing multipath fading. In order to prevent deterioration of transmission characteristics due to the multipath fading, a modulation/demodulation scheme having an anti-multipath characteristic is used.

The modulation/demodulation scheme having the anti-multipath characteristic includes, for example, a spectrum spread scheme, an OFDM (OFDM; Orthogonal Frequency Division Multiplexing) scheme in which information is distributed into a large number of subcarriers arranged over a wide range of frequency to be transmitted, and a so-called anti-multipath modulation scheme in which an anti-multipath characteristic is provided by adding phase redundancy or amplitude redundancy in a transmission symbol.

The spectrum spread scheme includes, for example, a DSSS (DSSS; Direct Sequence Spread Spectrum) scheme in which an original signal is multiplied by a spread signal with a band wider than the original signal, an FHSS (FHSS; Frequency Hopping Spread Spectrum) system in which a frequency is hopped over a wider band, and a THSS system (THSS; Time Hopping Spread Spectrum) in which a signal is spread by an impulse with a wide band.

The anti-multipath modulation scheme includes a PSK-VP (Phase Shift Keying with Varied Phase) scheme in which a convex phase redundancy is added (Non-patent Document 1), and a PSK-RZ (Return to Zero Phase Shift Keying) scheme in which the amplitude redundancy is added (Non-patent Document 2).

Additionally, even when a wireless communication is performed by use of a normal single carrier modulation scheme, the anti-multipath characteristic can be given by use of an equalizer at the receiving end. A modulation/demodulation scheme in which the wireless communication is performed by use of the single carrier modulation scheme, and the equalizer is used at the receiving end is also a modulation/demodulation scheme having the anti-multipath characteristic.

By using such a modulation/demodulation scheme with an anti-multipath property for communication, it is possible not only to prevent the deterioration of transmission characteristics due to a multipath waveform distortion, but also to actively improve the transmission characteristics with a plurality of delayed waves being received with diversity (path diversity) if there is an appropriate TDOA (time difference of arrival) between element waves forming the multipath (delayed waves) arriving at the receiver. Thus, with a path diversity, it is possible to obtain an effect of improving the transmission characteristics.

The appropriate minimum and maximum TDOAs with which a path diversity effect can be obtained will hereinafter be referred to as the "delay resolution" and the "maximum delay", respectively. The delay resolution and the maximum delay may be determined based on the principle of the modulation/demodulation scheme used, or based on the parameters and/or limitations on implementation of the modulation/demodulation scheme.

For example, with the DSSS scheme, it is possible, on the receiver side, to separate a receive signal into delayed wave components and combine them together (RAKE reception) to obtain a path diversity effect, with a delay resolution corresponding to the 1-chip length of the spread code and a maximum delay corresponding to a value that is less than the spread code length.

With the OFDM scheme, the delayed wave components are absorbed at the guard interval set for the signal, whereby the maximum delay corresponds to the guard period. Inter symbol interference does not occur if the TDOA between delayed waves is within the guard interval. Moreover, since an error correction operation is normally performed over a plurality of subcarriers, information can be reproduced even if some sub-carriers have errors therein due to a multipath distortion. The delay resolution corresponds to a value around the inverse of the frequency bandwidth. Thus, with the OFDM scheme, it is possible to obtain a path diversity effect (where the delay resolution is around the inverse of the frequency bandwidth) based on the effect of the guard interval and on the frequency diversity effect provided by scattering pieces of information over a wide frequency band and collecting the pieces together.

Moreover, when the PSK-VP scheme or the PSK-RZ scheme is used, the delay resolution corresponds to about several times less than a symbol length, and the maximum delay corresponds to a time less than 1 symbol-length. Furthermore, when the single carrier scheme, such as a PSK scheme and a QAM scheme is used at the transmitting end, the receiving end demodulates the signal utilizing an equalizer that uses a delay line with a tap. In this case, the delay resolution corresponds to 1 symbol-length, and the maximum delay corresponds to a time determined by the number of taps.

By artificially delaying the signal in performing a multi-station simultaneous transmission of the same signal from antennas of a plurality of base stations to thereby obtain the effect due to the path diversity by use of the modulation/demodulation scheme having the above-mentioned anti-multipath characteristic, there has been proposed a wireless transmission system which aims at active improvement of transmission characteristics, expansion of a communication area, or the like in a field of a cellular system or a broadcast system. Even in such a multi-station system, however, the effect due to the path diversity cannot be obtained at a point where the TDOA between incoming waves from respective antennas deviate from a range which is equal to or more than the above-mentioned delay resolution and equal to or more than above-mentioned maximum delay.

On the contrary, for example, when the TDOA between the incoming waves from two stations is extremely short, since the signals cancel each other at a point where two delayed waves with equal power are simultaneously received with opposite phases, the transmission characteristics will deteriorate significantly. Meanwhile, even in a point where the TDOA between the incoming waves from two stations exceeds the maximum delay, not only the path diversity effect is not obtained, but also the transmission characteristics will deteriorate. For that reason, in the conventional multi-station system, in order not to cause the above-mentioned problem, a proper difference is provided in transmission timings between the plurality of antennas for performing the multi-station simultaneous transmission, allowing the effect due to the path diversity to be certainly provided (for example, Patent Document 1).

FIG. 75A is a diagram illustrating a configuration of the conventional multi-station simultaneous transmission system described in Patent Document 1. In FIG. 75A, a base station 50 communicates with a moving terminal by use of a CDMA (Code Division Multiple Access) scheme. Remote antenna systems 52-1 through 52-$n$ lie between the base station and the moving terminal which is not shown, and relay a signal transmitted between the base station and a mobile station. The remote antenna systems 52-1 through 52-$n$ are arranged in a predetermined location far from the base station 50. The remote antenna systems 52-1 through 52-$n$ include high gain antennas 54-1 through 54-$n$, delay elements 56-1 through 56-$n$, and remote antennas 58-1 through 58-$n$.

The signals transmitted from the base station 50 are received by the high gain antennas 54-1 through 54-$n$ to then amplified, are subsequently delayed by predetermined times at the delay elements 56-1 through 56-$n$, respectively, and are transmitted from the remote antennas 58-1 through 58-$n$. In this system, the delay elements 56-1 through 56-$n$ that generate delay times which are multiple of a time ($\tau$) little larger time than one chip time of the spread code and are mutually different are provided in the remote antenna systems 52-1 through 52-$n$, respectively. As a result of this, for example, when areas that respective remote antennas 58-1 through 58-5 cover are formed as E58-1 through E58-5 shown in FIG. 75B, the TDOA between the incoming waves at an area overlap point having approximately equal distances from adjacent local antennas, to which the signals arrive from the adjacent local antennas at approximately equal power is set to a proper value (in this case, approximately $\tau$ through $3\tau$), and thus making it possible to certainly obtain the path diversity due to the multi-station simultaneous transmission.

Meanwhile, in recent years, a multihop system in which a plurality of wireless stations have performed wireless communications by mutually relaying data has been studied. FIG. 76 is a diagram illustrating a configuration of the conventional wireless transmission system described in Patent Document 2. In FIG. 76, the wireless transmission system is provided with six wireless stations 17-1 through 17-6. FIG. 77 is a diagram schematically illustrating a transmission timing of a packet that each wireless station shown in FIG. 76 transmits.

First, the wireless station 17-1 transmits a packet for broadcasting. Only the wireless stations 17-2 and 17-3 that are located near the wireless station 17-1 can receive the packet that the wireless station 17-1 has transmitted. The wireless stations 17-2 and 17-3 wait for the transmission between a timing of completing reception of the packet and a predetermined transmission timing, and simultaneously transmit the packet.

Next, only the wireless stations 17-4 and 17-5 can receive the packets that the wireless stations 17-2 and 17-3 have transmitted. The wireless stations 17-4 and 17-5 also wait for the transmission from a timing of completing reception of the packets to a predetermined transmission timing, and simultaneously transmit the packets. The wireless station 17-6 then receives the packets that the wireless stations 17-4 and 17-5 have transmitted. As described above, according to Patent Document 2, an OFDM (OFDM; Orthogonal Frequency Division Multiplexing) scheme having the anti-multipath characteristic is used in the multihop system, and thus the interference is avoided even when the plurality of wireless stations simultaneously transmit the same packet. Moreover, since a time required for the packet transmission for broadcasting can be reduced as compared with a case where the multihop transmission is sequentially performed from the wireless stations 17-1, 17-2, 17-3, 17-4, 17-5, and 17-6, in this order, transmission efficiency can be improved.

As described above, according to the conventional wireless transmission system described in Patent Document 2, the plurality of wireless stations can efficiently perform the multihop transmission by use of the modulation/demodulation scheme having the anti-multipath characteristic.

[Patent Document 1] Japanese Patent No. 3325890 specification

[Patent Document 2] Japanese Unexamined Patent Publication (Kokai) No. 2000-115181

[Non-patent Document 1] H. Takai, "BER Performance of Anti-multipath Modulation Scheme PSK-VP and its Optimum Phase-Waveform", IEEE, Trans. Veh. Technol., Vol. VT-42, 1993, November, p 625-639)

[Non-patent Document 2] S. Ariyavisitakul, S. Yoshida, F. Ikegami, K. Tanaka, T. Takeuchi, "A Power-efficient linear digital modulator and its application to an anti-multipath modulation PSK-RZ scheme", Proceedings of IEEE Vehicular Technology Conference 1987, 1987, June, p 66-71

DISCLOSURE OF THE INVENTION

Problems to be Solved by the Invention

Generally, since a multihop system is constructed by use of wireless stations adjacent to each other, a propagation path length between a wireless station for performing a multi-station simultaneous transmission of a packet and a receiving station will be almost the same from any stations. Hence, also in the conventional wireless transmission system described in Patent Document 2, when a proper difference between timings for transmitting the packets is not provided at the wireless station for performing the multi-station simultaneous transmission (for example, the wireless stations 17-4 and 17-5), since two delayed waves may cancel each other if they have opposite phases as described above, the effect due to the path diversity cannot be obtained.

However, since Patent Document 2 aims at reducing the time required for the packet transmission and increasing the transmission efficiency, it is not taken into consideration at all to certainly obtain the path diversity effect. For that reason, a method of certainly providing a proper transmission timing difference between the wireless stations is not described in Patent Document 2 at all.

Moreover, according to the conventional multi-station simultaneous transmission system described in Patent Document 1, a source of the signal is always one base station like a wireless system of a broadcast system or a cellular system, so that it aims at a system in which an arrangement of the antenna for performing the multi-station simultaneous transmission of the signal transmitted from the base station, and a transmission route are fixed. Accordingly, a case where the number of the wireless stations for performing the multi-station simultaneous transmission (the number of multi-stations) or the transmission route is changed by the movement of the wireless station serving as the source or the wireless station for relaying the signal is not taken into consideration at all. For that reason, when the conventional multi-station simultaneous transmission system described in Patent Document 1 is applied to the multihop system in which the wireless station for performing the multi-station simultaneous transmission or the transmission route is changed, the following problems may arise.

FIGS. 78A through 78C are diagrams for explaining the problems of adapting the multi-station simultaneous transmission system described in Patent Document 1 for the multihop system in which the number of multi-stations or the transmission route is changed. The wireless stations 17-1 through 17-n (n: natural number, n≧1) shown in FIG. 78 A form communication areas E17-1 through 17-m (m: natural number, 1≦m≦n), respectively, as shown in FIG. 78B or C.

It is assumed, for example, as shown in FIG. 78 A, that the delay times that are multiples of τ are allocated to n wireless stations 17-1 through 17-n, respectively, and the wireless stations 17-1 through 17-n give the allocated delay times to the packets to relay-transmit them. The delay time τ is the time equal to or more than the delay resolution.

For example, when respective wireless stations 17-1 through 17-6 have a relative position as shown in FIG. 78B, the wireless stations 17-2 and 17-3 perform the multi-station simultaneous transmission of the packet, which should be relay-transmitted and has been transmitted by the wireless station 17-1 (hereinafter, called a broadcast packet), and the wireless stations 17-4 and 17-5 subsequently perform the multi-station simultaneous transmission thereof again. In this case, since the delay times of 2τ through 5τ are set to the wireless stations 17-2 through 17-5, respectively, the TDOA between respective paths during the multi-station simultaneous transmission results in τ, so that the effect due to the path diversity can be obtained.

However, there may be a case where the wireless stations 17-1 through 17-5 and 17-m exist in a relative position as shown in FIG. 78C resulting from the movement, exchange, or the like of the wireless stations. In this case, the multi-station simultaneous transmission of the broadcast packet transmitted by the wireless station 17-2 is performed by the wireless stations 17-1 and 17-5. However, since there is the time difference of 4τ between the delay time τ allocated to the wireless station 17-1 and the delay time 5τ allocated to the wireless station 17-5, if 4τ exceeds the maximum delay, the effect due to the path diversity cannot be obtained. Hence, the wireless stations 17-3 and 17-m which should receive the packet transmitted from the wireless stations 17-1 and 17-5 will not be able to receive the broadcast packet. Meanwhile, if 4τ is the maximum delay or less, the multi-station simultaneous transmission of the broadcast packet that the wireless stations 17-3 and 17-m transmit is again performed with the time difference (m−3)τ. In addition, in this case, however, if (m−3)τ exceeds the maximum delay, the effect due to path diversity cannot be obtained, either, so that the wireless station 17-4 cannot receive the broadcast packet.

Moreover, in order not to cause the problem of exceeding the maximum delay as described above during the multi-station simultaneous transmission regardless of the relative position of the wireless stations, there may be considered an approach to perform the multihop transmission of the packet to, for example, the wireless stations 17-1 through 17-k (k: natural number, 1≦k≦n) by use of the modulation/demodulation scheme in which the maximum delay is kτ or more and less than (k+1)τ. In this case, as shown in FIG. 79A, it is also considered that the delay time jτ (j: remainder when m is divided by k) is allocated to the wireless station 17-m having a wireless station ID number of m. Also in this case, however, since the wireless stations set to the same delay time may be present, for example, as shown in FIG. 79B, if the same delay time is allocated to the wireless station 17-a and the wireless station 17-b which perform the multi-station simultaneous transmission of the packet, the timings when the incoming waves from the wireless station 17-a and the wireless station 17-b arrive at the wireless stations 17-4 and 17-5 result in the same, so that the effect due to the path diversity cannot be obtained.

The number of the delay amounts which can be set by the above-mentioned method is limited to about a value when dividing the maximum delay by the delay resolution. As a result, if the maximum delay is infinitely large, or the delay resolution is infinitely small, the above-mentioned problems may not be caused. In practice, however, since the delay resolution and the maximum delay certainly exist for every modulation/demodulation scheme due to parameters of the modulation/demodulation scheme and constraints on implementation, if the conventional multi-station simultaneous transmission system described in Patent Document 1 is applied to the multi-station simultaneous transmission of the multihop system, there may arise a case where the path diversity effect cannot be obtained as described above.

Therefore, an object of the present invention is, in the multi-station simultaneous transmission system in which the plurality of wireless stations arranged adjacently to each other transmit the same data, to provide the wireless transmission system which can certainly obtain the effect due to the path diversity even when the relative position between the wireless stations or the number of wireless stations for performing the multi-station simultaneous transmission of the data is changed, the wireless station used therein, and a method therefore.

Solution to the Problems

In order to solve the aforementioned problems, the present invention has following features. A first aspect of the present invention is a wireless transmission system capable of performing a multi-station simultaneous transmission of data by wireless. The wireless transmission system is provided with a plurality of wireless stations for transmitting/receiving data. A path diversity system is formed by a transmitter-side wireless station, a multipath channel, and a receiver-side wireless station in the wireless transmission system. At least one of the plurality of wireless stations decides, in accordance with a response packet responsive to a multi-station simultaneous transmission request packet transmitted by the wireless station or other stations, a plurality of delay amounts relative to a reference timing during the multi-station simultaneous transmission in the wireless transmission system. Each difference between the plurality of delay amounts is set to not less than the predetermined delay resolution. The difference between the maximum and minimum values in the plurality of delay amounts is set to not more than the predetermined maximum delay.

According to the first aspect of the present invention, before performing the multi-station simultaneous transmission of the data, each delay amount allocated to the wireless station for performing the multi-station simultaneous transmission is decided in accordance with the response packet responsive to the multi-station simultaneous transmission request packet. It is set so that each difference between the respective delay amounts may be not less than the predetermined delay resolution, and the difference between the maximum and minimum values may be not more than the predetermined maximum delay. Hence, even when a relative position or the number of wireless stations capable of performing the multi-station simultaneous transmission changes, the data will arrive at the wireless station at the receiving end in a state where the multipath with a proper TDOA occurs. Since the wireless transmission system of the present invention constitutes the system for path diversity by the wireless station at the transmitting end, the multipath transmission path, and the wireless station at the receiving end, the effect due to the path diversity can be certainly obtained in the state where the multipath with the proper TDOA occurs.

Specifically, the predetermined delay resolution and the predetermined maximum delay are set to the values for the wireless station at the receiving end to be able to perform the path diversity reception of a plurality of delayed waves, respectively.

When designing the system of the present invention, such values can be readily decided depending on how to constitute the system for path diversity. Hence, it is possible to construct the wireless transmission system which can readily provide the effect due to path diversity.

In one embodiment, the plurality of wireless stations include a plurality of management stations for managing at least one terminal station which exists within a certain communication area. Each of the management stations transmits and receives, prior to communication, the multi-station simultaneous transmission request packet and the response packet as a negotiation packet for establishing a communicatable state. At least one wireless station is a source management station for transmitting the data to a management station which performs the multi-station simultaneous transmission among the plurality of management stations. The source management station includes a delay amount determining section for recognizing, based on the negotiation packet, a management station capable of performing the multi-station simultaneous transmission to thereby decide the plurality of delay amounts when the multi-station simultaneous transmission is performed by the management station which has been recognized.

Thus, it is necessary to provide the delay amount determining section in not all the management stations which exist in the wireless transmission system. As a result, the data can be simultaneously transmitted at a suitable timing also from the management station with a simple configuration, in which the delay amount determining section is not provided.

In one embodiment, the plurality of wireless stations include a plurality of management stations for managing at least one terminal station which exists within a certain communication area. Each of the management stations transmits and receives, prior to communication, the multi-station simultaneous transmission request packet and the response packet as a negotiation packet for establishing a communicatable state. At least the one wireless station is each of the management stations, which becomes a management station capable of performing the multi-station simultaneous transmission based on the negotiation packet, among the plurality of management stations. Each of the management station decides the delay amount given to the data of its own-station.

Thus, each of the management stations independently decides the delay amount, so that it is not necessary to notify the delay amounts allocated to other management stations to each other. Hence, deterioration in transmission efficiency can be prevented.

In one embodiment, the wireless transmission system is a system for causing other wireless stations to relay a packet from a source wireless station to transmit the packet to a destination wireless station. The plurality of wireless stations include the source wireless station, the wireless station for relaying the packet, and the destination wireless station. Each wireless station includes: when there is any packet to be simultaneously transmitted, a broadcast section for broadcasting the multi-station simultaneous transmission request packet for requesting other wireless stations to perform the multi-station simultaneous transmission; when the multi-station simultaneous transmission request packet is received, a broadcast response packet generating/transmitting section for generating and transmitting a broadcast response packet responsive to the multi-station simultaneous transmission request packet; when the broadcast response packet is received, a simultaneous transmission station determining section for determining, based on the broadcast response packet, the wireless station capable of performing the multi-station simultaneous transmission; a delay amount determining section for determining the plurality of delay amounts for the packets simultaneously transmitted to the plurality of stations by the wireless station capable of performing the multi-station simultaneous transmission, which is determined by the simultaneous transmission station determining section; and when own-station is a source wireless station, a simultaneous transmission canceling section for notifying, upon receiving the broadcast response packet from the destination wireless station to cancel the multi-station simultaneous transmission.

Thus, when the packet to be simultaneously transmitted directly arrives at the destination wireless station from the source wireless station without the wireless station to relay, it is possible to prevent an unnecessary multi-station simultaneous transmission from being performed. Note herein that canceling of the multi-station simultaneous transmission is implemented by, for example, transmitting a multi-station simultaneous transmission canceling packet which notifies that the multi-station simultaneous transmission is canceled to other wireless stations. Alternatively, it is determined in advance that only the wireless station which has received the delay amount notice packet including therein the delay amount addressed to its own-station performs the multi-station simultaneous transmission, and when the source wireless station receives the response packet from the destination wireless station, the delay amount notice packet is not transmitted, and thus canceling of the multi-station simultaneous transmission is also implemented.

In one embodiment, the wireless transmission system is a system for causing other wireless stations to relay a packet from a source wireless station to transmit the packet to a destination wireless station. The plurality of wireless stations include the source wireless station, the wireless station for relaying the packet, and the destination wireless station. Each wireless station includes: when there is any packet to be simultaneously transmitted, a broadcast section for broadcasting the multi-station simultaneous transmission request packet for requesting other wireless stations to perform the multi-station simultaneous transmission; when the multi-station simultaneous transmission request packet is received, a broadcast response packet generating/transmitting section for generating and transmitting a broadcast response packet responsive to the multi-station simultaneous transmission request packet; when the broadcast response packet is received, a simultaneous transmission station determining section for determining, based on the broadcast response packet, the wireless station capable of performing the multi-station simultaneous transmission; a delay amount determining section for determining the plurality of delay amounts for the packets simultaneously transmitted to the plurality of stations by the wireless station capable of performing the multi-station simultaneous transmission, which is determined by the simultaneous transmission station determining section; and when own-station is a source wireless station, a simultaneous transmission canceling section for notifying, upon receiving a notice from the relay station which has received the broadcast response packet from the destination wireless station responsive to the packet to be simultaneously transmitted in that the broadcast response packet from the destination wireless station is received, other wireless stations to cancel the multi-station simultaneous transmission.

Thus, when the packet to be simultaneously transmitted arrives at the destination wireless station, it is possible to prevent the unnecessary multi-station simultaneous transmission from being performed.

Specifically, the multi-station simultaneous transmission request packet may be a channel information packet on communication channel that each of the wireless stations uses.

Thus, a procedure for transmitting/receiving a single purpose packet dedicated for a timing adjustment during the multi-station simultaneous transmission can be reduced by use of the channel information packet for the purpose of the multi-station simultaneous transmission request packet. Hence, the delay amount allocated to each wireless station can be determined efficiently.

In one embodiment, the plurality of wireless stations include a plurality of management stations for managing at least one terminal station which exists within a certain communication area. Each of the management stations transmits and receives, prior to communication, the multi-station simultaneous transmission request packet and the response packet as a negotiation packet for establishing a communicatable state. At least one wireless station is either of the plurality of management stations the at least one wireless station includes a delay amount determining section for recognizing, based on the negotiation packet, a management station capable of performing the multi-station simultaneous transmission to thereby determine the plurality of delay amounts when the multi-station simultaneous transmission is performed by the management station which has been recognized.

Thus, before performing the multi-station simultaneous transmission of the data, the transmission timing of each management station during the multi-station simultaneous transmission can always be decided appropriately by use of the management station transmitting/receiving common information. Hence, even when the number of management stations capable of the multi-station simultaneous transmission changes, it is possible to generate the multipath with the proper TDOA during the multi-station simultaneous transmission, and thus the effect due to the path diversity can be certainly obtained.

As one example, the multi-station simultaneous transmission request packet may be a request-to-send packet RTS (Request To Send) to be transmitted regardless of the availability of the multi-station simultaneous transmission, and the broadcast response packet may be a response packet CTS (Clear To Send) responsive to the request-to-send packet RTS.

As described above, by using a packet used for applications for collision avoidance of packets in a wireless LAN system using an IEEE802.11 standard or the like for the timing adjustment of the multi-station simultaneous transmission, a procedure for transmitting/receiving the packet dedicated for the timing adjustment during the multi-station simultaneous transmission can be reduced. Hence, the delay amount allocated to each wireless station can be determined efficiently.

As another example, the multi-station simultaneous transmission request packet may be the packet to be simultaneously transmitted, or a part of the packet to be simultaneously transmitted.

As described above, by using the packet to be simultaneously transmitted itself as the multi-station simultaneous transmission request packet, a procedure for transmitting/receiving the packet dedicated for the timing adjustment during the multi-station simultaneous transmission can be reduced. Hence, the delay amount allocated to each wireless station can be determined efficiently.

In one embodiment, the wireless transmission system is a system for causing other wireless stations to relay a packet from a source wireless station to transmit the packet to a destination wireless station. The plurality of wireless stations include the source wireless station, the wireless station for relaying the packet, and the destination wireless station. Each wireless station includes when there is any packet to be simultaneously transmitted, a broadcast section for broadcasting the multi-station simultaneous transmission request packet for requesting other wireless stations to perform the multi-station simultaneous transmission; when the multi-station simultaneous transmission request packet is received, a broadcast response packet generating/transmitting section for generating and transmitting a broadcast response packet responsive to the multi-station simultaneous transmission request packet; when the broadcast response packet is received, a simultaneous transmission station determining section for determining, based on the broadcast response packet, the wireless station capable of performing the multi-station simultaneous transmission; a delay amount determining section for determining the plurality of delay amounts for the packets simultaneously transmitted to the plurality of stations by the wireless station capable of performing the multi-station simultaneous transmission, which is determined by the simultaneous transmission station determining section; and when the multi-station simultaneous transmission request packet is received from the source wireless station, a relay availability determining section for determining whether or not its own-station can relay a packet transmitted from the source wireless station. The broadcast response packet generating/transmitting section generates and transmits the broadcast response packet including a determination result of the relay availability determining section.

Thus, the wireless station can correctly grasp the number of the wireless stations which can perform the multi-station simultaneous transmission. Hence, it is possible to allocate the suitable delay amount to the wireless station capable of performing the multi-station simultaneous transmission, and thus the effect due to the path diversity can be certainly obtained. Moreover, since it is possible that even the wireless station having a multi-station simultaneous transmission function do not participate in the multi-station simultaneous transmission according to a low power supply and a loaded condition of its own-station, a flexible multi-station simultaneous transmission system can be constructed.

In one embodiment, the wireless transmission system is a system for causing other wireless stations to relay a packet from a source wireless station to transmit the packet to a destination wireless station. The plurality of wireless stations include the source wireless station, the wireless station for relaying the packet, and the destination wireless station. Each wireless station includes: when there is any packet to be simultaneously transmitted, a broadcast section for broadcasting the multi-station simultaneous transmission request packet for requesting other wireless stations to perform the multi-station simultaneous transmission; when the multi-station simultaneous transmission request packet is received, a broadcast response packet generating/transmitting section for generating and transmitting a broadcast response packet responsive to the multi-station simultaneous transmission request packet; when the broadcast response packet is received, a simultaneous transmission station determining section for determining, based on the broadcast response packet, the wireless station capable of performing the multi-station simultaneous transmission; a delay amount determining section for determining the plurality of delay amounts for the packets simultaneously transmitted to the plurality of stations by the wireless station capable of performing the multi-station simultaneous transmission, which is determined by the simultaneous transmission station determining section; and when the multi-station simultaneous transmission request packet is received from the source wireless station, a relay availability determining section for determining whether or not its own-station can relay a packet transmitted from the source wireless station. When it is determined by the relay availability determining section that the relay transmission is available, the broadcast response packet generating/transmitting section generates and transmits the broadcast response packet.

Thus, the wireless station can correctly grasp the number of the wireless stations which can perform the multi-station simultaneous transmission. Hence, it is possible to allocate the suitable delay amount to the wireless station capable of performing the multi-station simultaneous transmission, and thus the effect due to the path diversity can be certainly obtained. Furthermore, since probability of collision of the broadcast response packets can be reduced by only a station capable of performing the relay transmission returning a response broadcast packet, it is possible to grasp the number of the wireless stations capable of performing the multi-station simultaneous transmission more certainly as compare with a case where all the wireless stations which have received the multi-station simultaneous transmission request packet return the broadcast response packet to thereby grasp the number of the wireless stations capable of performing the multi-station simultaneous transmission from the contents of the packet.

Preferably, at least one wireless station may determine the delay amount according to the number of the wireless stations which can perform the multi-station simultaneous transmission.

Thus, the optimal delay amount according to the number of wireless stations which can perform the multi-station simultaneous transmission can be determined. Hence, even when the number of the wireless stations capable of performing the multi-station simultaneous transmission changes, it is possible to generate the multipath with the proper TDOA during the multi-station simultaneous transmission according to the number of multi-stations, and thus the effect due to the path diversity can always be obtained to the maximum extent.

Preferably, at least one wireless station may notify the delay amount to a wireless station which can perform the multi-station simultaneous transmission.

Thus, it is necessary to provide delay amount determining means in not all the wireless stations which exist in the wireless transmission system. Hence, the packet can be simultaneously transmitted at the suitable timing also from the wireless station with a simple configuration, in which the delay amount determining means is not provided.

Moreover, a source wireless station which has transmitted the data to a wireless station capable of performing the multi-station simultaneous transmission may retransmit the data based on a delay amount allocated to its own-station among the plurality of delay amounts.

Thus, even when the wireless station capable of performing the multi-station simultaneous transmission other than the source wireless station is one in number, the source wireless station retransmits the packet, and thus the multipath can be generated and the effect due to the path diversity can be certainly provided.

In one embodiment, among the plurality of delay amounts, a delay amount to be allocated to a source wireless station which transmits the data to a wireless station capable of performing the multi-station simultaneous transmission, is determined by the source wireless station. The source wireless station sets a delay amount of a wireless station capable of performing the multi-station simultaneous transmission other than its own-station to 0 to thereby retransmit the data based on a delay amount allocated thereto.

Thus, even when the wireless station which relays the packet from the source wireless station is one in number, the source wireless station retransmits the packet, and thus the multipath can be generated and the effect due to the path diversity can be certainly provided. Additionally, once it is defined in advance that the wireless station capable of performing the multi-station simultaneous transmission other than the source wireless station, namely, the wireless station which relays the packet, when the delay amount notice packet including therein the delay amount addressed to its own-station is not received, performs the multi-station simultaneous transmission as setting the delay amount to 0, it is not necessary to notify the delay amount to the wireless station to relay, and thus the deterioration in transmission efficiency can be suppressed.

Preferably, at least one wireless station may determine the delay amount in the order of receiving the response packet.

Thus, since the wireless stations capable of performing the multi-station simultaneous transmission can determine the delay amounts allocated to their own-stations based on the order of transmitting the response packet, respectively, the procedure for notifying the delay amount is eliminated. Hence, the deterioration in transmission efficiency can be suppressed.

Preferably, a wireless station for performing the multi-station simultaneous transmission includes a storage section for storing a delay amount record table for recording the delay amount determined by the at least one wireless station. The wireless station for performing the multi-station simultaneous transmission may refer to the delay amount record table to thereby transmit the data to be simultaneously transmitted at a timing delayed by the delay amount allocated to its own-station.

Thus, since the wireless station keeps the delay amount record table on which the delay amount is recorded, it does not need to set the delay amount again as long as there is no change in the wireless station capable of performing the multi-station simultaneous transmission in number. Hence, the number of times of transmitting/receiving information required for notifying the delay amount can be suppressed to minimum, and thus the deterioration in transmission efficiency can be suppressed.

As one example, only a delay amount allocated to its own-station is recorded on the delay amount record table.

Thus, an increase in memory capacity required for storing the delay amount record table can be suppressed even when the number of wireless stations capable of performing the multi-station simultaneous transmission is increased.

As another example, delay amounts allocated to all the wireless stations which perform the multi-station simultaneous transmission are recorded on the delay amount record table.

Thus, by determining in advance a modification procedure of the delay amount when the wireless station capable of performing the multi-station simultaneous transmission changes, the modification procedure when the wireless station capable of performing the multi-station simultaneous transmission changes can be simplified as compared with a case of notifying the delay amount of other station. Hence, the deterioration in transmission efficiency can be suppressed.

In one embodiment, each wireless station includes: a packet transmitting section for transmitting a packet to be simultaneously transmitted to a wireless station capable of performing the multi-station simultaneous transmission; when the multi-station simultaneous transmission is available, a packet receiving section for receiving a packet to be simultaneously transmitted by the other wireless stations; a transmission timing control section for using the timing delayed by the delay amount as a transmission timing of the data; and a multi-station simultaneous transmission section for transmitting the packet received by the packet receiving section at the transmission timing determined by the transmission timing control section.

Thus, other than the data kept in advance by each wireless station as the data to be simultaneously transmitted, the data included in the packet transmitted from other wireless stations can be simultaneously transmitted at the suitable timing.

Preferably, if the number of the wireless stations capable of performing the multi-station simultaneous transmission is more than the maximum number of effective branches, at least one wireless station may reduce the number of the wireless stations determined to be able to perform the multi-station simultaneous transmission to not more than the maximum number of effective branches.

As described above, by limiting the number of the wireless station for performing the multi-station simultaneous transmission, the multi-station simultaneous transmission can be efficiently performed, without applying the load more than needed to the wireless station.

Preferably, the wireless transmission system is a system for causing other wireless stations to relay a packet from a source wireless station to transmit the packet to a destination wireless station. The plurality of wireless stations include the source wireless station, the wireless station for relaying the packet, and the destination wireless station. When there is any packet to be simultaneously transmitted, and when the response packet transmitted by the other wireless station responsive to the multi-station simultaneous transmission request packet in number more than the maximum number of effective branches is received, each wireless station does not transmit the response packet.

As described above, by restricting the transmission of the broadcast response packet, the transmission of the unnecessary broadcast response packet can be prevented. Hence, the multi-station simultaneous transmission can be efficiently performed, without applying the load more than needed to the wireless station, while suppressing interference to other wireless systems.

Preferably, if the number of management stations capable of performing the multi-station simultaneous transmission is more than the maximum number of effective branches, at least one wireless station may reduce the number of delay amounts to be determined to not more than the maximum number of effective branches.

Thus, even when the number of the wireless stations capable of performing the multi-station simultaneous transmission is more than the maximum number of effective branches which contributes to the effect due to the path diversity, incoming waves can be intensively received at timings the number of which corresponds to the maximum number of effective branches during the multi-station simultaneous transmission at the destination wireless station. Hence, even when the maximum number of effective branches in the wireless transmission system has a limit, the path diversity effect can be certainly obtained.

Moreover, according to a second aspect of the present invention, there is provided a wireless station used in a wireless transmission system capable of performing a multi-station simultaneous transmission of data by wireless. A path diversity system is formed by transmitter-side wireless stations, a multipath channel, and a receiver-side wireless station in the wireless transmission system. The wireless station according to the present invention includes a response packet receiving section for receiving a response packet responsive to a multi-station simultaneous transmission request packet transmitted by its own-station or other stations, and in response to the response packet being received by the response packet receiving section, a delay amount determining section for determining a plurality of delay amounts relative to a reference timing during the multi-station simultaneous transmission in the wireless transmission system. Each difference between the plurality of delay amounts is set to not less than a predetermined delay resolution, and the difference between the maximum and minimum values in the plurality of delay amounts is set to not more than the predetermined maximum delay.

Moreover, according to a third aspect of the present invention, there is provided a method used in a wireless transmission system capable of performing a multi-station simultaneous transmission of data by wireless. The wireless transmission system includes a plurality of wireless stations for transmitting/receiving data. A path diversity system is formed by a transmitter-side wireless station, a multipath channel, and a receiver-side wireless station in the wireless transmission system. According to this method, a plurality of delay amounts relative to a reference timing during the multi-station simultaneous transmission in the wireless transmission system is decided, in accordance with a response packet responsive to a multi-station simultaneous transmission request packet transmitted by the wireless station or other stations, by at least one of the plurality of wireless stations. Each difference between the plurality of delay amounts is set to not less than a predetermined delay resolution, and the difference between the maximum and minimum values in the plurality of delay amounts is set to not more than the predetermined maximum delay.

EFFECT OF THE INVENTION

As mentioned above, the present invention provides, in the multi-station simultaneous transmission system in which the plurality of wireless stations arranged adjacently to each other transmit the same data, even when the relative position between the wireless stations or the number of wireless stations for performing the multi-station simultaneous transmission of the data is changed, the wireless transmission system which can certainly obtain the effect due to the path diversity, the wireless station used therein, and the method used therefore.

These and other objects, features, aspects and effects of the invention will become more apparent from the following detailed description with reference to the appended drawings.

BRIEF DESCRIPTION OF THE DRAWINGS

FIG. 16C is a diagram illustrating an example of the configuration change of the wireless transmission system according to the first through fourth embodiments of the present invention.

FIG. 17A is a diagram illustrating an example of a delay amount record table of the management station according to the first embodiment of the present invention.

FIG. 17B is a diagram illustrating an example of a packet transmission timing according to the first embodiment of the present invention.

FIG. 18 is a diagram illustrating an operation of the management station and a delay amount decision procedure at the time of a response packet collision according to the first through fourth embodiments of the present invention.

FIG. 27C is a diagram illustrating the operation of the management station and the delay amount decision procedure according to the second embodiment of the present invention.

FIG. 28A is a diagram illustrating an example of a delay amount record table of the management station according to the second embodiment of the present invention.

FIG. 28B is a diagram illustrating an example of a packet transmission timing during a multi-station simultaneous transmission of the management station according to the second embodiment of the present invention.

FIG. 29B is a diagram illustrating an example of a packet transmission timing during a multi-station simultaneous transmission of the management station according to the second embodiment of the present invention.

FIG. 30A is a diagram illustrating an operation of the management station and a delay amount decision procedure according to the third embodiment of the present invention.

FIG. 30B is a diagram illustrating an example of the delay amount record table of the management station according to the third embodiment of the present invention.

FIG. 31B is a diagram illustrating an example of the delay amount record table of the management station according to the third embodiment of the present invention.

FIG. 32A is a diagram illustrating an example of the delay amount record table according to the first through fourth embodiments of the present invention.

FIG. 32B is a diagram illustrating an example of the delay amount record table according to the first through fourth embodiments of the present invention.

FIG. 35A is a diagram illustrating an example of a method of changing the delay amount record table when the number of management stations is reduced according to the first through fourth embodiments of the present invention.

FIG. 35B is a diagram illustrating an example of the method of changing the delay amount record table when the number of management stations is reduced according to the first through fourth embodiments of the present invention.

FIG. 35C is a diagram illustrating an example of the method of changing the delay amount record table when the number of management stations is reduced according to the first through fourth embodiments of the present invention.

FIG. 35D is a diagram illustrating an example of the method of changing the delay amount record table when the number of management stations is reduced according to the first through fourth embodiments of the present invention.

FIG. 35E is a diagram illustrating an example of the method of changing the delay amount record table when the number of management stations is reduced according to the first through fourth embodiments of the present invention.

FIG. 39B is a diagram illustrating an example of the method of changing the delay amount record table when the number of management stations is reduced according to the first through fourth embodiments of the present invention.

FIG. 39C is a diagram illustrating an example of the method of changing the delay amount record table when the number of management stations is reduced according to the first through fourth embodiments of the present invention.

FIG. 39D is a diagram illustrating an example of the method of changing the delay amount record table when the number of management stations is reduced according to the first through fourth embodiments of the present invention.

FIG. 39E is a diagram illustrating an example of the method of changing the delay amount record table when the number of management stations is reduced according to the first through fourth embodiments of the present invention.

FIG. 40 is a sequence diagram illustrating an outline of operation of a management station according to the fourth embodiment of the present invention.

FIG. 45 is a diagram illustrating a configuration of a packet transmitted according to the fifth through eighth embodiments of the present invention.

FIG. 55C is a diagram illustrating an example of the configuration change of the wireless transmission group according to the fifth through eighth embodiments of the present invention.

FIG. 56A is a diagram illustrating an example of the delay amount record table of the wireless station according to the fifth embodiment of the present invention.

FIG. 56B is a diagram illustrating an example of a packet transmission timing during a multi-station simultaneous transmission of the wireless station according to the fifth embodiment of the present invention.

FIG. 62C is a diagram illustrating a packet transmission timing during a multi-station simultaneous transmission according to the seventh embodiment of the present invention.

FIG. 63A is a diagram illustrating an example of a packet transmission timing during a multi-station simultaneous transmission when the wireless stations more than the maximum number of effective branches in number perform the multi-station simultaneous transmission.

FIG. 63B is a diagram illustrating an example of the delay amount record table of the wireless station when the wireless stations more than the maximum number of effective branches in number perform the multi-station simultaneous transmission.

FIG. 66B is a diagram illustrating an example of the configuration change of the wireless transmission group according to the fifth through eighth embodiments of the present invention.

FIG. 67A is a diagram illustrating an example of a method of changing the delay amount record table when the number of wireless stations is reduced according to the fifth through eighth embodiments of the present invention.

FIG. 67B is a diagram illustrating an example of the method of changing the delay amount record table when the number of wireless stations is reduced according to the fifth through eighth embodiments of the present invention.

FIG. 67C is a diagram illustrating an example of the method of changing the delay amount record table when the number of wireless stations is reduced according to the fifth through eighth embodiments of the present invention.

FIG. 67D is a diagram illustrating an example of the method of changing the delay amount record table when the number of wireless stations is reduced according to the fifth through eighth embodiments of the present invention.

FIG. 67E is a diagram illustrating an example of the method of changing the delay amount record table when the number of wireless stations is reduced according to the fifth through eighth embodiments of the present invention.

FIG. 68A is a diagram illustrating an example of the method of changing the delay amount record table when the number of wireless stations is reduced according to the fifth through eighth embodiments of the present invention.

FIG. 68B is a diagram illustrating an example of the method of changing the delay amount record table when the number of wireless stations is reduced according to the fifth through eighth embodiments of the present invention.

FIG. 68C is a diagram illustrating an example of the method of changing the delay amount record table when the number of wireless stations is reduced according to the fifth through eighth embodiments of the present invention.

FIG. 68D is a diagram illustrating an example of the method of changing the delay amount record table when the number of wireless stations is reduced according to the fifth through eighth embodiments of the present invention.

FIG. 68E is a diagram illustrating an example of the method of changing the delay amount record table when the number of wireless stations is reduced according to the fifth through eighth embodiments of the present invention.

FIG. 69 is a sequence diagram illustrating an outline of operation of the wireless station according to the eighth embodiment of the present invention.

Figure 70A:
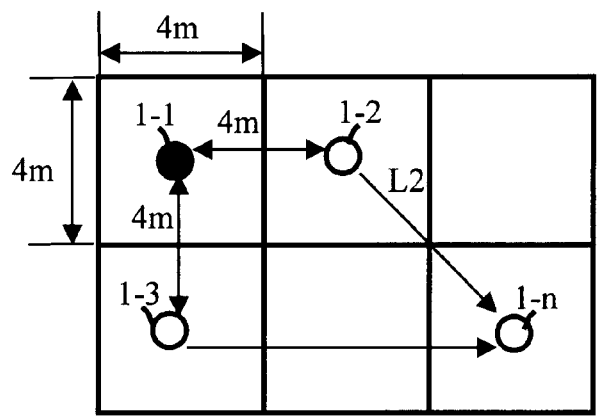

FIG. 70A is a diagram illustrating a concrete application example of the present invention.

Figure 70B:
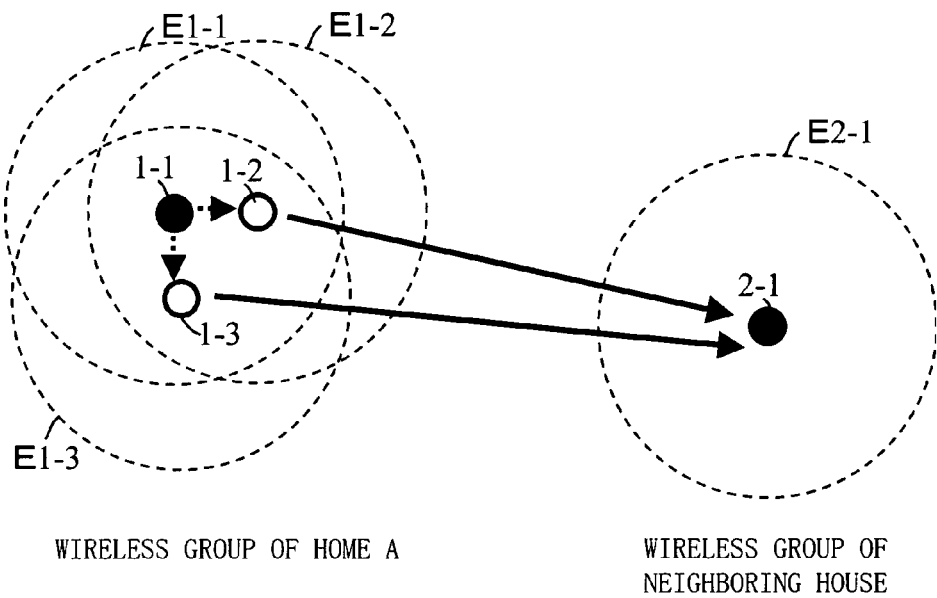

FIG. 70B is a diagram illustrating a concrete application example of the present invention.

Figure 71:
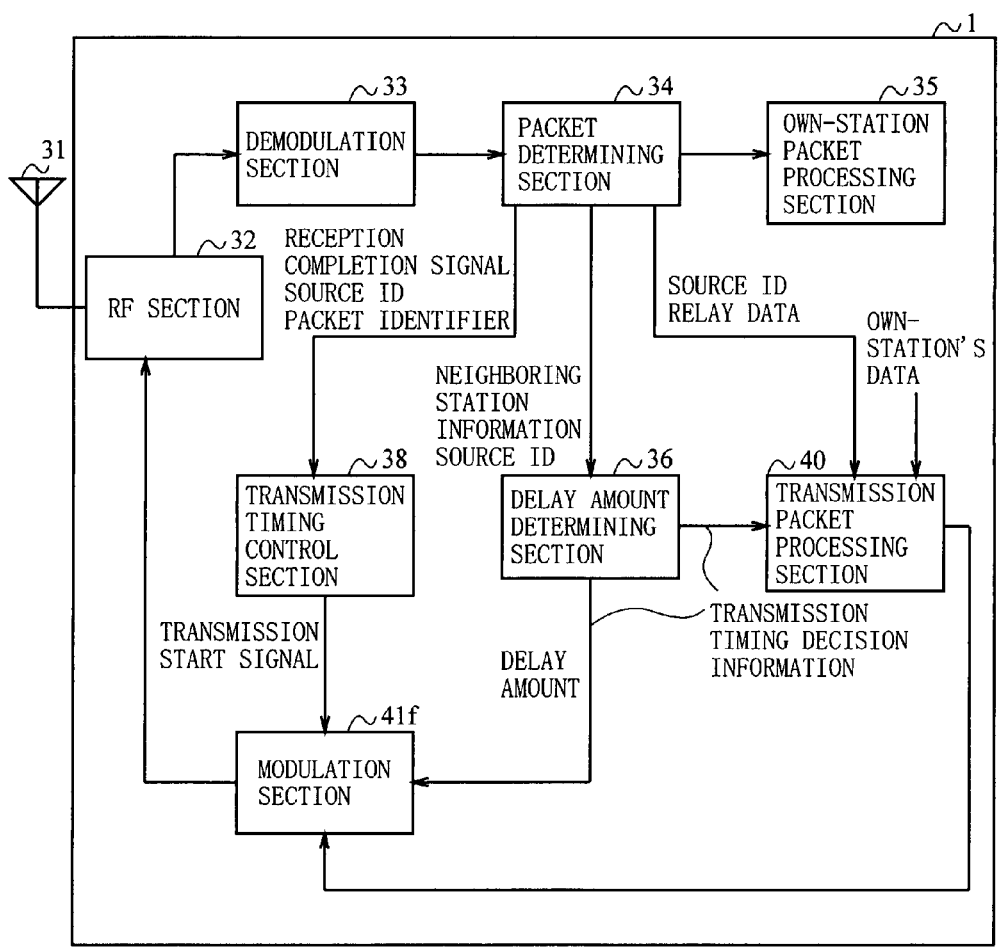

FIG. 71 is a block diagram illustrating a configuration of a wireless station when a modulation section gives a delay to a modulated baseband signal.

Figure 72:
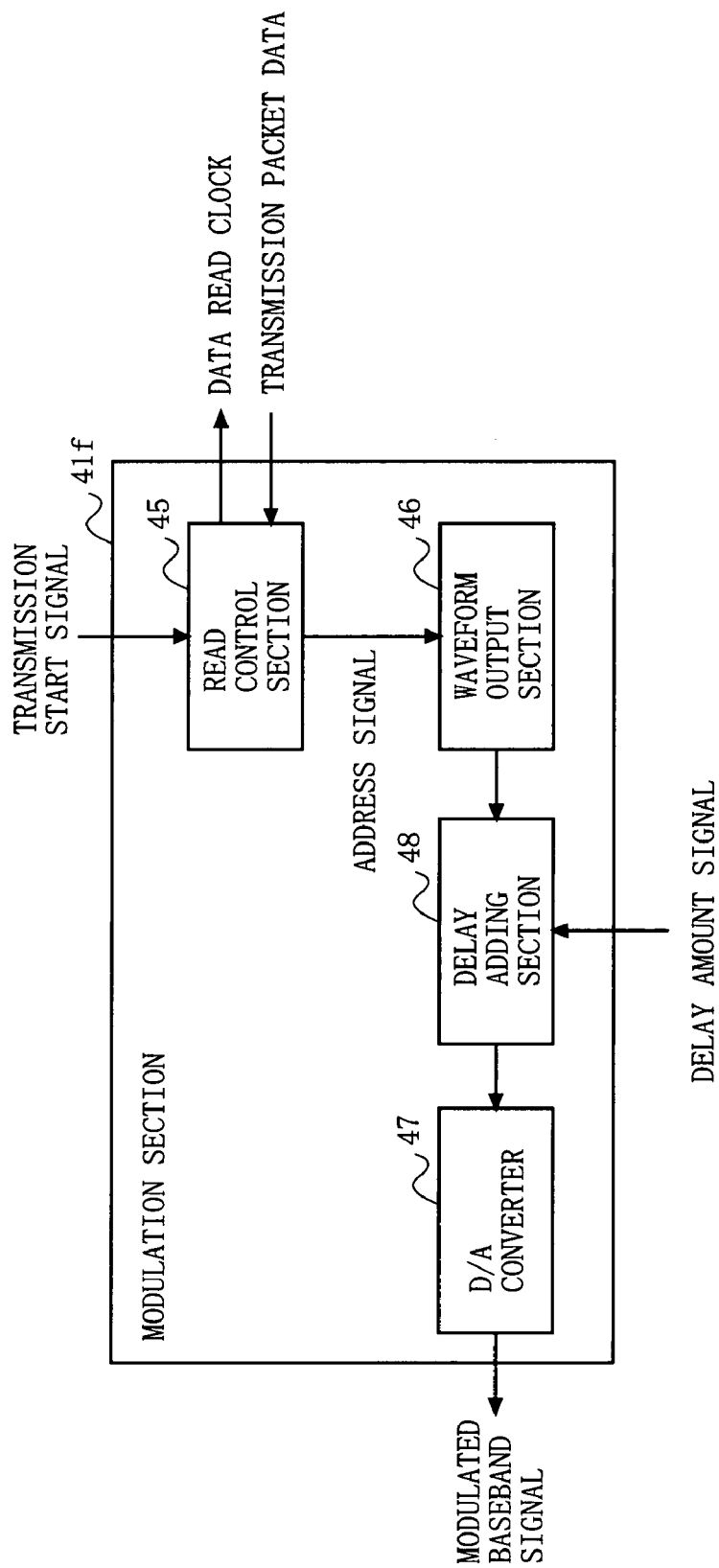

FIG. 72 is a block diagram illustrating a configuration of a modulation section 41f shown in FIG. 71.

Figure 73:
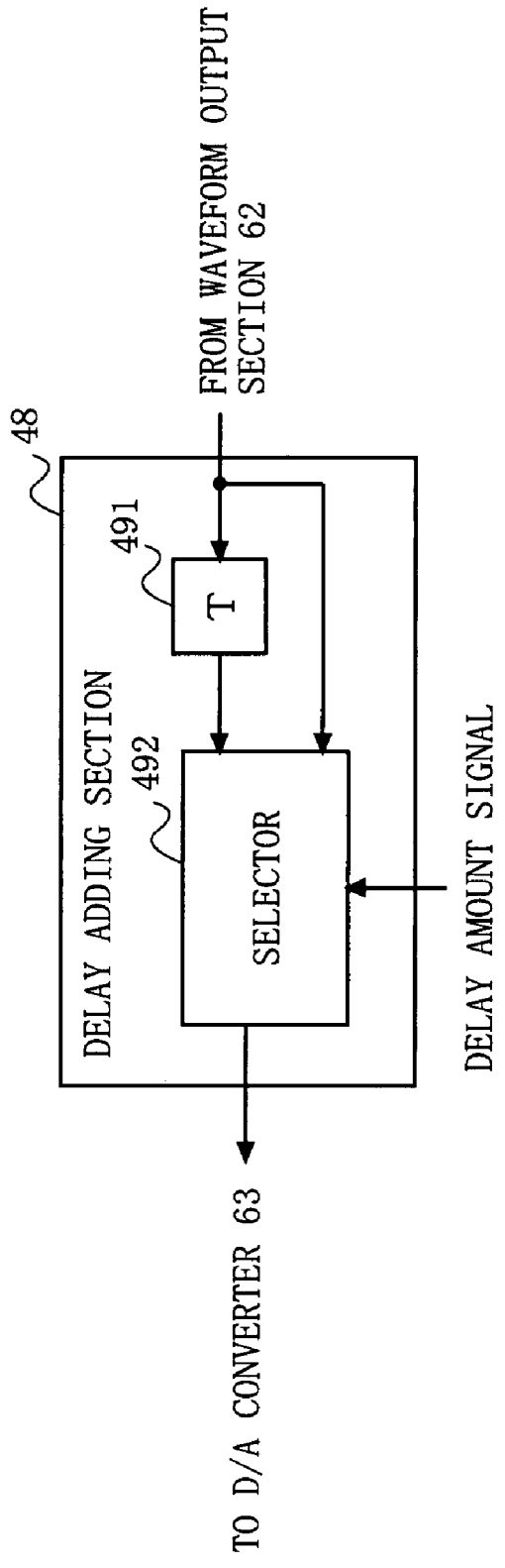

FIG. 73 is a block diagram illustrating an example of a detailed configuration of a delay adding section 48 shown in FIG. 72.

Figure 74:
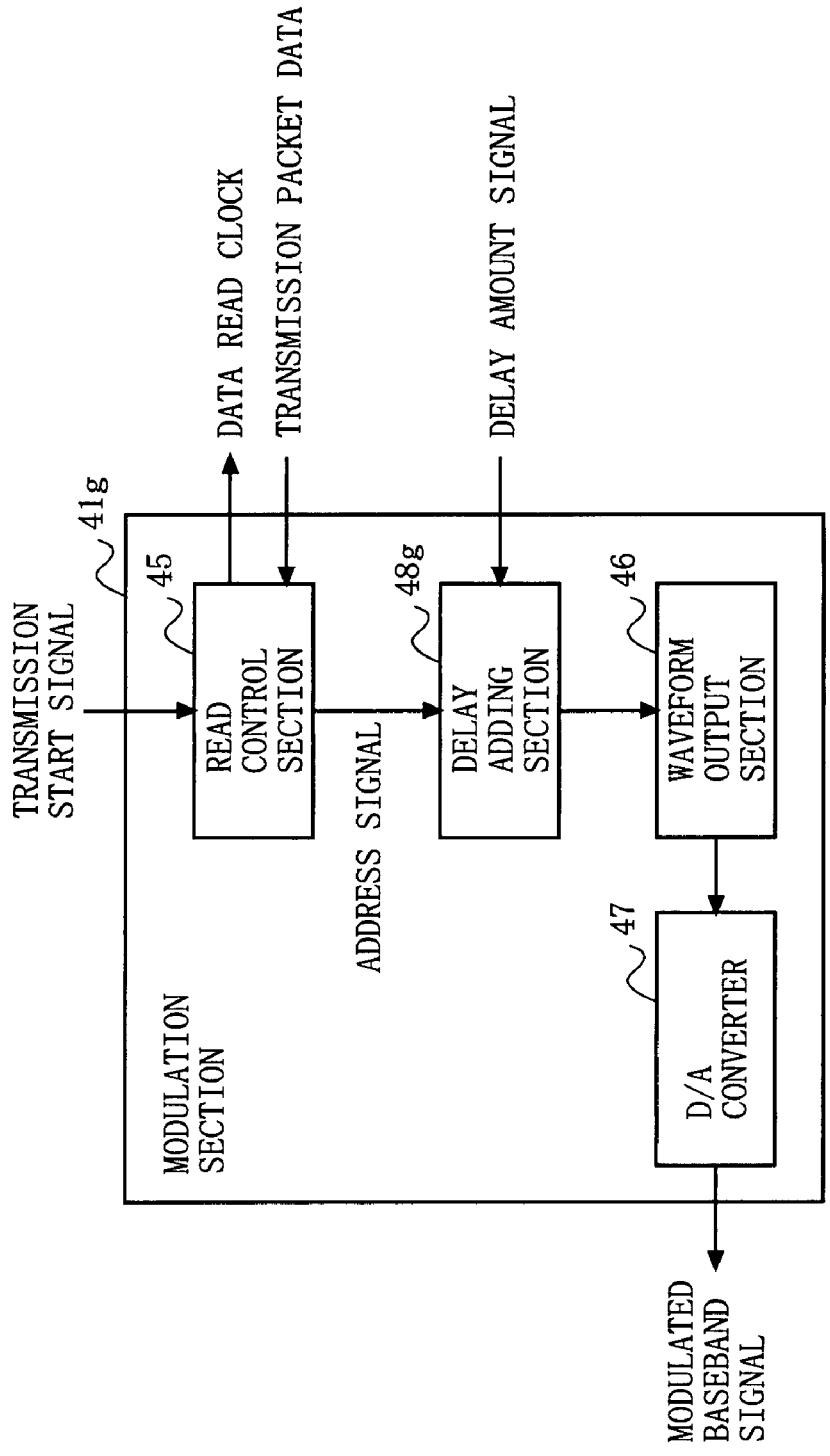

FIG. 74 is a block diagram illustrating a configuration of a modulation section 41g when a delay adding section is provided between a read control section and a waveform output section.

Figure 75A:
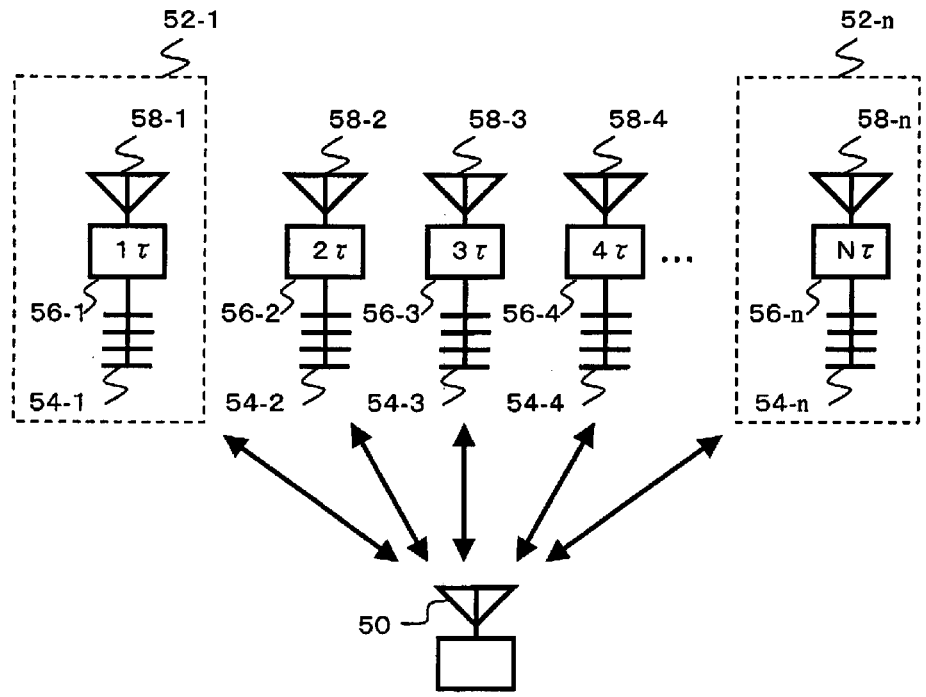

FIG. 75A is a diagram illustrating a configuration of a conventional multi-station simultaneous transmission system described in Patent Document 1.

Figure 75B:
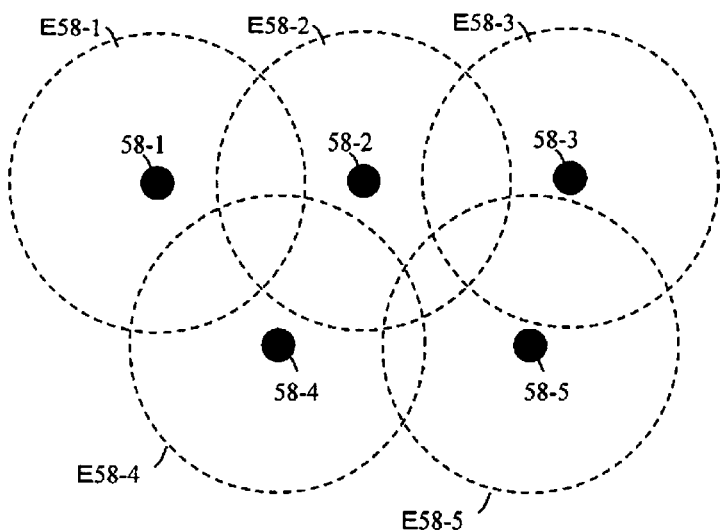

FIG. 75B is a diagram illustrating the configuration of the conventional multi-station simultaneous transmission system described in Patent Document 1.

Figure 76:
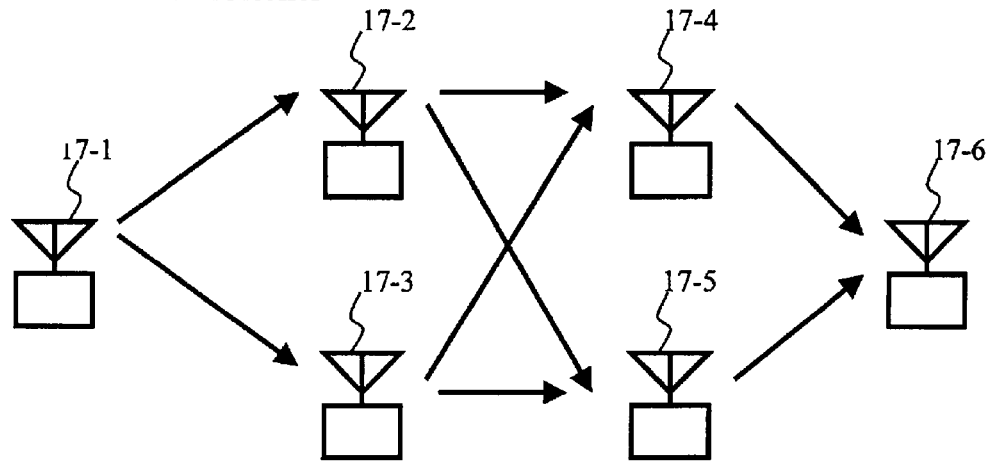

FIG. 76 is a diagram illustrating a configuration of the conventional wireless transmission system described in Patent Document 2.

Figure 77:
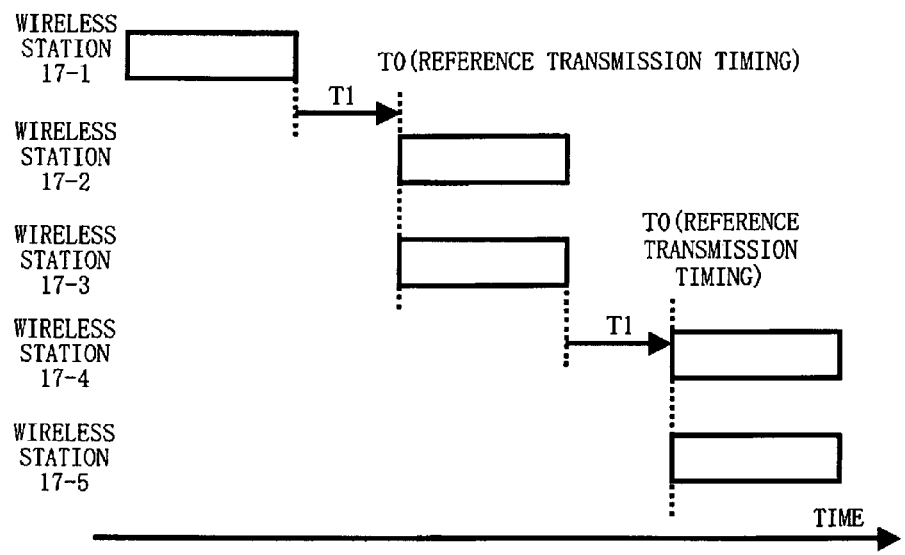

FIG. 77 is a diagram schematically illustrating a transmission timing of a packet that each wireless station shown in FIG. 76 transmits.

Figure 78A:
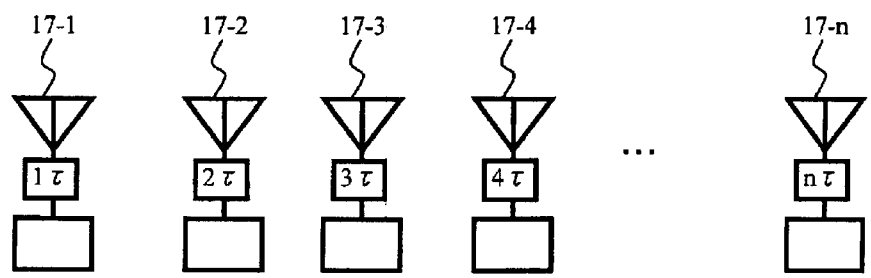

FIG. 78A is an explanatory diagram of a subject when the multi-station simultaneous transmission is performed with a multihop system by use of a conventional technology.

Figure 78B:
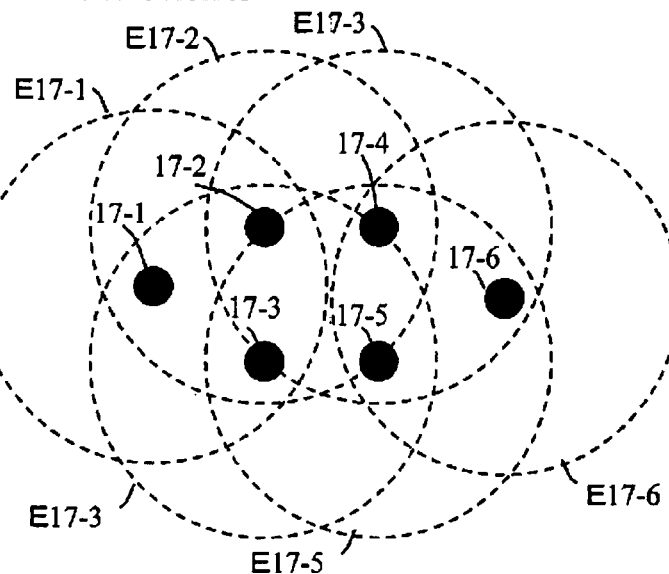

FIG. 78B is an explanatory diagram of the subject when the multi-station simultaneous transmission is performed with the multihop system by use of the conventional technology.

Figure 78C:
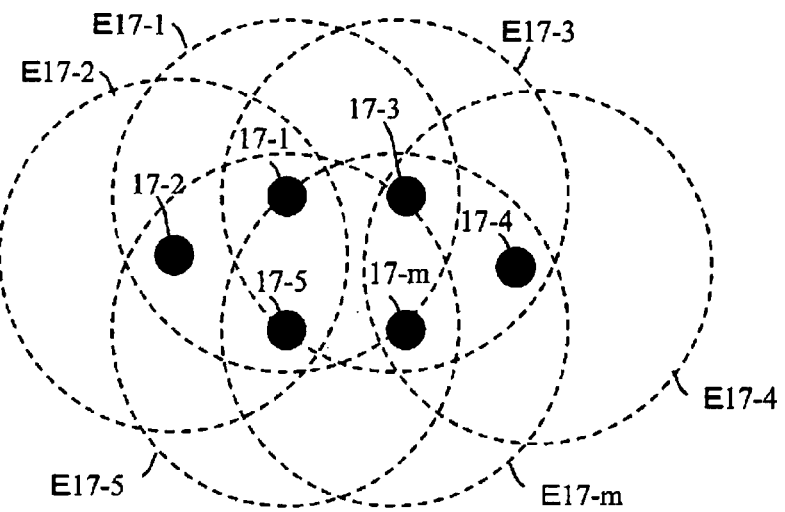

FIG. 78C is an explanatory diagram of the subject when the multi-station simultaneous transmission is performed with the multihop system by use of the conventional technology.

Figure 79A:
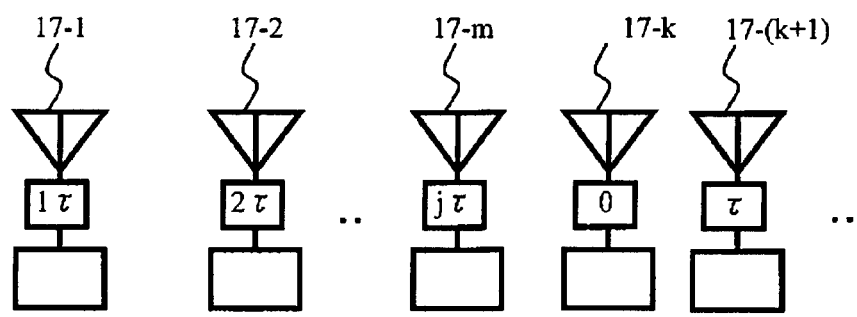

FIG. 79A is an explanatory diagram of the subject when the multi-station simultaneous transmission is performed with the multihop system by use of the conventional technology.

Figure 79B:
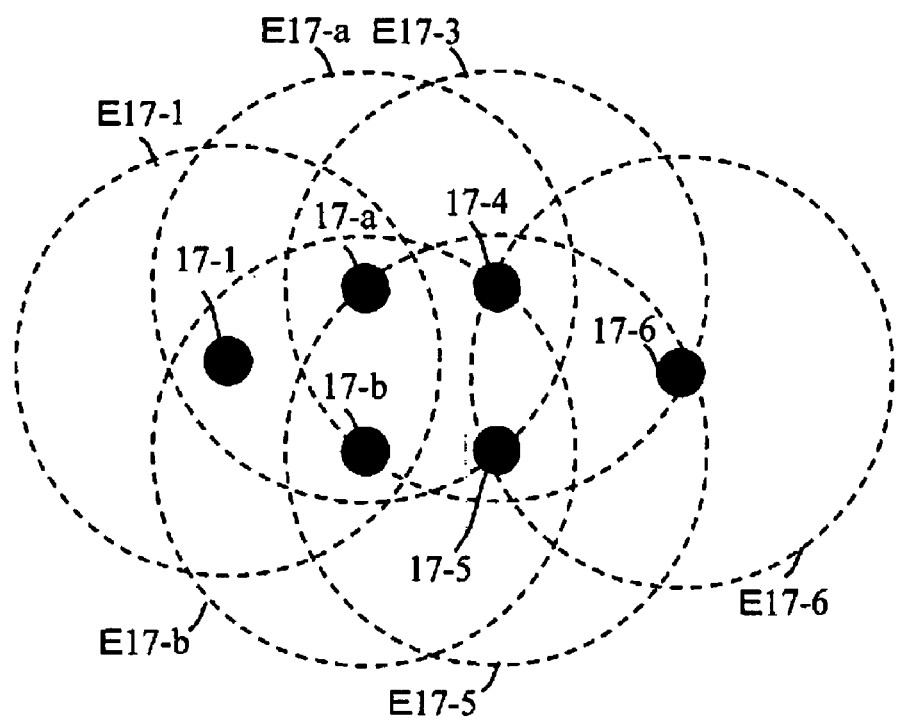

FIG. 79B is an explanatory diagram of the subject when the multi-station simultaneous transmission is performed with the multihop system by use of the conventional technology.

DESCRIPTION OF THE REFERENCE CHARACTERS 1 through 4, and 9 management station
10-1, 10-n, 20-1, 20-n, 30-1, and 30-n terminal station
1-1, 1-2, 1-n, 2-1, 2-2, and 2-n wireless station
31 antenna
32 RF section
33 demodulation section
34 packet determining section
35 own-station packet processing section
36 delay amount determining section
37 delay amount record table
38 transmission timing control section
40 transmission packet processing section
41 modulation section
42 table storing section
10, 17-1 source wireless station
11 through 14, and 17-2 through 17-5 relay wireless station
21, 17-6 destination wireless station

BEST MODE FOR CARRYING OUT THE INVENTION

Embodiments of the present invention will now be described with reference to the drawings. In this specification, a wireless transmission system wherein a path diversity system is formed by a transmitter-side wireless station, a multipath channel and a receiver-side wireless station is defined as a system capable of transmitting/receiving data using an anti-multipath modulation/demodulation scheme. Examples of path diversity systems include: (1) a system in which data is modulated by a transmitter-side wireless station by using a spread spectrum scheme (e.g., a DSSS scheme, a FHSS system or a THSS system) and is demodulated by a receiver-side wireless station by using a spread spectrum scheme; (2) a system in which data is modulated by a transmitter-side wireless station by using an OFDM scheme and is demodulated by a receiver-side wireless station by using an OFDM scheme; (3) a system in which data is modulated by a transmitter-side wireless station by using an anti-multipath modulation scheme (e.g., a PSK-VP scheme, a PSK-RZ scheme or a DSK system) and is demodulated by a receiver-side wireless station by using a demodulation scheme corresponding to the anti-multipath modulation scheme; and (4) a system in which data is modulated by a transmitter-side wireless station by using a single carrier modulation scheme (e.g., a PSK scheme or a QAM scheme) and is demodulated by a receiver-side wireless station by using an equalizer. Note that the present invention is not limited to those particular path diversity systems as set forth above, but encompasses any path diversity systems to be devised in the future.

First Embodiment

Figure 1A:
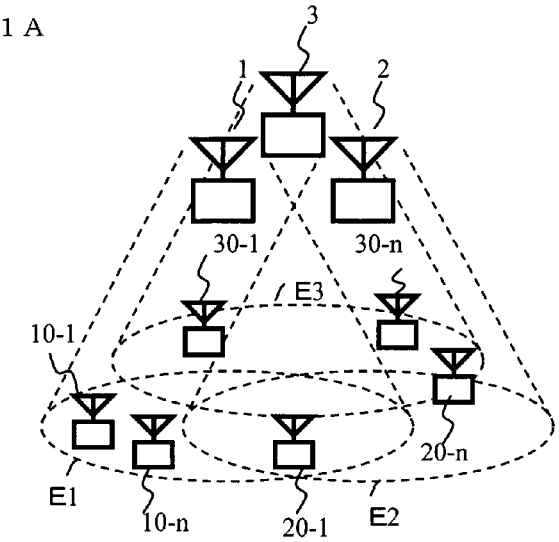
FIG. 1A is a diagram illustrating an example of a configuration of a wireless transmission system according to first through fourth embodiments according to the present invention.
Figure 1B:
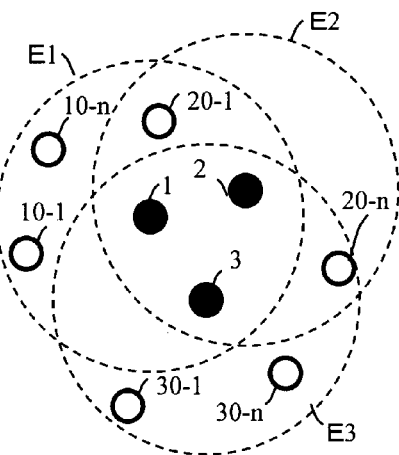
FIG. 1B is a diagram illustrating an example of the configuration of the wireless transmission system according to the first through fourth embodiments according to the present invention.

FIG. 1A is a diagram illustrating an example of a configuration of a wireless transmission system according to a first embodiment of the present invention. In FIG. 1A, the wireless transmission system is provided with management stations 1 through 3, each being a wireless station, and terminal stations 10-1 through 10-n, 20-1 through 20-n, and 30-1 through 30-n, each being a wireless station. FIG. 1B is a diagram illustrating a relative position between the management stations 1 through 3 and the terminal stations shown in FIG. 1A.

The management stations 1 through 3 form communication areas E1 through E3, respectively, and are connected with the terminal stations existing within respective communication areas with wireless. The management stations 1 through 3 perform channel assignment or the like for the terminal stations existing within respective communication areas. Incidentally, the communication areas E1 through E3 indicate communication areas when the management stations 1 through 3 transmit packets as a single station (a single station transmission). The terminal stations 10-1 through 10-n exist in the communication area E1, and the terminal stations 20-1 through 20-n exist in the communication area E2. Meanwhile, the terminal stations 30-1 through 30-n exist in the communication area E3. Note herein that respective terminal stations 10-1 through 10-n, 20-1 through 20-n, and 30-1 through 30-n will be called a terminal station 11 collectively unless they are required to be distinguished in particular. In addition, the terminal station and the management station will be called a wireless station collectively unless they are required to be distinguished in particular.

The management stations 1 through 3 and the terminal station 11 transmit and receive the packet by use of the modulation/demodulation scheme which provides the anti-multipath characteristic by the demodulated at the receiving end.

In the present embodiment, a case where the data is transmitted by use of the PSK-VP scheme will be described as the modulation/demodulation scheme having the anti-multipath characteristic.

The management stations 1 through 3 perform inter-system arbitration (hereinafter, called negotiations) in a negotiation zone (hereinafter, called a nego-zone), and avoid channel interference between areas. The nego-zone is a zone that is periodically provided on a common channel. Specifically, the management stations 1 through 3, prior to communication, transmit and receive a negotiation packet (hereinafter, called a channel information packet) for establishing a communicatable state, which includes information, such as channel information mutually used in a own-station area, a own-station ID, a terminal station ID managed by its own-station, and beacon information for synchronizing the system, by use of a common channel that is used in common among the management stations 1 through 3. Incidentally, the channel information packet does not need to include all information, such as the channel information, the its own-station ID, or the like mentioned above, and may include only one piece of information. The common channel is a channel for controlling the system, and is similar to a common channel for system control used in a general wireless transmission system. The common channel may also be used for general data transmission. The management station which has received the channel information packet generates a response packet to notify to related stations that the channel information packet is normally received, and transmits it to the management station that is a source of the channel information packet (source management station). Incidentally, since the response packet is a packet transmitted and received in the nego-zone, it is a negotiation packet.

Note herein that, in the present embodiment, it will be described that the management stations communicate with each other by use of a frequency channel of a FDMA system, but a time slot of a TDMA system, and a spread code of a CDMA scheme or the like may be used.

Moreover, in the present embodiment, it will be described that the management station is a centralized control station which always intervenes whenever the terminal stations managed by this management station communicate with each other. Note that, functions that the management station has are not limited to this, for example, the management station only performs negotiations with other systems and relays of the data to other systems, and the terminals which exist under the same management station may communicate with each other without via the management station. Moreover, the management station does not need to be decided from the beginning, for example, it may be decided such that a wireless station having a function capable of being the management station among the wireless stations constituting one wireless system (for example, the wireless station 10-1, the wireless station 10-n, the wireless station 1 shown in FIG. 1) declares to be the management station. Incidentally, when there are a plurality of wireless stations having the function capable of being the management station in one wireless system, a wireless station that has firstly declared to be the management station may be the management station, for example.

The management stations 1 through 3 will determine that a multi-station simultaneous transmission of the packet can be performed, when a management station that newly constructs a system within the communication area that those stations form is generated, and the number of the management stations capable of performing a relay transmission of the packet becomes not less than two. The management stations 1 through 3, when other management stations relay-transmit the packet, select and decide the delay amount that should be given to the packet among a plurality of candidate values. The management stations 1 through 3 then notify the decided delay amount to other management stations capable of performing the multi-station simultaneous transmission. At this time, the plurality of delay amounts that the management stations 1 through 3 have decided is set so that each difference between the plurality of delay amounts may not be less than a predetermined delay resolution, and a difference between the maximum and minimum values within the plurality of delay amounts may not be more than a predetermined maximum delay. The predetermined delay resolution and the predetermined maximum delay are respectively set to values from which the effect due to the path diversity is obtained at the receiving end, namely, values at which the wireless station at the receiving end can perform path diversity reception of a plurality of delayed waves. Hereinafter, a packet that the management stations 1 through 3 generate and transmit in order that other management stations which perform the multi-station simultaneous transmission of the packet may notify the delay amount to be given to the packet will be called a delay amount notice packet.

Additionally, when the packet received from other management stations or the terminal station is a packet which needs to be relay-transmitted, (hereinafter, called a broadcast packet), the management stations 1 through 3 consider a timing which is delayed by the delay amount notified from other stations, from a timing to be a reference for transmitting the broadcast packet (hereinafter, called a reference timing) to be a transmission start timing. When the transmission start timing arrives, the management stations 1 through 3 then relay-transmit the broadcast packet. Thus, since the multi-paths having a proper TDOA at an arbitrary receiving point can be generated during the multi-station simultaneous transmission, the effect due to the path diversity can be certainly obtained in a wireless station that receives the broadcast packet (hereinafter, called a receiving station).

Figure 2:
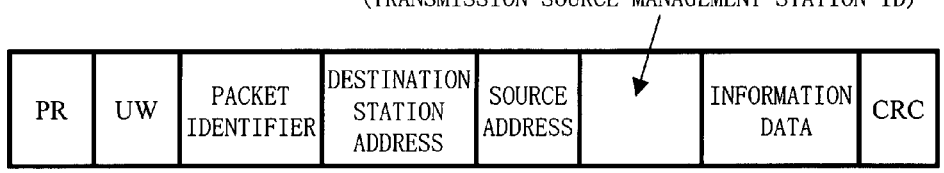
FIG. 2 is a diagram illustrating an example of a configuration of a packet transmitted according to the first through fourth embodiments of the present invention.

FIG. 2 is a diagram illustrating an example of a configuration of the packet transmitted and received in this system. The packet shown in FIG. 2 is composed of a preamble (PR), a unique word (UW), a packet identifier, a destination station address, a source address, a source management station address, information data, and CRC.

The preamble is used for gain control and clock recovery, frequency control, or the like. The unique word is used for determination of a frame type, and frame synchronization. The source address is an address of the wireless station serving as a packet source. The destination station address is an address of the wireless station serving as a packet destination. The source management station address is used for the address of the management station which transmits the packet for performing the multi-station simultaneous transmission to other management stations to be recorded. In the present embodiment, it will be described that an ID of the source management station is recorded as the source management station address. Hereinafter, an ID of the management station that has firstly received the packet among the management stations capable of performing the multi-station simultaneous transmission will be called a source management station ID. The information data is a main part of data to be transmitted. The packet identifier is used for identifying the packet. The CRC is a CRC (Cyclic Redundancy Check) code to be used for error detection.

Figure 3A:
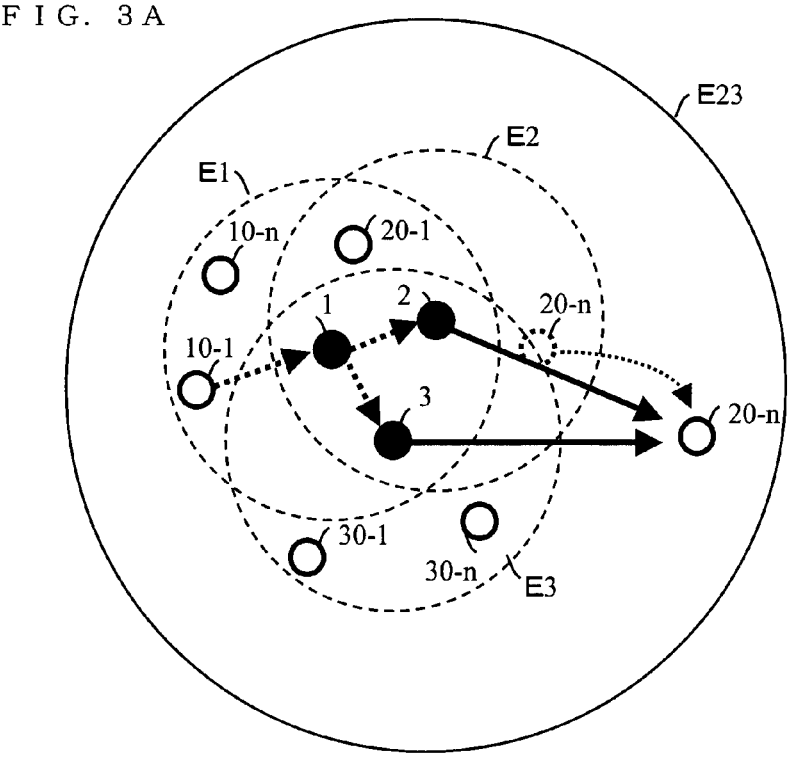
FIG. 3A is a diagram illustrating a multihop transmission method according to the first embodiment of the present invention.
Figure 4A:
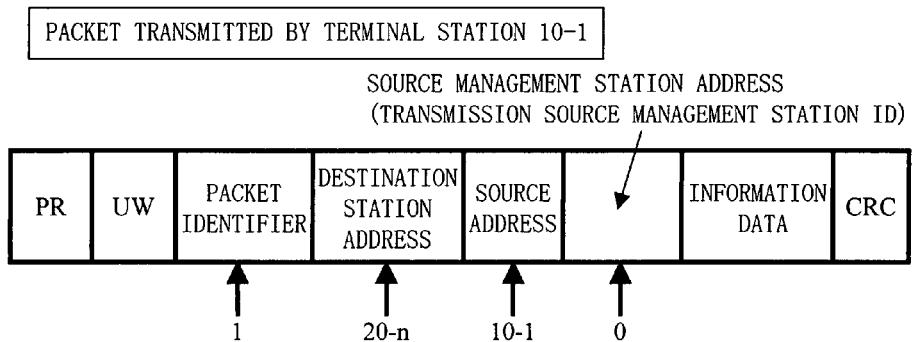
FIG. 4A is a diagram illustrating a configuration of a packet transmitted by terminal stations and management stations in a relative position shown in FIG. 3A.
Figure 4B:
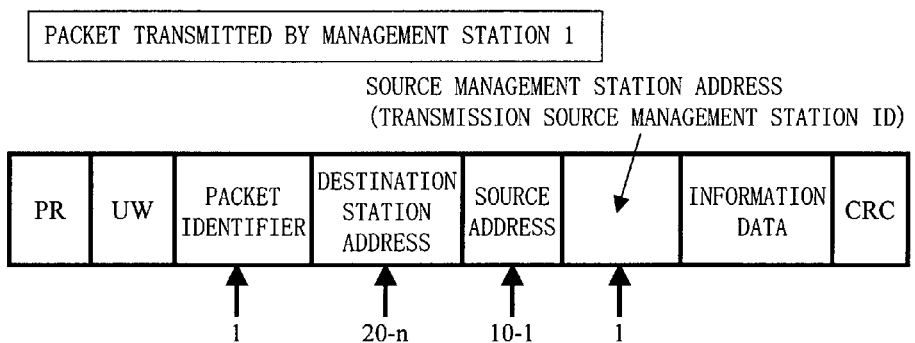
FIG. 4B is a diagram illustrating the configuration of the packet transmitted by the terminal stations and the management stations in the relative position shown in FIG. 3A.
Figure 4C:
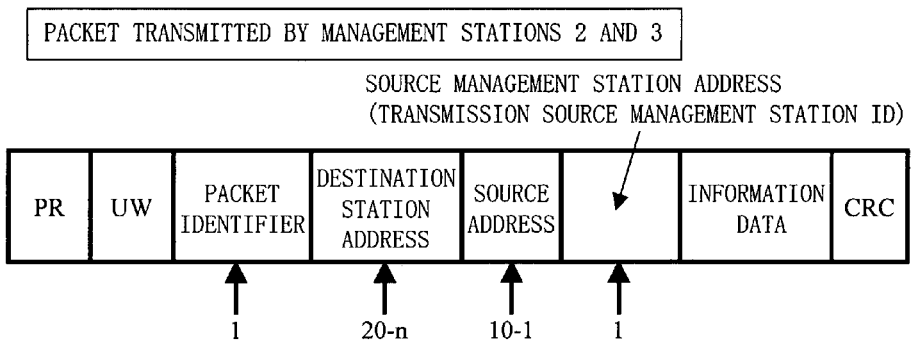
FIG. 4C is a diagram illustrating the configuration of the packet transmitted by the terminal stations and the management stations in the relative position shown in FIG. 3A.

FIGS. 3A and B are diagrams illustrating examples of a multihop transmission in the present embodiment. In FIGS. 3A and B, the management stations 1 through 3 are located so close to each other that a propagation time can be ignored as compared with the TDOA ($\tau$) which can provide a path diversity effect. Additionally, the management stations 1 through 3 are located in a mutual communication area. FIGS. 4A through C are diagrams illustrating configurations of the packet transmitted and received in FIG. 3A.

FIG. 3A is the diagram illustrating a flow of the packet when the terminal station 10-1 which is a packet source transmits the broadcast packet addressed to the terminal station 20-*n*. The terminal station 10-1 generates and transmits the packet shown in FIG. 4A. Here, as for the packet identifier, it is assumed that 0 indicates a packet that does not need the relay; 1, the broadcast packet; 2, the channel information packet; 3, the response packet; and 4, the delay amount notice packet. In this case, "1" for indicating that this packet is the broadcast packet is recorded on an identifier of the packet that the terminal station 10-1 generates. Meanwhile, the address of the terminal station 20-*n* which is a packet destination is recorded on the destination station address, and the address of the terminal station 10-1 is recorded on the source address. Moreover, since the packet is not relay-transmitted by the management station yet when the terminal station 10-1 transmits the packet, "0" is recorded on the source management station address.

When the packet transmitted from the terminal station 10-1 is received, the management station 1 will generate and transmit the broadcast packet shown in FIG. 4B. FIG. 4B is the diagram illustrating the configuration of the packet that the management station 1 transmits. The management station 1 rewrites the source management station ID of the packet transmitted from the terminal station 10-1 to an ID of its own-station, and transmits it. When the broadcast packet transmitted from the management station 1 is received, the management stations 2 and 3 will relay-transmit this broadcast packet. FIG. 4C is the diagram illustrating the configuration of the packet that the management stations 2 and 3 transmit at this time. As described above, the multi-station simultaneous transmission of the broadcast packet transmitted from one management station (here, the management station 1) is performed by the plurality of management stations (here, the management stations 2 and 3). The broadcast packet of which the management stations 2 and 3 have performed the multi-station simultaneous transmission is received by the terminal station 20-*n* which is a destination station.

Incidentally, since the packet is transmitted to the destination station in the terminal station 10-1 depending on the system, whether or not the relay is required may not be determined. In such a case, the terminal station 10-1 may set the packet identifier to "0" to transmit the packet. In this case, the management station 1 which has received the packet from the terminal station 10-1 recognizes the destination station address included in the packet to determine the necessity of the relay, and when the relay is required, it may rewrite the packet identifier to "1" to perform the relay transmission.

In the wireless transmission system in accordance with the present embodiment, the delay amount notice packet is transmitted in the nego-zone described previously. Thus, when the management stations 2 and 3 perform the multi-station simultaneous transmission of the broadcast packet, the multipaths having the proper TDOA arrive at an arbitrary receiving point. Hence, the communication area where the same transmission characteristics are obtained can be expanded by the path diversity effect as compared with the case of the single station transmission. The communication area, when the management stations 2 and 3 perform the multi-station simultaneous transmission, corresponds to the communication area E23 shown in FIG. 3A. As described above, compared with the communication areas E1 through E3 at the time of the single station transmission, the communication area can be expanded by performing the multi-station simultaneous transmission. Hence, as shown in FIG. 3A, even when the destination terminal station 20-*n* has moved out of the single station area E2 of the management station 2, the terminal station 20-*n* can receive the packet normally.

Figure 3B:
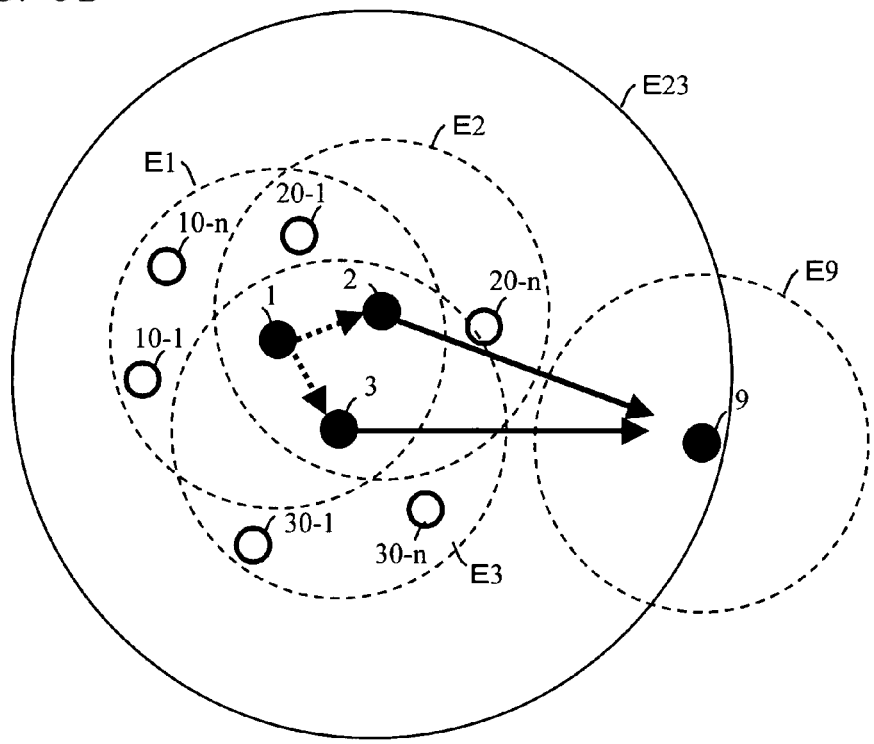
FIG. 3B is a diagram illustrating the multihop transmission method according to the first embodiment of the present invention.

Note herein that, in the wireless transmission system in accordance with the present embodiment, the multi-station simultaneous transmission of the broadcast packet (for example, the packet including the information on a channel which is used or is going to be used in the area E1, or the like) that the management station 1 itself has transmitted as the source may be performed by the management stations 2 and 3, as shown in FIG. 3B. Moreover, for example, the management stations 1 through 3 may perform the multi-station simultaneous transmission of the information which the management stations 1 through 3 share at a predetermined period. The shared information includes, for example, the information on the channel used in each area, the ID of the terminal station located in each area, the beacon information for synchronizing the system, or the like.

In the cases of FIG. 3B, in a manner similar to FIG. 3A, the multi-station simultaneous transmission of the packet which the management station 1 has transmitted is performed by the management stations 2 and 3, and it is received by a management station 9 with the proper TDOA. Hence, when the management station 9 which is going to construct another wireless system out of the single station area is generated, if the management station 9 which manages this another wireless system is located within the communication area E23 as shown in FIG. 3B, the management station 9 can normally receive the channel information on the management station 1, or the like.

Figure 5:
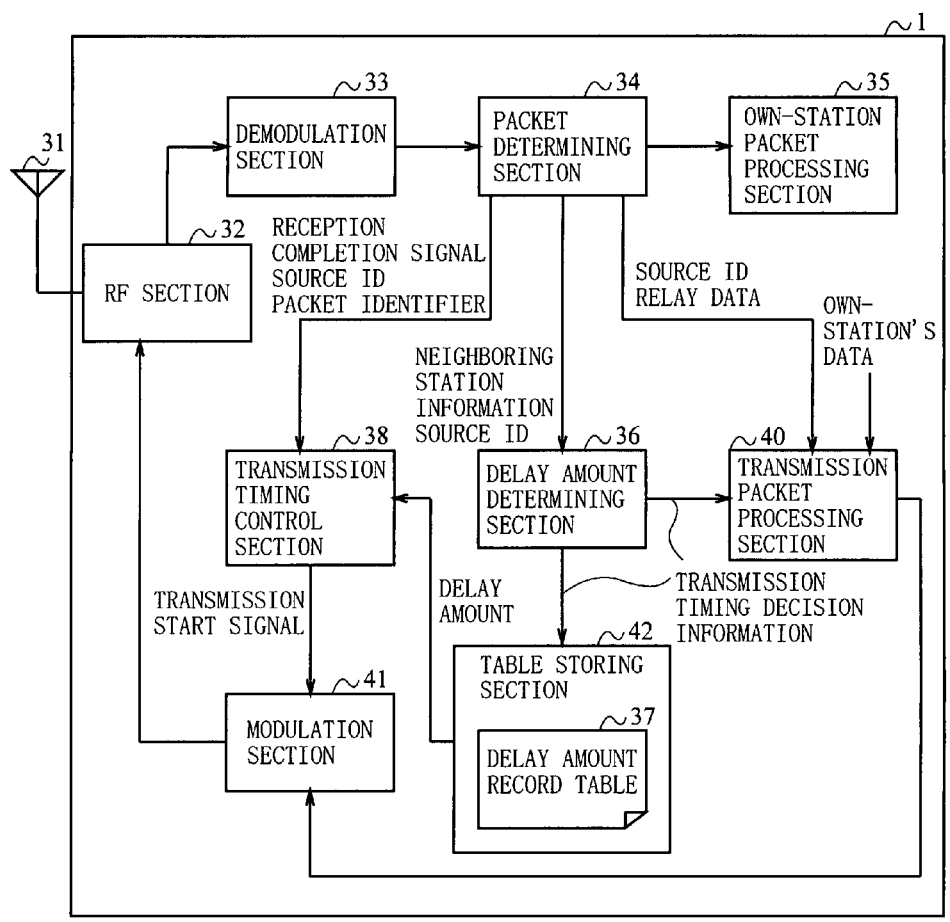
FIG. 5 is a block diagram illustrating a configuration example of the management station according to the first through fourth embodiments of the present invention.

FIG. 5 is a block diagram illustrating an example of a functional configuration of the management station 1. As shown in FIG. 5, the management station 1 is provided with an antenna 31, an RF section 32, a demodulation section 33, a packet determining section 34, an own-station packet processing section 35, a delay amount determining section 36, a transmission timing control section 38, a transmission packet processing section 40, a modulation section 41, and a table storing section 42. Incidentally, the management stations 2 and 3 also have a configuration similar to that of the management station 1.

The packet determining section 34 determines whether or not the packet can be normally received by use of an error detecting code, such as a CRC code included in demodulated data demodulated by the demodulation section 33. If the packet can be normally received, the packet determining section 34 analyzes the packet identifier, the destination station address, the source address, and the source management station ID included in the packet.

If the received packet is the channel information packet, the packet determining section 34 notifies the transmission packet processing section 40 of the source address included in the demodulated data as an address of the management station of a response destination, and instructs it to generate the response packet. The packet determining section 34 also notifies the transmission timing control section 38 to decide the transmission start timing of the response packet.

If the received packet is the response packet, the packet determining section 34 passes the source address (management station ID) included in the response packet to the delay amount determining section 36 as neighboring station information. Meanwhile, if the received packet is the delay amount notice packet, the packet determining section 34 passes the delay amount notice packet to the delay amount determining section 36. If the received packet is the broadcast packet, the packet determining section 34 generates a reception completion signal for indicating that reception of the broadcast packet is completed, and passes the reception completion signal to the transmission timing control section 38 along with the source management station ID and the packet identifier. In addition, at this time, the packet determining section 34 passes the data after UW in the broadcast packet to the transmission packet processing section 40 as relay data, and instructs to it generate the broadcast packet for performing the relay transmission. Meanwhile, if the received packet is the packet addressed to its own-station, the packet determining section 34 passes the demodulated data to the own-station packet processing section 35.

The own-station packet processing section 35 processes the packet addressed to its own-station, which is received from the packet determining section 34.

The delay amount determining section 36 recognizes the ID and the number of the management stations capable of performing the relay transmission of the broadcast packet that its own-station has transmitted, based on the neighboring station information notified by an ending time of a response zone which will be described later. If the number of management stations capable of performing the relay transmission is plural, namely, if there is a management station which can perform the multi-station simultaneous transmission, the delay amount determining section 36 decides the delay amount to be allocated to each management station, according to the number of management stations capable of performing the multi-station simultaneous transmission. The delay amount determining section 36, while recording the decided delay amount on a delay amount record table 37, passes the decided delay amount to the transmission packet processing section 40 along with a destination address. In addition, when the delay amount notice packet is received, the delay amount determining section 36 will extract the delay amount allocated to its own-station and other stations to record it on the delay amount record table 37.

The transmission timing control section 38 controls the timing of transmitting the broadcast packet, based on the reference timing and the delay amount recorded on the delay amount record table 37. Specifically, the transmission timing control section 38 defines a timing after a lapse of the predetermined time from receiving the reception completion signal from the packet determining section 34, as the reference timing, and defines a timing delayed from this reference timing by the delay amount, as the transmission start timing upon relay-transmission of the broadcast packet. When the transmission start timing arrives, the transmission timing control section 38 then generates a transmission start signal for instructing a transmission start to pass it to the modulation section 41. In addition, when transmission of the response packet is notified from the packet determining section 34, the transmission timing control section 38 generates the transmission start signal in a predetermined response zone at random timing to pass it to the modulation section 41.

The transmission packet processing section 40 receives, in the nego-zones provided periodically, its own-station's data including the terminal station ID that is managed by its own-station, the channel information used in its own-station, or the like from the control section which is not shown, and generates and keeps the channel information packet in which a predetermined header (preamble and unique word) and a predetermined footer (CRC code or the like) are added to its own-station's data. The transmission packet processing section 40, upon receiving the delay amount and the destination address from the delay amount determining section 36, will also generate and keep the delay amount notice packet in which the predetermined header and the predetermined footer are added to the destination address and the delay amount. Additionally, the transmission packet processing section 40, upon receiving the relay data from the packet determining section 34, will add the predetermined header to the relay data to generate and keep the broadcast packet. Moreover, the transmission packet processing section 40, upon receiving an instruction to generate the response packet from the packet determining section 34, will generate and keep the response packet.

The table storing section 42 stores the delay amount record table 37. Delay amounts notified from other management stations and delay amounts to be allocated to other management stations when its own-station becomes the source management station are recorded on the delay amount record table 37.

Figure 6:
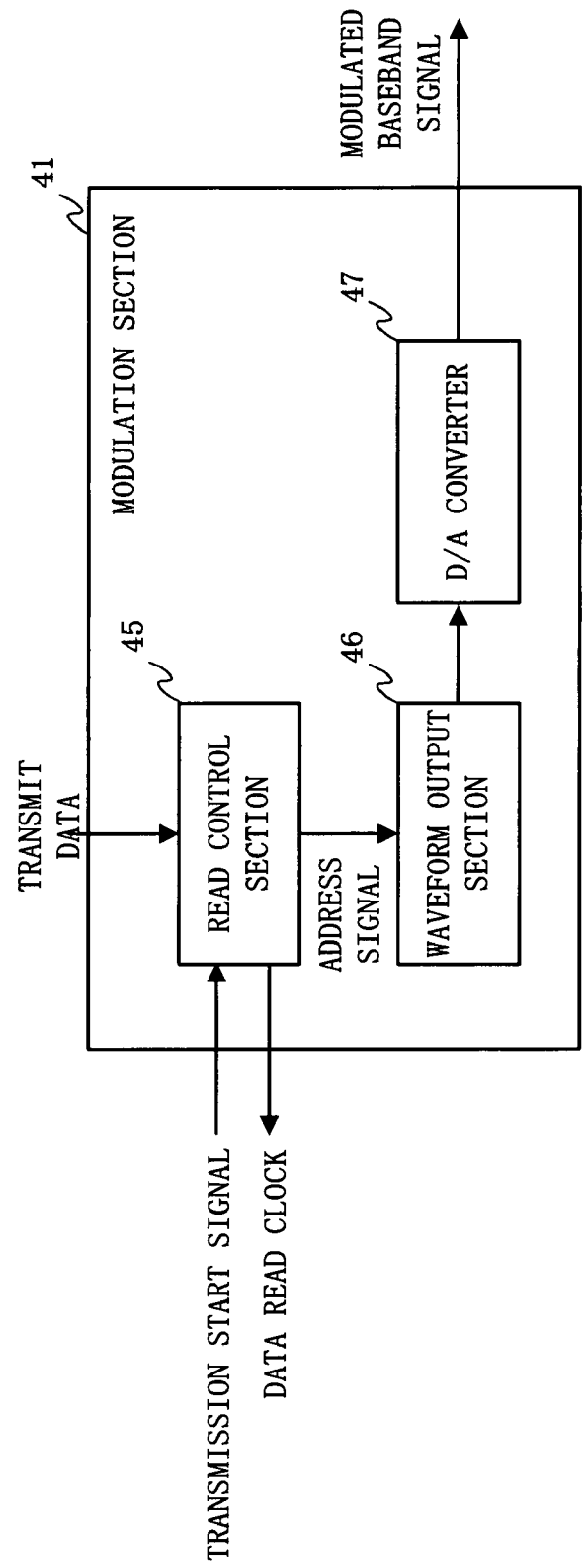
FIG. 6 is a block diagram illustrating a configuration of a modulation section 41 when communication is performed by use of the PSK-VP scheme.

The modulation section 41 generates and outputs a modulated baseband signal modulated with transmit data in the packet generated by the transmission packet processing section 40. FIG. 6 is a block diagram illustrating a configuration of the modulation section 41 when communication is performed by use of the PSK-VP scheme. In FIG. 6, the modulation section 41 comprises a read control section 45, a waveform output section 46, and a D/A converter 47.

The read control section 45 is composed of a counter which is operated by a base clock. The read control section 45, upon receiving the transmission start signal, will generate a data read clock for reading the transmit data, and an address signal which indicates an address for reading data of a modulated waveform, based on a counter value. The read control section 45 passes the generated data read clock to the transmission packet processing section 40, inputs it to a shift register with L-stage (L is a natural number) which has a bit string of the transmit data read from the transmission packet processing section 40 therein, and passes data with L-bit to the waveform output section 46 as an address signal.

The transmission packet processing section 40, while synchronizing with the received data read clock, reads the transmit data to pass it to the read control section 45 in the modulation section 41.

The waveform output section 46 reads, based on the received address signal, modulated waveform data according to the transmit data from an internal waveform memory. Specifically, the waveform output section 46 calculates in advance a baseband waveform of a PSK-VP modulation signal decided by any of L-bit patterns of the transmit data. In addition, the waveform output section 46 has a read-only memory (ROM) which stores the address represented by the above-mentioned L-bit pattern as wave data. The waveform output section 46 outputs the wave data stored in the address specified by the address signal as the modulated waveform data.

The D/A converter 47 converts the modulated waveform data inputted from the waveform output section 46 into an analog signal to output it as the modulated baseband signal.

As described above, the modulation section 41, upon receiving the transmission start signal, will generate the address signal for reading the modulated waveform from the waveform memory. Thus, the timing of outputting the modulated baseband signal changes per base clock according to the timing of receiving the transmission start signal. As for the base clock, usually, a frequency which is from several times to ten-odd times of a symbol frequency (an inverse number of a symbol length) is often used. Hence, the timing of outputting the modulated baseband signal can be adjusted in several times to ten-odd times less than the symbol length.

Note herein that, it has been described in FIG. 6 a case where the PSK-VP scheme is used, but when the signal is modulated by use of another modulation scheme (for example, the PSK-RZ scheme or the DSK system), what is necessary is just to change the data of the modulated waveform stored in the waveform memory.

The RF section 32 frequency-converts the modulated baseband signal outputted from the modulation section 41 to transmit it as a radio signal through the antenna 31. The RF section 32 converts a received signal of an RF band, which is received by the antenna 31 into a baseband signal, and outputs it as a received baseband signal.

Figure 7:
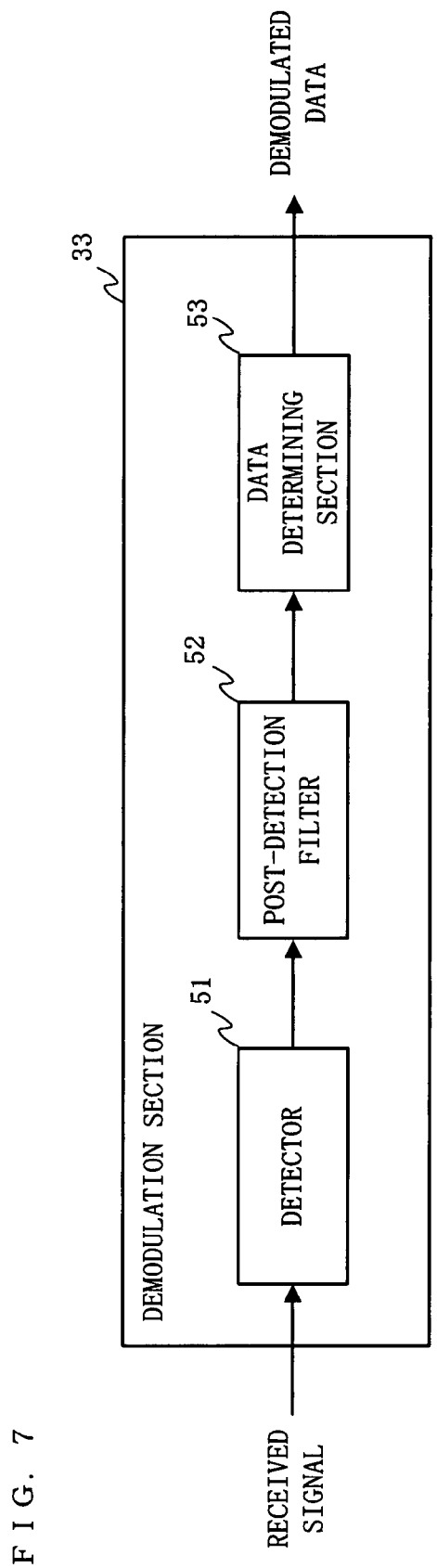
FIG. 7 is a block diagram illustrating a configuration of a demodulation section 33 when communication is performed by use of the PSK-VP scheme.

The demodulation section 33 demodulates the received baseband signal, and outputs it as the demodulated data. FIG. 7 is a block diagram illustrating a configuration of the demodulation section 33 when communication is performed by use of the PSK-VP scheme. The demodulation section 33 includes a detection section 51, a post-detection filter 52, and a data determining section 53.

The detection section 51 detects the baseband signal outputted from the RF section 32 in a receiving station 12. The post-detection filter 52 low-pass filters a detection signal. The data determining section 53 determines a signal outputted from the post-detection filter 52 to obtain the demodulated data.

Figure 8:
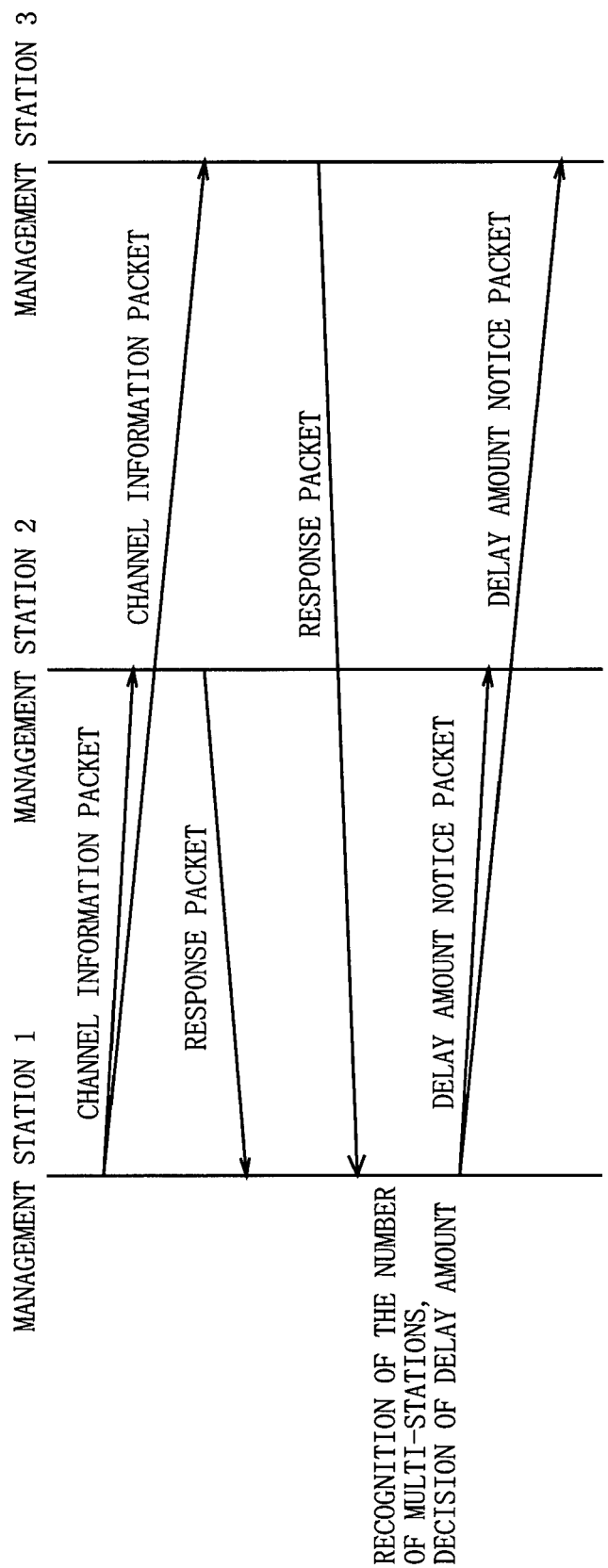
FIG. 8 is a sequence diagram illustrating an outline of operation of a management station 1.

FIG. 8 is a sequence diagram illustrating an outline of operation of the management stations 1 through 3 constituted as described above. First, the channel information packet transmitted by the management station 1 is received by the management stations 2 and 3. The management stations 2 and 3 transmit the response packet to the management station 1. The management station 1, upon receiving the response packet, will decide the delay amount of each management station at the time of the management stations 2 and 3 performing the multi-station simultaneous transmission of the broadcast packet where the management station 1 serves as the source management station. The management station 1 then generates the delay amount notice packet for notifying the decided delay amount to transmit it to the management stations 2 and 3. As is understood, the channel information packet can be said to be the multi-station simultaneous transmission request packet for requesting the multi-station simultaneous transmission.

Figure 9:
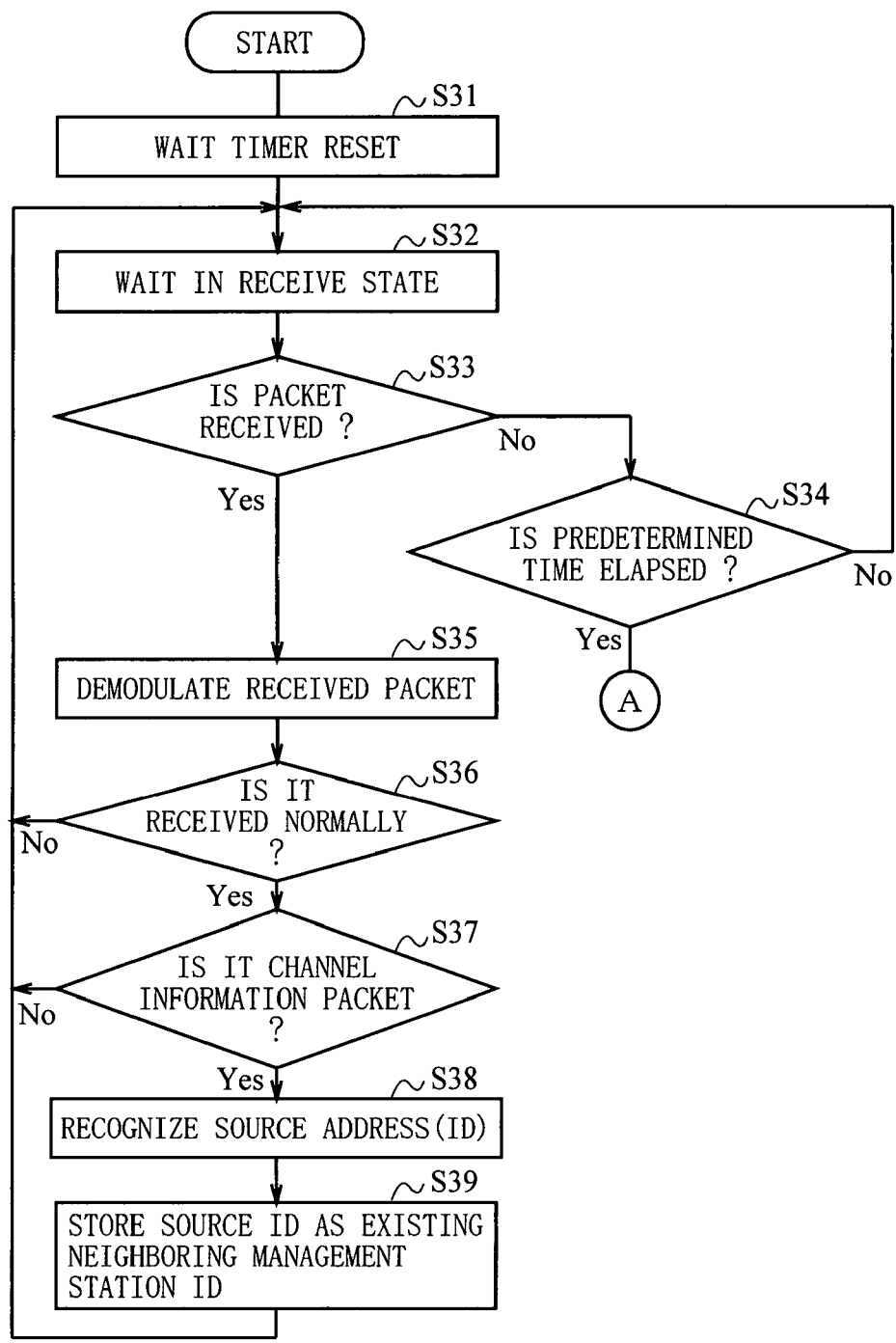
FIG. 9 is a flow chart illustrating an operation of the management station 1 in an existing neighboring management station search mode.

FIG. 9 is a flow chart illustrating an operation of the management station 1 in an existing neighboring management station search mode shown in FIG. 5. The management station 1 waits for the reception of the packet for a predetermined time when newly starting construction of a system (in the existing neighboring management station search mode), such as at the time of power-on, and determines whether or not there is any management station capable of performing the relay transmission (hereinafter, called a neighboring management station). The management station 1 resets a wait timer for waiting for the reception of the packet for a predetermined time (Step S31), and waits in a receive state (Step S32).

Subsequently, if the packet is received (Yes at Step S33) until the predetermined time elapses (No at Step S34), the management station 1 demodulates the received packet (Step S35). Specifically, the demodulation section 33 demodulates the received baseband signal which is received by the antenna 31 and frequency-converted by the RF section 32, and uses it as the demodulated data.

The packet determining section 34 applies a CRC check to the demodulated data to determine whether or not the packet is normally received (Step S36). If the packet cannot be demodulated normally, the management station 1 wait in a receive state again (Step S32). Meanwhile, if the packet can be demodulated normally, the packet determining section 34 refers to the packet identifier of the received packet to determine whether or not it is the channel information packet (Step S37).

If the packet is not the channel information packet, the management station 1 waits in a receive state again (Step S32). Meanwhile, if the packet is the channel information packet, it recognizes the source address (source ID) of the packet, and passes it to the delay amount determining section 36 (Step S38). The delay amount determining section 36 stores the received source ID as an ID of the neighboring management station which has been existed before its own-station exists (hereinafter, called an existing neighboring management station ID) (Step S39).

Figure 10:
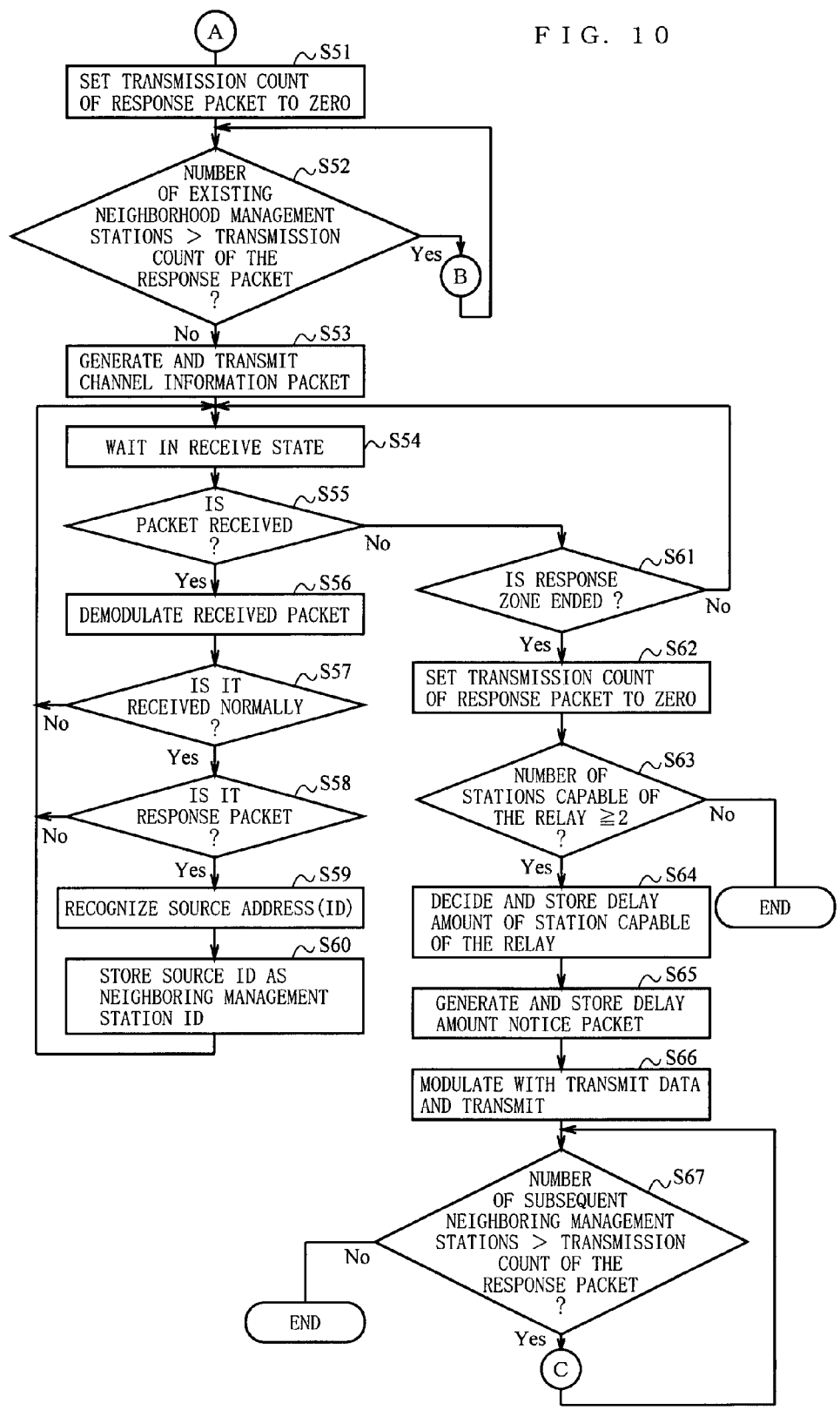
FIG. 10 is a flow chart illustrating an operation of the management station 1 after the existing neighboring management station search mode is completed.

Meanwhile, if the predetermined time elapses at Step S34, the process proceeds to Step S51 shown in FIG. 10.

FIG. 10 is a flow chart illustrating an operation of the management station 1 after the existing neighboring management station search mode is completed. In the management station 1, the delay amount determining section 36 sets transmission count of the response packet to zero (Step S51), and determines whether or not the existing neighboring management stations is larger than the transmission count of the response packet in number (Step S52). If the number of existing management stations is smaller than the transmission count of the response packet, the delay amount determining section 36 instructs the transmission packet processing section 40 to generate the channel information packet. The transmission packet processing section 40 generates the channel information packet, and passes it to the modulation section 41. The modulation section 41 generates a modulation signal from the channel information packet, and transmits it through the RF section 32 and the antenna 31 (Step S53).

Subsequently, the management station 1 waits in a receive state, and waits for the response packet transmitted from another management station (Step S54). The management station 1 determines, until the response zone is completed (No at Step S61), whether or not the packet is received (Step S55). If the packet has been received (Yes at Step S55) and the received packet could be demodulated normally, the packet determining section 34 determines whether or not the received packet is the response packet. If the received packet is the response packet, the delay amount determining section 36 stores the source ID included in the response packet as the neighboring management station ID (Step S56 through S60). Since operations at Steps S56 through S60 are similar to those at Steps S35 through S39 shown in FIG. 9, detailed description thereof will be omitted.

Meanwhile, when the response zone is completed and a waiting time for receiving the response packet elapses at Step S61, the delay amount determining section 36 sets the transmission count of the response packet to zero (Step S62). Subsequently, the delay amount determining section 36 determines whether or not the number of stations capable of the relay is not less than two (Step S63). Specifically, the delay amount determining section 36 determines the number of neighboring management stations that have made responses in the response zone (hereinafter, called the number of stations capable of the relay) based on the number of the neighboring management station IDs stored in the response zone. If the number of stations capable of the relay is less than two (No at Step S63), the management station 1 completes the process.

Meanwhile, if the number of stations capable of the relay is not less than two (Yes at Step S63), the delay amount determining section 36 decides the delay amount for allocating to the management station capable of relaying the broadcast packet to thereby record it on the delay amount record table 37, and also passes the ID of the station capable of the relay and the decided delay amount to the transmission packet processing section 40 to instruct it to generate the delay amount notice packet (Step S64).

The transmission packet processing section 40 generates the delay amount notice packet, and passes it to the modulation section 41 (Step S65). The modulation section 41 generates the modulation signal from the delay amount notice packet, and transmits it through the RF section 32 and the antenna 31 (Step S66). The delay amount determining section 36 compares the number of neighboring management station IDs stored in the response zone with the number of existing neighboring management station IDs obtained in an existing neighboring management station search mode, recognizes the number of management stations generated after its own-station (subsequent neighboring management station), and determines whether or not the number of subsequent neighboring management stations is larger than the transmission count of the response packet (Step S67). If the number of subsequent neighboring management stations is not larger than the transmission count of the response packet (No at Step S67), the management station 1 completes the process. Meanwhile, if the number of subsequent neighboring management stations is larger than the transmission count of the response packet (Yes at Step S67), the management station 1 proceeds to an operation at Step S81 shown in FIG. 12.

Figure 11:
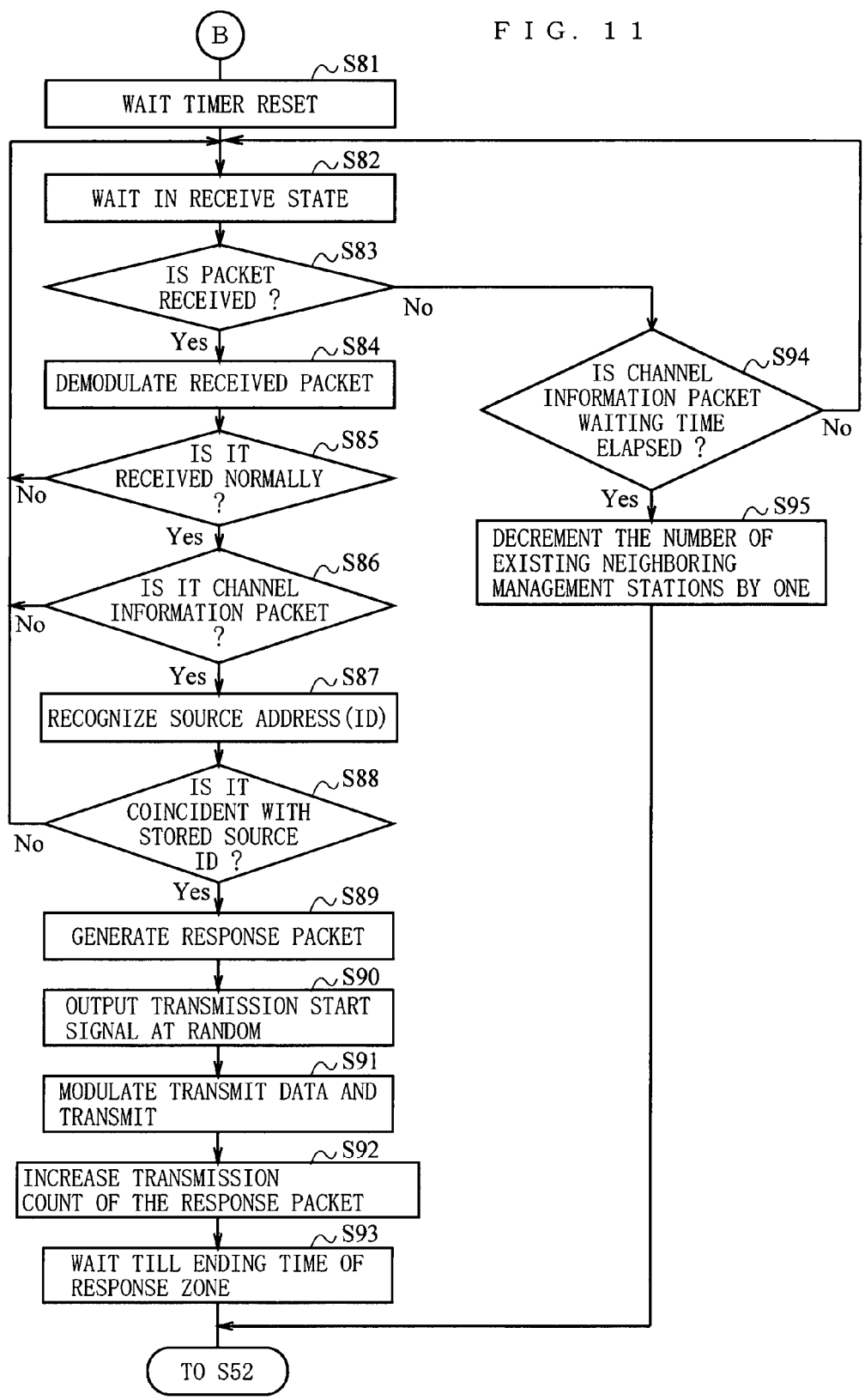
FIG. 11 is a flow chart illustrating an operation of the management station 1 when the number of existing neighboring management stations is larger than the transmission count of a response packet.

Meanwhile, if the number of existing neighboring management stations is larger than the transmission count of the response packet at Step S52, the management station 1 proceeds to the operation at Step S81 shown in FIG. 11.

FIG. 11 is a flow chart illustrating an operation of the management station 1 when the number of existing neighboring management stations is larger than the transmission count of the response packet. The management station 1 resets the wait timer (Step S81), and waits for the reception of the packet (Step S82) until the waiting time of the channel information packet elapses (No at Step S94). If the packet is received (Yes at Step S83), the demodulation section 33 demodulates the packet (Step S84), and the packet determining section 34 applies the CRC check to the demodulated data. If the packet is normally received (Step S83), the packet determining section 34 refers to the packet identifier of the packet to determine whether or not the received packet is the channel information packet (Step S86). If the received packet is not the channel information packet, the management station 1 returns to a waiting state again (Step S82).

Meanwhile, if the received packet is the channel information packet, the packet determining section 34 recognizes the source management station ID (Step S87), and passes it to the delay amount determining section 36. The delay amount determining section 36 determines whether or not the received source management station ID is coincident with the already stored existing neighboring management station ID (Step S88). If the source management station ID is not coincident therewith, it returns to a reception waiting state again (Step S82), whereas if the source management station ID is coincident therewith, the delay amount determining section 36 instructs the transmission packet processing section 40 to generate the response packet.

The transmission packet processing section 40 generates and stores the response packet (Step S89). Meanwhile, the transmission timing control section 38 generates the transmission start signal at random timing, and passes it to the modulation section 41 (Step S90). The modulation section 41, upon receiving the transmission start signal, will read the transmit data of the response packet to generate the modulation signal. The modulation signal generated by the modulation section 41 is transmitted through the RF section 32 and the antenna 31 as a radio signal (Step S91).

Subsequently, the delay amount determining section 36 increments the transmission count of the response packet by one (Step S92). Thereafter, the management station 1 waits until the ending time of the response zone (Step S93), and returns to the operation at Step S52 shown in FIG. 10.

Meanwhile, if the channel information packet could not be received from the existing neighboring management station even when the waiting time of the channel information packet has elapsed (Yes at Step S94), the delay amount determining section 36 decrements the stored number of existing neighboring management stations by one (Step S95). Subsequently, the management station 1 returns to the operation at Step S52 shown in FIG. 10.

Figure 12:
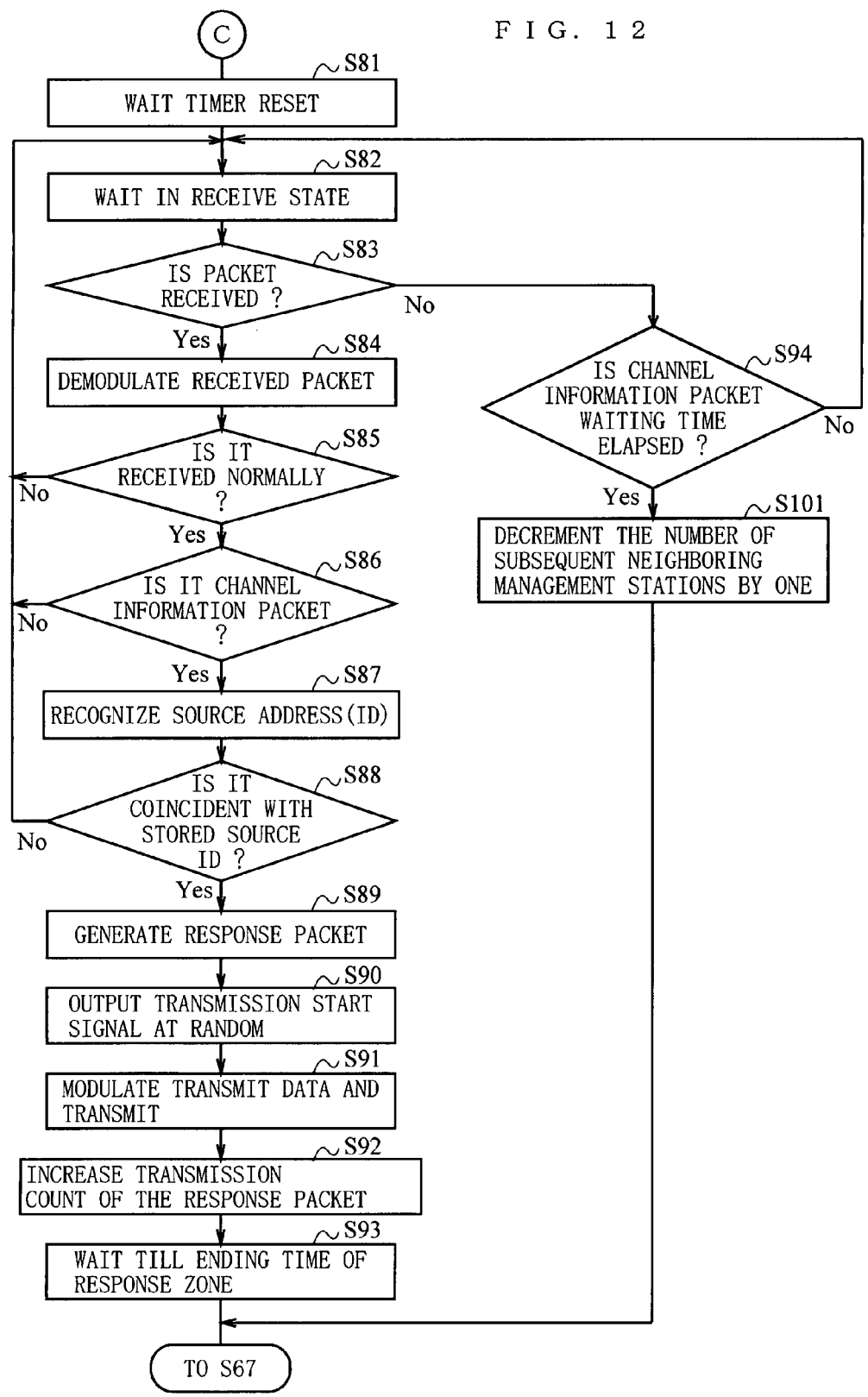
FIG. 12 is a flow chart illustrating an operation of the management station 1 when the number of subsequent neighboring management stations is larger than the transmission count of the response packet.

FIG. 12 is a flow chart illustrating an operation of the management station 1 when the number of subsequent neighboring management stations is larger than the transmission count of the response packet. At Step S88 shown in FIG. 12, the delay amount determining section 36 determines whether or not the received source management station ID is coincident with the already stored neighboring management station ID, and if the source management station ID is not coincident therewith, it returns to Step S82, whereas if it is coincident therewith, it instructs the transmission packet processing section 40 to generate the response packet. In addition, since operation of S81 through Step S94 shown in FIG. 12 are similar to those of the steps to which the same symbols are given as shown in FIG. 11, description thereof will be omitted as much as possible. If the channel information packet from the neighboring management station whose ID has already been stored could not be received even when the waiting time of the channel information packet has elapsed (Yes at Step S94), the delay amount determining section 36 decrements the stored number of subsequent neighboring management stations by one (Step S101). The management station 1 then returns to the operation at Step S67 shown in FIG. 10. As mentioned above, while the operation of the management station 1 has been described by use of the flow chart shown in FIG. 9 through FIG. 12, the management stations 2 and 3 also operate similarly to that of the management station 1.

Figure 13:
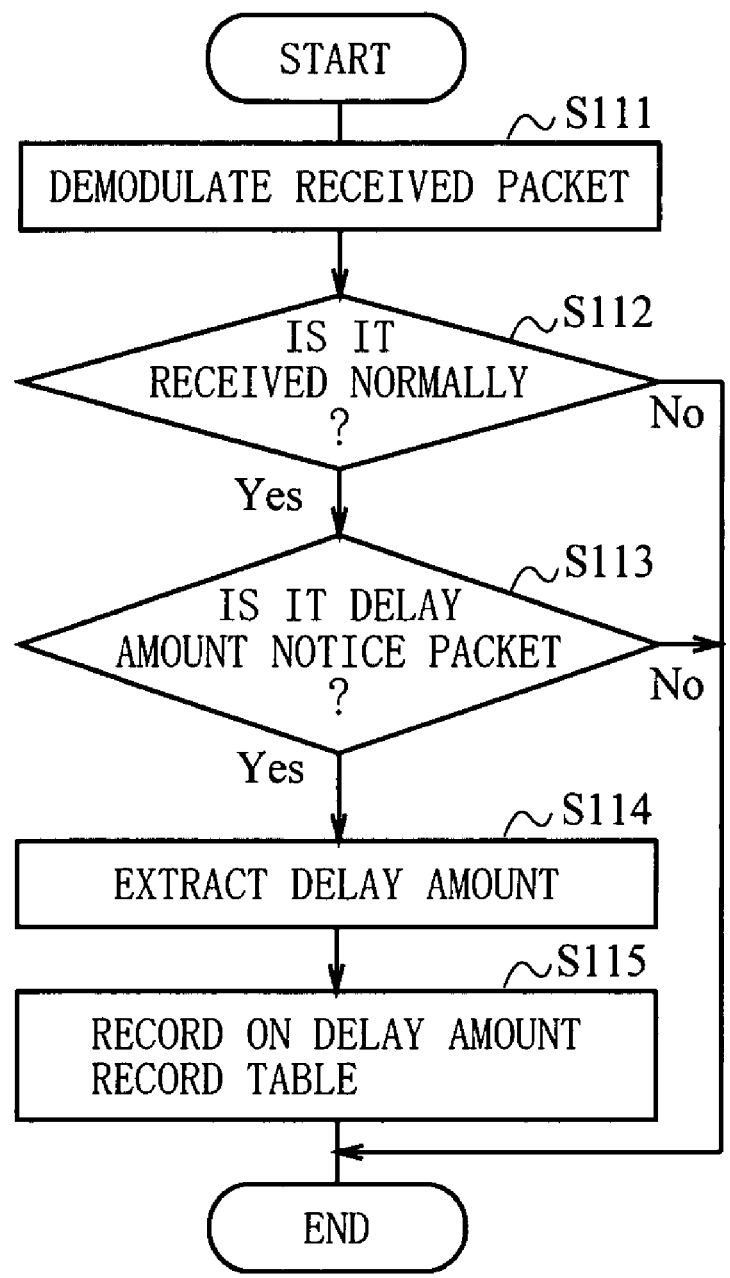
FIG. 13 is a flow chart illustrating an operation of the management station 2 which has received a delay amount notice packet transmitted at Step S66 shown in FIG. 10.

FIG. 13 is a flow chart illustrating an operation of the management station 2 which has received the delay amount notice packet transmitted at Step S66 shown in FIG. 10. First, the delay amount determining section 36 determines whether or not the packet demodulated by the demodulation section 33 (Step S111), and determined to be normally received by the packet determining section 34 (Yes at Step S112) is the delay amount notice packet (Step S113). If the received packet is the delay amount notice packet, the delay amount determining section 36 extracts the delay amount from the packet (Step S114), and records the extracted delay amount on the delay amount record table 37 (Step S115). Note herein that, while the operation of the management station 2 has been described in FIG. 13, the management stations 1 and 3 also operate similarly to the management station 2.

Figure 14:
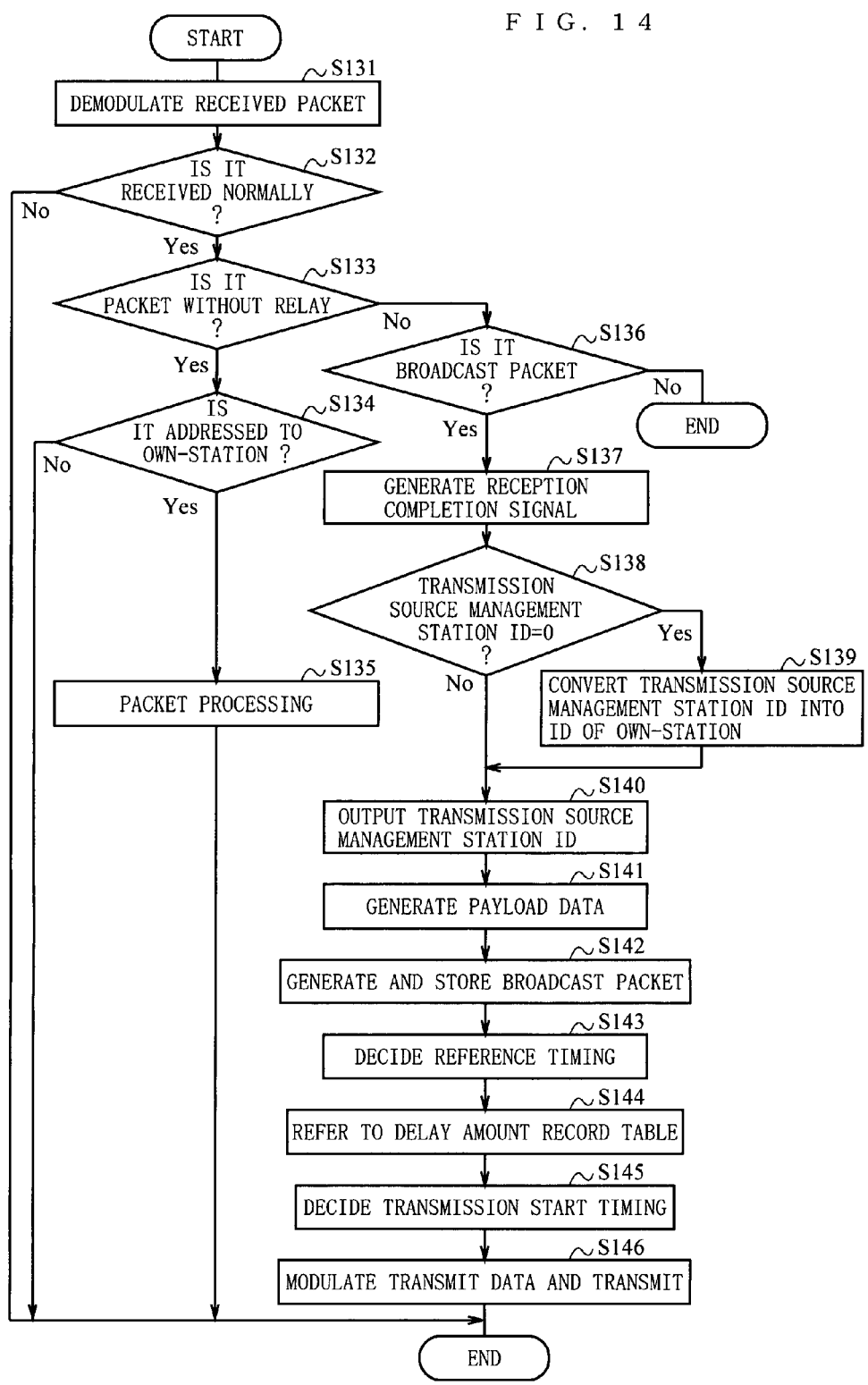
FIG. 14 is a flow chart illustrating an operation of the management station 1 during packet reception after the delay amount to be allocated to each management station is decided by the operation shown in FIG. 10 through FIG. 13.

FIG. 14 is a flow chart illustrating an operation of the management station 1 during packet reception after the delay amount to be allocated to each management station is decided by the operation shown in FIG. 10 through FIG. 13. In the management station 1, the demodulation section 33 demodulates the received baseband signal which is received by the antenna 31 and outputted from the RF section 32, and uses it as the demodulated data (Step S131).

The packet determining section 34 applies the CRC check to the demodulated data to determine whether or not the packet is normally received (Step S132). If the packet cannot be demodulated normally, the management station 1 completes the process. Meanwhile, if the packet can be demodulated normally, the packet determining section 34 refers to the packet identifier of the received packet to determine whether or not it is the packet that does not need the relay (Step S133).

If the received packet is the packet that does not need the relay, the packet determining section 34 refers to the destination address of the packet to determine whether or not this packet is addressed to its own-station (Step S134). If the packet is not addressed to its own-station, the management station 1 completes the process, whereas if the packet is addressed to its own-station, the packet determining section 34 passes the demodulated data to the own-station packet processing section 35. The management station 1 performs a predetermined processing for the demodulated data in the own-station packet processing section 35 (Step S135), and then completes the process.

Meanwhile, if the received packet is not the packet that does not need the relay at Step S133, the packet determining section 34 refers to the packet identifier to determine whether or not the received packet is the broadcast packet (Step S136). If the received packet is not the broadcast packet, the management station 1 completes the process. Meanwhile, if the received packet is the broadcast packet, the packet determining section 34 generates the reception completion signal, and then passes it to the transmission timing control section 38 along with the identifier of the packet (Step S137).

Subsequently, the packet determining section 34 refers to the source ID of the packet to determine whether or not the source management station ID is zero (Step S138). If the source management station ID is not zero, the packet determining section 34 outputs the source management station ID to the transmission timing control section 38 (Step S140). Meanwhile, if the source management station ID is zero, the packet determining section 34 converts the source management station ID to the ID of its own-station (Step S139), and outputs the converted ID to the transmission timing control section 38 as the source management station ID (Step S140).

Moreover, the packet determining section 34 extracts the data after UW shown in FIG. 2 from the demodulated data as payload data, and passes the payload data in which the source management station ID in the payload data is converted to the ID of its own-station as the relay data, to the transmission packet processing section 40 as required (Step S141). The transmission packet processing section 40 adds the predetermined header thereto to generate and store the broadcast packet (Step S142).

The transmission timing control section 38, upon receiving the reception completion signal, will decide the reference timing (Step S143). Subsequently, the delay amount determining section 36 refers to the delay amount record table 37 (Step S144), and defines a timing delayed from the reference timing by the delay amount allocated to its own-station, as the transmission start timing (Step S145). The transmission timing control section 38, when the transmission start timing arrives, will generate the transmission start signal to pass it to the modulation section 41.

The modulation section 41, upon receiving the transmission start signal, will read the transmit data of the broadcast packet to generate the modulation signal. The modulation signal generated by the modulation section 41 is transmitted through the RF section 32 and the antenna 31 as a radio signal (Step S146).

Note herein that, while the operation of the management station 1 has been described in FIG. 14, the management stations 2 and 3 also operate similarly to the management station 1. Additionally, at Step S139, since the single station transmission of the broadcast packet is performed if the source management station ID is rewritten, the transmission timing control section 38 may generate the transmission start signal by use of a predetermined reference timing as the transmission start timing.

Figure 15A:
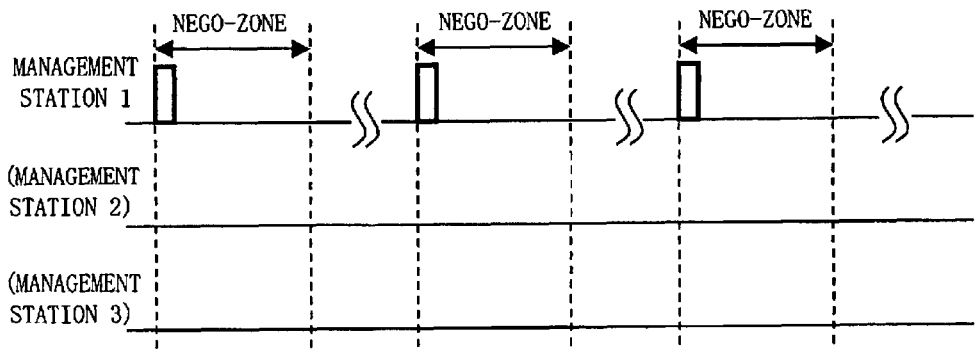
FIG. 15A is a diagram illustrating an operation of the management station and a delay amount decision procedure according to the first embodiment of the present invention.
Figure 15B:
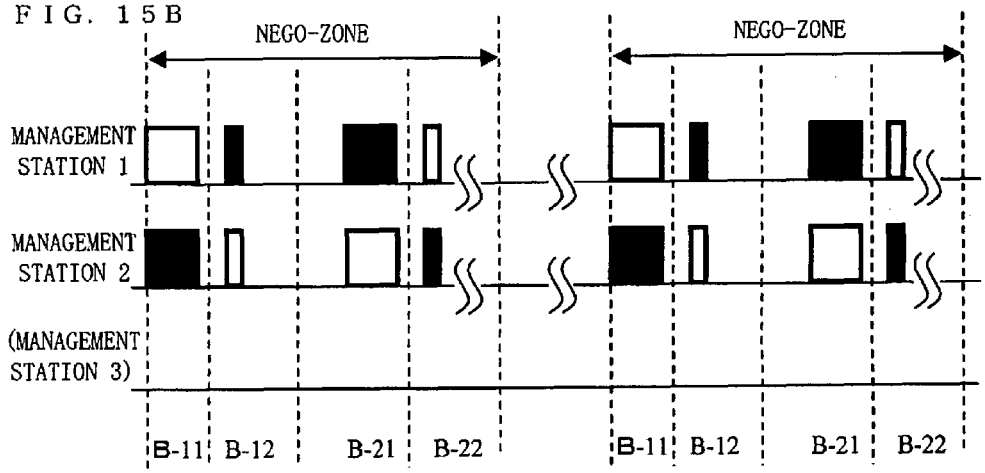
FIG. 15B is a diagram illustrating the operation of the management station and the delay amount decision procedure according to the first embodiment of the present invention.
Figure 15C:
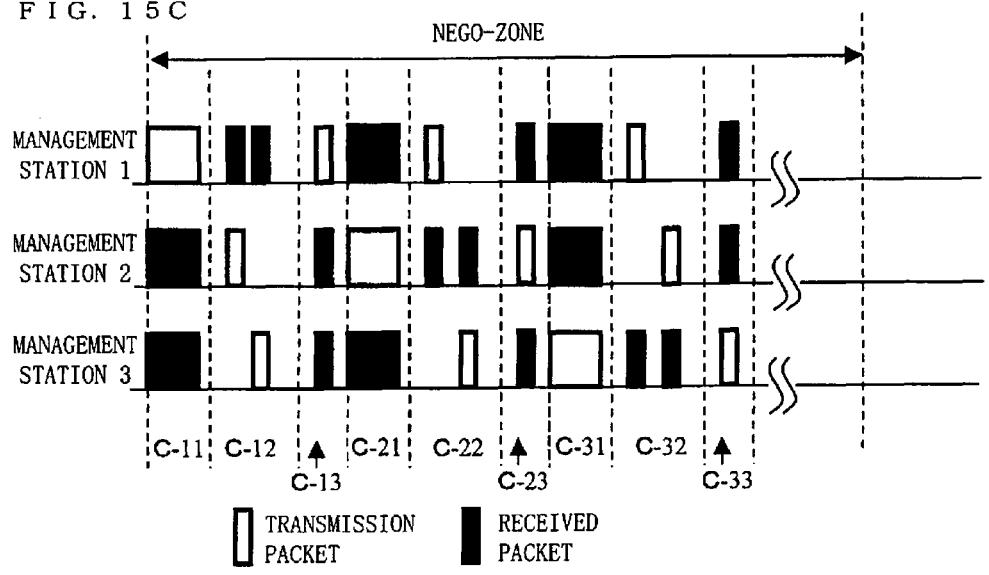
FIG. 15C is a diagram illustrating the operation of the management station and the delay amount decision procedure according to the first embodiment of the present invention.
Figure 16A:
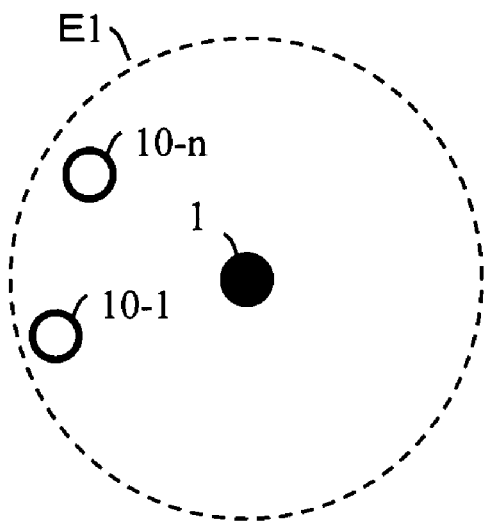
FIG. 16A is a diagram illustrating an example of a configuration change of the wireless transmission system according to the first through fourth embodiments of the present invention.
Figure 16B:
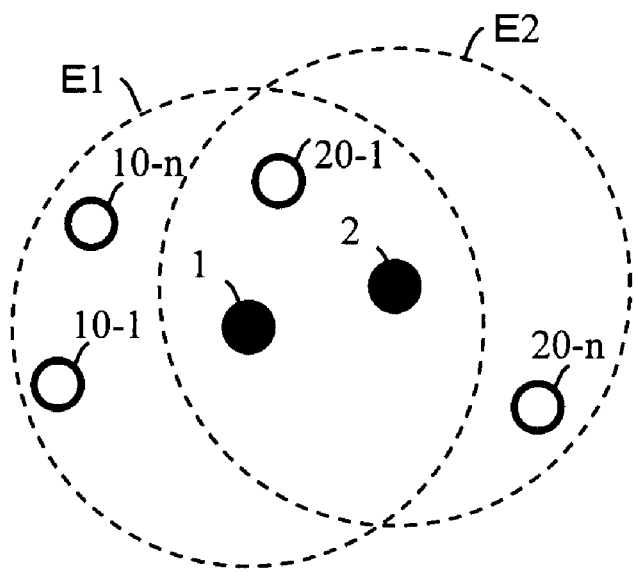
FIG. 16B is a diagram illustrating an example of the configuration change of the wireless transmission system according to the first through fourth embodiments of the present invention.

FIGS. 15A through C are diagrams illustrating examples of a negotiation procedure after one wireless system is generated until a system configuration shown in FIG. 1 is created. FIGS. 16A through C are diagrams illustrating the relative position between the management stations 1 through 3 and the terminal station 11 after one wireless system is generated until a system configuration shown in FIG. 1 is created. Hereinafter, referring to FIGS. 15A through C and FIGS. 16A through C, there will be described a procedure in which the management stations 1 through 3 shown in FIG. 5 negotiate with each other to decide the delay amount to be allocated to each management station. Note herein that there is omitted, in FIGS. 15A through C, an illustration of the packet showing a procedure when the management stations 2 and 3 receive the channel information packet in an existing neighboring management station search mode.

First, as shown in FIG. 16A, if only the wireless transmission system being the management station 1 exists as the wireless transmission system, the management station 1 transmits the channel information packet in the nego-zone according to the procedure shown in FIG. 10 (FIG. 15A).

Next, as shown in FIG. 16B, if the management station 2 having a function capable of newly constructing and managing the wireless transmission system within the communication area E1 of the management station 1 is generated, the management station 2, while observing the common channel for a predetermined period, searches for an existing neighboring management station according to the procedure shown in FIG. 9. The predetermined period is, for example, one period time of the nego-zone or more. Thereafter, when the management station 2 receives the channel information packet transmitted by the management station 1 (FIG. 15B: B-11), the management station 2 generates the response packet for notifying the neighboring stations that the channel information packet is normally received according to the procedure shown in FIG. 11, and transmits it within the predetermined response zone (FIG. 15B: B-12).

The management station 1 receives the response packet transmitted from the management station 2 in the response zone, and recognizes the number of stations capable of the relay according to the procedure shown in FIG. 10 (FIG. 15B: B-12). Since the management stations which exist in the wireless transmission system are two of the management stations 1 and 2 at this time, the number of response packets that the management station 1 receives within the response zone is one. As a result, since the multi-station simultaneous transmission cannot be performed upon relay-transmission of the broadcast packet, the management station 1 does not determine the transmission timing of the management station 2 in particular.

In this case, the broadcast packet transmitted from the management station 1 is received by the management station 2, and is simply relay-transmitted by single station at a predetermined reference timing (T0) defined by the system in advance.

Based on the channel information packet received from the management station 1, the management station 2 decides a channel to be used in the system of its own-station so that interference with the management station 1 may not be caused. Subsequently, after the predetermined time after the end of the response zone (B-11, 12), the management station 2 transmits the channel information packet according to the procedure shown in FIG. 10 (FIG. 15B: B-21). According to the procedure shown in FIG. 12, the management station 1, upon receiving the channel information packet transmitted by the management station 2 (FIG. 15B: B-21), will transmit the response packet in the response zone (FIG. 15B: B-22). The management station 2 reaffirms that the management station 1 exists by receiving the response packet therefrom in the response zone (FIG. 15B: B-22). Thereafter, the management stations 1 and 2 transmit and receive the channel information packet and the response packet to and from each other in the nego-zones provided periodically.

Next, as shown in FIG. 16B and FIG. 16C, there will be described a case where the management station 3 having a function capable of constructing and managing the wireless transmission system is newly generated within the communication areas E1 and E2 formed by the management stations 1 and 2. First, the management station 3, while observing the common channel for a predetermined period, searches for an existing neighboring management station according to the procedure shown in FIG. 9. Thereafter, the management stations 2 and 3 receive the channel information packet transmitted from the management station 1 (FIG. 15C: C-11). According to the procedure shown in FIG. 11, the management station 3 generates the response packet responsive to the channel information packet transmitted by the management station 1. Incidentally, the management station 2 also generates the response packet in this zone. In the response zone, the management stations 2 and 3 transmit the response packets at random timing (FIG. 15C: C-12).

The management station 1, upon receiving the response packets transmitted by the management stations 2 and 3 in the response zone, decides the delay amounts to be allocated to the management stations 2 and 3 according to the procedure shown in FIG. 10, and records them on the delay amount record table 37. Subsequently, in a zone immediately after the end of the response zone until the channel information packets of other management stations are transmitted, the management station 1 generates the delay amount notice packet including the decided delay amount to transmit it to each of the management stations 2 and 3 (FIG. 15C: C-13).

The management stations 2 and 3, upon receiving the delay amount notice packets transmitted by the management station 1, will extract the delay amounts allocated to its own-station and other stations during the multi-station simultaneous transmission, according to the procedure shown in FIG. 13, and record it on the delay amount record table 37 (FIG. 15C: C-13).

Next, the management stations 1 and 3 receive the channel information packets transmitted by the management station 2 according to the procedure shown in FIG. 12 and FIG. 11, respectively (FIG. 15C: C-21). Subsequently, in C-22 and C-23 shown in FIG. 15C, in a procedure similar to that in C-12 and C-13 shown in FIG. 15C, the delay amount in performing the multi-station relay transmission of the transmission packet of the management station 2 is recorded on the delay amount record table 37 of each management station.

Next, the management stations 1 and 2 receive the channel information packets transmitted from the management station 3 according to the procedure shown in FIG. 12 (FIG. 15C: C-31). Subsequently, in a procedure similar to that in C-12 and C-13 shown in FIG. 15C, the delay amount in performing the multi-station relay transmission of the transmission packet of the management station 3 is recorded on the delay amount record table 37 of each management station (FIG. 15C: C-32 and C-33). Thereafter, the management stations 1 through 3 transmit and receive the channel information packet and the response packet to and from each other in the nego-zones provided periodically.

FIG. 17A is a diagram illustrating a configuration of the delay amount record table 37 that the management stations 1 through 3 keep. Assuming that, for example, the management station 1 is a packet source, the management station 2, upon relay-transmitting the packet, uses a timing delayed from the reference timing by the delay amount $\tau$, as the transmission start timing. Meanwhile, the management station 3, upon relay-transmitting the packet, uses a timing delayed from the reference timing by the delay amount 0, namely, the reference timing in this case, as the transmission start timing. Incidentally, the delay amount $\tau$ is a proper value that provides the path diversity effect at the receiving end, namely, a value not less than the predetermined delay resolution and not more than the predetermined maximum delay. As is understood, the delay amount determining section 36 in each of the management stations 1 through 3 recognizes the management station capable of performing the multi-station simultaneous transmission, decides the plurality of delay amounts when the recognized management station performs the multi-station simultaneous transmission, and notifies it to other management stations. These other management stations store the notified delay amounts as the delay amount record tables.

FIG. 17B is a diagram illustrating a transmission/reception timing of the packet when only the management station 2 relay-transmits the broadcast packet transmitted by the management station 1 in the relative position shown in FIG. 16B. The management station 2, upon relay-transmitting the packet, transmits the packet without giving the delay amount thereto.

Figure 17C:
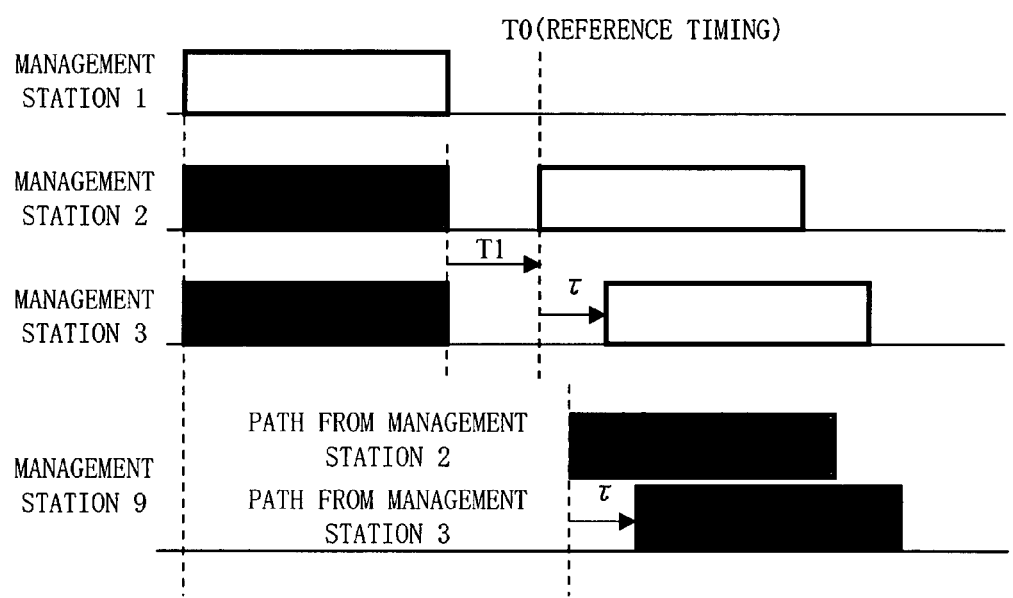
FIG. 17C is a diagram illustrating an example of a packet transmission timing during a multi-station simultaneous transmission according to the first embodiment of the present invention.

FIG. 17C is a diagram illustrating a transmission/reception timing of the packet when the management stations 2 and 3 relay-transmit the broadcast packet transmitted by the management station 1 in the relative position shown in FIG. 16C. The management stations 2 and 3 perform the multi-station simultaneous transmission of the broadcast packet according to the delay amount record table shown in FIG. 17A.

As shown in FIG. 17C, the management stations 2 and 3 set a timing after a lapse of a predetermined time (T1) from a timing when the reception of the broadcast packet transmitted from the management station 1 is completed, as the reference timing (T0). The management station 2 transmits the broadcast packet at the timing T0 when the delay amount "0" has elapsed from the reference timing T0, namely, the reference timing T0. Meanwhile, the management station 3 transmits the broadcast packet using a timing after a lapse of the delay amount "τ" from the reference timing, as the transmission timing. Since the management stations 2 and 3 are located so close to each other that the propagation time can be ignored as compared with the delay amount difference τ, the packets transmitted from two management stations arrive at the receiving station (for example, the management station 9) with a value very close to a proper transmission time difference τ which can provide the path diversity effect. Hence, the receiving station can provide the effect due to the path diversity to the maximum extent to thereby receive the packet normally.

As described above, according to the present embodiment, respective management stations negotiate with each other before the multi-station simultaneous transmission is performed to decide the transmission timings for respective management stations during the multi-station simultaneous transmission. The plurality of delay amounts used for the decision of the transmission timing are set so that each difference between the plurality of delay amounts may not be less than the predetermined delay resolution, and the difference between the maximum and minimum values of the plurality of delay amounts may not be more than the predetermined maximum delay. As a result, even when the relative position between the management stations changes, or the number of the management stations for performing the multi-station simultaneous transmission changes resulting from the movement thereof, since each difference between the plurality of delay amounts is not less than the predetermined delay resolution, and the difference between the maximum and the minimums value is not more than the predetermined maximum delay, the data simultaneously transmitted to the multi-station will be received by the receiving stations at the TDOA which can certainly provide the effect due to the path diversity. Hence, in the multi-station simultaneous transmission system in which the plurality of wireless stations arranged adjacently to each other transmit the same data, there will be provided the wireless transmission system which can certainly obtain the effect due to the path diversity even when the relative position between the wireless stations or the number of wireless stations for performing the multi-station simultaneous transmission of the data is changed, the wireless station used therein, and the method used therefore.

Note herein that in the first embodiment, if minimum, at least one management station (for example, the management station 1) among the management stations decides the plurality of delay amounts from the reference timing according to the response packet responsive to the channel information packet transmitted by its own-station or other stations during the multi-station simultaneous transmission in the wireless transmission system, it is possible to have the management stations 2 and 3 perform the multi-station simultaneous transmission of the data whose source is the management station 1.

Incidentally, in the present embodiment, there has been described the system in which there exists an exchange area existing regardless of the availability of the multi-station simultaneous transmission between the management stations, such that respective management stations transmit the channel information packets in the negotiation zone, and return the response packets responsive to the packets. In this system, as one example, channel information confirmation zones of C-m2 (m=1, 2, 3) shown in FIG. 15C, in which the response packet has been returned to the channel information packet, has been used as a multi-station situation confirmation zone for confirming how many management stations could perform the relay transmission when its own-station has transmitted it. Moreover, it has been described that the response packet responsive to the channel information packet is also used as the response packet for confirming situations of the multi-stations to thereby decide the timing during the multi-station transmission of each management station. Here, it is also possible, as a matter of course, to transmit a management station search packet for searching for the management station capable of performing the multi-station transmission within the negotiation zone, to independently provide a zone of returning the response packet responsive to the packet, and to appropriately set the transmission timing of each management station during the multi-station transmission in a procedure similar to that described above. However, as compared with such a method, according to the first embodiment, each management station uses the exchange existing regardless of the availability of the multi-station transmission, between the management stations in the negotiation zone also for setting the timing of the multi-station transmission, and thus suppressing deterioration in transmission efficiency due to setting the timing.

Incidentally, in the first embodiment, it has been described that the plurality of management stations located in the mutual communication area certainly relay-transmit the broadcast packet transmitted from another management station. Here, a situation in which the relay transmission cannot be performed on account of its own-station may arise even when each management station can receive the broadcast packet. In that case, information for indicating whether or not the relay transmission can be performed may be included in the response packet mentioned above.

Incidentally, it has been described in the present embodiment a case where the number of management stations capable of communicating with each other is three, but even when the number of management stations is increased to four or more, the delay amount of each management station can be decided by repeating the procedure of C-m1, C-m2, and C-m3 (m=1, 2, 3) shown in FIG. 15C by the number of management stations.

Incidentally, in the present embodiment, respective management stations that have received the channel information packet have transmitted the response packets at random timing in the response zone. Hence, the response packets may collide with each other in the response zone in rare cases. FIG. 18 is a diagram illustrating a transmission/reception timing of the packet when the response packets collide with each other. As shown in FIG. 18, if the response packets transmitted by the plurality of management stations collide with each other in the response zone of N-m2, there may occur a case where the packet cannot be normally received. In that case, for example, the management station m that has transmitted the channel information packet may transmit the response packet re-send request packet immediately after the end of the response zone as N-m3 shown in FIG. 18, and the management station capable of performing the relay transmission to the management station may transmit the response packet again at random timing. By repeating this procedure until the management station that has transmitted the channel information packet can normally receive the response packets of all the management stations capable of performing the relay transmission, the delay amounts to be allocated to all the management stations that relay the packets transmitted by their own-stations can be decided. However, in order to avoid that the negotiation among all the management stations will not be completed in the nego-zone resulting from the continuous collisions, it is desirable to set an upper-limit to re-send times of the response packet.

Incidentally, there is an upper-limit in the number of effective branches which can contribute to the effect due to the path diversity. Hereinafter, this upper-limit value will be called the maximum number of effective branches. If, for example, the PSK-VP scheme is used as the modulation/demodulation scheme, since the delay resolution is about several times less than the symbol length, and the maximum delay is a value less than one symbol time, the number of incoming waves (a number not more than a value given by dividing the maximum delay by the delay resolution) separable in the receiving station is about at most three, so that the maximum number of effective branches is suppressed to about two and three. Hence, if there are so many management stations for performing the multi-station simultaneous transmission in number to exceed the maximum number of effective branches, the path diversity effect may not be improved as compared with a case where the proper multipaths which cause the proper TDOA is certainly generated in the multi-station, the number of which is equal to the number of branches (in the above-mentioned example, three stations). As a result, if the number of the response packets from the neighboring management stations, which could be normally received within the response zone exceeds the maximum number of effective branches which provides the effect due to the path diversity, it is desirable that the management station m that has transmitted the channel information packet does not transmit the response packet re-send request packet even when the collision of the response packets occurs in the response zone. In this case, the management station m may transmit the delay amount notice packet including the delay amount only to a neighboring management station that could receive normally. As is understood, as for the management station which decides the delay amount, if the number of management stations capable of performing the multi-station simultaneous transmission is more than the maximum number of effective branches, the number of the wireless stations decided to be able to perform the multi-station simultaneous transmission may be not more than the maximum number of effective branches. Incidentally, if the delay amount to its own-station does not exist in the packet, the management station which has received the delay amount notice packet may not perform the relay transmission of the broadcast packet even when it is received from the management station which has transmitted that packet.

In addition, it has been described in the present embodiment that the management station manages the terminal station existing in the communication area of its own-station, but the management station may just have capability to manage the terminal station, and the terminal station to be a target that the management station manages may not necessarily exist. The reason is that, for example, during the process for the management station to newly construct the wireless transmission system, there may be a case where the terminal station does not exist in the communication area formed by the management station.

Moreover, a data row which is simultaneously transmitted by the plurality of management stations may not necessarily be fully matched, but parts intending to improve the transmission characteristics by performing the multi-station simultaneous transmission to thereby increase reliability of the data transmission may be the same.

Moreover, it has been described in the present embodiment a case where the communication is performed by use of the PSK-VP scheme as the modulation/demodulation scheme, but an effect similar to that of the present embodiment can be obtained even when communication is performed by use of the OFDM scheme as the modulation/demodulation scheme.

Figure 19:
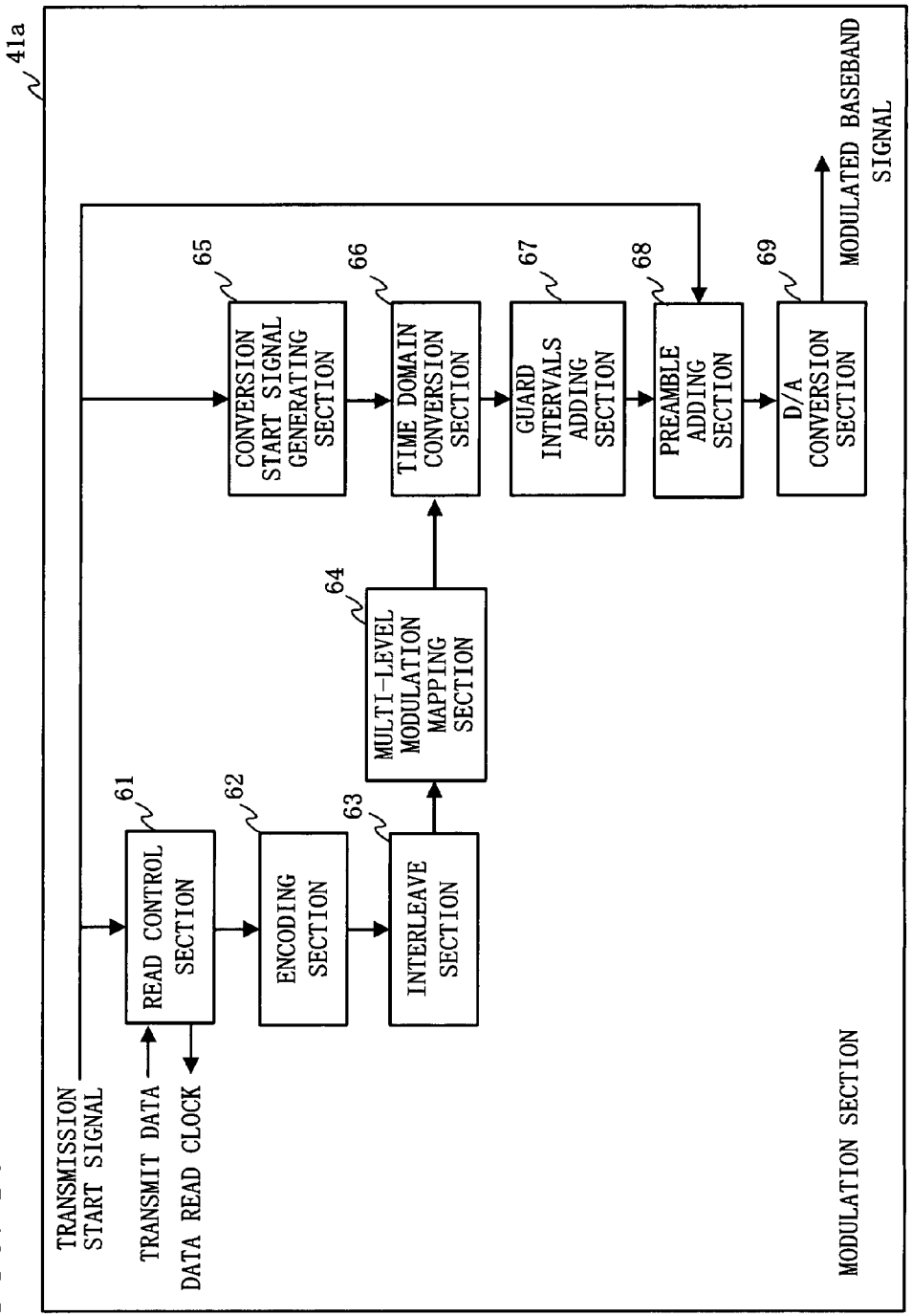
FIG. 19 is a block diagram illustrating a configuration of a modulation section 41a when communication is performed by use of an OFDM scheme.

FIG. 19 is a block diagram illustrating a configuration of a modulation section 41a when communication is performed by use of the OFDM scheme. In FIG. 19, the modulation section 41a comprises a read control section 61, an encoding section 62, an interleave section 63, a multi-level modulation mapping section 64, a conversion start signal generating section 65, a time domain conversion section 66, a guard intervals adding section 67, a preamble adding section 68, and a D/A conversion section 69.

An operation of the read control section 61 is similar to that of the read control section 45 shown in FIG. 6. The read control section 61 outputs a generated read clock to the transmission packet processing section 40 to receive the transmit data, and passes it to the encoding section 62.

The encoding section 62 performs encoding for error correction by use of, for example, a convolutional code. The interleave section 63 performs an interleave processing to a signal encoded by the encoding section 62. The multi-level modulation mapping section 64 performs a symbol mapping with a digital modulation scheme such as PSK and QAM, to a signal to which the interleave-processing has been performed to thereby generate a frequency domain signal.

The conversion start signal generating section 65, upon receiving the transmission start signal from the transmission timing control section 38, will generate a conversion start signal for indicating a timing of converting the frequency domain signal into a time domain signal, and pass it to the time domain conversion section 66.

The time domain conversion section 66, upon receiving the conversion start signal, will convert the frequency domain signal into the time domain signal to use it as an OFDM signal. The guard intervals adding section 67 adds a guard interval for every OFDM symbol to output an OFDM-modulated signal.

The preamble adding section 68 adds the preamble to be used for a synchronous processing to the signal. The D/A conversion section 69 converts a digital OFDM signal to which the preamble is added into an analog signal to output it as the modulated baseband signal.

Figure 20:
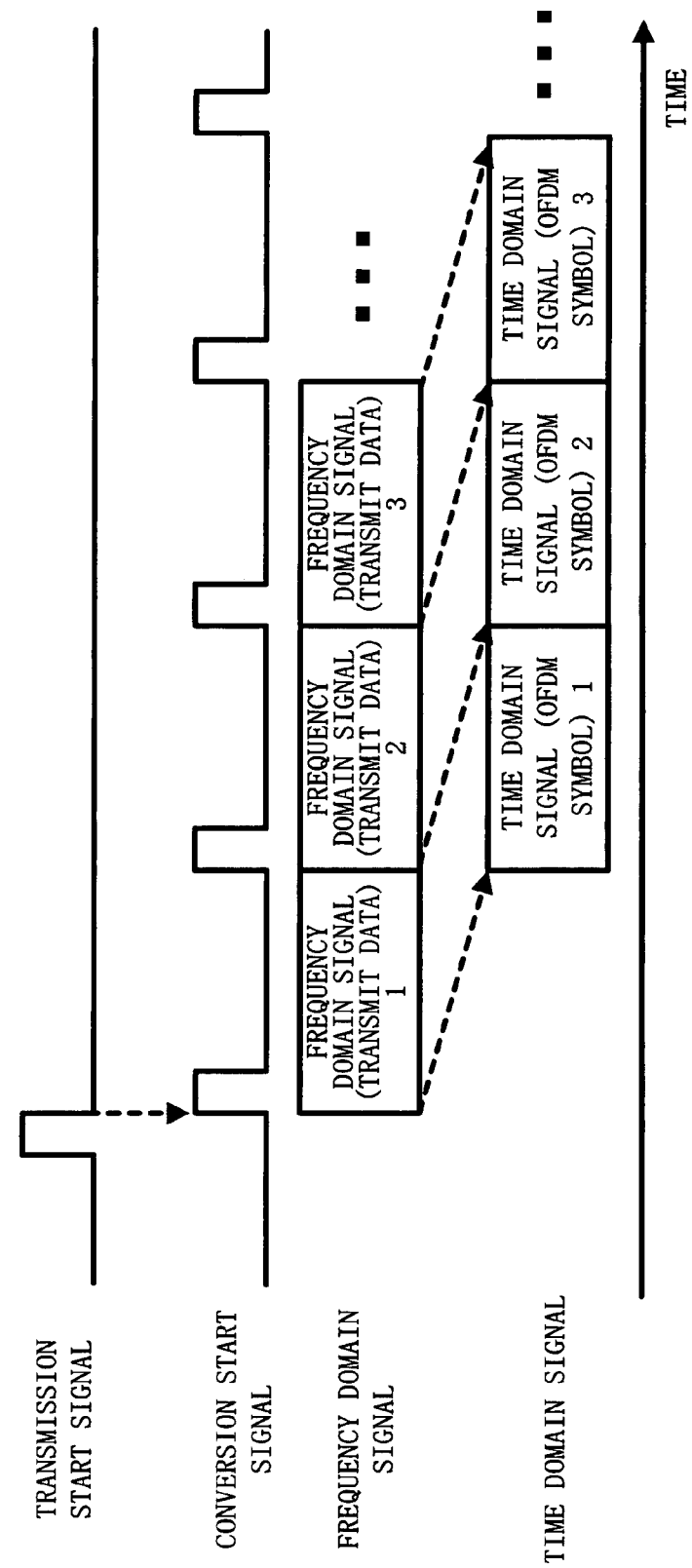
FIG. 20 is a diagram illustrating a timing between signals generated in principal parts of the modulation section 41a shown in FIG. 19 and a transmission start signal.

FIG. 20 is a diagram illustrating a timing between the signals generated in the principal parts of the modulation section 41a shown in FIG. 19 and the transmission start signal.

In the modulation section 41a, the conversion start signal generating section 65, upon receiving the transmission start signal from the transmission timing control section 38, will generate the conversion start signal. According to the timing indicated by the conversion start signal, the time domain conversion section 66 converts the frequency domain signal into the time domain signal to generate an OFDM symbol. Thus, the modulation section 41a, upon receiving the transmission start signal, will modulate the transmit data.

Figure 21:
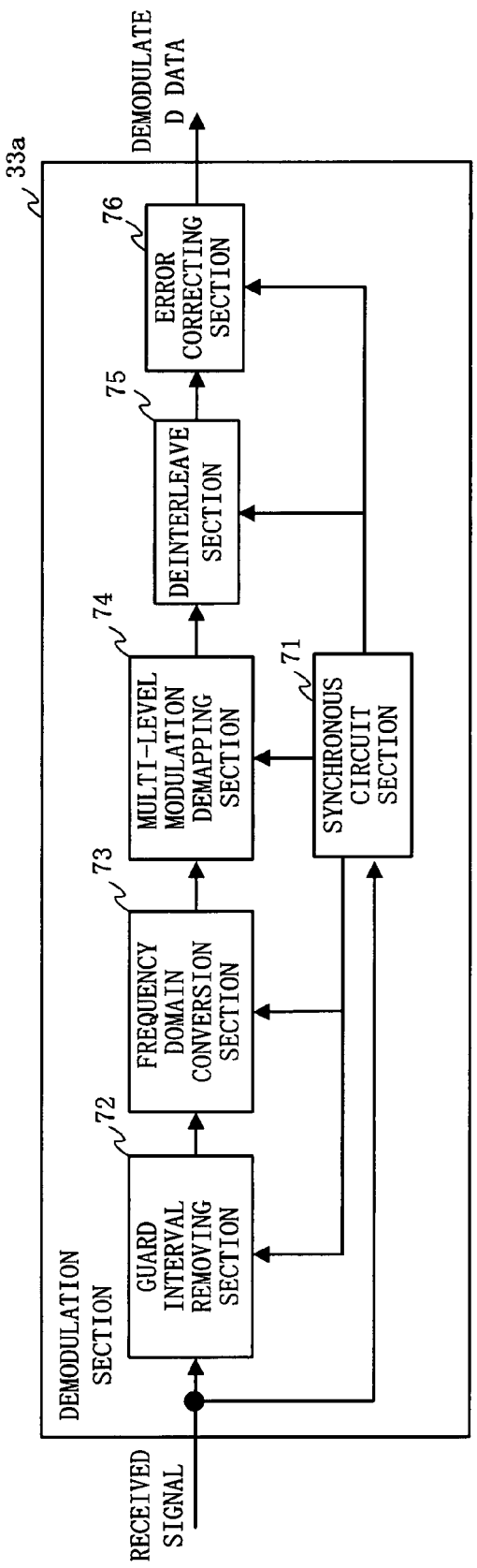
FIG. 21 is a block diagram illustrating a configuration of a demodulation section 33a when communication is performed by use of the OFDM scheme.

FIG. 21 is a block diagram illustrating a configuration of a demodulation section 33a when communication is performed by use of the OFDM scheme. In FIG. 21, the demodulation section 33a comprises a synchronous circuit section 71, a guard interval removing section 72, a frequency domain conversion section 73, a multi-level modulation demapping section 74, a deinterleave section 75, and an error correcting section 76.

The synchronous circuit section 71 generates a symbol synchronizing signal for the OFDM symbol to output it to other sections that the demodulation section 33a has. The symbol synchronizing signal is used for the timing for internal processing in each section. The guard interval removing section 72 removes the guard interval included in each OFDM symbol, from the received baseband signal.

The frequency domain conversion section 73 converts the time domain signal into the frequency domain signal. The multi-level modulation demapping section 74 performs a demapping processing on a constellation of a multi-level modulation from the frequency domain signal to obtain determination data. The deinterleave section 75 applies a deinterleave-processing to the determination data. The error correcting section 76 performs an error correction processing to the data to which the deinterleave-processing has been performed to obtain the demodulated data. When the convolutional code, for example, a Viterbi symbol, is used for the error correction processing, a Viterbi decoding processing is performed.

In the OFDM scheme, if the TDOA between the multipaths is within a guard interval, inter-symbol interference will not be caused and an error will not be caused, wither. Further, the error correction is typically performed over a plurality of carriers. Hence, a frequency selective fading in which a plurality of notches are generated in a spectrum rather than a flat fading in which an overall spectrum falls provides the path diversity effect. In the OFDM scheme, the delay resolution corresponds to an inverse number of the frequency bandwidth, and the maximum delay corresponds to a guard interval length. Accordingly, when the modulation section 41a shown in FIG. 19 and the demodulation section 33a shown in FIG. 21 are used, what is necessary is just to decide the delay amount so that the difference between the delay amounts of respective management stations may be not less than the above-mentioned delay resolution and not more than the maximum delay.

Additionally, also when a single carrier system, such as a QPSK scheme, is used for the modulation scheme, and an equalizer for compensating channel distortion is used for the demodulation scheme, an effect similar to that of the first embodiment can be obtained. At this time, what is necessary is just to replace, in the configuration of the modulation section 41 shown in FIG. 6, to the waveform of the single carrier system which uses only the modulated waveform stored in the waveform memory of the waveform output section 46, so that the configuration of the modulation section shown in FIG. 6 will be used.

Figure 22:
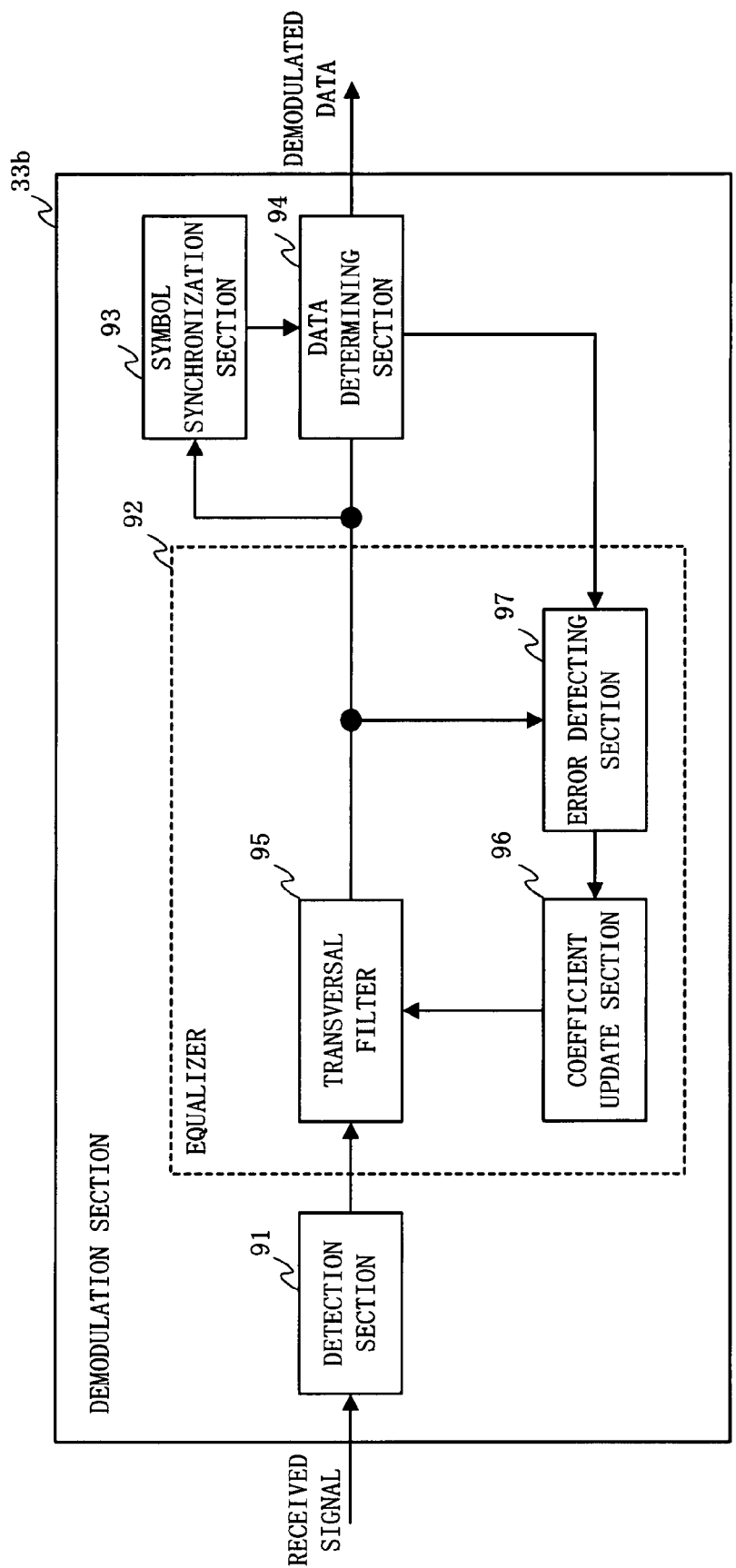
FIG. 22 is a block diagram illustrating a configuration of a demodulation section 33b when communication is performed by use of a single carrier system.

FIG. 22 is a block diagram illustrating a configuration of a demodulation section 33b when communication is performed by use of the single carrier system. In FIG. 22, the demodulation section 33b comprises a detection section 91, an equalizer 92, a symbol synchronization section 93, and a data determining section 94. The equalizer 92 is composed of a transversal filter 95, an error detecting section 97, and a coefficient update section 96.

The detection section 91 detects a received baseband signal. In the equalizer 92, the transversal filter 95 equalizes the received baseband signal according to a filter factor outputted from the coefficient update section 96 to output it as an equalized signal. The error detecting section 97 detects an error between the equalized signal and the demodulated data. The coefficient update section 96 updates the filter factor of the transversal filter based on the error detected by the error detecting section 97.

The symbol synchronization section 93 reproduces a symbol timing by performing a clock recovery of the signal outputted from the transversal filter 95. The data determining section 94 samples the signal after equalization according to the symbol timing to obtain the demodulated data.

When the equalizer is used for demodulating the data, the delay resolution corresponds to the symbol length, and the maximum delay corresponds to a time length decided by the number of taps. Hence, when the modulation section 41 shown in FIG. 6 and the demodulation section 33b shown in FIG. 22 are used, what is necessary is just to decide the delay amount so that the difference between the delay amounts of respective management stations may be not less than the above-mentioned delay resolution and not more than the maximum delay.

Figure 23:
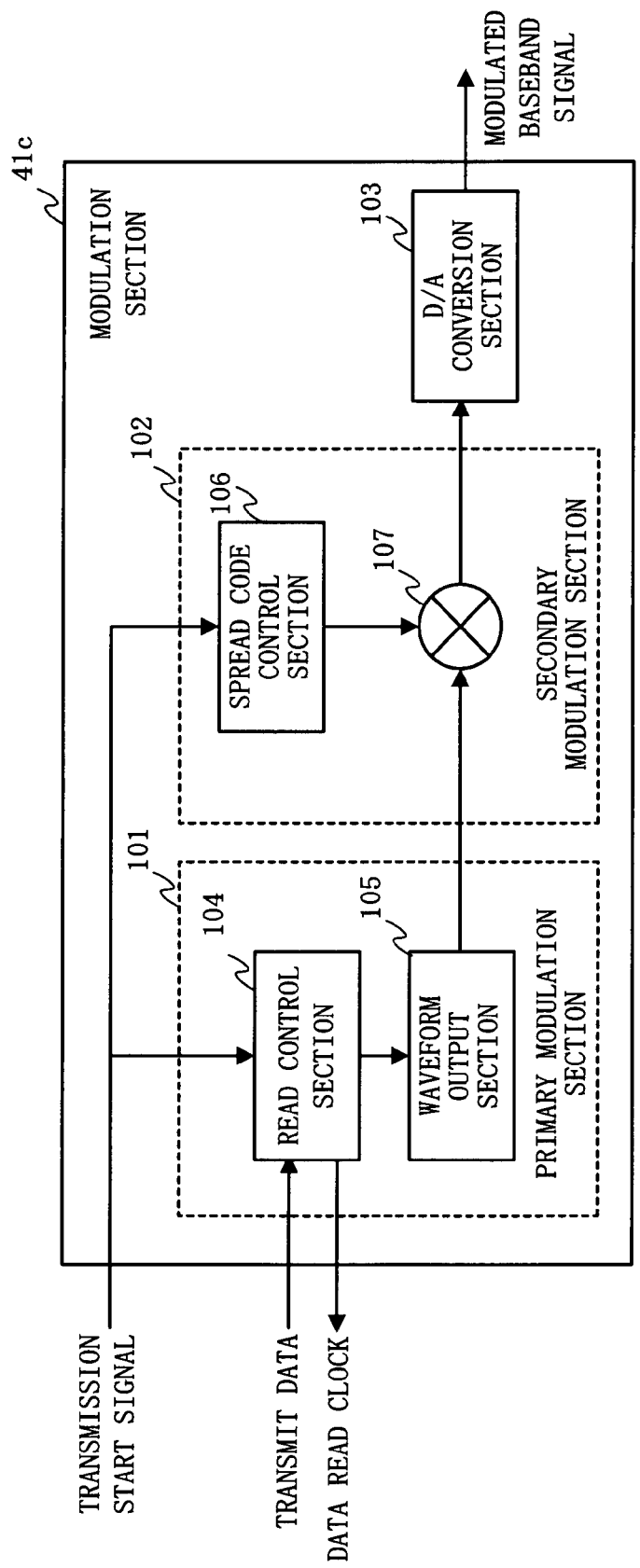
FIG. 23 is a block diagram illustrating a configuration of a modulation section 41c when communication is performed by use of a DSSS scheme.

FIG. 23 is a block diagram illustrating a configuration of a modulation section 41c when communication is performed by use of the DSSS scheme. In FIG. 23, the modulation section 41c comprises a primary modulation section 101 and a secondary modulation section 102. The primary modulation section 101 is composed of a read control section 104 and a waveform output section 105. The secondary modulation section 102 is composed of a spread code control section 106 and a multiplier 107.

In the primary modulation section 101, the read control section 104, in a manner similar to that of the read control section 45 shown in FIG. 6, generates the read clock in response to the transmission start signal, outputs the generated read clock to the transmission packet processing section 40 to receive the transmit data, and passes the address signal based on the transmit data to the waveform output section 105. The waveform output section 105 stores the data of the modulated waveform in the waveform memory in advance, reads the data of the modulated waveform according to the address signal, and outputs it as a primary modulation signal.

In the secondary modulation section 102, the spread code control section 106, upon receiving the transmission start signal, will output a spread signal to the multiplier 107. The multiplier 107 spreads the primary modulation signal with the spread signal. The D/A converter 108 converts the spread digital signal into an analog signal to output it as the modulated baseband signal. As described above, the modulation section 41c, upon receiving the transmission start signal, will start a spread modulation of the signal. Thus, the data, to which the predetermined delay amount is given, can be transmitted.

Figure 24:
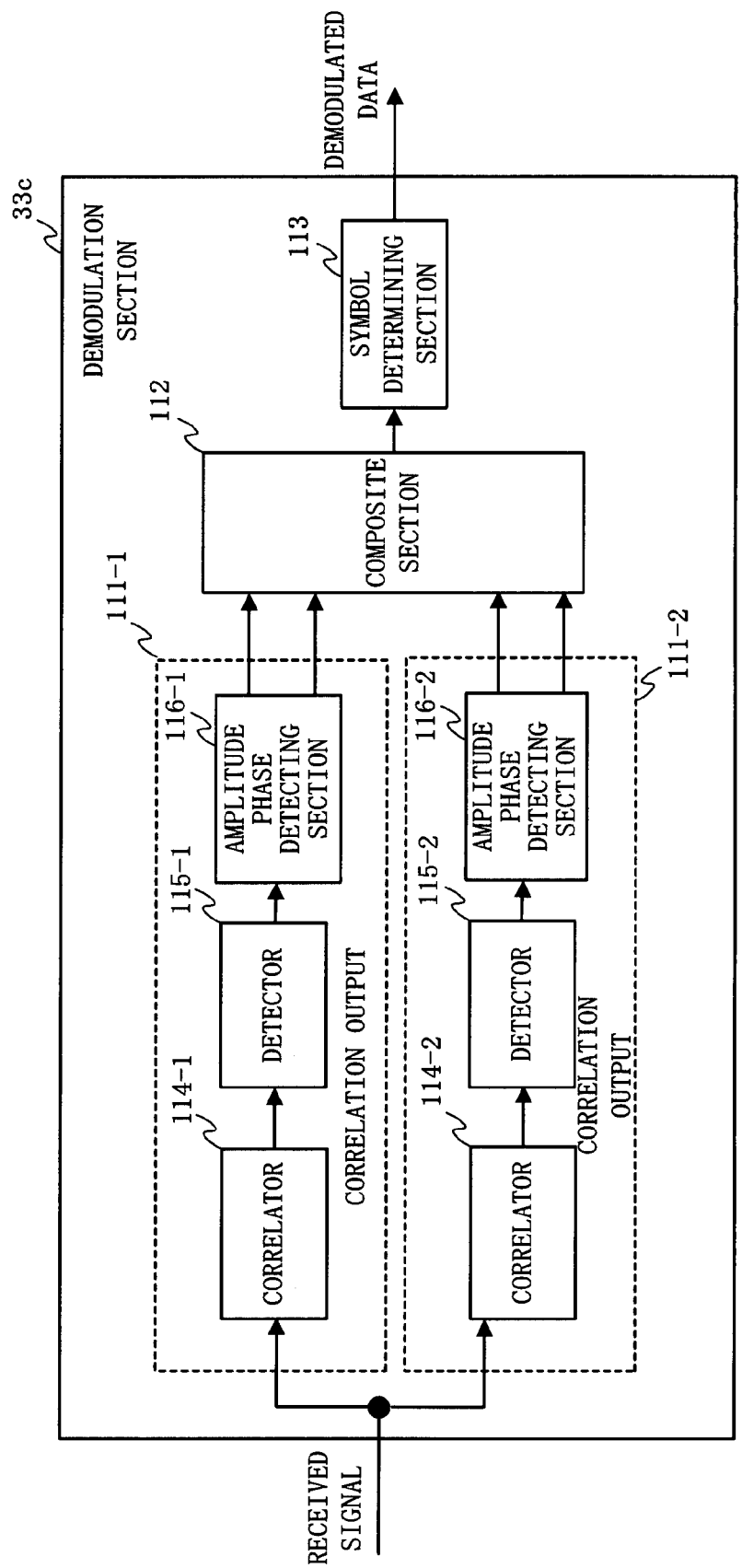
FIG. 24 is a block diagram illustrating a configuration of a demodulation section 33c when communication is performed by use of the DSSS scheme.

FIG. 24 is a block diagram illustrating a configuration of a demodulation section 33c in the case of performing communications by use of the DSSS scheme. In FIG. 24, the demodulation section 33c comprises two fingers 111-1, 111-2, a composite section 112, and a symbol determining section 113. The fingers 111-1, 111-2 are composed of correlators 114-1, 114-2, detectors 115-1, 115-2, and amplitude phase detecting sections 116-1, 116-2, respectively.

The correlators 114-1, 114-2 inverse-spread a received spread signal, and generate inverse spread signals. The detectors 115-1, 115-2 detect the inverse spread signals, and generate detection signals. The amplitude phase detecting sections 116-1, 116-2 detect amplitudes and phases from the detection signals, and output them as amplitude information and phase information, respectively.

The composite section 112 composes detection signals from two different lines based on respective amplitude information and phase information, and generates a composite signal. The symbol determining section 113 performs a symbol determination of the composite signal to obtain the demodulated data.

Further, in the DSSS scheme, the delay resolution corresponds to one-chip length of the spread code, and the maximum delay corresponds to the spread code length. Hence, when the modulation section 41c shown in FIG. 23 and the demodulation section 33c shown in FIG. 24 are used, what is necessary is just to decide the delay amount so that the difference between the delay amounts of respective management stations may be not less than the above-mentioned delay resolution and not more than the maximum delay.

As is understood, the predetermined delay resolution and the predetermined maximum delay are changed depending on the wireless transmission system for constituting the system for path diversity. However, since the predetermined delay resolution and the predetermined maximum delay can be decided once the configuration of the system for path diversity is decided, the present invention is applicable to all the system for path diversity.

(Modification)

It has been described in the first embodiment that each management station transmits the delay amount notice packet each time when it receives the response packet from other management stations. Note herein that the transmission of the delay amount may be performed only when the management station is newly generated, or the existing management station disappears. According to this modified embodiment, each management station generates the delay amount notice packet only when the management station is newly generated, or the existing management station disappears. Incidentally, since the configuration of the management stations 1 through 3 is similar to that of the first embodiment, FIG. 5 will be used.

Figure 25:
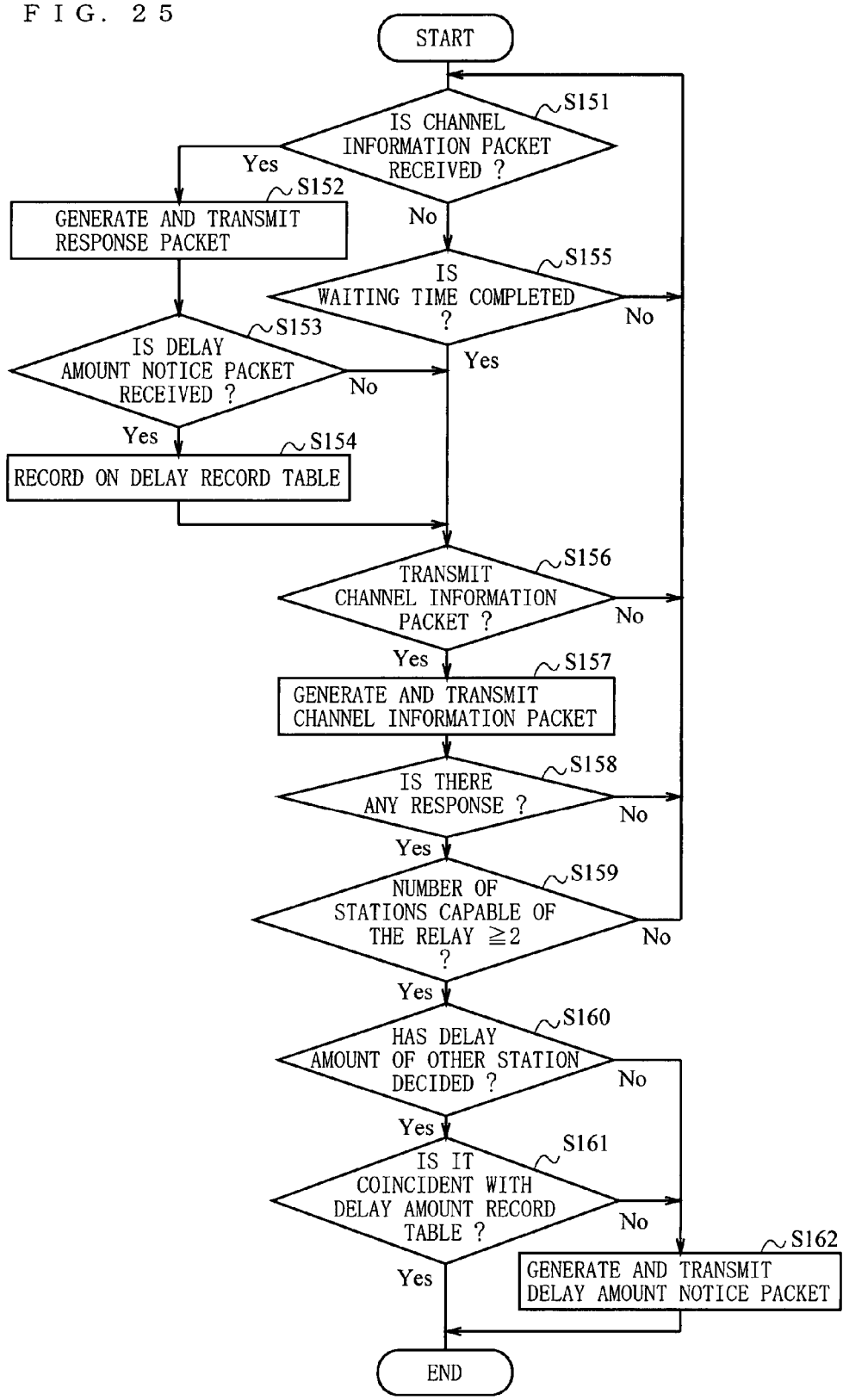
FIG. 25 is a flow chart illustrating an operation of the management station 1 according to a modification of the first embodiment.

FIG. 25 is a flow chart illustrating the operation of the management station 1 in accordance with the present modified embodiment. First, the management station 1 determines whether or not the channel information packet is received from another management station (Step S151). If the channel information packet is not received, the management station 1 determines whether or not the predetermined waiting time is completed (Step S155), and if the waiting time is not completed, the process returns to the operation at Step S151. Meanwhile, if the waiting time is completed, the management station 1 proceeds to the operation at Step S156.

Meanwhile, if the channel information packet is received at Step S151, the management station 1 generates and transmits the response packet (Step S152). Subsequently, the management station 1 determines whether or not the delay amount notice packet is received (Step S153). If the delay amount notice packet is received, the management station 1 extracts the neighboring management station ID and the delay amount from the delay amount notice packet to record them on the delay amount record table 37 (Step S154), and proceeds to the operation at Step S156.

The management station 1 determines whether or not the channel information packet is transmitted (Step S156). Here, if the delay amount is not recorded on the delay amount record table 37, the management station 1 considers at Step S156 that the existing neighboring management station is not more than one in number, and determines that its own-station should transmit the channel information packet. Meanwhile, if the delay amount is recorded on the delay amount record table 37, the management station 1 considers at Step S156 that the existing neighboring management station is not less than two in number, determines that its own-station will not transmit the channel information packet until the channel information packet is received from all other management stations recorded on the delay amount record table 37.

If it is determined that the channel information packet is transmitted, the management station 1 generates and transmits the channel information packet (Step S157), and determines whether or not the response packet is received (Step S158). If the response packet is not received in the response zone, the management station 1 returns to the operation at Step S151. Meanwhile, if the response packet is received, the management station 1 determines whether or not the number of stations capable of the relay is not less than two from the number of received response packets (Step S159). If the number of stations capable of the relay is less than two, the management station 1 returns to the operation at Step S151.

Meanwhile, if the number of stations capable of the relay is not less than two, the management station 1 determines whether or not the delay amounts of other management stations at the time when its own-station becomes the source management station have been decided (Step S160). If the delay amounts of other management stations have already decided, the management station 1 determines whether or not the management station ID recorded on the delay amount record table is coincident with the ID of the station capable of the relay obtained from the source ID of the response packet received at Step S158 (Step S161). If both IDs are coincident with each other, the management station 1 completes the process, whereas if not, the management station 1 generates the delay amount notice packet, and transmits it to other management stations (Step S162). In addition, if the delay amounts of other management stations have not been decided at Step S160, it similarly generates the delay amount notice packet at Step S162.

As described above, according to the present modified embodiment, only when the delay amounts of other management stations have not been decided yet, or the ID of the source management station of the response packet is different from the ID recorded on the delay amount record table, the management station generates and transmits the delay amount notice packet even when the number of stations capable of the relay is not less than two. Namely, only when the delay amounts of other management stations are decided first, and the recorded ID of the neighboring management station is not coincident with the source ID of the received response packet resulting from an increase/decrease or an exchange in the neighboring management station, the delay amount notice packet will be transmitted. According to the first embodiment, since it is necessary to prepare the area, such as C-13, C-23, and C-33 shown in FIG. 15C, for transmitting the delay amount notice packet within the negotiation zone, the deterioration in transmission efficiency due to deciding the delay amount during the multi-station simultaneous transmission is slightly caused. According to the present modified embodiment, however, since it is not necessary to prepare the area for transmitting the delay amount notice packet within the negotiation zone each time, the deterioration in transmission efficiency is suppressed compared with the first embodiment.

Second Embodiment

The wireless transmission system in accordance with the present embodiment is different from the first embodiment in that after the management station transmits a packet, when other management stations relay-transmit the packet, the management station being the source station also transmits the same packet again.

Figure 26A:
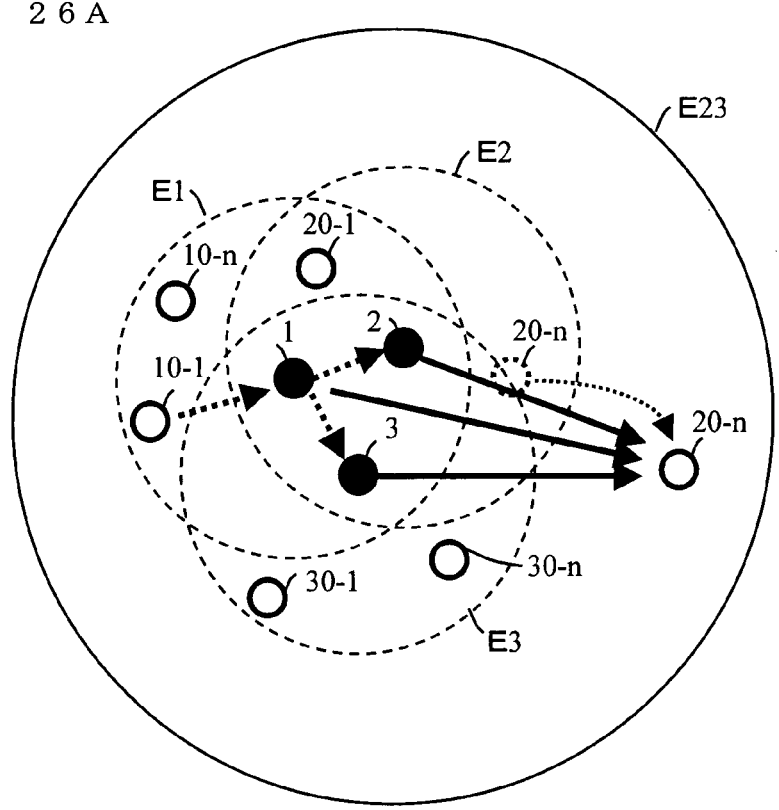
FIG. 26A is a diagram illustrating a multihop transmission method according to the second embodiment of the present invention.

FIGS. 26A and B are diagrams illustrating examples of the multihop transmission in the second embodiment. As shown in FIGS. 26A and B, the management station 1 being the source management station, after transmitting a packet to be relay-transmitted to the management stations 2 and 3, retransmits this packet again to the destination station. Note herein that since a configuration of the wireless transmission system and the management station in accordance with the present embodiment is similar to that of the first embodiment, FIGS. 1A, B, and FIG. 5 will be used, respectively.

In the present embodiment, the management station which relay-transmits the packet sets a timing after a lapse of the predetermined time from the timing when the reception of the broadcast packet is completed, as the reference timing. Additionally, the management station being the source management station of the packet sets a timing after a lapse of the predetermined time from the timing when the packet is once transmitted, as the reference timing. It will be described that these two reference timings are coincident with each other.

Figure 27A:
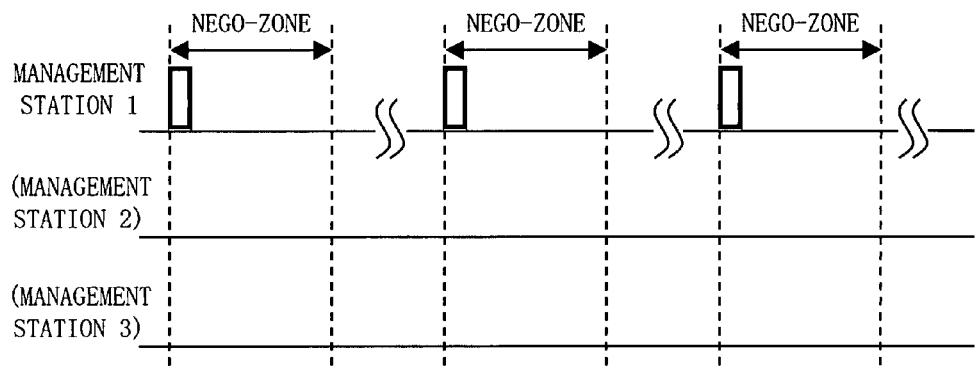
FIG. 27A is a diagram illustrating an operation of the management station and a delay amount decision procedure according to the second embodiment of the present invention.
Figure 27B:
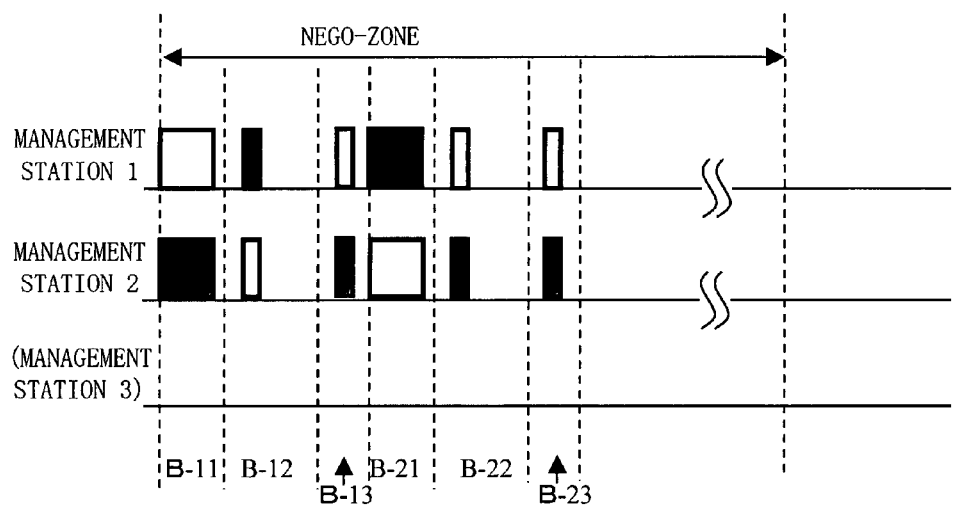
FIG. 27B is a diagram illustrating the operation of the management station and the delay amount decision procedure according to the second embodiment of the present invention.

FIGS. 27A through C are diagrams illustrating examples of the negotiation procedure performed by the management station in accordance with the second embodiment. Since a change of the system configuration will be described by use of an example similar to that of the first embodiment, FIGS. 16A through C will be used.

Hereinafter, referring to FIGS. 16A through C, and FIGS. 27A through C, an operation and a procedure of each management station until the management stations 1 through 3 in the present embodiment negotiate with each other to decide the delay amount of each management station during the multi-station simultaneous transmission will be described focusing on the difference from the first embodiment.

First, as shown in FIG. 16A, the operation of the management station 1 when only the system of the management station 1 exists is similar to that of the first embodiment.

The operation of the management stations 1 through 3 in accordance with the second embodiment differs from that in the first embodiment in the operation at Step S63 in the flow chart shown in FIG. 10. The management stations 1 through 3 in accordance with the second embodiment determine at Step S63 whether or not the number of stations capable of the relay is not less than one. If the number of stations capable of the relay is not less than one, the process then proceeds to the operation at Step S64 and following Steps, and the delay amount notice packet is generated and transmitted. Since the operation other than that are similar to those of the first embodiment, FIG. 10 through FIG. 14 will be used.

If the system configuration changes from a state shown in FIG. 16A to a state shown in FIG. 16B, the management station 2 which newly constructs a system, upon receiving the channel information packet transmitted by the management station 1, will generate a response packet, and transmits the response packet in the response zone (FIG. 27B: B-12). The management station 1 recognizes that the number of management stations capable of performing the relay transmission of the transmission packet of its own-station is one based on the neighboring station information notified by the ending time of the response zone.

In the first embodiment, if the number of management station capable of performing the relay transmission is one, the delay amounts allocated to other management stations are not decided. In the present embodiment, since the management station being the source management station retransmits the packet, the multi-station simultaneous transmission can be performed during the relay transmission even when the number of management station capable of performing the relay transmission is one. As a result, in the management station 1, the delay amount determining section 36 decides the delay amount of the management station 2 as the value ($\tau$) that is properly shifted from the reference timing, and while recording it on the delay amount record table 37, notifies it to the transmission packet processing section 40. In addition, at this time, the delay amount determining section 36 also decides the delay amount allocated to its own-station.

Subsequently, the management station 1 transmits the delay amount notice packet including the decided delay amount to the management station 2 in a zone immediately after the end of the response zone until the channel information packet of the management station 2 is transmitted (FIG. 27B: B-13). This point is different from the first embodiment. According to the present embodiment, the operation and the procedure shown in FIG. 15C are already performed in the state shown in FIG. 16B, and each management station decides the delay amount to be given to the packet during the multi-station simultaneous transmission. As for the operation and the procedure after B-13 shown in FIG. 27B, except for deciding also the delay amount to be allocated to its own-station during the multi-station simultaneous transmission, and transmitting, at B-13 and B-23 shown in FIG. 27B, the delay amount notice packet including also that value, the operation and the procedure are the same as those after C-13 shown in FIG. 15C in the first embodiment, so that detailed description thereof will be omitted.

Next, also for a case where the system configuration changes from the state shown in FIG. 16B to a state shown in FIG. 16C, except for deciding also the delay amount to be allocated to the source management station itself as the transmission timing during the multi-station simultaneous transmission, it is similar to that in the first embodiment (FIG. 27C), so that description thereof will be omitted.

FIG. 28A is a diagram illustrating an example of the delay amount record table when the management stations 1 and 2 in the relative position shown in FIG. 16B set the delay amounts according to the procedure shown in FIG. 27B. The management stations 1 and 2 refer to the delay amount record table shown in FIG. 28A to decide the delay amount to be given to the packet when other stations relay-transmit the packet. For example, if the management station 1 is the source management station of the packet, the management station 2, upon relay-transmitting the packet received from the management station 1, transmits it with a timing delayed relative to the reference timing (T0) by the delay amount $\tau$.

Figures 28C, 29A:
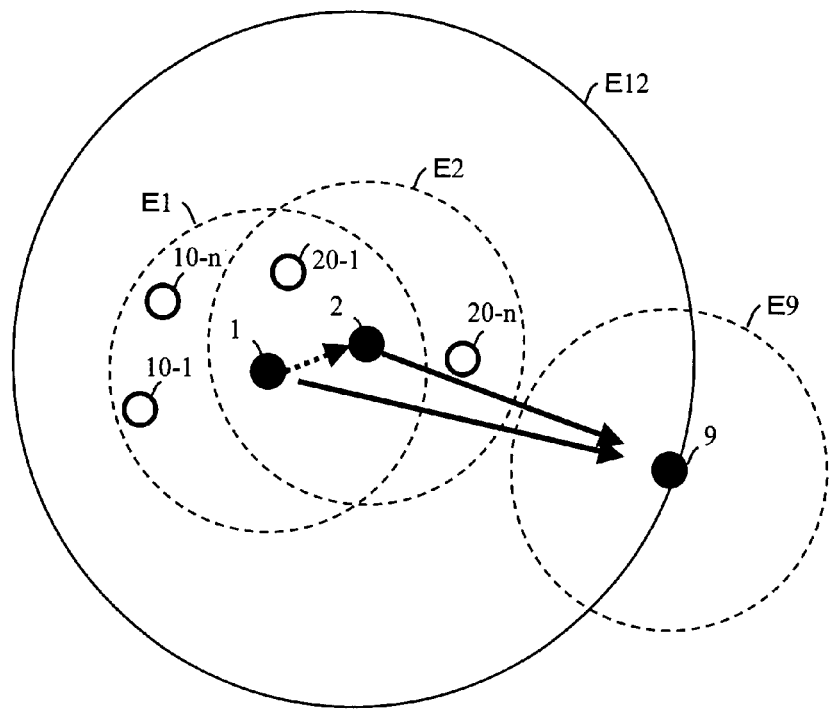
FIG. 28C is a diagram illustrating an example of an aspect of the multi-station simultaneous transmission of the management station according to the second embodiment of the present invention.
FIG. 29A is a diagram illustrating an example of a delay amount record table of the management station according to the second embodiment of the present invention.

FIG. 28B is a diagram illustrating a transmission timing of the packet where, in the management stations 1, 2 and 9 having a relative position shown in FIG. 28C, the broadcast packet is transmitted from the management station 1, is relayed by the management station 2, and arrives at the management station 9. It is assumed here that the management stations 1 and 2 keep the delay amount record table shown in FIG. 28A.

As shown in FIG. 28B, the management station 2, upon receiving the broadcast packet transmitted from the management station 1, will decide the transmission start timing in a procedure similar to that of the first embodiment. The management station 1 sets a timing after a lapse of the predetermined time (T1) from the timing when the broadcast packet is transmitted, as the reference timing (T0), and transmits the broadcast packet by setting that time as the transmission timing. The management stations 1 and 2 are located so close to each other that a propagation time can be ignored as compared with the proper time difference $\tau$ which can provide the path diversity effect. Consequently, the management station 9 receives the packets transmitted from two management stations with an TDOA of a value very close to the proper transmission time difference $\tau$ which provides the effect due to the path diversity. Hence, the management station 9 can obtain the effect due to the path diversity to the maximum extent.

FIG. 29A is a diagram illustrating an example of the delay amount record table when the management stations 1 through 3 in the relative position shown in FIG. 16C set the delay amounts according to the procedure shown in FIG. 27C. Incidentally, in the present embodiment, the wireless transmission system will be described as a system in which the maximum number of effective branches for contributing to the effect due to the path diversity is three (for example, a system for performing a RAKE reception, with three fingers at the receiving end, of a modulation signal generated by performing spread spectrum with a spread code whose spread code length is four chips at the transmitting end, by use of a spectrum spread scheme as the modulation/demodulation scheme).

In FIG. 29A, the delay amount $\tau$ is not more than the maximum delay, and the delay amount $\tau/2$ is not less than the delay resolution. For example, in a system in which the spectrum spread scheme is used for the modulation/demodulation scheme, the maximum delay corresponds to a value not more than the spread code length, and the delay resolution corresponds to a value not less than one-chip length of the spread code.

Figure 26B:
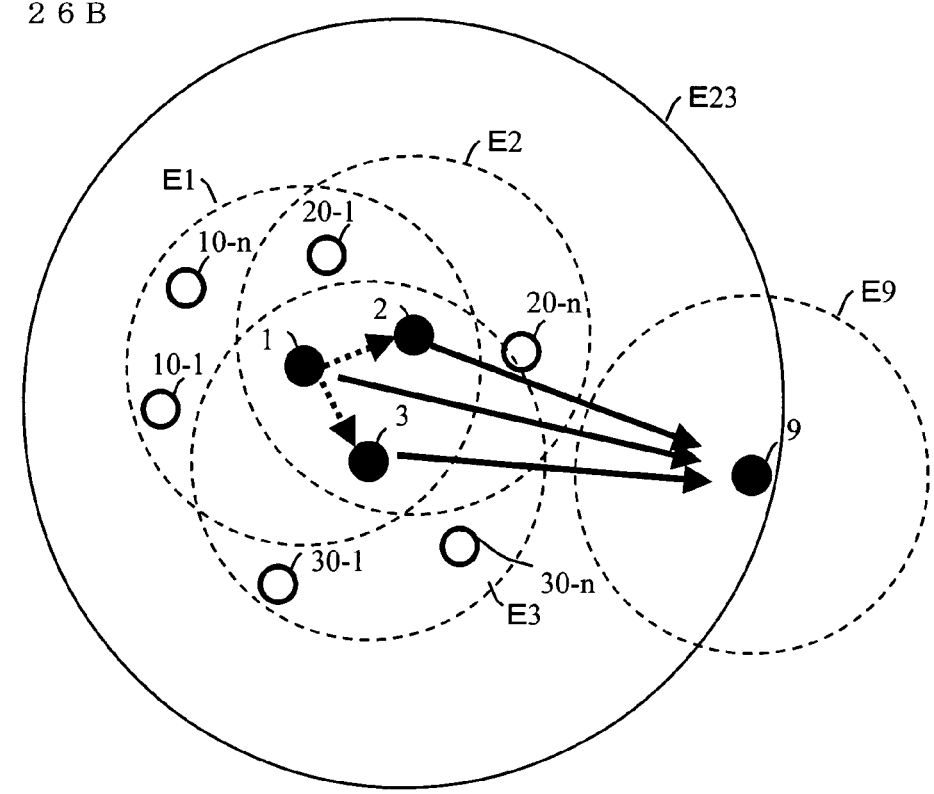
FIG. 26B is a diagram illustrating the multihop transmission method according to the second embodiment of the present invention.

FIG. 29B is a diagram illustrating a timing when the management stations 1 through 3 in the relative position shown in FIG. 26B perform the multi-station simultaneous transmission of the broadcast packet according to the delay amount record table shown in FIG. 29A.

As shown in FIG. 29B, the management stations 2 and 3 set a timing after a lapse of a predetermined time (T1) from a timing when the reception of the broadcast packet transmitted from the management station 1 is completed, as the reference timing (T0). The management station 2 transmits the broadcast packet using a timing delayed from the reference timing by the delay amount $\tau$, as the transmission start timing. Meanwhile, the management station 3 transmits the broadcast packet using a timing delayed from the reference timing by the delay amount $\tau/2$, as the transmission start timing.

The management station 1 serving as the source of the broadcast packet sets a timing after a lapse of the predetermined time from the timing when the broadcast packet is transmitted, as the reference timing (T0). The management station 1 transmits the broadcast packet by use of the reference timing as the transmission start timing. Since the management station 1, the management station 2, and the management station 3 are located so close to each other that the propagation time can be ignored as compared with the proper time difference $\tau/2$ which can provide the path diversity effect, the packets transmitted from the three management stations, any two of them are selected, arrive at the management station 9 with a value very close to the proper transmission time difference $\tau/2$, or $\tau$ which can provide the path diversity effect. Hence, the management station 9 can obtain the effect due to the path diversity to the maximum extent.

As described above, according to the present embodiment, since each management station decided as the management station capable of performing the multi-station simultaneous transmission also decides the delay amount given to the data of its own-station, and the source management station retransmits the broadcast packet, the multi-station simultaneous transmission can be performed by providing the proper time difference even when there is only one management station capable of performing the relay transmission, so that the effect due to the path diversity can be certainly obtained. Moreover, even when the number of management stations capable of performing the relay transmission is smaller than the maximum number of effective branches which contributes to the effect due to the path diversity, the great path diversity effect can be obtained compared with the wireless transmission system in accordance with the first embodiment.

Incidentally, it has been described in the present embodiment a case where the number of management stations capable of performing the communication with each other is three, but even when it becomes not less than four stations, suitable delay amounts during the multi-station simultaneous transmission can be certainly set to respective management stations by repeating the procedure of C-m1, C-m2, and C-m3 (m=1, 2, 3) shown in FIG. 27C as many times as the number of stations.

Third Embodiment

The wireless transmission system in accordance with a third embodiment is different from the second embodiment in that the delay amount given to the packet that the source management station capable of performing the multi-station simultaneous transmission relay-transmits during the relay transmission is decided to be a value properly shifted from the reference timing (T0) in advance. The configuration of the wireless transmission system and the management station, and the negotiation procedure of the channel information between the systems other than that are similar to those of the first embodiment and the second embodiment.

FIG. 30A is a diagram illustrating an example of the negotiation procedure in the third embodiment from the system configuration shown in FIG. 16A where one wireless system is generated to the system configuration shown in FIG. 16B. The management station in accordance with the present embodiment is different from that shown in FIG. 27B (the second embodiment) in that the delay amount notice packet is not transmitted in the zones of B-13 and B-23.

Each management station, when having other stations relay-transmit the broadcast packet, keeps in advance the delay amount given to the packet when its own-station (source management station) retransmits the packet. For example, Each management station, when its own-station becomes the source management station of the packet, uses a timing delayed from the reference timing (T0) by the proper delay amount ($\tau$), as the transmission start timing. Hence, as shown in FIG. 30A, the management station 1, when the number of neighboring management stations is one, does not generate the delay amount notice packet.

The management station 2 which does not receive the delay amount notice packet, upon relay-transmission of the broadcast packet, transmits the broadcast packet without giving the delay amount thereto. Namely the management station 2 uses the predetermined reference timing (T0) as the transmission start timing during the relay transmission. As a result, when the management station 2 relay-transmits the broadcast packet and the management station 1 retransmits the packet, there is an TDOA of τ between the packets arriving at the management station 9.

FIG. 30B is a diagram illustrating an example of the delay amount record table when the management stations 1 and 2 in the relative position shown in FIG. 16B decide the delay amount according to the procedure shown in FIG. 30A. When the management stations 1 and 2 retransmit the broadcast packets, the delay amount to be given to the packet is set in advance. As a result, when there is only one management station capable of performing the relay transmission of the broadcast packet, each management station can decide and keep the delay amount record table shown in FIG. 30B even when the delay amount notice packet is not transmitted.

Figure 30C:
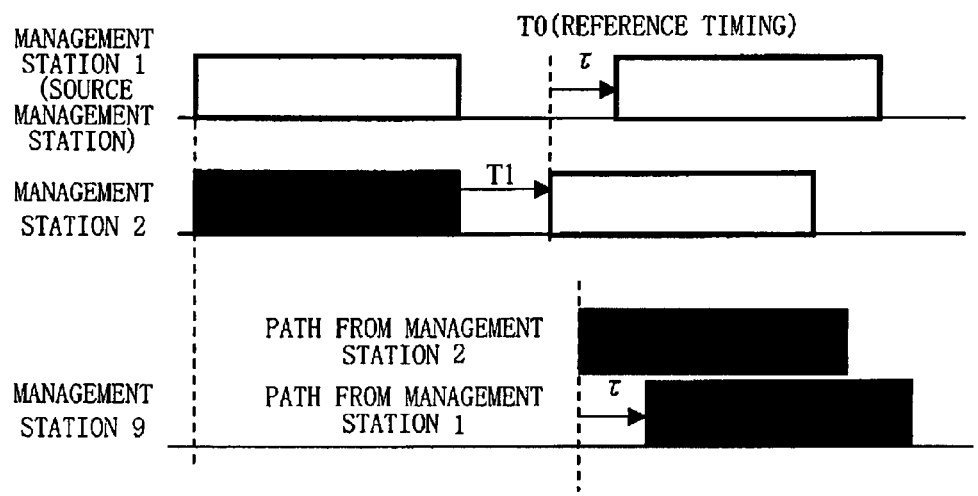
FIG. 30C is a diagram illustrating an example of a packet transmission timing during a multi-station simultaneous transmission of the management station according to the third embodiment of the present invention.

FIG. 30C is a diagram illustrating a transmission/reception timing of the packet when the management station 2 relay-transmits the broadcast packet that the management station 1 in the relative position shown in FIG. 16C has transmitted. As shown in FIG. 30C, the packets transmitted from two management stations arrive at the management station 9 with a value very close to the proper transmission time difference τ which can provide the path diversity effect. Hence, the management station 9 can provide the path diversity effect to the maximum extent to thereby receive the packet normally.

As described above, according to the present embodiment, when the management station capable of performing the relay transmission of the packet is two in number including the source management station, the source management station decides the delay amount given to the packet of its own-station as the value properly shifted from the reference timing, without transmitting the delay amount notice packet, and relay-transmits the packet to the reference timing with the source station, without giving the delay amount to another management station. As a result, since it is not necessary to prepare the zone for transmitting/receiving the delay amount notice packet, the maximum path diversity effect can be certainly provided while suppressing the deterioration in transmission efficiency as compared with the method of the second embodiment.

Figure 31A:
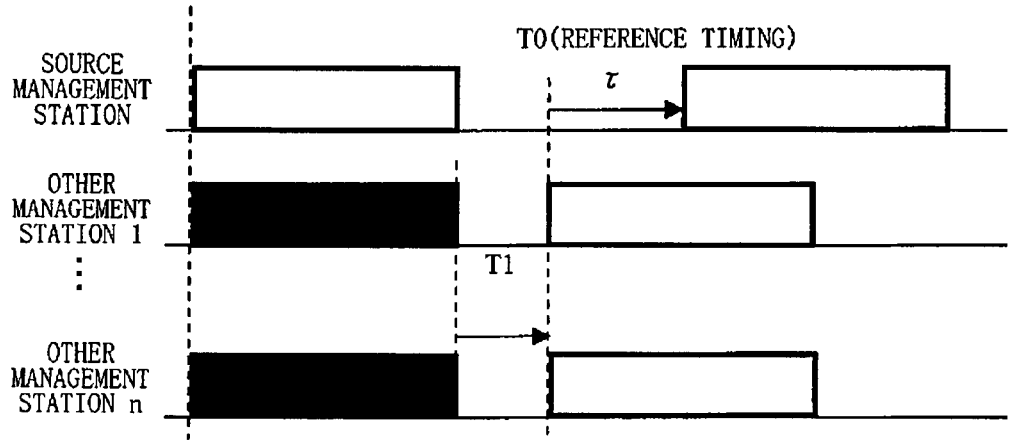
FIG. 31A is a diagram illustrating an example of a packet transmission timing during a multi-station simultaneous transmission of the management station according to the third embodiment of the present invention.

Incidentally, it has been described in the present embodiment a case where the number of management stations is two. Note herein that even when the number of management stations is not less than three, and the maximum number of branches from which the effect due to the path diversity is obtained is only two at the receiving station, the present embodiment is useful. FIG. 31A is a diagram illustrating a transmission/reception timing of the packet where, when the maximum number of branches from which the effect due to the path diversity is obtained is two at the receiving station, not less than three management stations perform the multi-station simultaneous transmission of the packet. FIG. 31B is a diagram illustrating an example of the table that the management station which transmits and receives the broadcast packet at the timing shown in FIG. 31A keeps. In FIG. 31B, the delay amount allocated to each management station used as the source management station is τ. Meanwhile, the delay amount allocated to the management station which relay-transmits the packet transmitted from other management stations is 0. In this case, as well, each management station can decide the delay amount that each management station gives to the packet to be optimal, without transmitting the delay amount notice packet to other management stations. As a result, since it is not necessary to prepare the zone for transmitting/receiving the delay amount notice packet, the maximum path diversity effect can be certainly provided while suppressing the deterioration in transmission efficiency as compared with the method of the second embodiment.

Incidentally, when the maximum number of effective branches which contributes to the effect due to the path diversity is not less than three, the management stations other than the source management station also need to properly shift the transmission start timing in order to obtain the effect due to the path diversity to the maximum extent. In this case, the delay amount notice packet may be transmitted in a procedure similar to that shown in FIG. 27C in the second embodiment, and the delay amount record table shown in FIG. 32A may be provided to each management station, for example. In the present embodiment, however, since the delay amount to be allocated to the source management station is defined as τ in advance, the delay amount notice packet does not need to include the data for indicating the delay amount of the source management station. Hence, a delay amount notice packet length can be slightly reduced as compared with the second embodiment. Consequently, the zone for transmitting the delay amount notice packet shown in C-13 or C-23 of FIG. 27C can be slightly reduced. Hence, even when the maximum number of effective branches which contributes to the effect due to the path diversity is not less than three, the effect due to the path diversity can be obtained to the maximum extent while suppressing the deterioration in transmission efficiency as compared with the second embodiment.

Fourth Embodiment

In the first embodiment, it has been only the source management station of the channel information packet that has received the response packet responsive to the channel information packet. Meanwhile, in a fourth embodiment, the management stations other than the source of the channel information packet also receive the response packet transmitted by other management stations. Since the configuration of the wireless transmission system and the block configuration of the management station other than that, and the negotiation procedure of the channel information between the systems are similar to those in the first embodiment, description thereof will be omitted.

Hereinafter, referring to FIGS. 16A through C, and FIGS. 33A through C, a procedure in which the management stations 1 through 3 in accordance with the present embodiment negotiate with each other to decide the delay amount that each management station gives to the packet during the multi-station simultaneous transmission will be described focusing on the difference from the first embodiment.

Figure 33A:
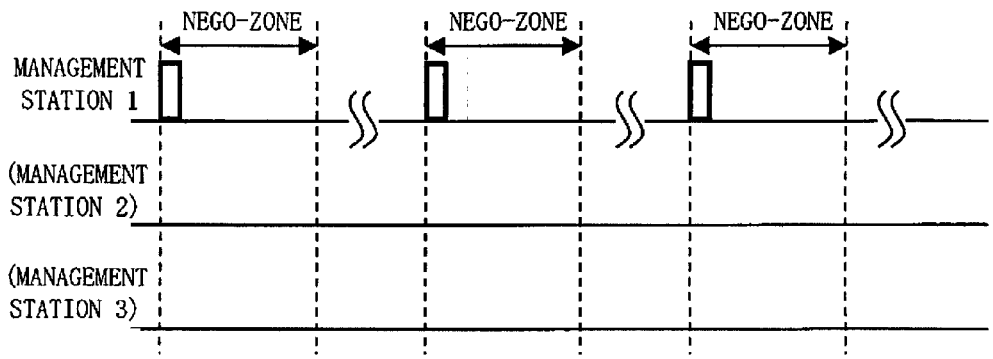
FIG. 33A is a diagram illustrating an operation of the management station and a delay amount decision procedure according to the fourth embodiment of the present invention.
Figure 33B:
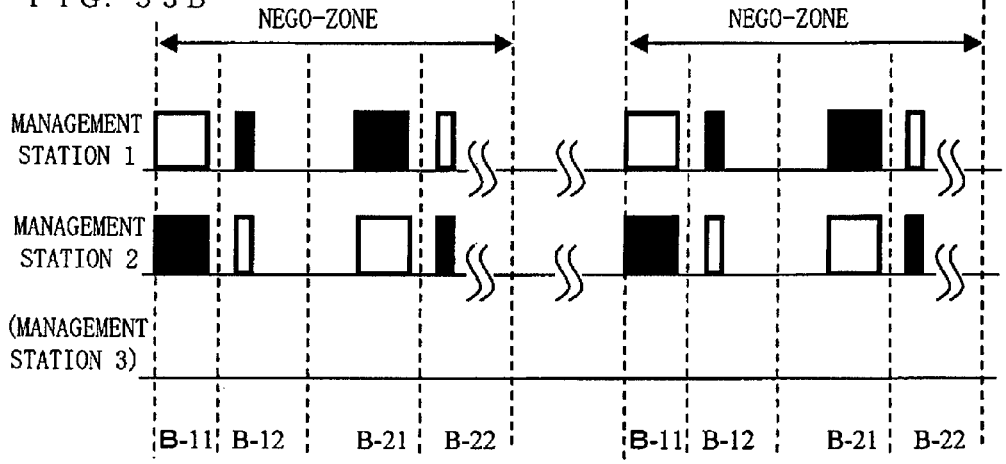
FIG. 33B is a diagram illustrating the operation of the management station and the delay amount decision procedure according to the fourth embodiment of the present invention.
Figure 33C:
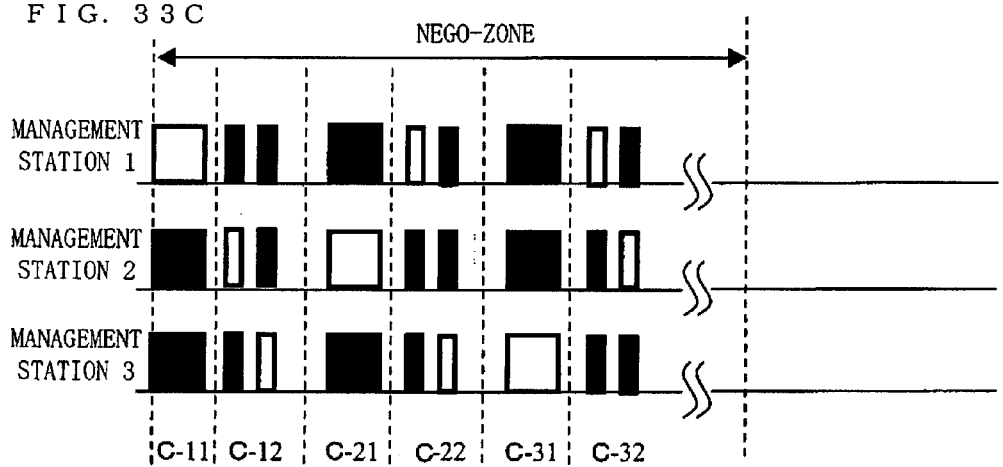
FIG. 33C is a diagram illustrating the operation of the management station and the delay amount decision procedure according to the fourth embodiment of the present invention.

FIGS. 33A through C are diagrams illustrating examples of the negotiation procedure after one wireless transmission system is generated until it becomes a system configuration shown in FIGS. 1A and B. FIGS. 33A through C correspond to FIGS. 16A through C, respectively, and show the transmission/reception timing of the packet in the management station. First, the operation of the management stations 1 through 3 having the system configuration shown in FIG. 16A or FIG. 16B is similar to that of the first embodiment.

Next, a case where the system configuration changes from the state of FIG. 16B to the state of FIG. 16C will be described. The management station 3 which newly constructs the system, upon receiving the channel information packet transmitted from the management station 1, generate the response packet, and transmits it at random timing (C-11 in FIG. 33C). Meanwhile, in this response zone, the management station 2 also generates the response packet and transmits it at random timing.

The management station 1 receives the response packet transmitted from the management stations 2 and 3. Further, in this response zone, the management station 2 receives the response packet transmitted by the management station 3, and the management station 3 receives the response packet transmitted by the management station 2. This is the different point from the first embodiment.

Thus, in the management station 2, the delay amount determining section 36 can recognize the management station 3 as the neighboring management station, without receiving the channel information packet from the management station 3. Similarly, the management station 3 also memorizes not only the management station 1 but also the management station 2 as the neighboring management station.

As is understood, the management station 2 or 3, by receiving the response packet transmitted by the other management station 3 or 2 responsive to the channel information packet transmitted by the management station 1, recognizes that the number of management stations capable of performing the relay transmission of the broadcast packet transmitted by the management station 1 is two including its own-station. Each management station then decides, when the management station 1 becomes the source management station, the delay amount to be allocated to each management station. Incidentally, each management station decides the delay amount to be allocated to each management station according to a delay amount decision rule defined in advance, so that the delay amount decided to the same management station may not be different values.

Next, the management stations 1 and 3 receive the channel information packet transmitted from the management station 2 (FIG. 33C: C-21). Subsequently, in a procedure similar to that in C-12 shown in FIG. 33C, each management station decides the delay amount upon relay-transmitting the transmission packet of the management station 2, and records it on the delay amount record table 37 (FIG. 33C: C-22 and C-23).

Thus, each management station decides the delay amount individually. As a result, since it is not necessary to prepare the area for transmitting the delay amount notice packet as the first embodiment (FIG. 15C: C-13), the deterioration in transmission efficiency can be suppressed.

Incidentally, in the present embodiment, it is assumed as the delay amount decision rule that, among predetermined candidates of the plurality of delay amounts to the reference timing defined in advance according to the number of management stations capable of performing the relay transmission obtained from the neighboring station information notified by the ending time of the response zone, and the maximum number of effective branches which contributes to the effect due to the path diversity, a smaller value is given to the management station in the order of previously transmitting the response packet.

For example, when the maximum number of effective branches which contributes to the effect due to the path diversity is four, it is assumed that as the delay amount that among two delay amounts of 0 and $\tau$ when the number of during the relay transmission multi-stations is two stations, three delay amounts of 0, $\tau/2$, and $\tau$ when the number of multi-stations is three stations, and four delay amounts of 0, $\tau/3$, $2\tau/3$, $\tau$ when the number of multi-stations is not less than four stations, a smaller value is given to the management station in the order of previously transmitting the response packet. According to this delay amount decision rule, when, as shown in FIG. 33C, the management station 2 and 3 sequentially return the response packets responsive to the channel information packet of the management station 1, the management station 1 and 3 sequentially return the response packets responsive to the channel information packet of the management station 2, and the management station 1 and 2 sequentially return the response packet responsive to the channel information packet of the management station 3, the delay amount record table shown in FIG. 17A will be kept in each management station in the same manner as that of the first embodiment. Incidentally, it is assumed here that the delay amount $\tau$ is not more than the maximum delay, and the delay amount $\tau/3$ is not less than the delay resolution. Incidentally, the delay amount decision rule is not limited to this, but for example, a larger value may be given to the management station in the order of previously transmitting the response packet, or a smaller value may be given to the management station in the order of the ID number of the management station that has transmitted the response packet.

Incidentally, it has been described in the present embodiment a case where the number of management stations capable of communicating with each other is three stations, but even when it becomes not less than four stations, suitable delay amounts during the multi-station simultaneous transmission can be certainly set to respective wireless stations by repeating the procedure of C-m1 and C-m2 (m=1, 2, 3) shown in FIG. 33C as many times as the number of stations.

Incidentally, it is assumed in the above first through fourth embodiments that the nego-zones are periodically provided on the common channel, but only when a management station is newly generated or the existing management station disappears, that management station transmits a negotiation request to the existing management station, so that it may be provided. Anyway, since the negotiation is certainly performed when the number of management stations changes, namely, when the number of multi-stations changes, the multipaths with the proper TDOA can be generated during the multi-station simultaneous transmission even when the number of multi-stations changes according to the present invention, and thus allowing the path diversity effect to be certainly provided.

Moreover, it has been described in the above first through fourth embodiments that one channel is defined in advance as the common channel, and the newly generated management station observes the common channel first, but the common channel may not be defined to one channel in advance. For example, the management station that exists first may exclusively define one of a plurality of communication channels as the common channel for negotiating with another management station generated later, or a communication channel used for the communication with a terminal of its own-station and the common channel may be shared. Incidentally, in that case, the management station first perform a channel search for recognizing which channel of the plurality of communication channels the common channel is along with a search for the neighboring management station.

Incidentally, it has been described in the first through fourth embodiments that the reference timing (T0) is the timing after a elapse of the predetermined time from the timing when the management station completes the reception of the broadcast packet. Here, the timing after a lapse of the predetermined time from the timing when the management station detects the unique word included in the packet may be set as the reference timing (T0). Moreover, by use of a beacon signal for synchronizing between the management stations, a timing after a lapse of the predetermined time from the timing when the reception of the beacon signal is completed may be set as the reference timing (T0). Alternatively, each management station may obtain the reference timing from a time entry obtained from a radio-controlled clock, or each management station may have a GPS (Global Positioning System) to obtain the reference timing from a time entry included in a GPS signal.

Incidentally, in the first through fourth embodiments, as shown in FIG. 17A, FIG. 29A, and FIG. 32A, the delay amounts of the delays amount allocated to all the management stations have been recorded on the delay amount record table 37 that each management station which performs the multi-station simultaneous transmission keeps. Here, each management station may record only the delay amount allocated to its own-station on the delay amount record table. FIG. 32B is a diagram illustrating an example of the delay amount record table when each management station records only the delay amount allocated to its own-station. For example, as shown in FIG. 32A, when the delay amount allocated to each management station is decided, the delay amount record table that each management station keeps will be one shown in FIG. 32B.

Thus, memory capacity required for storing the delay amount record table can be reduced. As a result, an increase in memory capacity required for storing the delay amount record table can be suppressed even when the number of stations capable of performing the multi-station simultaneous transmission is increased.

Incidentally, when there is any available room in the memory capacity of the management station, it is desirable to provide, as the delay amount record table, the same delay amount record table that records the delay amounts of all the management stations as shown in FIG. 17A, FIG. 29A, and FIG. 32A to each management station, as shown the example of the delay amount record table in the first through fourth embodiments. The reason is that even when the number of management stations which constitutes the wireless system is reduced as shown from FIG. 34A to FIG. 34B, if a timing change rule of the remaining management stations is defined in advance, the transmission timing of each management station can be appropriately decided without transmitting the delay amount notice packet described in the first through third embodiments, so that the maximum path diversity effect can be certainly provided while suppressing the deterioration in transmission efficiency without the need of the area for transmitting the delay amount notice packet. This will be described below.

Figure 34A:
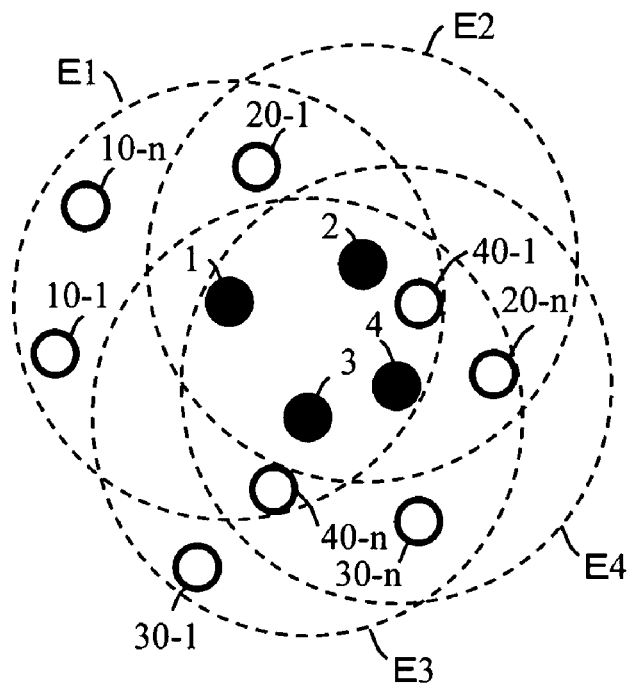
FIG. 34A is a diagram illustrating an example of a configuration change of the wireless transmission system according to the first through fourth embodiments of the present invention.
Figure 34B:
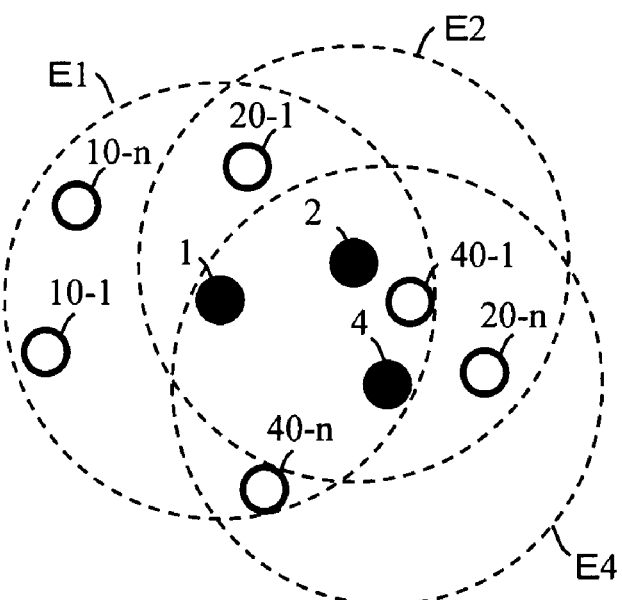
FIG. 34B is a diagram illustrating an example of the configuration change of the wireless transmission system according to the first through fourth embodiments of the present invention.

There will be described a case as an example where a system configuration shown in FIG. 34B is provided by decreasing one management station from the system configuration as shown in FIG. 34A in which four management stations exist. Incidentally, in the systems shown in FIGS. 34A and B, there will be described a case as an example where the maximum number of effective branches which contributes to the effect due to the path diversity is three. In addition, it is assumed that each management station keeps the delay amount record table shown in FIG. 35A during configuring the system shown in FIG. 34A.

The value τ in the delay amount record table is a value that does not exceed the upper-limit value which can provide the path diversity effect (for example, when the spectrum spread scheme is used for the modulation/demodulation scheme, it is a value less than the spread code length), the value τ/2 is a value that does not drop below the lower-limit which can provide the path diversity effect (for example, when the spectrum spread scheme is used for the modulation/demodulation scheme, it is a value exceeding one chip time of the spread code).

In this system, the timing change rule when the number of management stations is reduced will be defined in advance as follows, for example.

(1) A case where the number of remaining management stations in the system is not less than the maximum number of the effective branches which can contribute to the effect due to the path diversity (hereinafter, called the maximum number of effective branches)

When the management station to which the same delay amount is allocated as the management station which has disappeared from the system exists, the delay amount allocated to each management station is not changed. When the management station to which the same delay amount is allocated as the management station which has disappeared from the system does not exist, the management station to which the same delay amount is allocated among the remaining management stations in the system exists. Hence, the delay amount allocated to the management station with a larger management station ID among the management stations to which the same delay amount is allocated is changed to the delay amount allocated to the management station that has disappeared from the system.

(2) A case where the number of remaining management stations in the system is less than the maximum number of effective branches When the management station to which the same delay amount is allocated among the remaining management stations exists, the delay amount allocated to the management station with a larger management station ID among the management stations to which the same delay amount is allocated is changed to the delay amount allocated to the management station that has disappeared from the system. When the management station to which the same delay amount is allocated among the remaining management station does not exist, the delay amount allocated to each management station is not changed.

According to the above-mentioned rules (1) and (2), for example, even when the number of management stations is reduced from four to three as shown from FIG. 34A to FIG. 34B, each management station can independently change to the same delay amount record table (FIG. 35B when the management station 1 has disappeared and the number thereof is reduced, FIG. 35C when the management station 2 has disappeared and the number thereof is reduced, (FIG. 35D when the management station 3 has disappeared and the number thereof is reduced, and FIG. 35E when the management station 4 has disappeared and the number thereof is reduced).

Incidentally, when the number of management stations is more than the maximum number of effective branches, it is desirable, as shown in FIG. 35A, to make the number of candidate values of the delay amount to be a number equal to the maximum number of effective branches, or to be a number smaller than the maximum number of effective branches. This is based on a reason described below.

Although the maximum number of effective branches is equal to or less than a value given by dividing the maximum delay by the delay resolution, this becomes a very small value when the maximum delay is close to the delay resolution. In such a case, if the number of multi-stations is increased blindly, following problems may occur.

For example, in a case where the maximum number of effective branches is 2, when a third delayed wave further arrives during an arrival time between two delayed waves having the arrival delays separated from each other by the delay resolution the third delayed wave is superimposed on both of the two waves, and remains in common even after path decomposition in a receiver, so that a correlation between the branches in the path diversity is increased, and thus causing deterioration. Hence, the maximum delay becomes close to the delay resolution, and when the maximum number of effective branches which contributes to the effect due to the path diversity is limited to a small number, a case where deterioration in characteristics is further caused may occur by blindly increasing the number of stations which perform the multi-station transmission.

When the case where the maximum delay becomes close to the delay resolution and the maximum number of effective branches is limited to a small number is further described for respective modulation/demodulation schemes noted in the description of the background art, it would be as follows.

When the DSSS scheme is used, since the maximum delay corresponds to the spread code length, the spread code length becomes short, and when it approaches to a spread chip length corresponding to the delay resolution, the maximum number of effective branches is reduced. For example, when the spread code length is a four-chip length, and a spreading ratio is four times, namely, one symbol is spread with the spread code with four chips, since the delay resolution is not less than one-chip length, and the maximum delay is less than four-chip length, the maximum number of effective branches will be at most about four. When the FHSS system is used, the delay resolution corresponds to a spread bandwidth, and the maximum delay corresponds to a hop sequence length. Hence, when the spread bandwidth is narrow and the hop sequence length is short, the maximum number of effective branches is limited to a small number.

Moreover, when the THSS system is used, the delay resolution corresponds to a pulse width, and the maximum delay corresponds to a pulse sequence length. Hence, when the pulse width is wide and the pulse sequence length is short, the maximum number of effective branches is limited to a small number. Similarly, in the OFDM scheme, the delay resolution corresponds to the frequency bandwidth in which the subcarriers are distributed, and the maximum delay is defined by the guard interval length. Hence, when the frequency bandwidth is narrow and the guard interval is short, the maximum number of effective branches is limited to a small number. When the PSK-VP scheme or the PSK-RZ scheme is used, since the maximum delay cannot exceed the symbol length theoretically, the delay resolution and the maximum delay are close to each other, originally. Hence, the maximum number of effective branches is limited to a small number.

Further, when the equalizer is used, the delay resolution is decided by the symbol length and the maximum delay is decided by a tap length of an equalization filter. As a result, when a time length of the filter tap is short compared with the symbol length, it results in a similar case. Incidentally, in the equalizer, since the number of taps may influence a circuit scale greatly, the maximum delay is restricted due to constraints on the circuit scale in many cases.

Figure 36:
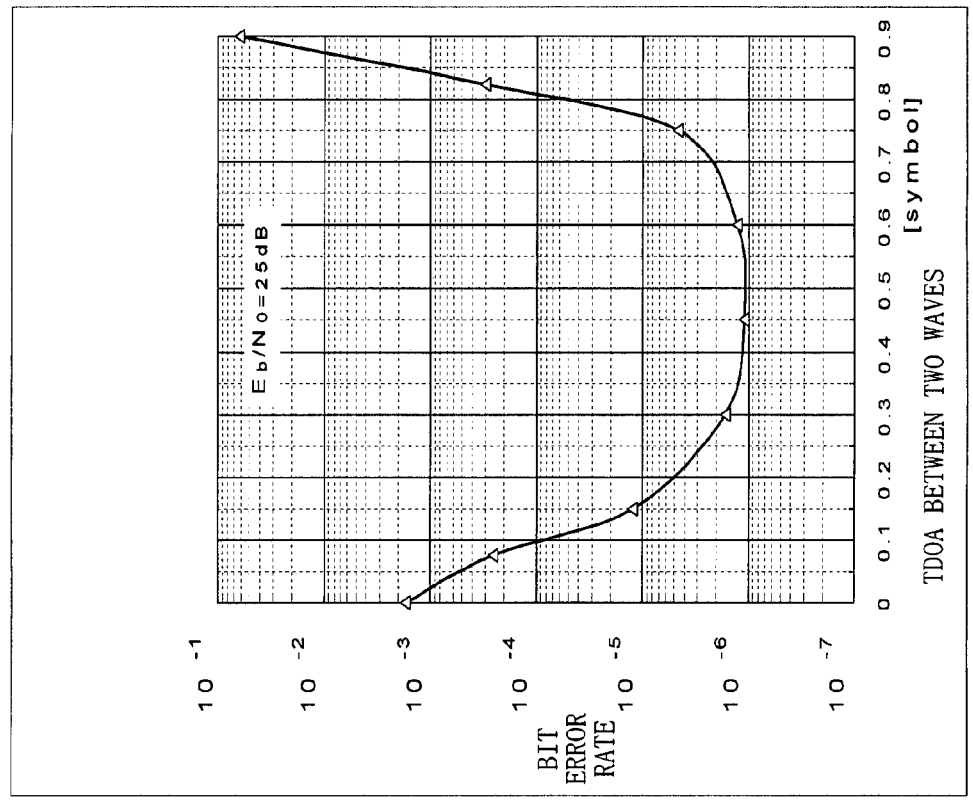
FIG. 36 is a diagram illustrating a bit error rate characteristic to an TDOA of two waves when a QPSK-VP scheme is used.

An aforementioned example where deterioration in characteristic is caused when the maximum number of effective branches is limited to a small number will be concretely described based on a characteristic evaluation result of the PSK-VP scheme. FIG. 36 is a diagram illustrating a bit error rate characteristic to the TDOA of two waves in a QPSK-VP scheme when a BT product (product of spectrum bandwidth and symbol time) is set to 1.5. A horizontal axis indicates a value given by normalizing the TDOA by a symbol length T, and a vertical axis indicates a bit error rate. Note herein, the transmission path is two-wave Rice fading environment of Eb/No=25 dB. it turns out from FIG. 36 that the effect due to the path diversity is provided in a range where the delay amount is 0.2 symbol-length to 0.7 symbol-length, and a drastic characteristic improvement is obtained compared with a case where the TDOA is 0 (corresponds to "during the single station transmission") shown in FIG. 36. Namely, in this case, the delay resolution is about 0.2 symbol-length, and the maximum delay is about 0.7 symbol-length. Hence, in this case, the maximum number of effective branches is reduced to a very small number of about two and three.

Figure 37:
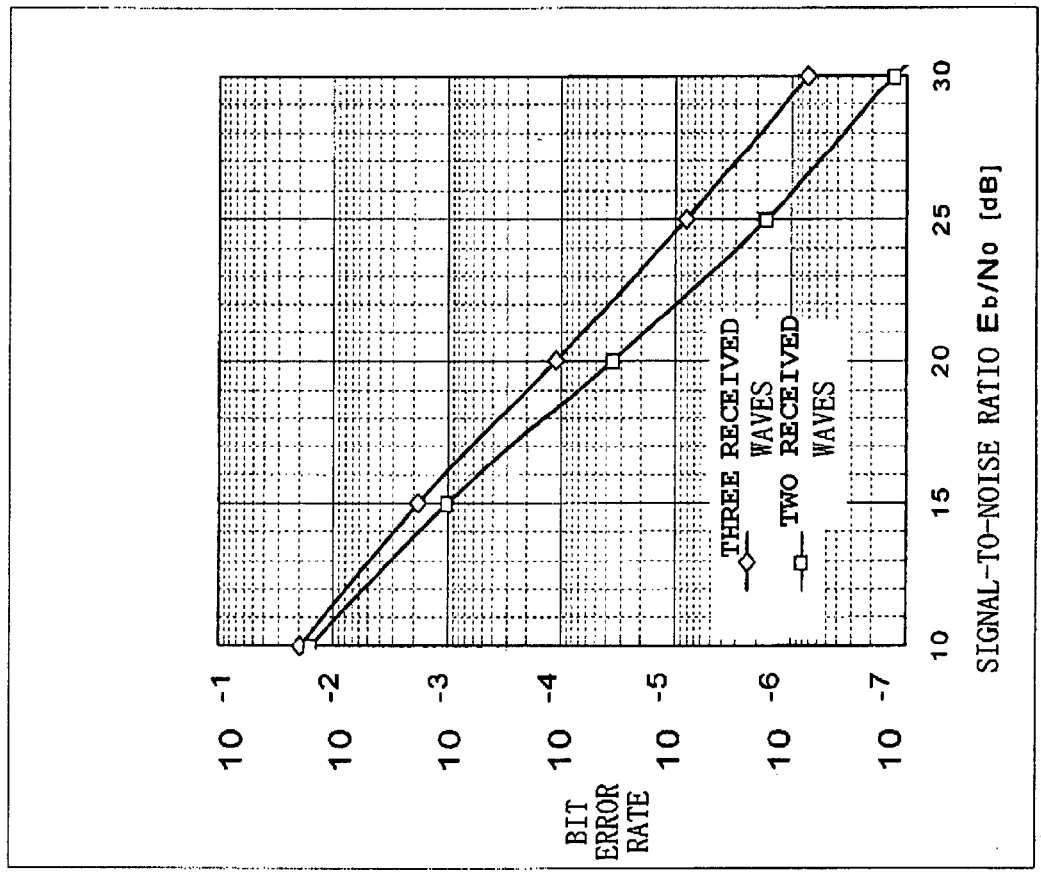
FIG. 37 is a diagram illustrating the bit error rate characteristic for two received waves and three received waves in the QPSK-VP scheme.
Figures 38, 39A:
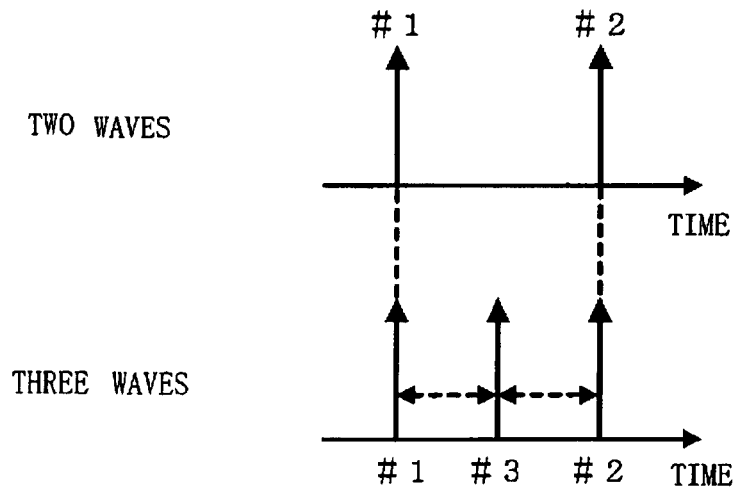
FIG. 38 is a diagram illustrating the temporal relationship between two wave and three waves in FIG. 37.
FIG. 39A is a diagram illustrating an example of the method of changing the delay amount record table when the number of management stations is reduced according to the first through fourth embodiments of the present invention.

FIG. 37 is a diagram illustrating the bit error rate characteristic in cases of two received waves and three received waves in the above-mentioned QPSK-VP scheme, while FIG. 38 illustrates a time relation between two received waves and three received waves in FIG. 37. Incidentally, each received wave is a Rice fading wave, and three received waves is a transmission path model where a third wave is further inserted in a intermediate time position in a case of two received waves. It turns out as shown in FIG. 37 that the bit error rate when the third wave is inserted between two waves is deteriorated compared with the case where the received wave is two waves. As is understood, it is confirmed that, in the case where the maximum number of effective branches is limited to a small number (two in this example), when a plurality of incoming waves exceeding the maximum number of effective branches arrive at the receiver at different timings, a component of a certain incoming wave (the third wave located between two waves in this example), and a component of two waves on the time-axis of both sides thereof cannot be separated completely, so that the component of the third wave remains in common in two waves on both sides to thereby increase a correlation between two waves on both sides, and thus the effect due to the path diversity cannot be fully provided, causing the deterioration in characteristic.

As a result, when the delay resolution and the maximum delay which can separate the delayed wave components approach significantly, and the maximum number of effective branches which contributes to the path diversity effect is limited to a small number, if the multi-station transmission is carelessly performed from the management stations whose number exceeds the maximum number of effective branches, the deterioration of the transmission characteristics can be further caused.

As a result, by making the number of candidate values of the delay amount to be a number equal to or less than the maximum number of effective branches, the incoming waves can be intensively received at timings the number of which corresponds to the maximum number of effective branches. Thus, even when the maximum number of effective branches has a limit, the effect due to the path diversity can be certainly obtained.

Meanwhile, if the number of management stations is more than the maximum number of effective branches, even when the multi-station simultaneous transmission can be performed, a management station which is not allowed to perform the multi-station simultaneous transmission may be provided. FIG. 39A is a diagram illustrating an example of the delay amount record table that each management station keeps, when the maximum number of branches in the receiving station is three. In this case, as shown in FIG. 39A, when the management stations 1 through 3 serves as the source management station of the packet, the management station 4 does not perform the multi-station simultaneous transmission of the broadcast packet. Meanwhile, when the management station 4 serves as the source management station of the packet, the management station 3 does not perform the multi-station simultaneous transmission of the broadcast packet. As is understood, even when the multi-station simultaneous transmission can be performed, the management station which is not allowed to perform the multi-station simultaneous transmission (management station represented by the delay amount of "-" in FIG. 39A) may be provided.

Note herein, in order to provide the management station which is not allowed to perform the multi-station simultaneous transmission even when the multi-station simultaneous transmission can be performed, what is necessary is to generate the delay amount notice packet not including the delay amount to transmit it to some management stations, when a certain management station transmits the delay amount notice packet, for example. Subsequently, the management station which has received the delay amount notice packet not including the delay amount for its own-station, upon receiving the broadcast packet from the source management station of this delay amount notice packet, may not relay-transmit the broadcast packet. As is understood, by limiting the number of the management station for performing the multi-station simultaneous transmission, the effect due to the path diversity can be certainly obtained without increasing the load on the management station.

Moreover, as described above, in the system which restricts the number of multi-stations increasing blindly, and has the multi-station the number of which is equal to the maximum number of branches transmit when the number of management stations is more than the maximum number of effective branches, for example, the timing change rule when the number of management stations is reduced will be defined in advance as follows, for example.

(3) A case where the number of remaining management stations in the system is not less than the maximum number of effective branches A management station with the largest management station ID among the management stations which has not participated in the multi-station simultaneous transmission till then while having a capability of the multi-station simultaneous transmission among the remaining management stations in the system changes its timing to the same timing as that of a management station with the largest management station ID among the reduced management stations.

According to the above-mentioned rule (3), when each of the management stations with the system configuration shown in FIG. 34A keeps the delay amount record table shown in FIG. 39A, for example, even when the number of management stations is reduced from four to three as shown in FIG. 34B, each management station can independently change the delay amount record table that its own-station keeps.

FIG. 39B is a diagram illustrating an example of the delay amount record table when the management station 1 disappears. In this case, zero is allocated to the management station 4 as the delay amount during the multi-station simultaneous transmission. FIG. 39C is a diagram illustrating an example of the delay amount record table when the management station 2 disappears. In this case, the delay amount allocated to the management station 2 is allocated to the management station 4 as the delay amount during the multi-station simultaneous transmission. The FIG. 39D is a diagram illustrating an example of the delay amount record table when the management station 3 disappears. In this case, the delay amount allocated to the management station 3 is allocated to the management station 4 as the delay amount during the multi-station simultaneous transmission. FIG. 39 E is a diagram illustrating an example of the delay amount record table when the management station 4 disappears. In this case, the delay amounts allocated to the management stations 1 through 3 as the delay amount during the multi-station simultaneous transmission are not changed.

As is understood, each management station keeps the delay amount record table which stores the delay amounts of all the management stations capable of performing the multi-station simultaneous transmission, and decides in advance a transmission timing modification procedure when a situation of the multi-station, such as the number of multi-stations changes. Thus, compared with a transmission timing setting procedure at the time of an early negotiation, the transmission timing of the management station capable of performing the multi-station simultaneous transmission in a simple procedure can be reset even when the situation of the multi-station changes. Hence, the maximum path diversity effect can be certainly provided while suppressing the deterioration in transmission efficiency.

Moreover, in the present embodiment, the delay amount during the multi-station simultaneous transmission has been decided by repeating the transmission of the channel information packet as many times as the number of management stations existing in the wireless transmission system. Here, the delay amount may be decided based on the numbers of the channel information packet transmitted first and the response packets transmitted responsive to this channel information packet.

FIG. 40 is a sequence diagram illustrating operation of the management stations 1 through 3 when each management station decides the delay amount to be given to the packet during the multi-station simultaneous transmission based on one-time transmission of the channel information packet. The management stations 2 and 3, upon receiving the channel information packet transmitted by the management station 1, will generate and transmit the response packets. The management station 1 receives the response packets transmitted by the management stations 2 and 3. Further, the management station 2 receives the response packet transmitted by the management station 3, while the management station 3 receives the response packet transmitted by the management station 2. The management stations 1 through 3 determine that the total number of the received channel information packets and response packets is the number of management stations capable of performing the multi-station simultaneous transmission upon relay transmission of the broadcast packet. Subsequently, the management stations 1 through 3, when their own-stations perform the multi-station simultaneous transmission, decide the delay amounts to be given to the packets according to the above-mentioned predetermined rule. As is understood, if each management station decides the delay amount by one-time transmission of the channel information packet, the procedure for deciding the delay amount can be made simpler.

Example

Lastly, there will be described an example of the wireless transmission system which can certainly provide the path diversity effect by use of the above-mentioned wireless transmission method of either of the first through fourth embodiments. There will be described, as one example, a case where the communication is performed in a short distance within premises or the like by use of the QPSK-VP scheme for the modulation/demodulation scheme in the management station on condition that a transmission rate between wireless zones is 2 Mbps.

It is known that when an electric wave is transmitted from one station within premises, a multipath occurs because the electric wave is reflected to a wall, a ceiling, or the like in a room, and when a transmitting station is located beyond the horizon (for example, next room or the like), a received power distribution in a neighborhood where distances between transmission and reception are almost the same generally shows a Rayleigh distribution. Additionally, in premise transmission, since the room is generally as small as several square meters in size, it is also known that variation in time difference (hereinafter, called delay spread) when the multipaths generated during the transmission from one station arrive at the receiving station will be about several nanoseconds to ten nanoseconds.

Figure 41A:
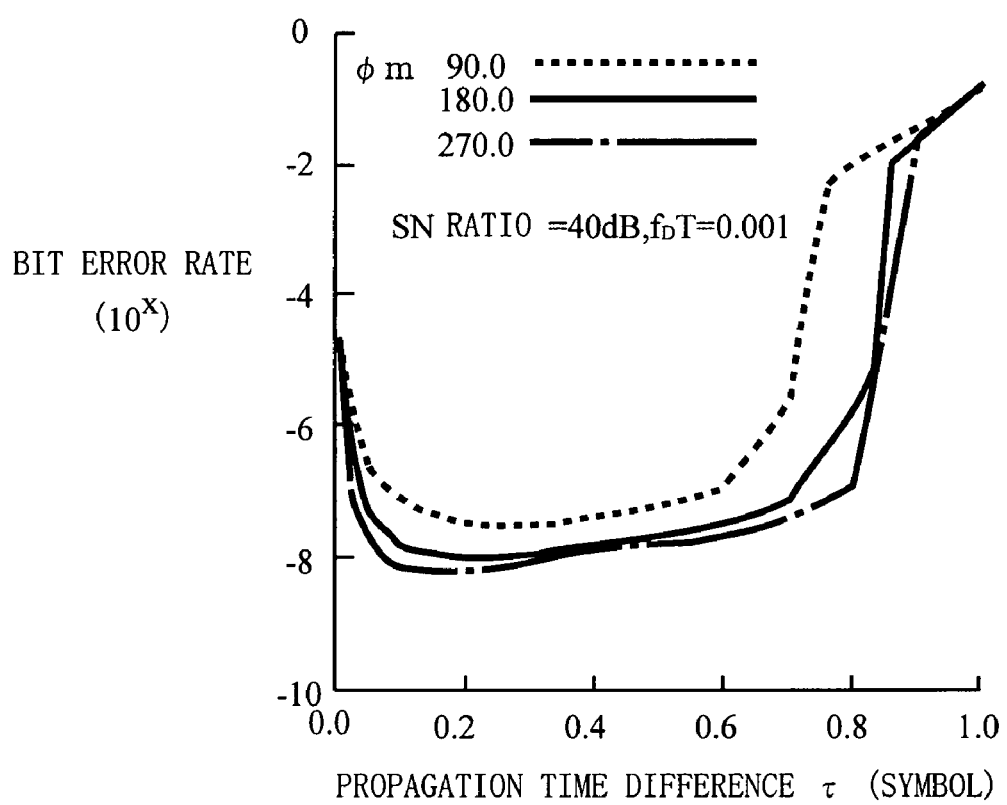
FIG. 41A is a diagram illustrating an example of an anti-multipath characteristic in the PSK-VP scheme.

FIG. 41A is a diagram illustrating a simulation result of evaluating a relation between a time difference τ between two waves and a bit error rate (BER) under a two-wave Rayleigh fading environment (delay spread for every wave is 0) of the PSK-VP scheme (FIG. 9 of Non-patent Document 1). A horizontal axis indicates the TDOA between two waves normalized by the symbol time, and a vertical axis indicates the bit error rate. Symbol φm indicates the maximum phase shift amount of a redundancy phase to be added within the symbol.

It turned out from FIG. 41A that the bit error rate characteristic can be greatly improved by selecting a suitable value as φm when the TDOA is between 0.1 through 0.8 symbols, as compared with a case where propagation time difference=0.

Figure 41B:
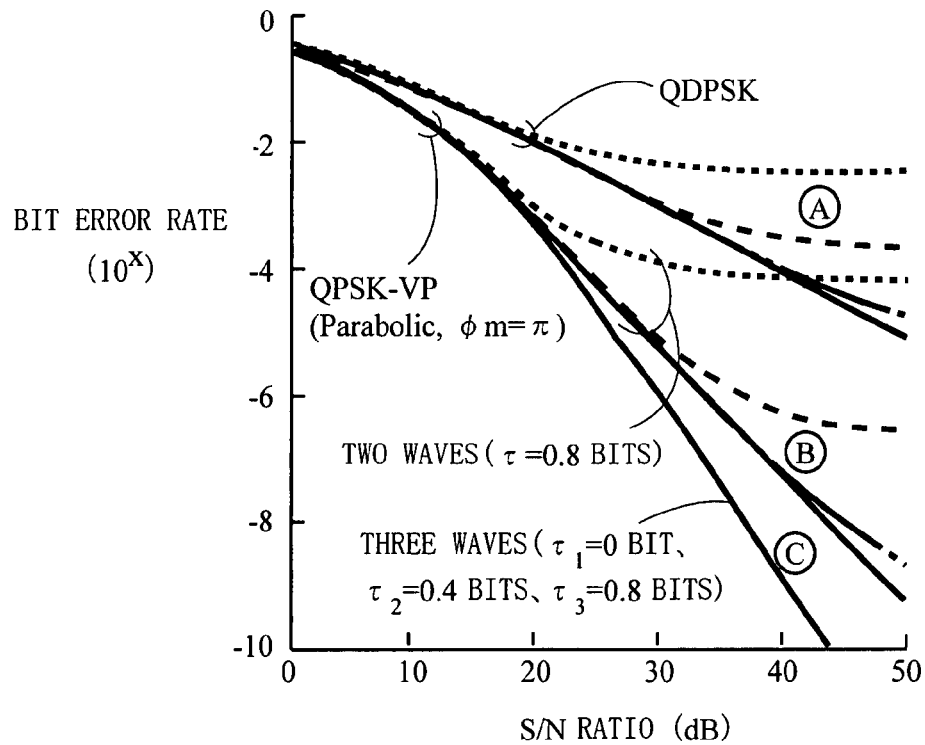
FIG. 41B is a diagram illustrating an example of the anti-multipath characteristic of the PSK-VP scheme.

FIG. 41B a diagram illustrating a simulation result of indicating a relation between a received signal strength and BER of the QPSK-VP scheme when only one wave arrives (A), when two waves arrive with the proper time difference (B), and when three waves arrive with the proper time difference (C), at the receiving station on condition that the delay spread for every wave is 0 and the waves are independently subjected to Rayleigh fading (FIG. 12 of Non-patent Document 1). Although the BER characteristic in the multipath environment of the PSK-VP scheme changes according to a waveform shaping method and a band limit condition, when, for example, a waveform shaping method and a band limit condition (Parabolic, φm=π, Gauss, BT=1.3) shown in Non-patent Document 1 are used, it turned out, as shown in FIG. 41B, that the effect due to the path diversity is obtained and the BER characteristic is greatly improved by performing the multi-station simultaneous transmission compared with a case where one wave, namely, one station transmits the packet.

In addition, according to the simulation results shown in FIGS. 41A and B, it turns out that the value of τ in FIG. 17A, FIG. 29A, and FIG. 32A may be set as, for example, τ=about 0.5 symbols when the number of multi-stations is two stations, and τ=about 0.4 symbols when the number of multi-stations is not less than three stations.

The delay spread value (about several nanoseconds to ten nanoseconds) for every station under the above-mentioned in-premise transmission environment is very small compared with the symbol time length (1 microsecond) to the transmission rate (2 Mbps) of this example. Hence, when the wireless communication is performed in the short distances between the rooms by use of, for example, the QPSK-VP scheme with the above-mentioned conditions, it is considered that almost the same BER characteristic as the simulation result shown in FIGS. 41A and B can be obtained.

Figure 42A:
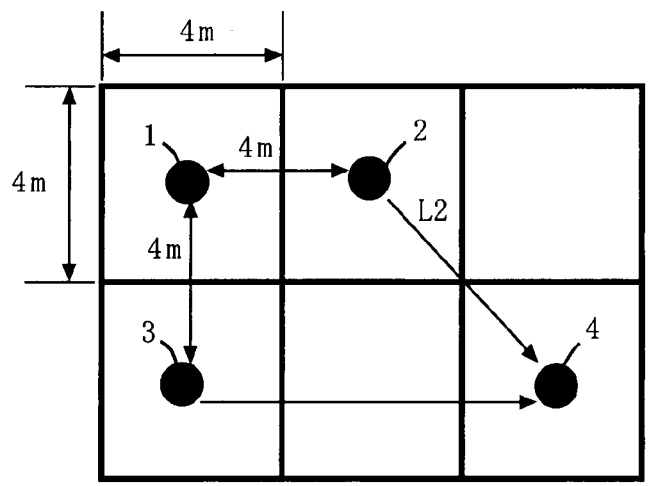
FIG. 42A is a diagram illustrating a concrete application example of the present invention.

FIG. 42A is a diagram illustrating the relative position between the management stations 1 through 3 when the management stations are arranged within the premises. As shown in FIG. 42A, it is assumed that there are six rooms with 4 m square within the premises, and the management stations 1 through 4 are arranged near the center of the rooms, respectively. At this time, the propagation time difference to a difference between propagation distances (at most 4 m) from the management stations 1 through 3 to the management station 4 is at most about ten nanoseconds. This propagation time difference is very small compared with the symbol time length (one microsecond). Hence, when the delay amount of the management station which performs the multi-station simultaneous transmission during the relay transmission is decided according to the above-mentioned procedure, by setting the time difference τ between the transmission timings of two management stations (for example, the management stations 2 and 3 when the source station is the management station 1) between 0.2 symbols (200 nanoseconds) and 0.8 symbols (800 nanoseconds) the path diversity effect corresponding to two branches can be provided. Moreover, when the number of management stations which perform the multi-station simultaneous transmission is three during the relay transmission, if the multi-station simultaneous transmission is performed while keeping the delay amount record table as shown in FIG. 32A in the management station by setting the delay amount τ as, for example, about 0.5 symbols, the path diversity effect corresponding to three branches can be provided.

For example, supposing that required quality of the communication area is BER=$10^{-5}$, it turns out from the result of FIG. 41B that, as compared with during the single station transmission (A), a path diversity gain of about 20 dB during the multi-station simultaneous transmission of two stations (B), and about 23 dB during the multi-station simultaneous transmission of three stations (C) is obtained. When an expansion effect of the communication area due to this gain is calculated while considering a propagation loss as a free space loss for simplification of the description, area expansion of about 10 times during the multi-station simultaneous transmission of two stations, and about 14 times during the multi-station simultaneous transmission of three stations can be expected as compared with during the single station transmission. Actually, since a transmission loss due to the wall or the like is added as the propagation loss, such expansion may not be expected, but by providing the suitable time difference τ using the method of this example to thereby perform the multi-station simultaneous transmission during the relay transmission, area expansion of several times can be still expected as compared with during the single station transmission.

Figure 42B:
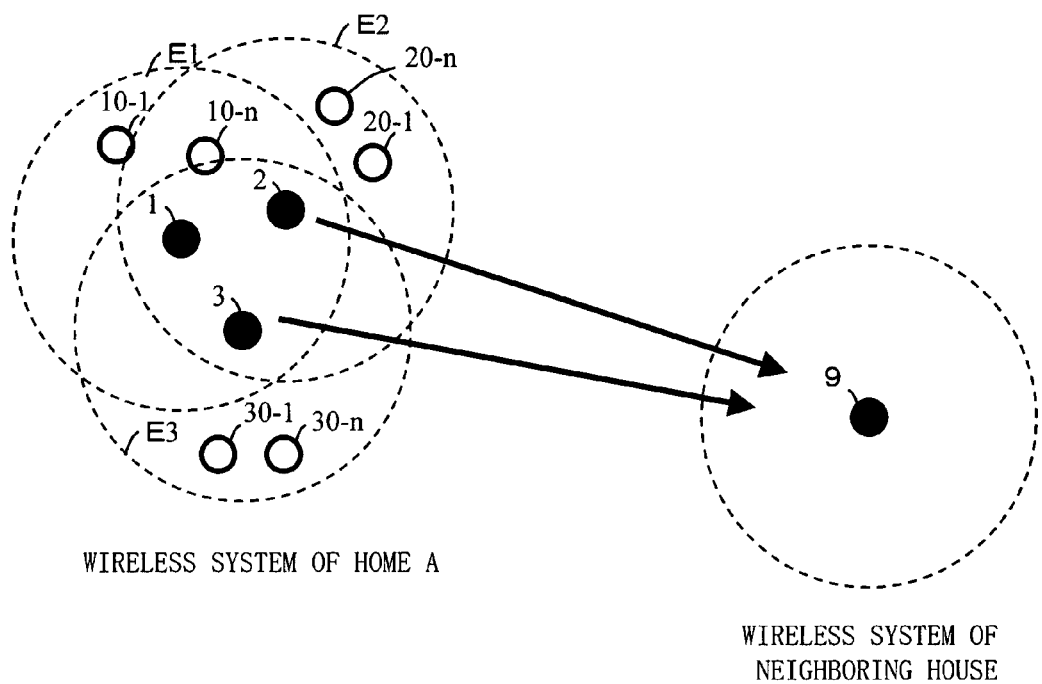
FIG. 42B is a diagram illustrating a concrete application example of the present invention.

Hence, when a transmission power of the management station is decided assuming that the communication area during the single station transmission has a radius of about 10 m, if the house has such a size as shown in FIG. 42A, the broadcast packet can be transmitted throughout the premises by performing the multi-station simultaneous transmission during the relay transmission. Meanwhile, when the houses are comparatively close to each other, since it is possible to make the broadcast packet including the channel information used in the wireless system of a house of A arrive at a neighboring house as shown in FIG. 42B the channel interference between the wireless systems respectively constituted by the neighboring houses can be avoided.

Incidentally, it has been described, in the first through fourth embodiments described above, that the PSK-VP scheme is used as the modulation/demodulation scheme. Here, since the modulation/demodulation scheme may be the modulation/demodulation scheme having the anti-multipath characteristic, it is not limited to the PSK-VP scheme. For example, the spectrum spread schemes, such as the PSK-RZ scheme and the DSSS scheme, the OFDM scheme, or the DSK (Double Shift Keying) system in which the anti-multipath characteristic is provided by carrying information towards the phase change added within the transmission symbol (the maximum delay is less than 0.5 bit) may be used therefore, and the equalizer may be used for the demodulation section. The DSK system is described in detail in Non-patent Document 3.

Non-patent Document 3

S. Ariyavisitakul, S. Yoshida, F. Ikegami, T. Takeuchi, "A Novel Anti-Multipath Modulation Technique DSK)", IEEE Trans. Communication, Vol. COM-35, No. 12, 1987 December, p 1252-1264

The transmission timing of each management station during the multi-station simultaneous transmission is decided using respective management stations negotiating with each other before the multi-station simultaneous transmission is performed so that the difference between the transmission timings of respective management stations may be not less than the delay resolution and not more than the maximum delay for each modulation/demodulation scheme, and thus the multipaths with the proper TDOA can be generated during the multi-station simultaneous transmission even when the number of multi-stations changes, and thus allowing the path diversity effect to be certainly provided.

Moreover, it has been described in the first through fourth embodiments that each management station transmits the packet. Incidentally, the information that each management station transmits is not limited to the packet, but the present invention is applicable also in a case where, for example, the management stations transmit the same information with each other over a long period of time.

Incidentally, as described in the paragraph of the background art, the delay resolution and the maximum delay of each modulation/demodulation scheme are the time lengths respectively decided by several times less than the symbol length and not more than one symbol in the case of the PSK-RZ scheme, several times less than the symbol length and not more than 0.5 symbols in the case of the DSK system, one chip time and spread code length in the case of the DSSS scheme, inverse number of the frequency bandwidth and guard interval length in the case of the OFDM scheme, and symbol time and the number of taps in the case of using the equalizer.

Fifth Embodiment

Figure 43A:
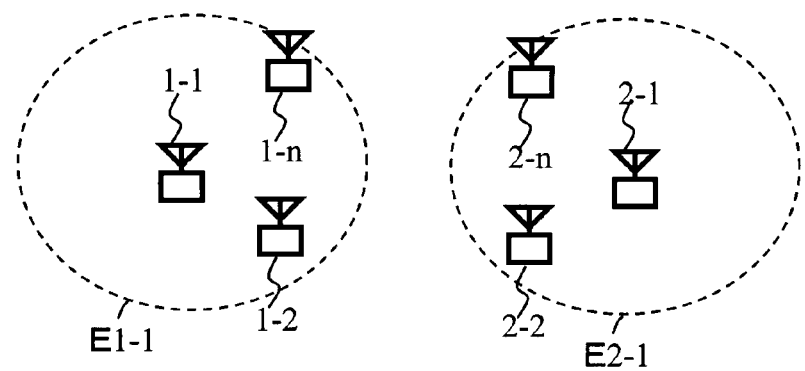
FIG. 43A is a diagram illustrating an example of a configuration of a wireless transmission system according to fifth through eighth embodiments according to the present invention.
Figure 43B:
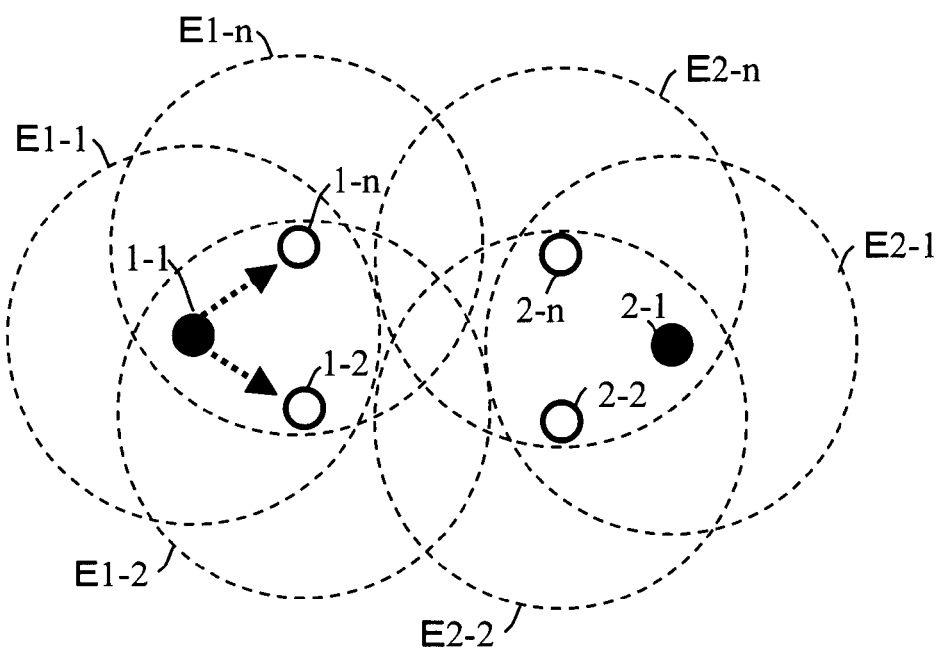
FIG. 43B is a diagram illustrating an example of the configuration of the wireless transmission system according to the fifth through eighth embodiments according to the present invention.

FIG. 43A is a diagram illustrating an example of a configuration of a wireless transmission system according a fifth embodiment according to the present invention. In FIG. 43A, the wireless transmission system is provided with wireless stations 1-1 through 1-n and 2-1 through 2-n. FIG. 43B is a diagram illustrating a range (communication area) where the electric wave can be properly received at a predetermined error rate when each of the wireless stations shown in FIG. 43A independently transmits the electric wave (hereinafter, called the single station transmission), and a relative position of respective wireless stations. The wireless stations 1-m, 2-m (m is a natural number not less than 1 and not more than n) have the communication areas E1-m, E2-m where the single station transmission can be performed, respectively.

Respective wireless stations are connected with each other through the wireless stations which exist within the communication areas of their own-stations by wireless, respectively. Respective wireless stations constitute a ad-hock network during communication with other wireless stations. When being able to directly communicate with a specific wireless station, respective wireless stations directly communicate with it without through other wireless stations.

Figure 44A:
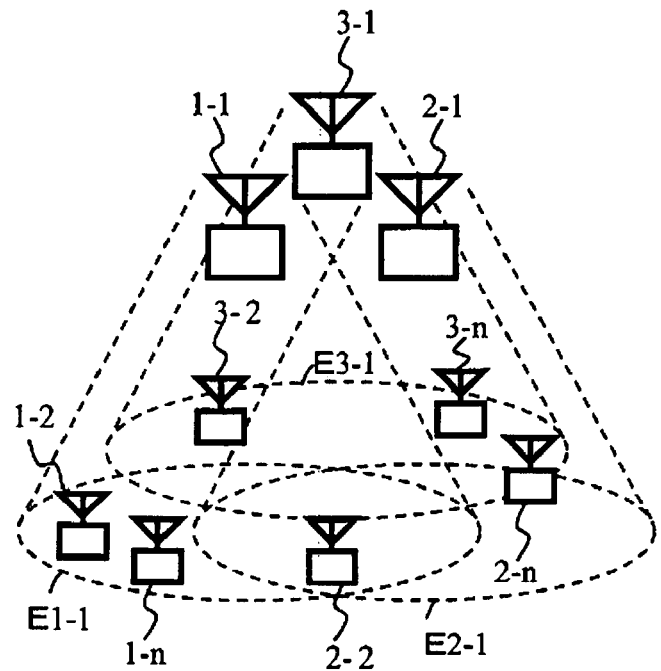
FIG. 44A is a diagram illustrating an example of the configuration of the wireless transmission system according to fifth through eighth embodiments according to the present invention.
Figure 44B:
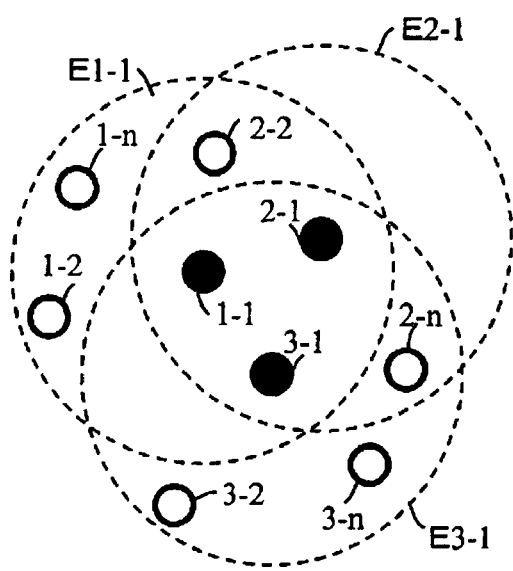
FIG. 44B is a diagram illustrating an example of the configuration of the wireless transmission system according to the fifth through eighth embodiments according to the present invention.

Incidentally, the wireless station may determine a communication channel used in the communication area of its own-station, and operate, to the wireless station which exists within its own-station communication area, as the management station for informing information on the communication channel used in the communication area of its own-station. FIG. 44A is a diagram illustrating a configuration of the wireless transmission system when the wireless stations 1-1 and 2-1 shown in FIG. 43A operate as the management stations. The wireless station 1-1 informs the channel information used in a communication area E1-1 to the wireless stations 1-2 and 1-n which exists within its own-station communication area E1-1. Thus, the wireless stations 1-1 through 1-n which exist within the communication area E1-1 constitute one group which performs communication using the same communication channel. Meanwhile, the wireless station 2-1 operates as the management station within a communication area E2-1 like the wireless station 1-1, so that the wireless stations 2-1 through 2-n which exist within the communication area E2-1 also constitute one group. The wireless station 3-1 operates as the management station within a communication area E3-1 like the wireless station 1-1, so that the wireless stations 3-1 through 3-n which exist within the communication area E3-1 also constitutes one group. FIG. 44B is a diagram illustrating a relative position between the wireless stations shown in FIG. 44A.

When the wireless station operates as the management station of the group, the wireless station which operates as the management station of the group, and other wireless stations do not have such a relation as a base station and a wireless station which constitute a system of a cellular system. The wireless station which operates as the management station, and other wireless stations constitute the ad-hock network during communication. In other words, while a wireless station k-1 (k is a natural number of 1 to 3) which operates as the management station has a function to determine the communication channel to be used in its own-group, there is no distinction with wireless stations k-2 through k-n concerning the other functions. The wireless stations k-1 through k-n, when being able to directly communicate, will communicate with each other without through other wireless stations. Additionally, the management station does not need to be decided from the beginning. For example, it is decided such that the wireless station having the function capable of being the management station among the wireless stations k-1 through k-n constituting one group declares to be the management station. Incidentally, when there are a plurality of wireless stations having the function capable of being the management station in one group, a wireless station that has firstly declared to be the management station may be the management station.

The wireless stations which constitute a plurality of groups mutually inform, using a common channel that is used in common among the plurality of groups, a packet including information, such as channel information mutually used within its own-station group, a wireless station ID within its own-station group, and beacon information for synchronizing between groups or within the group (hereinafter, called the channel information packet) to neighboring wireless stations. Thus, the wireless stations themselves which constitute the plurality of groups makes it possible to prevent interference of the communication channel generated between different groups, or possible to perform communication between the wireless stations belonging to the different group.

The wireless transmission system in accordance with the present embodiment will be described such that the wireless stations constitute the plurality of groups as shown in FIG. 44B, and an arbitrary wireless station within the group is operating as the management station. Moreover, the present embodiment will be described such that the communication channel and the common channel mean a frequency channel of the FDMA system. The above-mentioned channel is not limited to this, but it may be distinguished by a time slot of the TDMA system, a spread code, such as the CDMA scheme, or the like.

The wireless stations k-1 through k-$n$ transmits and receives the packet by use of the modulation/demodulation scheme having the anti-multipath characteristic. In the present embodiment, a case where data is transmitted by use of the PSK-VP scheme will be described as the modulation/demodulation scheme having the anti-multipath characteristic.

FIG. 45 is a diagram illustrating an example of a configuration of the packet transmitted and received in this system. The packet shown in FIG. 45 is composed of a preamble (PR), a unique word (UW), a packet identifier, a destination station address, a source address, a relay frequency identifier, information data, and CRC.

The preamble is used for gain control and clock recovery, frequency control, or the like. The unique word is used for packet synchronization. The packet identifier is used for identifying the packet. The destination station address indicates an address of the wireless station serving as a packet destination. The source address indicates an address of the wireless station serving as a packet source. The relay frequency identifier indicates the number of times for the packet to be relayed at the time of the packet being transmitted. The information data is a main part of data to be transmitted. CRC is a CRC code to be used for error detection. Incidentally, while the unique word and the packet identifier are provided separately in this embodiment, as a matter of course, it is also possible to prepare a plurality of unique words corresponding to the packet type, and to identify the packet synchronization and the packet type simultaneously.

Figure 46A:
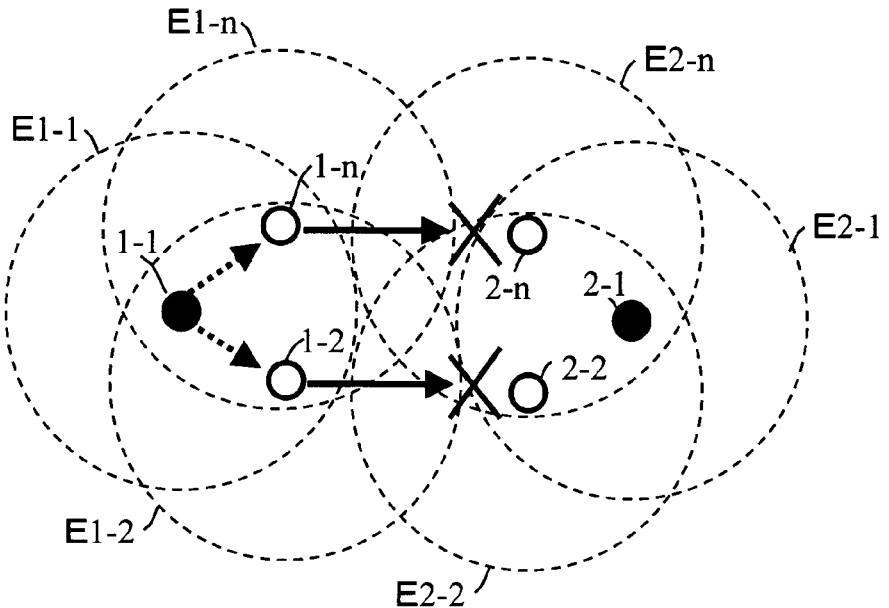
FIG. 46A is a diagram for explaining a difference between a conventional wireless transmission system and the wireless transmission system according to the present embodiment.
Figure 46B:
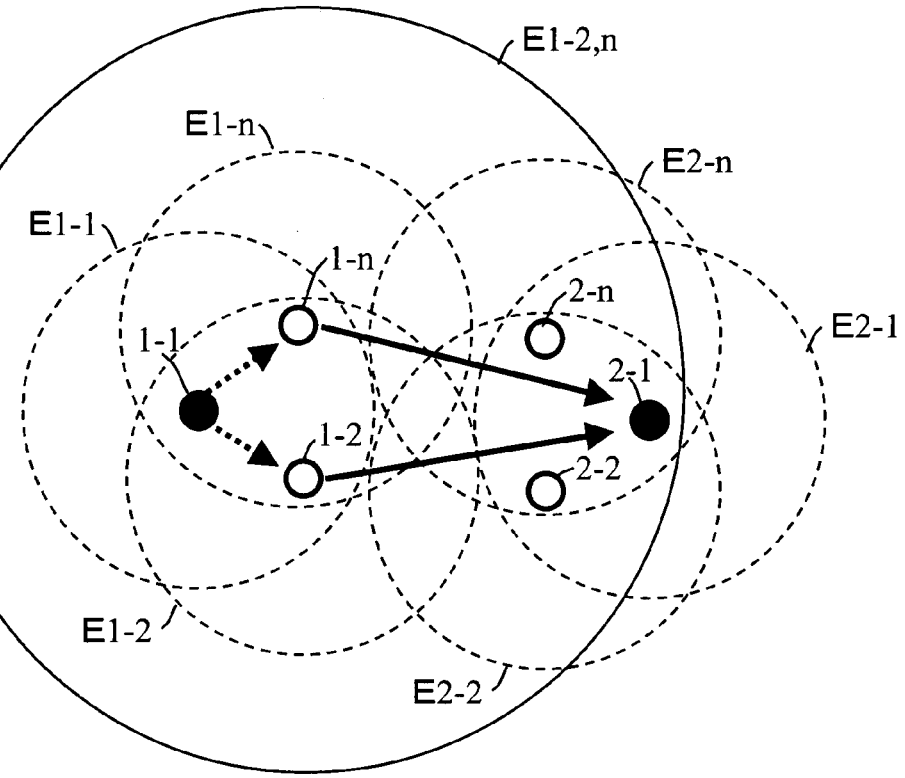
FIG. 46B is a diagram for explaining a difference between the conventional wireless transmission system and the wireless transmission system according to the present embodiment.

FIGS. 46A and 46B are diagrams for explaining a difference between the conventional wireless transmission system described in Patent Document 2 and the wireless transmission system according to the present embodiment. FIG. 46A is a block diagram of the conventional wireless transmission system described in Patent Document 2. FIG. 46B is a block diagram of the wireless transmission system according to the present embodiment. In FIGS. 46A and 46B, the wireless stations 1-2 and 1-$n$ are located so close to each other that the propagation time can be ignored as compared with the TDOA ($\tau$) which can provide the path diversity effect. In FIGS. 46A and 46B, since the wireless station 1-1 and the wireless station 2-1 do not exist within communication areas which belong to the other stations, respectively, they cannot directly communicate with each other. When the packet is transmitted from the wireless station 1-1 to the wireless station 2-1, the wireless stations 1-2 and 1-$n$ perform the relay transmission of the packet. FIGS. 46A and 46B illustrate an example of a situation of performing the multi-station simultaneous transmission to the wireless station 2-1 during the relay transmission of the wireless stations 1-2 and 1-$n$. Incidentally, in the following description, a packet which needs the relay transmission is called a broadcast packet.

In the case of the conventional wireless transmission system described in Patent Document 2 shown in FIG. 46A, The wireless stations 1-2 and 1-$n$ perform the relay transmission of the broadcast packet almost simultaneously, namely, with a time difference of less than the delay resolution. For this reason, the conventional wireless transmission system can not provide the effect due to the path diversity. Hence, even when the wireless stations 1-2 and 1-$n$ perform the relay transmission, the wireless stations 2-1 through 2-$n$ which exist out of the communication areas E1-2 through E1-$n$ during the single station transmission of the wireless stations 1-2 and 1-$n$ cannot normally receive the broadcast packet that the wireless station 1-1 has transmitted.

Meanwhile, in the case of the wireless transmission system according to the present embodiment shown in FIG. 46B, the wireless station 1-1 transmits the broadcast packet to the wireless stations 1-2 and 1-$n$. Additionally, the wireless station 1-1 notifies the delay amounts to the wireless stations 1-2 and 1-$n$, respectively so that the wireless stations 1-2 and 1-$n$ can perform the multi-station simultaneous transmission with a suitable time difference in the negotiation zone (nego-zone). The plurality of delay amounts are determined so that each difference between the plurality of delay amounts may be set to not less than the predetermined delay resolution, and the difference between the maximum and minimum values may be set to not more than the predetermined maximum delay. The delay resolution and the maximum delay are decided depending on respective systems for path diversity. Hereinafter, a procedure of deciding a suitable transmission timing in order to perform the multi-station simultaneous transmission will be called a negotiation. The wireless stations 1-2 and 1-$n$ perform the multi-station simultaneous transmission of the broadcast packet transmitted by the wireless station 1-1 using a timing delayed by the delay amount notified from the wireless station 1-1 from a timing to be a reference to perform the relay transmission of the broadcast packet (reference timing) as a transmission start timing. Note herein that the wireless station 1-1 generates and transmits a packet including delay amount information (delay amount notice packet) in order to give the above-mentioned delay amounts the wireless stations 1-2 and 1-$n$.

The difference between the delay amounts that the wireless station 1-1 gives to the wireless stations 1-2 and 1-$n$ is a proper value that provides the effect due to the path diversity at the receiving end, namely, a value not less than a predetermined delay resolution and not more than a predetermined maximum delay. As a result, the wireless station 1-2 and the wireless station 1-$n$, during the relay transmission, can expand the communication areas larger than respective communication areas E1-2 and E1-$n$ when the wireless stations 1-2 and 1-$n$ perform the single station transmission. Consequently, the wireless stations 2-1 through 2-$n$ which exist out of the communication areas E1-2 and E1-$n$ during the single station transmission of the wireless stations 1-2 and 1-$n$ can receive the broadcast packet normally. Incidentally, in FIG. 46B, E1-2 and E1-$n$ indicate the communication areas secured when the wireless stations 1-2 and 1-$n$ perform the multi-station simultaneous transmission with the suitable time difference that can provide the effect due to the path diversity.

Figure 47A:
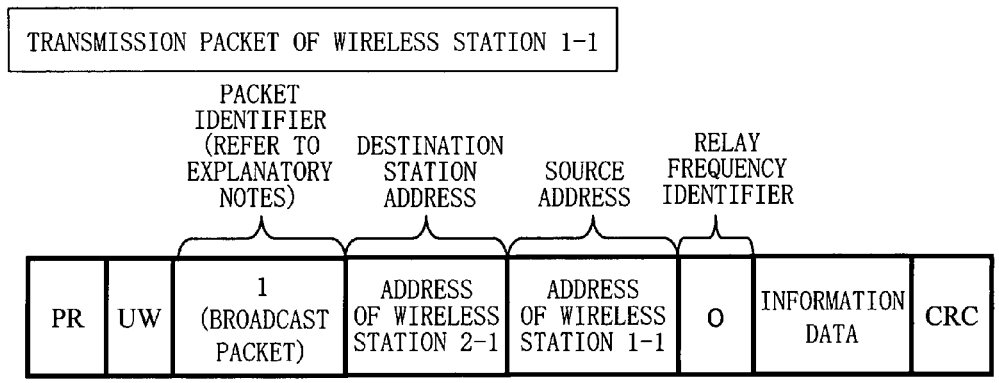
FIG. 47A is a diagram illustrating a configuration of the packet transmitted by wireless stations in a relative position shown in FIG. 46B.
Figure 47B:
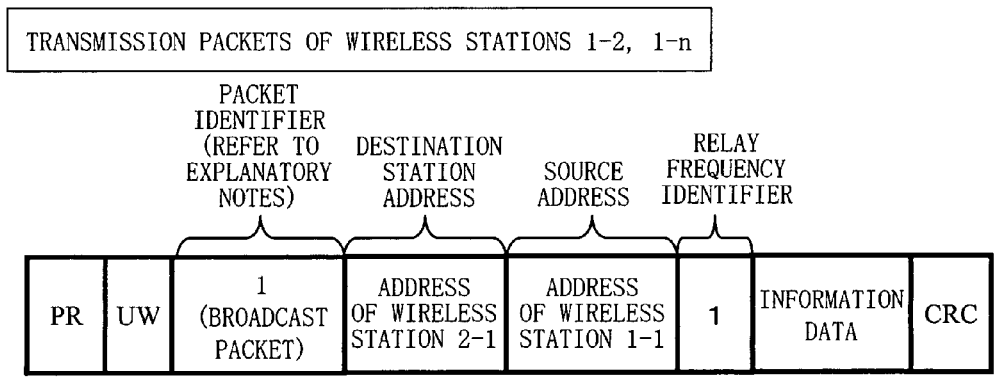
FIG. 47B is a diagram illustrating a configuration of the packet transmitted by the wireless stations in the relative position shown in FIG. 46B.

FIGS. 47A and 47B are diagrams illustrating a configuration of the packets transmitted and received in the wireless transmission system shown in FIG. 46B. In FIG. 46B, the wireless station 1-1 generates the packet shown in FIGS. 47A, and transmits it to the wireless station 1-2 and the wireless station 1-$n$. Here, as for the packet identifier, it is assumed 0 indicates a packet that does not need the relay; 1, the broadcast packet; 2, the channel information packet; 3, the response packet; and 4, the delay amount notice packet. The response packet is a packet for notifying the neighboring stations that the broadcast packet has been normally received. Since the response packet is a response responsive to the broadcast packet, it is called also a broadcast response packet.

For example, "1" for indicating that this packet is the broadcast packet is recorded on an identifier of the packet that the wireless station 1-1 generates. Meanwhile, the address of the wireless station 2-1 which is a packet destination is recorded on the destination station address, and the address of the wireless station 1-1 is recorded on the source address. Moreover, since the packet is not relay-transmitted yet when the wireless station 1-1 transmits the packet, "0" is recorded on the relay frequency identifier.

The wireless stations 1-2 and 1-n, upon receiving the packet shown in FIG. 47A transmitted by the wireless station 1-1, generates and transmits a broadcast packet shown in FIG. 47B. FIG. 47B is a diagram illustrating a configuration of the packet transmitted by the wireless stations 1-2 and 1-n. As shown in FIG. 47B, the wireless stations 1-2 and 1-n rewrites the received relay frequency identifier of the broadcast packet to "1", and transmits it. As is understood, the multi-station simultaneous transmission of the broadcast packet transmitted from one wireless station (in the case of FIG. 46B, the wireless station 1-1) is performed by a plurality of wireless stations (in the case of FIG. 46B, the wireless stations 1-2 and 1-n).

Note herein, in the wireless transmission system of the present embodiment, the maximum value of the relay frequency identifier (the maximum relay frequency) is determined to be a predetermined frequency. Subsequently, the wireless station, upon receiving the packets shown in FIG. 47A or 47B, compares the relay frequency identifier included in the packet with the predetermined maximum relay frequency to determine whether or not to perform the relay transmission. For example, if the respective wireless stations keep the maximum relay frequency in advance while setting the maximum relay frequency to 1 time, the wireless station 2-2 and 2-n, even when the broadcast packet from the relay stations 1-2 and 1-n is received, may not further relay it. As a result, in the wireless transmission system shown in FIG. 46B, the packet does not need to be relay-transmitted uselessly after the packet is normally received by the wireless station 2-1 serving as the destination station. Note herein that it may not be necessary to determine the maximum relay frequency to the predetermined frequency. For example, an area for storing the maximum relay frequency may be independently provided in the packet shown in FIGS. 47A and/or 47B to set the maximum relay frequency depending on significance of the packet.

Incidentally, since the packet is transmitted to the destination station in the source wireless station depending on the system, whether or not the relay is required may not be determined. In such a case, the distinction between the packet identifiers "0" and "1" may be removed, and all packets other than the response packet or the delay amount notice packet, namely, other than the packet having the packet identifier "3" or "4" may be treated as the broadcast packet.

Figure 48:
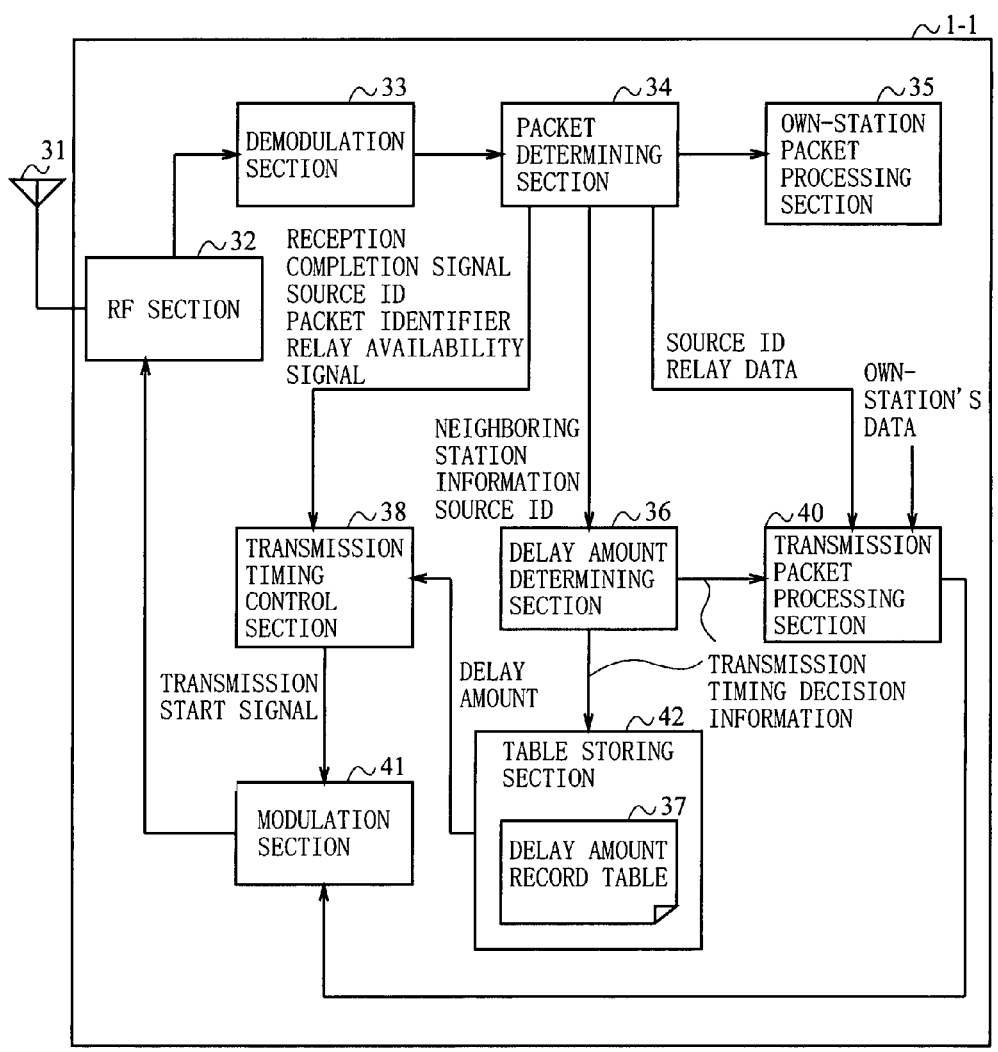
FIG. 48 is a block diagram illustrating a configuration example of the wireless station according to the fifth through eighth embodiments of the present invention.

FIG. 48 is a block diagram illustrating a configuration example of the wireless station 1-1. As shown in FIG. 48, the wireless station 1-1 is provided with the antenna 31, the RF section 32, the demodulation section 33, the packet determining section 34, the own-station packet processing section 35, the delay amount determining section 36, the transmission timing control section 38, the transmission packet processing section 40, the modulation section 41, and the table storing section 42. Incidentally, other wireless stations also have a configuration similar to that of the wireless station 1-1.

The packet determining section 34 determines whether or not the packet can be normally received by use of an error detecting code, such as a CRC code included in the received data demodulated by the demodulation section 33. If the packet can be normally received, the packet determining section 34 analyzes the packet identifier, the destination station address, the source address, and the source wireless station ID included in the packet.

If the received packet is the broadcast packet, the packet determining section 34 notifies the transmission packet processing section 40 of the source address included in the received data as an address of the wireless station of a response destination, and instructs it to generate the response packet. The packet determining section 34 also notifies the transmission timing control section 38 to decide the transmission start timing of the response packet. Moreover, the packet determination section 34 generates the reception completion signal for indicating that reception of the broadcast packet is completed, and passes the source address, the packet identifier, and the reception completion signal to the transmission timing control section 38. In addition, at this time, the packet determining section 34 passes the data after UW in the broadcast packet to the transmission packet processing section 40 as relay data, and instructs to it generate the broadcast packet for performing the relay transmission.

If the received packet is the channel information packet, the packet determination section 34 recognizes the source address included in received data, the channel that the source station uses within the group, and the relay frequency stored in the relay frequency identifier. If the relay frequency is more than the maximum relay frequency in number, the packet determination section 34 determines that the received packet is transmitted from a station outside an area to which its own-station can belong. Meanwhile, if the relay frequency is not more than the maximum relay frequency, the packet determination section 34 determines that the received packet is transmitted from a wireless station of a group in an area to which its own-station can belong. Subsequently, the packet determination section 34 passes the source address and information on the channel used within the group to the communication control section which is not shown.

If the received packet is the response packet, the packet determining section 34 passes the source address included in the response packet to the delay amount determining section 36 as neighboring station information.

Meanwhile, if the received packet is the delay amount notice packet, the packet determination section 34 passes the delay amount notice packet to the delay amount determining section 36.

Further, if the received packet is the packet addressed to its own-station, the packet determination section 34 passes the received data to the own-station packet processing section 35. The own-station packet processing section 35 processes the packet addressed to its own-station, which is received from the packet determining section 34.

The delay amount determining section 36 recognizes the ID and the number of the wireless stations capable of performing the relay transmission of the broadcast packet that its own-station has transmitted, based on the neighboring station information notified by an ending time of a response zone which will be described later. If the number of wireless stations capable of performing the relay transmission is plural, the delay amount determining section 36 decides the delay amount allocated to each of wireless stations. The delay amount determining section 36, while recording the decided delay amount on the delay amount record table 37, passes the decided delay amount and the destination address to the transmission packet processing section 40. In addition, when the delay amount notice packet is received, the delay amount determining section 36 will extract the delay amount allocated to its own-station and other stations to record it on the delay amount record table 37.

The communication control section (not shown), upon receiving the channel information packet, receives the source address and the channel information from the packet determination section 34. The communication control section, while storing the source address as an address of the management station of the group in which its own-station participates, stores the channel information. Further, the communication control section passes a relay availability signal for indicating whether or not its own-station is in a state to be able to perform the relay currently to the transmission timing control section 38. Note herein that the communication control section may pass the relay availability signal to the transmission timing control section 38 when the relay transmission is not available, or may pass the relay availability signal to the transmission timing control section 38 only when the relay transmission is available.

The transmission timing control section 38, if its own-station can perform the relay, controls the timing of transmitting the broadcast packet, based on the reference timing and the delay amount recorded on the delay amount record table 37. Specifically, the transmission timing control section 38 sets a timing after a lapse of the predetermined time from receiving the reception completion signal from the packet determining section 34, as the reference timing, and a timing delayed from this reference timing by the delay amount allocated to its own-station, which is recorded on the delay amount record table 37, sets the transmission start timing upon relay-transmission of the broadcast packet. When the transmission start timing arrives, the transmission timing control section 38 then generates a transmission start signal for instructing a transmission start to pass it to the modulation section 41. Moreover, when transmission of the response packet is notified from the packet determining section 34, the transmission timing control section 38 generates the transmission start signal within a predetermined response zone at random timing to pass it to the modulation section 41.

The transmission packet processing section 40, if its own-station is the source, receives from the control section which is not shown information desired to inform from its own-station to other wireless stations as its own-station's data, and generates and keeps the broadcast packet or a packet that does not need the relay, in which the predetermined header (preamble and unique word) and a predetermined footer (CRC code or the like) are added to its own-station's data. The transmission packet processing section 40, upon receiving the delay amount and the destination address from the delay amount determining section 36, will also generate and keep the delay amount notice packet in which the predetermined header and the predetermined footer are added to the destination address and the delay amount. Additionally, the transmission packet processing section 40, upon receiving the relay data from the packet determining section 34, will add the predetermined header to the relay data to generate and keep the broadcast packet. Moreover, the transmission packet processing section 40, upon receiving an instruction to generate the response packet from the packet determining section 34, will generate and keep the response packet.

The table storing section 42 stores the delay amount record table 37. Delay amounts notified from other wireless stations and delay amounts to be allocated to other wireless stations when its own-station becomes the source wireless station are recorded on the delay amount record table 37.

The modulation section 41 generates and outputs a modulated baseband signal modulated with transmit data in the packet generated by the transmission packet processing section 40. The configuration of the modulation section 41 when communication is performed by use of the PSK-VP scheme is similar to that shown in FIG. 6. In addition, the configuration of the demodulation section 33 is similar to that shown in FIG. 7.

Figure 49:
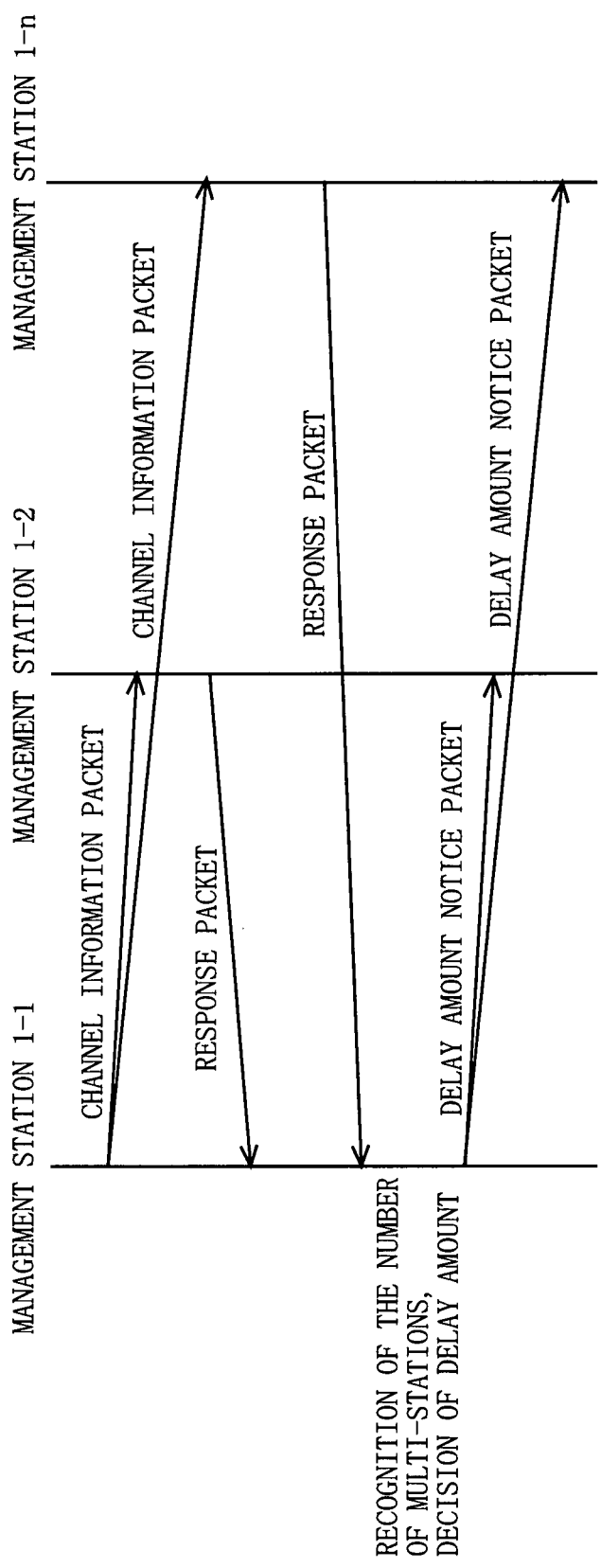
FIG. 49 is a sequence diagram illustrating an outline of operation of the wireless station.

FIG. 49 is a sequence diagram illustrating an outline of operation of the wireless station constituted as described above. First, the broadcast packet transmitted by the wireless station 1-1 is received by the wireless stations 1-2 and 1-*n*. The wireless stations 1-2 and 1-*n* transmits the response packet to the wireless station 1-1. The wireless station 1-1, upon receiving the response packet, will decide the delay amount of each wireless station at the time of the wireless stations 1-2 and 1-*n* performing the multi-station simultaneous transmission of the broadcast packet where the wireless station 1-1 serves as the source wireless station. The wireless station 1-1 then generates the delay amount notice packet for notifying the decided delay amounts to transmit it to the wireless stations 1-2 and 1-*n*.

FIG. 50 through FIG. 53 are flow charts illustrating an operation of the wireless station shown in FIG. 48. The wireless station waits for the reception of the packet for a predetermined time when starting participation in a new group and construction of a new group (existing management station search mode), such as at the time of power-on, and determines whether or not any management station which constitutes the group exists within a predetermined area. If the management station exists, the wireless station participates in the group that the management station manages, and if the management station does not exist, its own-station will be a new management station of the group. The operation of the wireless station at that time will be described using the flow chart shown in FIG. 50. Note herein, the flow chart shown below will be described as the operation of the wireless station 1-1.

The wireless station 1-1 resets a wait timer for waiting for the reception of the packet for a predetermined time (Step S231), and waits in a receive state (Step S232). Subsequently, if the wireless station 1-1 receives the packet (Yes at Step S233) until the predetermined time elapse (No at Step S234), it demodulates the received packet (Step S235). Specifically, the demodulation section 33 demodulates the received baseband signal which is received by the antenna 31 and frequency-converted by the RF section 32, and uses it as the demodulated data.

The packet determining section 34 applies the CRC check to the demodulated data to determine whether or not the packet is normally received (Step S236). If the packet cannot be demodulated normally, the wireless station 1-1 wait in a receive state again (Step S232). Meanwhile, if the packet can be demodulated normally, the packet determining section 34 refers to the packet identifier of the received packet to determine whether or not it is the channel information packet (Step S237).

If the received packet is not the channel information packet, the wireless station 1-1 wait in a receive state again (Step S232). Meanwhile, if the received packet is the broadcast packet, the packet determination section 34 recognizes the source address (source ID) of the received packet, the channel that the source station uses within the group, and the frequency that the packet has been relay-transmitted (relay frequency) (Step S238). If the relay frequency is larger than the maximum relay frequency in number, the wireless station 1-1 determines that the received packet is transmitted from other station out of the area to which its own-station can belong, and waits in a receive state again (Step S232). Meanwhile, if the relay frequency is not more than the maximum relay frequency in number (Yes at Step S239), The wireless station 1-1 determines that the received packet is transmitted from the wireless station of the group in the area to which its own-station can belong. The packet determination section 34 then pass the source ID as a management station ID of the group in which its own-station participates, and the information on the channel used within the group to the communication control section which is not shown. Subsequently, the communication control section stores them therein (Step S240) The process then proceeds to Step S251 shown in FIG. 11.

Meanwhile, if the predetermined time elapses at Step S234, the wireless station 1-1 decides that its own-station will be the new management station of the group (Step S241), and decides a use channel to be used within the group (Step S242). The process then proceeds to Step S251 shown in FIG. 11.

Figure 51:
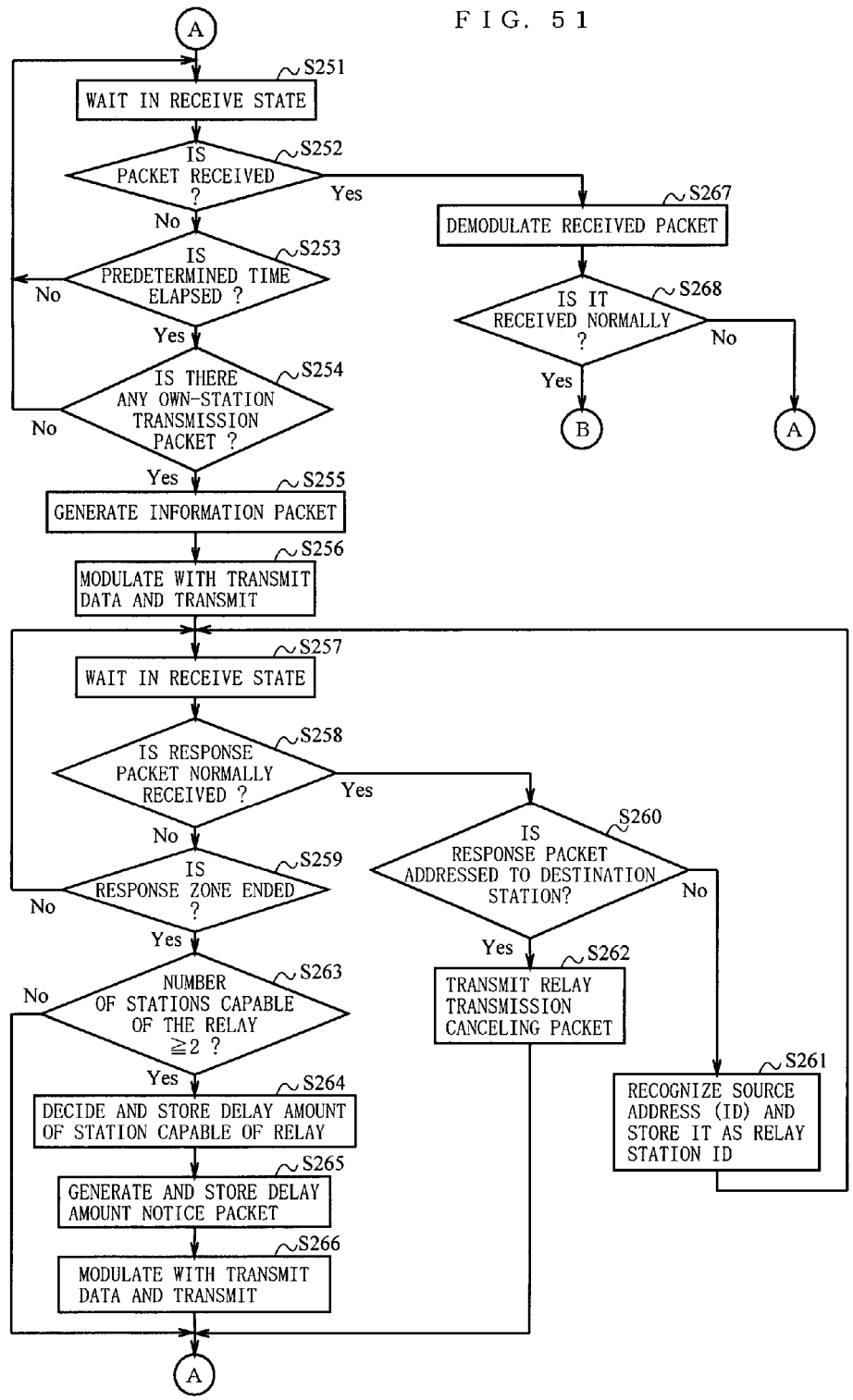
FIG. 51 is a flow chart illustrating an operation of the wireless station 1-1 after the neighboring wireless station search mode is completed.

FIG. 51 is a flow chart illustrating an operation of the management station 1-1 after the existing management station search mode is completed. The wireless station 1-1 waits in a receive state (Step S251), and if a state where the packet is not received (No at Step S252) lasts for the predetermined time (Yes at Step S253), it confirms that the channel is available. The wireless station 1-1, if there is no packet that its own-station desires to transmit as the source, waits further in a receive state (No at Step S254). Meanwhile, the wireless station 1-1, if there is the information (either of the channel information packet, the relay transmission canceling packet, the broadcast packet) that its own-station desires to transmit as the source (Yes at Step S254), generates the information packet in the transmission packet processing section 40 (Step S255), the transmission timing control section 38 outputs a transmission start timing signal to the modulation section 41, and the transmission packet processing section 40 passes the transmit data of the information packet to the modulation section 41. The modulation section 41 generates the modulation signal from the transmit data of the information packet, and transmits it through the RF section 32 and the antenna 31 (Step S256).

Thereafter, the wireless station 1-1 waits for the response packet transmitted from other wireless stations in a receive state (Step S257). The wireless station 1-1 determines, until the response zone is completed (No at Step S259), whether or not the response packet is normally received (Step S258). If the response packet is normally demodulated (Yes at Step S258), the wireless station 1-1 determines whether or not the source wireless station of the response packet is the destination wireless station of the information packet (Step S260). If the source wireless station of the response packet is not the destination station of the information packet, the source ID is recognized by the packet determination section 34 to be passed to the delay amount determining section 36, and the delay amount determining section 36 stores the source ID included in the response packet as the ID (relay station ID) of the wireless station which relay-transmits the packer that its own-station has transmitted (Step S261). Incidentally, the wireless station which transmits the response packet may determine whether or not the relay is available to thereby transmit this response packet by adding the determination result to the response packet. Thus, the wireless station which has received the response packet can determine whether or not the relay by the wireless station which has transmitted the response packet is available. The wireless station 1-1 repeats this operation until the response zone is completed. If the source wireless station of the response packet is the destination station of the information packet, the wireless station 1-1 generates the relay transmission canceling packet for notifying to cancel the relay transmission (Step S262). The wireless station 1-1 modulates and transmits the relay transmission canceling packet (Step S266), and returns to a reception waiting state at Step S251.

Meanwhile, when the response zone is completed and a waiting time for receiving the response packet elapses at Step S259, the delay amount determining section 36 determines whether or not the number of stations capable of the relay is not less than two (Step S263). Specifically, the delay amount determining section 36 determines the number of neighboring wireless stations that has made a response within the response zone (hereinafter, called the number of stations capable of the relay) from the number of the relay station IDs stored within the response zone. If the number of stations capable of the relay is less than two, the wireless station 1-1 completes the process (No at Step S263).

Meanwhile, if the number of stations capable of the relay is not less than two (at Step S263 Yes), the delay amount determining section 36 decides the delay amount to be allocated to the relay station when performing the simultaneous transmission of the broadcast packet from the relay station to thereby records it on the delay amount record table 37 (Step S264), also passed the relay station ID and the delay amount decided for every relay station to the transmission packet processing section 40 to instruct it to generate the delay amount notice packet.

According to the instruction from the delay amount determining section 36, the transmission packet processing section 40 generates the delay amount notice packet (Step S265), and passes it to the modulation section 41. The modulation section 41 generates the modulation signal from the delay amount notice packet, and transmits it through the RF section 32 and the antenna 31 (Step S266).

Meanwhile, if the packet is received during reception waiting of Steps S251 through S253 (Yes at Step S252), the wireless station 1-1 demodulates the received packet (Step S267), and determines whether or not the packet determination section 34 could normally receive it (Step S268). If not, the process proceeds to Step S251 again. If it could, the process proceeds to Step S271 shown in FIG. 52.

Figure 52:
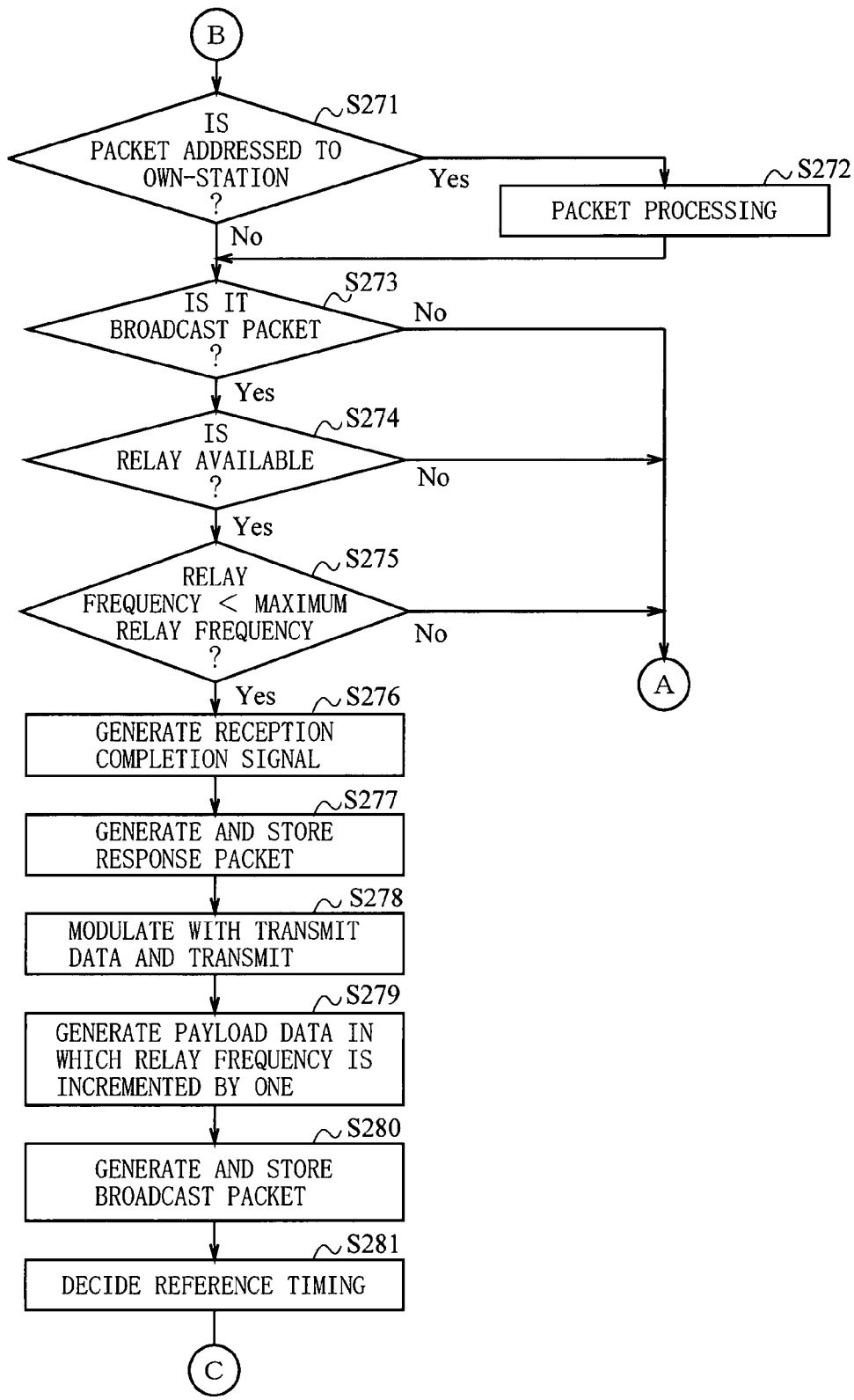
FIG. 52 is a flow chart illustrating an operation of the wireless station 1-1 when a certain packet is received in a reception waiting state.
Figure 53:
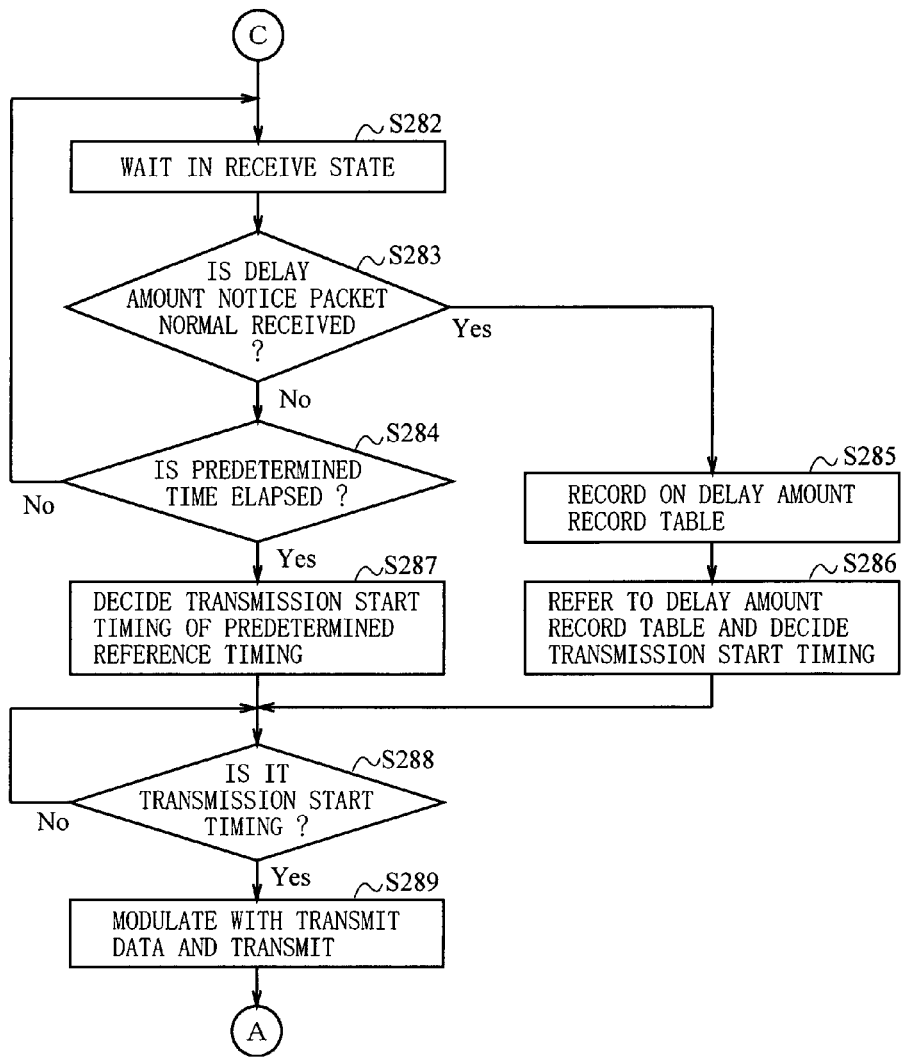
FIG. 53 is a flow chart illustrating the operation of the wireless station 1-1 when a certain packet is received in the reception waiting state.

FIG. 52 and FIG. 53 are flow charts illustrating an operation of the wireless station 1-1 when a certain packet is normally received (Yes at Step S268 shown in FIG. 51) in a reception waiting state (Steps S251 through S253) shown in FIG. 51. The wireless station 1-1, if the received packet is a packet addressed to its own-station (Yes at Step S271), performs a predetermined processing in the own-station packet processing section 35 (Step S272), and proceeds to Step S273. Meanwhile, if the received packet is not the packet addressed to the its own-station (No at Step S271), the packet is then determined whether or not it is the broadcast packet, namely, the packet which needs the relay (Step S273).

If the received packet is not the broadcast packet (No at Step S273), the wireless station 1-1 proceeds to Step S251 again, and waits in a receive state. If the received packet is the broadcast packet (Yes at Step S273), the transmission timing control section 38 determines whether or not the relay transmission is available using the relay availability signal passed from the communication control section (not shown) (Step S274). If the relay transmission is not available, the wireless station 1-1 returns to Step S251 shown in FIG. 51. If the relay transmission is available, the wireless station 1-1 proceeds to Step S275.

The wireless station 1-1 recognizes the relay frequency included in the packet by the packet processing section 34, and if the relay frequency has already reached the maximum relay frequency (No in Step S275), it proceeds to Step S251 again, and waits in a receive state. If the relay frequency has not yet reached the maximum relay frequency (Yes in Step S275), the packet determination section 34 generates the reception completion signal to pass it to the transmission timing control section 38 along with the identifier of the packet (Step S276). Additionally, the packet determination section 34 recognizes the source wireless station ID, passes it to the transmission packet processing section 40, and instructs to generate the response packet. The transmission packet processing section 40 generates and stores the response packet (Step S277).

The transmission timing control section 38 generates the transmission start signal at random timing based on the reception completion signal, and passes it to the modulation section 41. The modulation section 41, upon receiving the transmission start signal, will read the transmit data of the response packet to generate the modulation signal. The modulation signal generated by the modulation section 41 is transmitted through the RF section 32 and the antenna 31 as a radio signal (Step S278).

Further, the packet determination section 34 extracts the data after UW as shown in FIG. 45 from the demodulated data as payload data, and then passes payload data in which the relay frequency ID in the payload data is incremented by 1 to the transmission packet processing section 40 as the relay data (Step S279). The transmission packet processing section 40 adds the predetermined header to the relay data, and generates and stores the broadcast packet (Step S280). Further, the transmission timing control section 38 decides the reference timing based on the reception completion signal (Step S281).

The processes of the wireless station 1-1 after Step S282 will be described using FIG. 53. After the transmission timing control section 38 decides the reference timing at Step S281, the wireless station 1-1 waits, for a predetermined time, for the delay amount notice packet to be informed from the source wireless station of the broadcast packet (Steps S282 through S284).

If the delay amount notice packet is normally received within the predetermined time (Yes at Step S283), the delay amount determining section 36 receives a payload portion of the delay amount notice packet from the packet determination section 34 to extract the delay amount, and records the extracted delay amount on the delay amount record table 37 (Step S285). Subsequently, the transmission timing control section 38 refers to the delay amount record table 37, and defines a timing delayed from the reference timing by the delay amount allocated to its own-station as the transmission start timing (Step S286). Meanwhile, if the delay amount notice packet is not normally received within the predetermined time (No at Step S283), the transmission timing control section 38 defines the reference timing decided at Step S281 shown in FIG. 52 as the transmission start timing (Step S287). The transmission timing control section 38, when the transmission start timing arrives, generates the transmission start signal to pass it to the modulation section 41 (Yes at Step S288).

The modulation section 41, upon receiving the transmission start signal, will read the transmit data from the broadcast packet to generate the modulation signal. The modulation signal generated by the modulation section 41 is transmitted through the RF section 32 and the antenna 31 as a radio signal (Step S289). Thereafter, the wireless station 1-1 proceeds to Step 51 again and waits in a receive state.

As mentioned above, while the operation of the wireless station 1-1 had been described using the flow charts shown in FIG. 50 through FIG. 53, the above-mentioned operation of the wireless station is common in all the wireless stations.

Figure 54A:
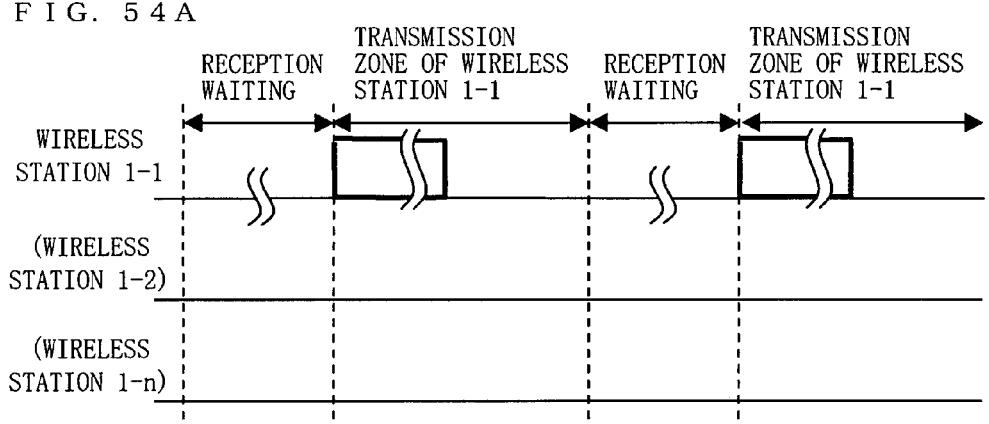
FIG. 54A is a diagram illustrating an operation of the wireless station and a delay amount decision procedure according to the fifth embodiment of the present invention.
Figure 54B:
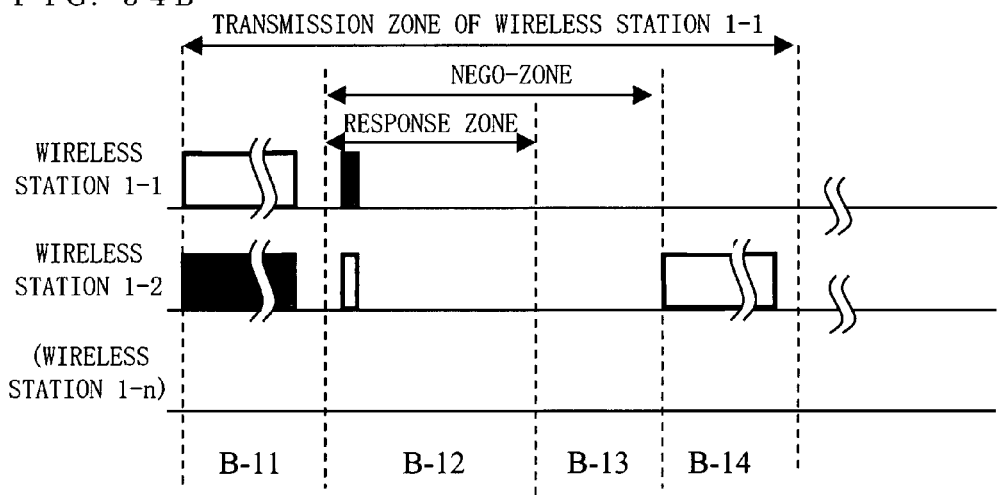
FIG. 54B is a diagram illustrating the operation of the wireless station and the delay amount decision procedure according to the fifth embodiment of the present invention.
Figure 54C:
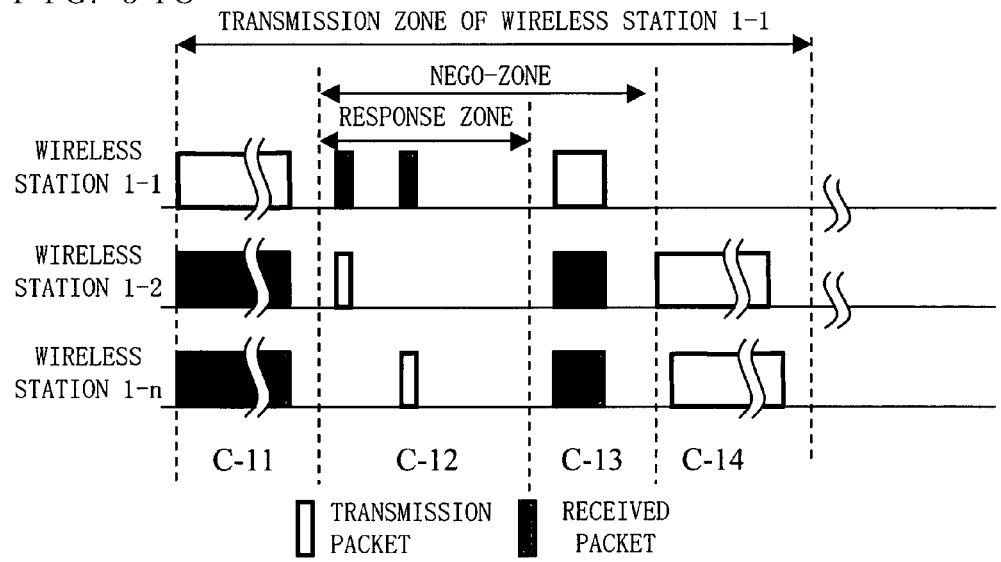
FIG. 54C is a diagram illustrating the operation of the wireless station and the delay amount decision procedure according to the fifth embodiment of the present invention.
Figure 55A:
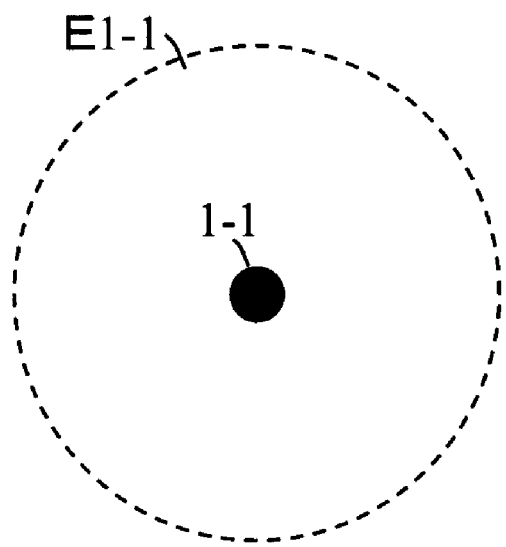
FIG. 55A is a diagram illustrating an example of a configuration change of a wireless transmission group according to the fifth through eighth embodiments of the present invention.
Figure 55B:
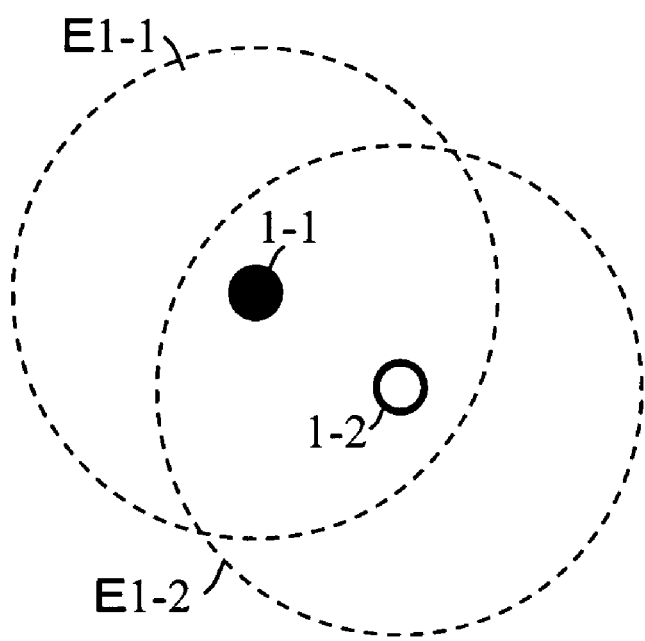
FIG. 55B is a diagram illustrating an example of the configuration change of the wireless transmission group according to the fifth through eighth embodiments of the present invention.

FIGS. 54A through 54C are diagrams illustrating an example of a procedure after one wireless station 1-1 is generated, and the one wireless station 1-1 then constitutes the group to be a group configuration shown in FIGS. 43A through 43B, until the multi-station simultaneous transmission of the broadcast packet transmitted from the wireless station 1-1 is performed with the proper time difference during the relay transmission. FIGS. 55A through 55C are diagrams illustrating a relative position between the wireless stations 1-1 through 1-*n* after one wireless station 1-1 is generated, and the wireless station 1-1 then constitutes the group, until it becomes the group configuration shown in FIG. 1. Hereinafter, referring to FIGS. 54A through 54C, and FIGS. 55A through 55C, a procedure in which the wireless stations 1-1 through 1-*n* shown in FIG. 48 negotiate with each other, and decide the delay amount allocated to each wireless station during the relay transmission to perform the multi-station simultaneous transmission at proper timing will be described. Incidentally, in FIGS. 54A through 54C, it will be described such that the channel information packet is relay-transmitted. In other words, the channel information packet will be described as the broadcast packet.

First, as shown in FIG. 54A and FIG. 55A, when there is not any other wireless stations around the wireless station 1-1, and the channel information packet is not received in the wireless station 1-1 in the predetermined time, the wireless station 1-1 transmits the channel information packet as the source station to declare that the wireless station will be the management station. Note herein that in the wireless system of the present embodiment, when the broadcast packet (including the channel information packet) is transmitted from a certain wireless station k, a predetermined time from the transmission start time of the packet until the relay transmission of the packet is completed is allocated as a zone for transmitting the packet of the wireless station k (wireless station k transmission zone) which has transmitted the packet as the source station.

Figure 50:
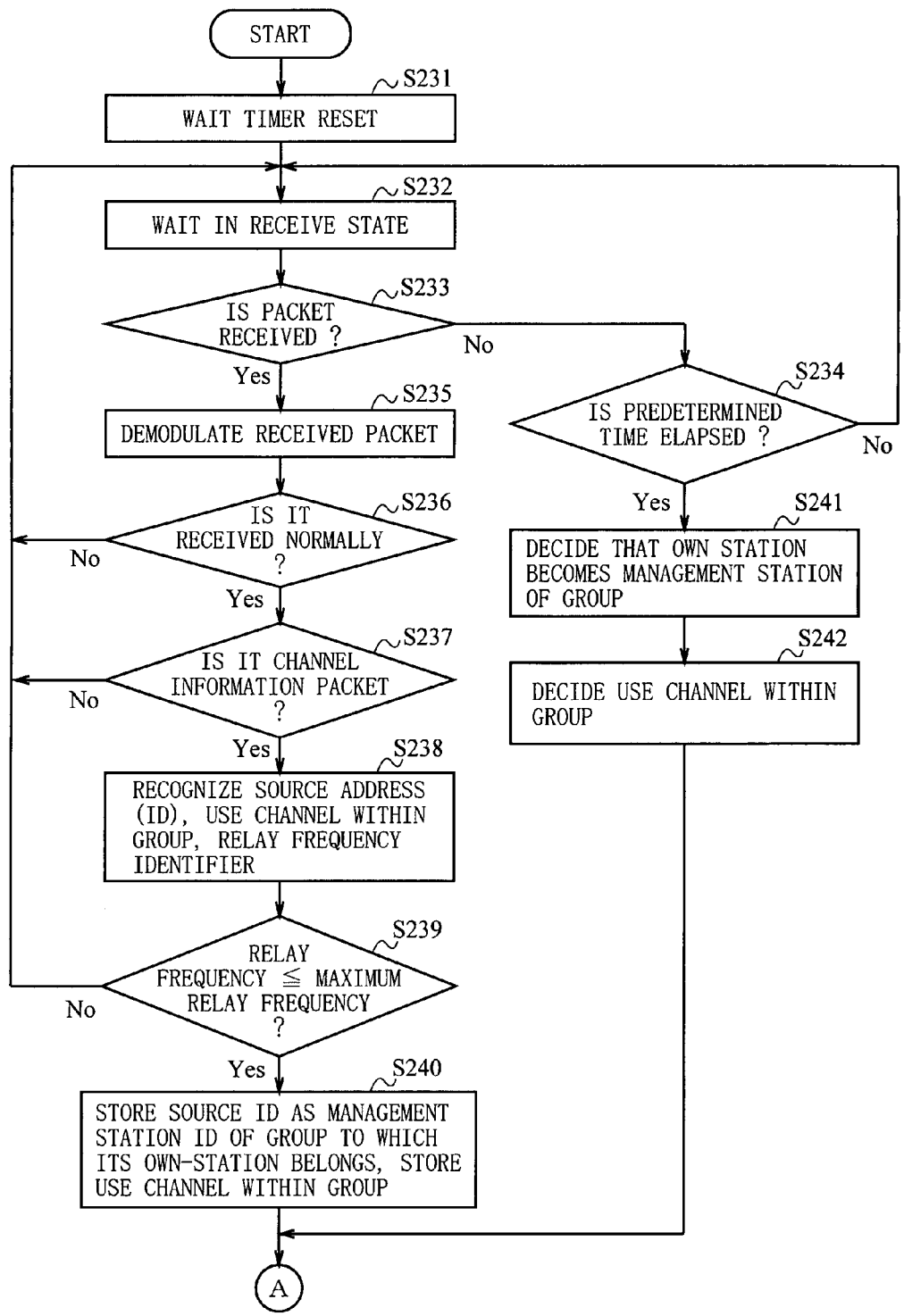
FIG. 50 is a flow chart illustrating an operation of a wireless station 1-1 in a neighboring wireless station search mode.

Next, as shown in FIG. 55B, when the wireless station 1-2 is newly generated within the communication area E1-1 of the wireless station 1-1, the wireless station 1-2 searches for the existing neighboring management station according to the procedure shown in FIG. 50 while observing the common channel for a predetermined period. The predetermined period, when the channel information packets are periodically transmitted, for example, may set to not less than one cycle time. Thereafter, the wireless station 1-2, upon receiving the broadcast packet transmitted by the wireless station 1-1 (FIG. 54B: B-11), generates the response packet for notifying the neighboring stations that the broadcast packet has been normally received according to the procedure shown in FIG. 51, and transmits it within a predetermined response zone (FIG. 54B: B-12).

The wireless station 1-1 receives, in the response zone, the response packet transmitted from the wireless station 1-2, and recognizes the number of stations capable of the relay according to the procedure shown in FIG. 50 (FIG. 54B: B-12). At this time, since the wireless stations which exist in its own-group is two of the wireless stations 1-1 and 1-2 in number, the number of the response packets that the wireless station 1-1 receives within the response zone is one. As a result, since the multi-station simultaneous transmission cannot be performed upon relay-transmission of the broadcast packet, the wireless station 1-1 does not allocate the delay amount to the wireless station 1-2 (FIG. 54B: B-13).

In this case, the broadcast packet transmitted from the wireless station 1-1 is simply relay-transmitted by single station from the wireless station 1-2 at a predetermined reference timing (T0) defined by the system in advance (FIG. 54B: B-14).

Next, as shown in FIG. 55B and FIG. 55C, there will be described a case where the wireless station 1-*n* is newly generated in the group that the wireless stations 1-1 and 1-2 forms. First, the wireless station 1-*n* searches for the existing neighboring management station according to the procedure shown in FIG. 50 while observing the common channel for the predetermined period. Thereafter, the wireless stations 1-2 and 1-*n*, upon receiving the broadcast packet transmitted by the wireless station 1-1 (FIG. 54C: C-11), generates the response packet responsive to the broadcast packet transmitted by the wireless station 1-1 according to the procedure shown in FIG. 52, and transmits the response packet in the response zone at random timing (FIG. 54C: C-12).

The wireless station 1-1, upon receiving the response packet transmitted by the wireless stations 1-2 and 1-*n* in the response zone according to the procedure shown in FIG. 51, decides the delay amounts to be allocated to the wireless stations 1-2 and 1-*n*, and records them on the delay amount record table 37. Subsequently, within a predetermined time immediately after the end of the response zone, the wireless station 1-1 generates the delay amount notice packet including the decided delay amount to transmit it to each of the wireless stations 1-2 and 1-*n* (FIG. 54C: C-13). As is understood, the broadcast packet (channel information packet in the present embodiment) can be said to be the multi-station simultaneous transmission request packet for requesting the multi-station simultaneous transmission.

The wireless stations 1-2 and 1-*n*, upon receiving the delay amount notice packet transmitted by the wireless stations 1-1 according to the procedure shown in FIG. 53, extracts the delay amounts allocated to their own-stations and other stations during the multi-station simultaneous transmission, and records them on the delay amount record table 37 (FIG. 54C: C-13).

Subsequently, the multi-station simultaneous transmission of the broadcast packet transmitted from the wireless station 1-1 is performed from the wireless stations 1-2 and 1-*n* at timings delayed from the reference timing (T0) defined by the system in advance by the delay amounts allocated to their own-stations, respectively, (FIG. 54C: C-14).

FIG. 56A is a diagram illustrating a configuration of the delay amount record table 37 that the wireless stations 1-2 and 1-*n* keeps. For example, when the wireless station 1-1 is the packet source, the wireless station 1-*n*, upon relay-transmitting the packet, uses a timing delayed from the reference timing by the delay amount τ, as the transmission start timing. Meanwhile, the wireless station 1-2, upon performing the relay transmission of the packet, uses a timing delayed from the reference timing by the delay amount 0, namely, the reference timing in this case, as the transmission start timing. Incidentally, the delay amount τ is a proper value that provides the path diversity effect at the receiving end, namely, a value not less than the predetermined delay resolution and not more than the predetermined maximum delay.

FIG. 56B is a diagram illustrating a transmission/reception timing of the packet when only the wireless station 1-2 relay-transmits the broadcast packet transmitted by the wireless station 1-1 in the relative position shown in FIG. 55B. The wireless station 1-2, upon relay-transmitting the packet, transmits the packet, without giving the delay amount thereto.

Figure 56C:
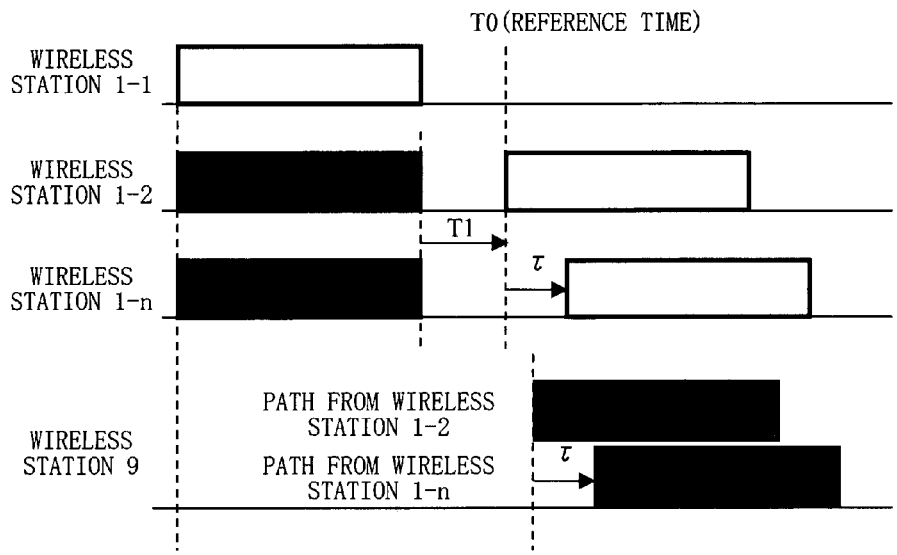
FIG. 56C is a diagram illustrating an example of a packet transmission timing during a multi-station simultaneous transmission of the wireless station according to the fifth embodiment of the present invention.

FIG. 56C is a diagram illustrating a transmission/reception timing of the packet when the wireless stations 1-2 and 1-*n* relay-transmit the broadcast packet transmitted by the wireless station 1-1 in the relative position shown in FIG. 55C. The wireless stations 1-2 and 1-*n* perform the multi-station simultaneous transmission of the broadcast packet according to the delay amount record table shown in FIG. 56A.

As shown in FIG. 56C, the wireless stations 1-2 and 1-*n* set a timing after a lapse of the predetermined time (T1) from the timing when the reception of the broadcast packet transmitted from the wireless station 1-1 is completed, as the reference timing (T0). The wireless station 1-2 transmits the broadcast packet at the timing T0 when the delay amount "0" has elapsed from the reference timing T0, namely, the reference timing T0. Meanwhile, the wireless stations 1-*n* defines a timing after a lapse of the delay amount "τ" from the reference timing as the transmission timing, and transmits the broadcast packet. Since the wireless stations 1-2 and 1-*n* are located so close to each other that the propagation time can be ignored as compared with the delay amount difference τ, the packets transmitted from two wireless stations arrive at the receiving station (for example, the wireless station 9) with a value very close to the proper transmission time difference τ which can provide the path diversity effect. Hence, the receiving station can provide the effect due to the path diversity to the maximum extent to thereby receive the packet normally.

As described above, according to the present embodiment, each of the wireless stations, by providing the negotiation zone (nego-zone) before the multi-station simultaneous transmission is performed, decides the transmission timings for each of the wireless stations during the multi-station simultaneous transmission based on the response in the nego-zone from the wireless station which has received the packet. As a result of this, even when the number of multi-stations changes, the multipaths with the proper TDOA can be certainly generated at the time of the multi-station simultaneous transmission, so that the effect due to the path diversity can be certainly provided at the receiving station.

Incidentally, in the present embodiment, each of the wireless stations has grasped the number of the wireless stations capable of performing the relay transmission from the number of the response packets received in the response zone. Here, an area for transmitting a packet dedicated to searching for a wireless station capable of performing the multi-station simultaneous transmission (multi-station status confirmation packet) may be independently provided within the nego-zone to return a response packet responsive to the packet. In this case, as well, the delay amount allocated to each wireless station can be appropriately set in a manner similar to that of the above-mentioned procedure. In this case, however, a wireless station searching packet must be transmitted. In contrast with this, according to the present embodiment, since the broadcast packet transmitted and received by the wireless station is used upon obtaining the response packet for grasping the wireless station capable of performing the multi-station simultaneous transmission, the delay amount can be set without reducing the transmission efficiency.

Incidentally, there are some wireless systems that transmit the information packet after confirming whether or not the information packet can be transmitted by causing the wireless stations themselves to transmit and receive the packets with short packet length to thereby negotiate with each other in advance before transmitting the information packet with packet length. It includes, for example, a wireless LAN system using RTS (Request to Send)/CTS (Clear To Send) of an IEEE802.11 standard or the like. In such a system, it is not necessary to provide the response zone after the source station has transmitted the broadcast packet like the first embodiment, but the delay amount of each of the stations capable of the relay during the multi-station transmission may be decided according to the similar procedure to that of the present embodiment by use of the nego-zone which originally exists. For example, when the procedure of the present embodiment is applied to the above-mentioned wireless LAN system, to the source wireless station 1-1 which has transmitted RTS as the multi-station simultaneous transmission request packet, the wireless stations 1-2 through 1-*n* having relay capability, which have received the RTS as the response packet, may add the wireless station ID of its own-station to the CTS to thereby return it as the response packet, and the wireless station 1-1 may decide the delay amounts during the multi-station transmission to the wireless stations 1-2 through 1-*n*, respectively. However, in this case, as well, in order to avoid a case where CTSs returned from the plurality of wireless stations collide with each other, and cannot be normally received in the wireless station 1-1, it is necessary to shift the timings of returning the CTSs in respective wireless stations.

As how to shift the return timing of the response packet, there is a method in which each wireless station decides the return timing at random like the first embodiment, but the response zone may be divided into a plurality of return zones as a Slotted Aloha method, and each wireless station may select a return zone at random and return it. Additionally, when respective wireless stations mutually recognize in advance the other wireless station IDs, a predetermined rule according to wireless station ID numbers, such as an ascending order of the wireless station ID number, or a descending order thereof may be defined in advance, and the plurality of wireless stations may return the packet according to the rule. As a result of this, it is possible to avoid the response packets from colliding with each other as much as possible.

Incidentally, it has been described in the first embodiment that the plurality of wireless stations located within the mutual communicatable area, upon receiving the broadcast packet, determine the availability of the relay transmission of the broadcast packet, and do not return the response packet if the relay transmission is not available. The wireless station which cannot perform the relay transmission, however, may transmit the response packet including the information indicating the availability of the relay transmission.

Incidentally, it has been described in the first embodiment that the channel information packet is periodically transmitted on the common channel. Here, the channel information packet may be irregularly transmitted on the common channel. For example, the wireless station which is going to newly participate in the group, and the wireless station is going to quit from the group may transmit the request-to-send packet of the channel information packet, and the management station may transmit the channel information packet after the predetermined time of receiving the request-to-send packet. In this case, as well, the wireless station which is going to newly participate in the group, by searching the predetermined time and the existing management station according to the procedure shown in FIG. 50 after transmitting the request-to-send packet, can determine whether or not its own-station should constitute the group as the management station, or should participate in the existing group.

Incidentally, it has been described in the first embodiment that the channel information packet is relay transmitted on the common channel, namely, the channel information packet is the broadcast packet. Here, the broadcast packet is not limited to the channel information packet, but may be a general information packet transmitted on the communication channel. In this case, as well, each zone shown in FIGS. 54B and 54C is provided on the communication channel, and respective wireless stations in the same group can appropriately decide the transmission timings of respective wireless stations during the multi-station simultaneous transmission according to the procedure shown in FIG. 51 through FIG. 53. However, when the destination station is the wireless station which uses another communication channel, each wireless station performs the multi-station transmission of the broadcast packet using the channel used by the group of the destination station during the multi-station transmission (FIG. 54: C-14).

Incidentally, it has been described in the present embodiment a case where the number of the wireless stations capable of the relay transmission is up to two, but even when the number of the wireless stations capable of the relay is not less than three, a suitable transmission timing is set according to the procedure of C-11 through C-14 shown in FIG. 54C to perform the multi-station simultaneous transmission during the relay transmission, so that the effect due to path diversity can be obtained certainly.

Figure 57:
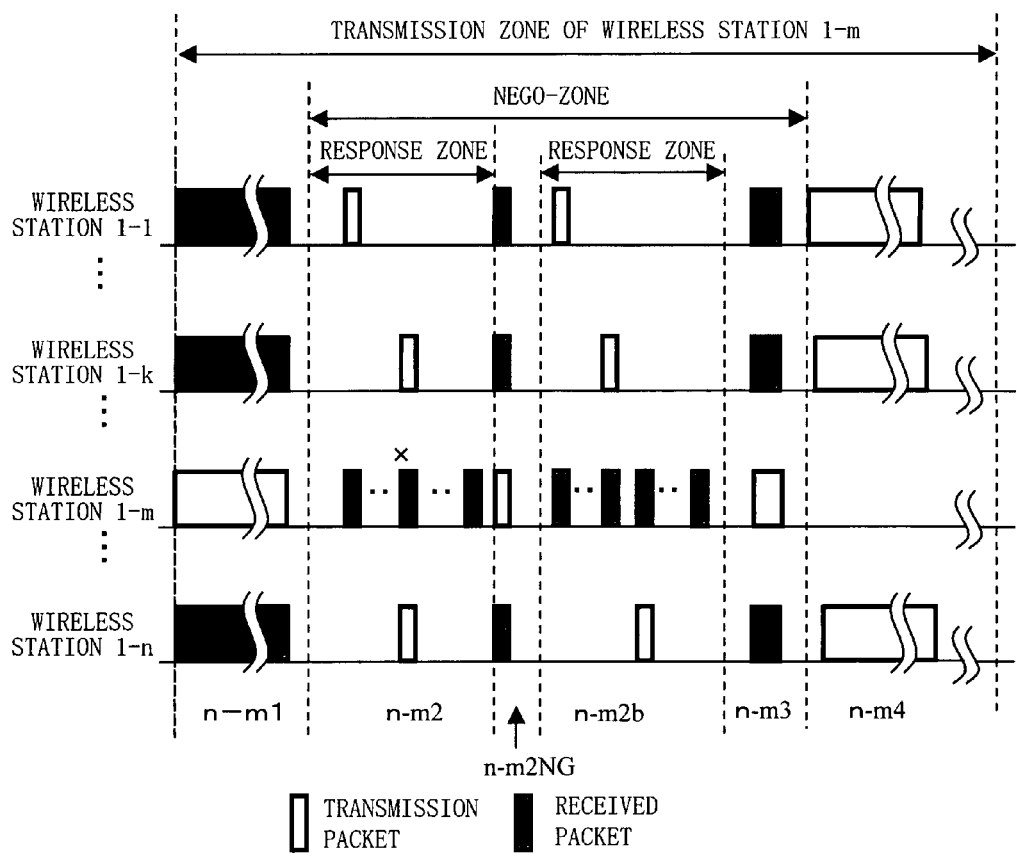
FIG. 57 is a diagram illustrating an operation of the wireless station, and a delay amount decision procedure at the time of a response packet collision according to the fifth through eighth embodiments of the present invention.

Incidentally, according to the present embodiment, each wireless station which receives the broadcast packet has transmitted the response packet at random timing in the response zone. Hence, the response packets may collide with each other in the response zone in rare cases. FIG. 57 is a diagram illustrating a transmission/reception timing of the packet when the response packets collide with each other. Note herein that in FIG. 57, n wireless stations capable performing the relay transmission exist in the group managed by the wireless station 1-1 and the procedure after the other n-1 wireless stations perform the multi-station simultaneous transmission of the broadcast packet transmitted by the wireless station 1-*m* until they perform the relay transmission is also shown. As shown in FIG. 57, if the response packets transmitted by the plurality of wireless stations collide with each other in the response zone of n-m2, there may occur a case where the packet cannot be normally received. In that case, for example, the wireless station 1-*m* that has transmitted the broadcast packet may transmit the response packet re-send request packet immediately after end of the response zone as m2NG shown in FIG. 57, and the wireless station capable of performing the relay transmission to the wireless station 1-*m* may provide the response zone as n-m2*b* again to transmit the response packet at random timing. By repeating this procedure until the wireless stations 1-*m* that have transmitted the broadcast packets can normally receive the response packets of all other wireless stations capable of performing the relay transmission, the delay amounts to be allocated to all the wireless stations that relay the packets transmitted by their own-stations can be decided. However, in order to avoid that the relay transmission will not be completed within a predetermined transmission zone of the wireless station 1-*m* resulting from continuously collisions, it is desirable to provide the upper-limit to the reset times of the response zone.

Incidentally, there is an upper-limit in the maximum number of effective branches (the maximum number of effective branches) which can contribute to the effect due to the path diversity. If, for example, the PSK-VP scheme is used as the modulation/demodulation scheme, since the delay resolution is about several times less than the symbol length, and the maximum delay is a value less than one symbol time, the number of incoming waves (a number not more than a value given by dividing the maximum delay by the delay resolution) separable in the receiving station is about at most three, so that the maximum number of effective branches is suppressed to about two and three. As a result, even when there exist so many wireless stations for performing the multi-station simultaneous transmission in number as to exceed the maximum number of effective branches, there may not be obtained the path diversity effect superior to a case in which the proper multipaths which cause the proper TDOA is certainly generated in the multi-station, the number of which is equal to the number of branches (in the above-mentioned example, three stations). Hence, in FIG. 57, if the number of the response packets from the neighboring wireless stations, which could be normally received within the response zone exceeds the maximum number of effective branches, it is desirable that the wireless station 1-*m* which has transmitted the broadcast packet, even when the collision of the response packets occurs in the response zone, does not reset the response zone, but to transmit the delay amount notice packet including the delay amount only to neighboring wireless stations which could normally receive it. Incidentally, if the delay amount to its own-station does not exist in the packet, the wireless station which has received the delay amount notice packet may not perform the relay transmission of the broadcast packet even when it is received from the wireless station which has transmitted that packet.

Moreover, a data row which is simultaneously transmitted by the plurality of wireless stations may not necessarily be fully matched, but parts intending to improve the transmission characteristics by performing the multi-station simultaneous transmission to thereby increase reliability of the data transmission may be the same.

Moreover, it has been described in the present embodiment a case where the communication is performed by use of the PSK-VP scheme as the modulation/demodulation scheme, but an effect similar to that of the present embodiment can be obtained even when communication is performed by use of the OFDM scheme as the modulation/demodulation scheme. The configuration of the modulation section when communication is performed by use of the OFDM scheme is similar to that shown in FIG. 19. In addition, the timing of the signal generated in the main part of the modulation section and the transmission start signal when communication is performed by use of the OFDM scheme is similar to that shown in FIG. 20. Further, the configuration of the demodulation section when communication is performed by use of the OFDM scheme is similar to that shown in FIG. 21.

Additionally, also when a single carrier system, such as a QPSK scheme, is used for the modulation scheme, and an equalizer for compensating channel distortion is used for the demodulation scheme, it is similar to the first embodiment, and as for the configuration of the modulation section, what is necessary is just to replace, in the configuration of the modulation section 41 shown in FIG. 6, to the waveform of the single carrier system which uses only the modulated waveform stored in the waveform memory of the waveform output section 46, so that FIG. 22 will be used for the configuration of the demodulation section.

The modulation section when communication is performed by use of the DSSS scheme has a configuration similar to that shown in FIG. 23, and the configuration of the demodulation section is similar to that shown in FIG. 24.

Modified Embodiment 1

It has been described in the fifth embodiment that each wireless station transmits the delay amount notice packet each time when it receives the response packet from other wireless stations. Note herein, the decision of the delay amount and the transmission of the delay amount notice packet may be performed only when the wireless station is newly generated, or the existing wireless station disappears. According to this modified embodiment, each wireless station generates the delay amount notice packet, only when the wireless station is newly generated within the group, or the existing wireless station within the group disappears. Incidentally, that the wireless station is newly generated within the group can be recognized by for example, the wireless station newly generated within the group transmitting the response packet immediately after receiving the channel information packet, and the existing wireless station receiving the response packet. Moreover, that the existing wireless station within the group disappears can be recognized by for example, the wireless station which is going to disappear from the group transmitting a "group leave notice packet" for indicating to leave from the group after a predetermined time immediately after receiving the channel information packet, and the existing wireless station receiving the response packet.

As described above, according to the present modified embodiment, since it is not necessary to provide the nego-zone within the transmission zone of the wireless station k each time, the deterioration in transmission efficiency due to preparing the procedure for providing the suitable timing during the multi-station transmission can be suppressed.

Modified Embodiment 2

The relay station which has received the broadcast response packet from the destination wireless station of the packet to be simultaneously transmitted may transmit a notice of receiving the broadcast response packet to the source wireless station. In this case, the source wireless station, upon receiving this notice, may notify that the multi-station simultaneous transmission is canceled to other wireless stations. The source wireless station may include the simultaneous transmission canceling section for this notice.

Sixth Embodiment

The wireless transmission system in accordance with the present embodiment is different from the fifth embodiment in that after the wireless station transmits the packet, the wireless station serving as the source station also transmits the same packet again when other wireless stations relay-transmit the packet.

Figure 58:
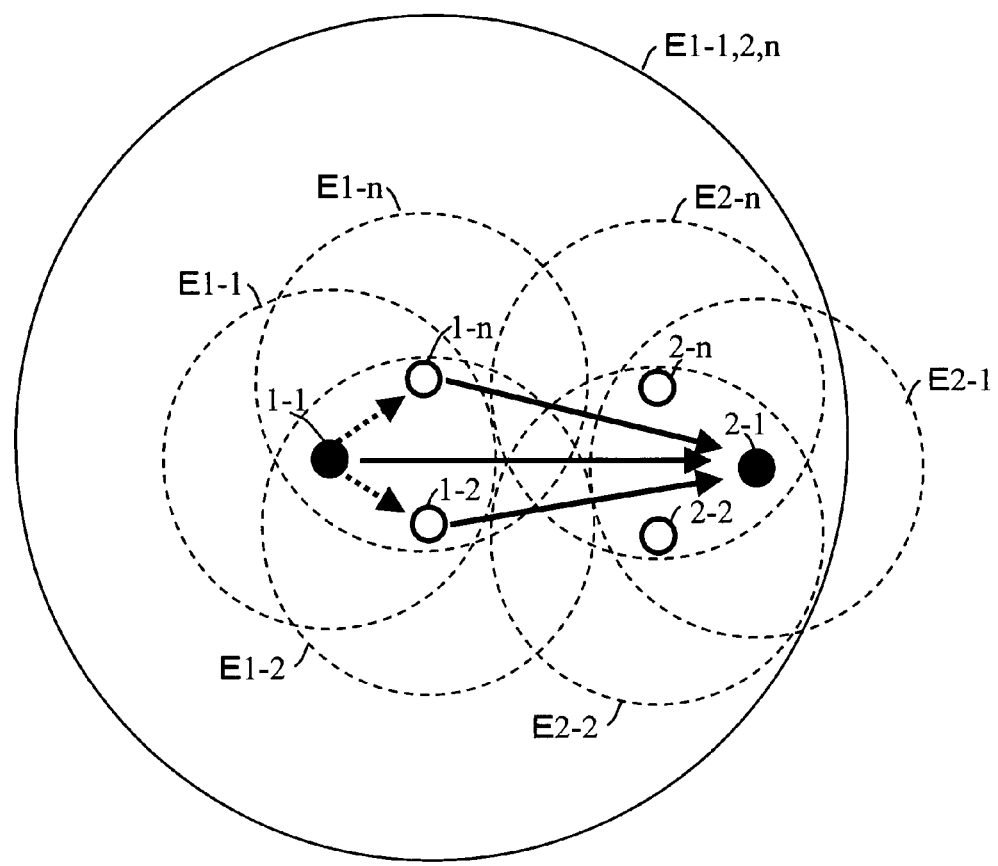
FIG. 58 is a diagram illustrating an example of a relay transmission method according to the sixth embodiment of the present invention.

FIG. 58 is a diagram illustrating an example of the relay transmission in the second embodiment. As shown in FIG. 58, the wireless station 1-1 serving as the source wireless station transmits the packet to be relay-transmitted to the wireless stations 1-2 and 1-*n* (bold dotted line in FIG. 58), and thereafter, retransmits this packet to the destination station (bold line in FIG. 58) when the wireless stations 1-2 and 1-*n* perform the relay transmission thereof. Incidentally, since the configuration of the wireless transmission system and the wireless station in accordance with the present embodiment is similar to that of the fifth embodiment, FIGS. 43A, 43B, and FIG. 48 will be used, respectively.

In the present embodiment, the wireless station which relay-transmits the packet sets a timing after a lapse of the predetermined time from the timing when the reception of the broadcast packet is completed, as the reference timing. Additionally, the wireless station being the source wireless station of the packet sets a timing after a lapse of the predetermined time from the timing when the packet is once transmitted, as the reference timing. It will be described that these two reference timings are coincident with each other.

Figure 59A:
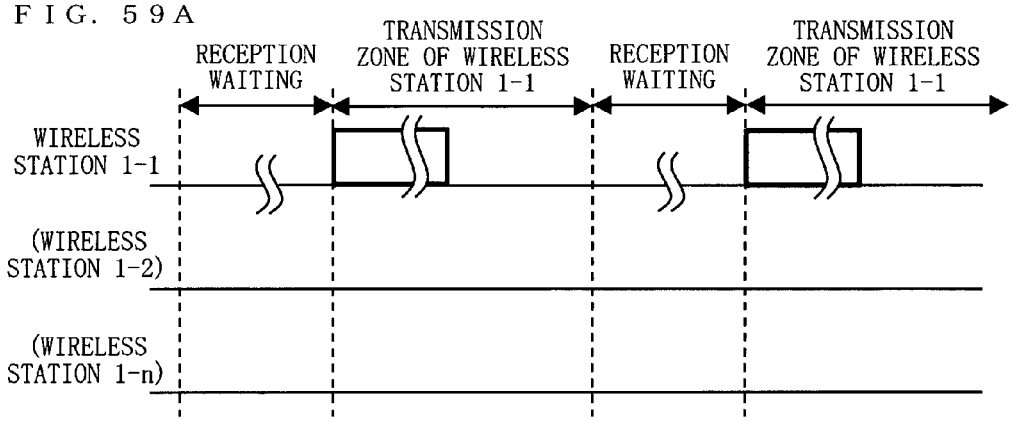
FIG. 59A is a diagram illustrating an operation of the wireless station and a delay amount decision procedure according to the sixth embodiment of the present invention.

FIG. 59A through 59A are diagrams illustrating an example of a procedure in accordance with the sixth embodiment after one wireless station 1-1 is generated, and the one wireless station 1-1 constitutes the group to be a group configuration shown in FIG. 1, until the multi-station simultaneous transmission of the broadcast packet transmitted from the wireless station 1-1 is performed with the proper time difference during the relay transmission. Since a change of the group configuration will be described by use of an example similar to that of the fifth embodiment, FIGS. 55A through 55C will be used.

Hereinafter, referring to FIGS. 55A through 55C, and FIGS. 59A through 59A, an operation and a procedure of each wireless station until the wireless stations in the present embodiment negotiate with each other to decide the delay amount of each wireless station during the multi-station simultaneous transmission will be described focusing on the difference with the fifth embodiment.

First, as shown in FIG. 55A, the operation of the wireless station 1-1 when only the wireless station 1-1 exists in the group is similar to that of the fifth embodiment.

The operation of the wireless station in accordance with the sixth embodiment differs from that in the fifth embodiment in the operation at Step S263 in the flow chart shown in FIG. 51. The wireless station in accordance with the sixth embodiment determines at Step S263 whether or not the number of stations capable of the relay is not less than one. If the number of stations capable of the relay is not less than one, the process then proceeds to the operation at Step S264 and following Steps, and the delay amount notice packet is generated and transmitted. Since the operation other than that is similar to that of the fifth embodiment, FIGS. 50 through FIG. 53 will be used.

Figure 59B:
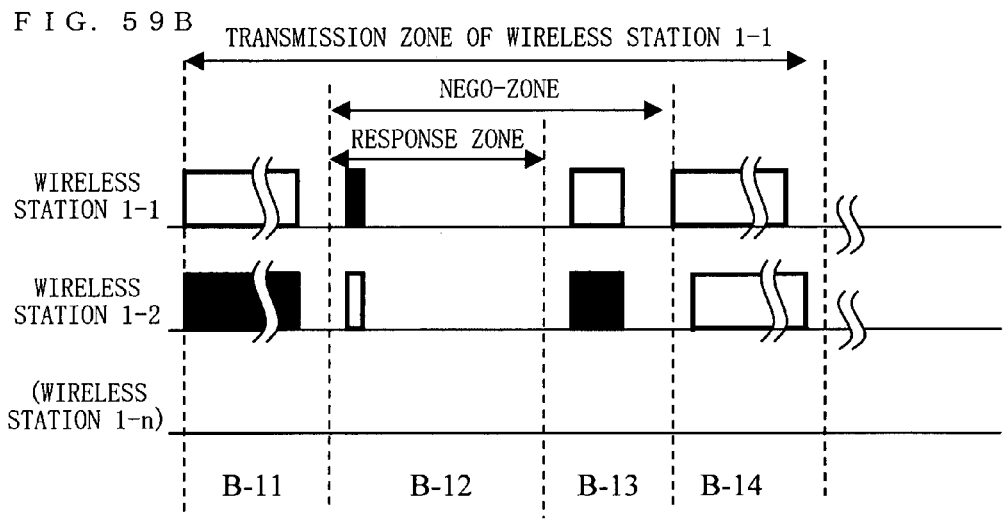
FIG. 59B is a diagram illustrating the operation of the wireless station and the delay amount decision procedure according to the sixth embodiment of the present invention.

If the system configuration changes from a state shown in FIG. 55A to a state shown in FIG. 55B, the wireless station 1-2 newly participated in the group, upon receiving the broadcast packet transmitted by the wireless station 1-1, generates the response packet and transmits the response packet in the response zone (FIG. 59B: B-12). The wireless station 1-1 recognizes that the number of wireless stations capable of performing the relay transmission of the transmission packet of its own-station is one based on the response packet notified by the ending time of the response zone.

In the fifth embodiment, when the number of the wireless station capable of performing the relay transmission is one, the delay amount to be allocated to other wireless stations has not decided. In the present embodiment, since the wireless station 1-1 serving as the source wireless station retransmits the packet, the multi-station simultaneous transmission can be performed during the relay transmission even when the number of the wireless station capable of performing the relay transmission is one. As a result, in the wireless station 1-1, the delay amount determining section 36 decides the delay amount of the wireless station 1-2 as the value ($\tau$) that is properly shifted from the reference timing, and while recording it on the delay amount record table 37, notifies it to the transmission packet processing section 40. In addition, at this time, the delay amount determining section 36 also decides the delay amount to be allocated to its own-station.

Subsequently, within a predetermined time immediately after the end of the response zone, the wireless station 1-1 generates the delay amount notice packet including the decided delay amount to transmit it to the wireless station 1-2 (FIG. 59B: B-13). This point is different from the fifth embodiment. According to the present embodiment, the operation and the procedure in FIG. 54C are already performed in the state in FIG. 55B, and each wireless station decides the delay amount to be given to the packet during the multi-station simultaneous transmission. As for the operation and the procedure after B-13 shown in FIG. 59B, except for deciding also the delay amount to be allocated to its own-station during the multi-station simultaneous transmission, and transmitting, at B-13 shown in FIG. 59B, the delay amount notice packet including also that value, the operations and the procedure are the same as those after C-13 shown in FIG. 54C in the fifth embodiment, so that detailed description thereof will be omitted.

Next, since a case where the group configuration changes from the state shown in FIG. 55B to a state shown in FIG. 55C is also similar to that of the first embodiment (FIG. 54C) except for deciding also the delay amount to be allocated to the source wireless station itself as the transmission timing during the multi-station simultaneous transmission, description thereof will be omitted.

Figures 60A, 60B, 61A:
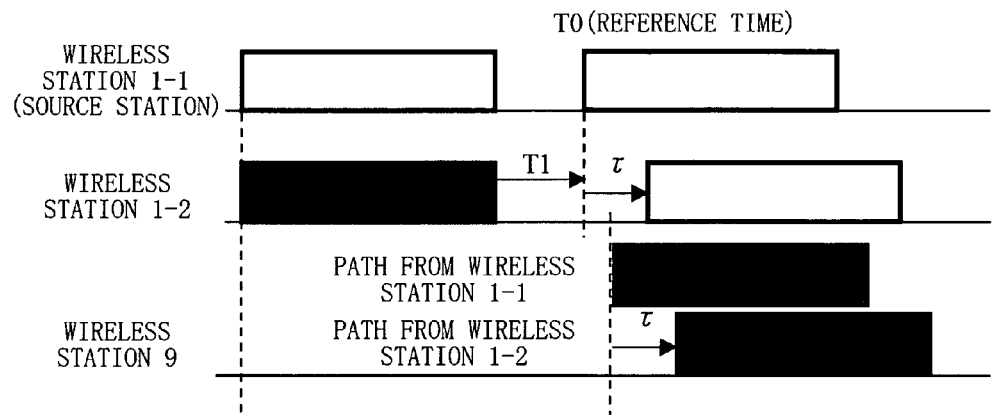
FIG. 60A is a diagram illustrating an example of a delay amount record table of the wireless station according to the sixth embodiment of the present invention.
FIG. 60B is a diagram illustrating an example of a packet transmission timing during a multi-station simultaneous transmission of the wireless station according to the sixth embodiment of the present invention.
FIG. 61A is a diagram illustrating an example of the delay amount record table of the wireless station according to the sixth embodiment of the present invention.

FIG. 60A is a diagram illustrating an example of the delay amount record table when the wireless stations 1-1 and 1-2 in the relative position shown in FIG. 55B set the delay amounts according to the procedure shown in FIG. 59B. The wireless stations 1-1 and 1-2 refer to the delay amount record table shown in FIG. 60A to decide the delay amount to be given to the packet when other stations relay-transmit the packet. For example, when the wireless station 1-1 is the source wireless station of the packet, the wireless station 1-2, upon relay-transmitting the packet received from the wireless station 1-1, transmits it with a timing delayed relative to the reference timing (T0) by the delay amount $\tau$.

FIG. 60B is a diagram illustrating a transmission timing of the packet where, in the wireless stations 1-1, 1-2 and the wireless station 9 which is not shown having the relative position shown in FIG. 55B, the broadcast packet is transmitted from the wireless station 1-1, is relayed at the wireless station 1-2, and arrives at the wireless station 9. It is assumed here that the wireless stations 1-1 and 1-2 keep the delay amount record table shown in FIG. 60A.

As shown in FIG. 60B, the wireless station 1-2, upon receiving the delay amount notice packet transmitted from the wireless station 1-1, will decide the transmission start timing in a procedure similar to that of the first embodiment. The wireless station 1-1 sets a timing after a lapse of the predetermined time from the timing when the broadcast packet is transmitted, as the reference timing (T0), and transmits the broadcast packet by setting that time as the transmission timing. The wireless station 1-1 and the wireless station 1-2 are located so close to each other that the propagation time can be ignored as compared with the proper time difference $\tau$ which can provide the path diversity effect. Consequently, the wireless station 9 receives the packets transmitted from two wireless stations with an TDOA of a value very close to the proper transmission time difference $\tau$ which provides the effect due to the path diversity. Hence, the wireless station 9 can obtain the effect due to the path diversity to the maximum extent.

Figure 59C:
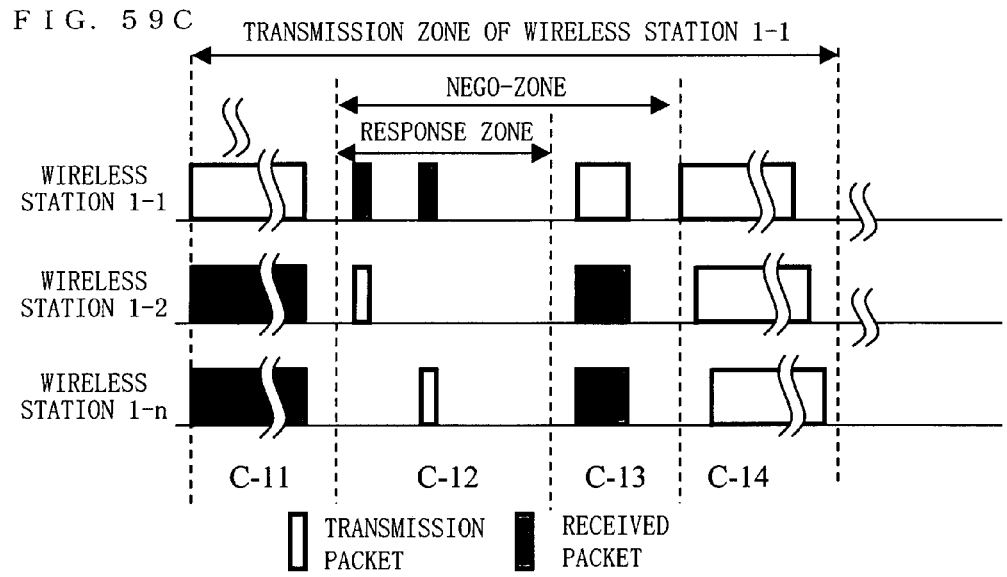
FIG. 59C is a diagram illustrating the operation of the wireless station and the delay amount decision procedure according to the sixth embodiment of the present invention.

FIG. 61A is a diagram illustrating an example of the delay amount record table of the wireless stations 1-1 through 1-*n* in the relative position shown in FIG. 55C at the time of setting the delay amount according to the procedure shown in FIG. 59C. Incidentally, it will be described in the present embodiment such that the maximum number of effective branches of the wireless system is three (for example, a system for performing a RAKE reception, with three fingers at the receiving end, of a modulation signal generated by performing spread spectrum with a spread code whose spread code length is four chips at the transmitting end, by use of a spectrum spread scheme as the modulation/demodulation scheme).

In FIG. 61A, the delay amount $\tau$ is not more than the maximum delay, and the delay amount $\tau/2$ is not less than the delay resolution. For example, in the system in which the spectrum spread scheme is used for the modulation/demodulation scheme, the maximum delay corresponds to a value not more than the spread code length, and the delay resolution corresponds to a value not less than one-chip length of the spread code.

Figure 61B:
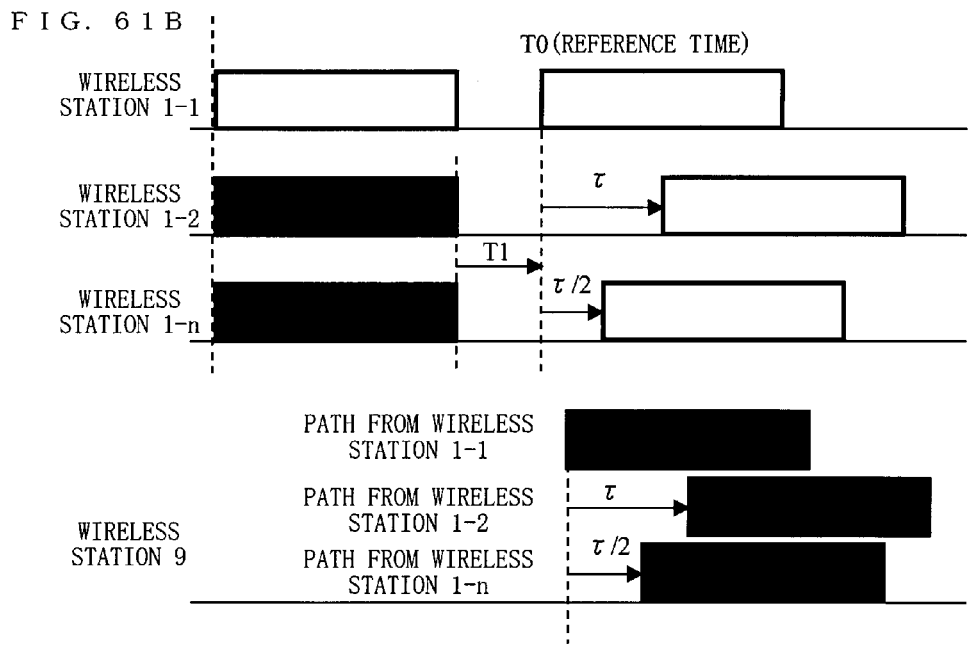
FIG. 61B is a diagram illustrating an example of a packet transmission timing during a multi-station simultaneous transmission of the wireless station according to the sixth embodiment of the present invention.

FIG. 61B is a diagram illustrating a timing when the wireless stations 1-1 through 1-*n* in the relative position shown in FIG. 58 perform the multi-station simultaneous transmission of the broadcast packet according to the delay amount record table shown in FIG. 61A.

As shown in FIG. 61B, the wireless stations 1-2 through 1-$n$ set a timing after a lapse of the predetermined time (T1) from the timing when the reception of the broadcast packet transmitted from the wireless station 1-1 is completed, as the reference timing (T0). The wireless station 1-2 transmits the broadcast packet using a timing delayed from the reference timing by the delay amount $\tau$, as the transmission start timing. Meanwhile, the wireless station 1-$n$ transmits the broadcast packet using a timing delayed from the reference timing by the delay amount $\tau/2$, as the transmission start timing.

The wireless station 1-1 serving as the source of the broadcast packet sets a timing after a lapse of the predetermined time from the timing when the broadcast packet is transmitted, as the reference timing (T0), and transmits the broadcast packet by setting that time as the transmission timing. Since the wireless stations 1-2 through 1-$n$ are located so close to each other that the propagation time can be ignored as compared with the proper time difference $\tau/2$ which can provide the path diversity effect, the packets transmitted from the three wireless stations, any two of them are selected, arrive at the wireless station 9 with a value very close to the proper transmission time difference $\tau/2$, or $\tau$ which can provide the path diversity effect. Hence, the wireless station 9 can obtain the effect due to the path diversity to the maximum extent.

As described above, according to the present embodiment, since the source wireless station retransmits the broadcast packet, the multi-station simultaneous transmission can be performed by providing the proper time difference even when there is only one wireless station capable of performing the relay transmission, so that the effect due to the path diversity can be certainly obtained. Additionally, when the number of the wireless stations capable of performing the relay transmission is small as compared with the maximum number of effective branches, the great path diversity effect can be obtained compared with the wireless system of the fifth embodiment.

Incidentally, it has been described in the present embodiment a case where the number of the wireless stations capable of communicating with each other is three stations, but even when it becomes not less than four stations, suitable delay amounts during the multi-station simultaneous transmission can be certainly set to respective wireless stations according to the procedure of C-11 through C-14 shown in FIG. 59C.

Incidentally, in a manner similar to the fifth embodiment, it is possible also in the present embodiment to use the negotiation packet also as the multi-station status confirmation packet and the response packet in a system of transmitting and receiving the negotiation packet for confirming whether or not the information packet can be transmitted prior to communication (for example, RTS/CTS of an IEEE802.11 standard).

Incidentally, in such a system, it has been described in the fifth embodiment that the wireless station ID (return wireless station ID) for returning the response packet is included in the response packet. Hence, when the plurality of response packet are returned, each response packet differs in value of an insert portion in the return wireless station ID. For that reason, it has been described that each wireless station returns the response packet at random timing so as not to cause the collision of the packets as less as possible. Also in the present embodiment, as a matter of course, the response packet may be similarly returned at random timing from each wireless station as assuming that each response packet mutually includes a value different from that of the other. Here, in the present embodiment, the response packets may be returned almost simultaneously from respective wireless stations as assuming that the response packet is completely the same in all the wireless stations, namely, without including the return wireless station ID in the response packet. Namely, the multi-station simultaneous transmission of the response may also be performed upon transmission of the response packet from each wireless station. In this case, although the number of stations capable of the relay cannot be recognized even when the response packet is received, that the wireless station capable of performing the relay transmission exists at least one or more in its neighborhood can be recognized. In the present embodiment, the delay amount different from that of the station capable of the relay is provided in the source station, and both of the source station and the station capable of the relay perform the multi-station simultaneous transmission of the broadcast packet at the proper transmission time difference. Therefore, also in this case, the effect due to the path diversity corresponding to two branches can be certainly obtained.

Seventh Embodiment

The wireless transmission system in accordance with a seventh embodiment is different from the sixth embodiment in that the delay amount is defined in advance to the source wireless station, and the source station retransmits the packet during the relay transmission at a timing different from the reference timing (T0). The wireless transmission system, the configuration of the wireless station, and the delay amount decision procedure other than that are similar to those of the fifth embodiment and the sixth embodiment.

Figure 62A:
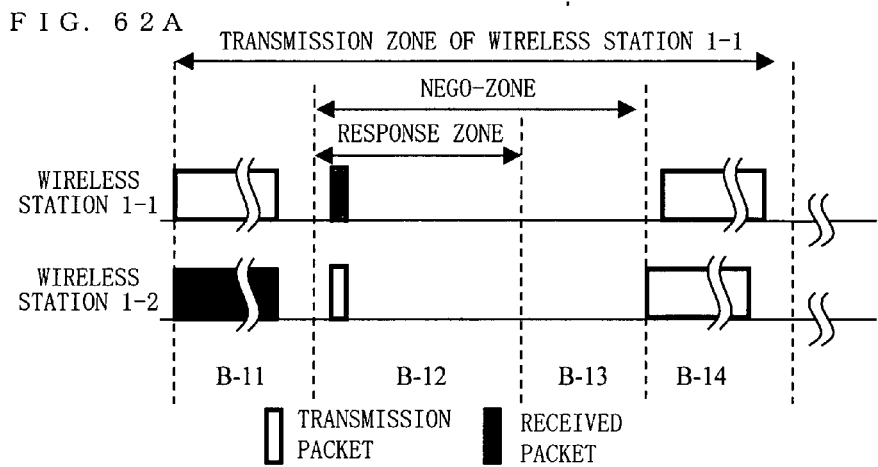
FIG. 62A is a diagram illustrating an operation of the wireless station and a delay amount decision procedure according to the seventh embodiment of the present invention.

FIG. 62A is a diagram illustrating an example of a procedure in the seventh embodiment after the one wireless station 1-1 is generated, the wireless station 1-1 constitutes the group, and it becomes the group configuration shown in FIG. 55B, until the multi-station simultaneous transmission of the broadcast packet transmitted from the wireless station 1-1 is performed with the proper time difference during the relay transmission. The wireless station in accordance with the present embodiment is different from the wireless station shown in FIG. 59B (the fifth embodiment) in that the delay amount notice packet is not transmitted in the zone of B-13 shown in FIG. 62B.

Each wireless station, when the relay-transmission of the broadcast packet is performed by other stations, keeps in advance the delay amount given to the packet when its own-station (source wireless station) retransmits the packet. For example, each wireless station, when its own-station serves as the source wireless station of the packet, uses a timing delayed from the reference timing (T0) by the proper delay amount ($\tau$), as the transmission start timing. Hence, as shown in FIG. 62A, the wireless station 1-1, when the number of stations capable of the relay is one, does not generate the delay amount notice packet.

The wireless station 1-2 which does not receive the delay amount notice packet, upon relay-transmission of the broadcast packet, transmits the broadcast packet without giving the delay amount thereto. Namely the wireless station 1-2 uses the predetermined reference timing (T0) as the transmission start timing during the relay transmission. As a result, when the wireless station 1-2 relay-transmits the broadcast packet and the wireless station 1-1 retransmits the packet, there is an TDOA of $\tau$ between the packets arriving at an arbitrary receiving point.

Figure 62B:
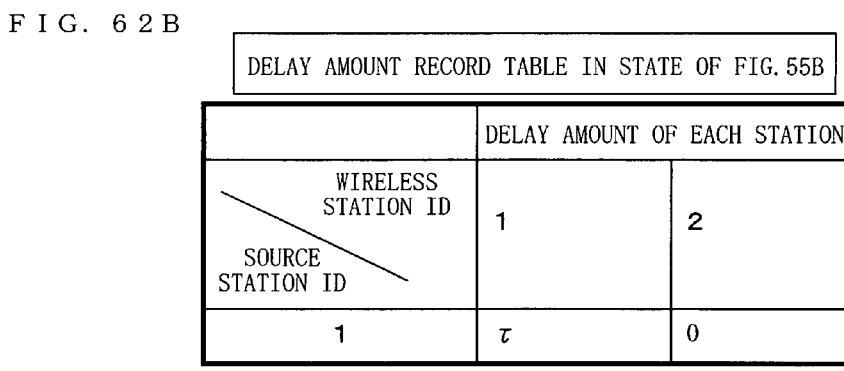
FIG. 62B is a diagram illustrating an example of a delay amount record table of the wireless station according to the seventh embodiment of the present invention.

FIG. 62B is a diagram illustrating an example of the delay amount record table when the wireless stations 1-1 and 1-2 in the relative position shown in FIG. 55B set the delay amount according to the procedure shown in FIG. 62A. When each of the wireless stations 1-1 and 1-2 retransmits the broadcast packet, the delay amount to be given to the packet is set in advance. As a result, when there is only one wireless station capable of performing the relay transmission of the broadcast packet, each wireless station can keep the delay amount record table shown in FIG. 62B, even when the delay amount notice packet is not transmitted.

FIG. 62C is a diagram illustrating a transmission/reception timing of the packet when the wireless station 1-2 performs the relay transmission of the broadcast packet that the wireless station 1-1 in the relative position shown in FIG. 55B has transmitted. The wireless station 9 is the destination station of the broadcast packet transmitted by the wireless station 1-1. As shown in FIG. 62C, the packets transmitted from two wireless stations arrive at the wireless station 9, which is not illustrated, with a value very close to the proper transmission time difference τ which can provide the path diversity effect. Hence, the wireless station 9 can provide the path diversity effect to the maximum extent to thereby receive the packet normally.

As described above, according to the present embodiment, when the number of the wireless stations capable of performing the relay transmission of the packet is two, the delay amount that each wireless station gives to the packet can be set without transmitting the delay amount notice packet. As a result, since it is not necessary to prepare the zone for transmitting/receiving the delay amount notice packet, the maximum path diversity effect can be certainly provided while suppressing the deterioration in transmission efficiency as compared with the method of the sixth embodiment.

Incidentally, it has been described in the present embodiment a case where the number of the wireless stations is two. Note herein, even when the number of the wireless stations is not less than three, and the maximum number of effective branches is only two, the present embodiment is useful. FIG. 63A is a diagram illustrating a transmission/reception timing of the packet where, when the maximum number of effective branches is two, not less than three wireless stations perform the multi-station simultaneous transmission of the packet. FIG. 63B is a diagram illustrating an example of the table that the wireless station which transmits and receives the broadcast packet at the timing shown in FIG. 63A keeps. In FIG. 63B, the delay amount allocated to the source wireless station is τ. Meanwhile, the delay amount allocated to the wireless station which relay-transmits the packet transmitted from other wireless stations is 0. Also in this case, each wireless station can decide the delay amount that each wireless station gives to the packet to be optimal, without the source wireless station transmitting the delay amount notice packet to other wireless stations (relay station). As a result, since it is not necessary to prepare the zone for transmitting/receiving the delay amount notice packet, the maximum path diversity effect can be certainly provided while suppressing the deterioration in transmission efficiency as compared with the method of the sixth embodiment.

Incidentally, when the maximum number of effective branches is not less than three, the wireless stations other than the source wireless station also need to properly shift the transmission start timing in order to obtain the effect due to the path diversity to the maximum extent. In this case, the delay amount notice packet may be transmitted in a procedure similar to that shown in FIG. 59C in the second embodiment, and the delay amount record table shown in FIG. 64A may be provided to each wireless station, for example. In the present embodiment, however, since the delay amount to be allocated to the source wireless station is defined as τ in advance, the delay amount notice packet does not need to include the data for indicating the delay amount of the source wireless station. Hence, the delay amount notice packet length can be slightly reduced as compared with the sixth embodiment. Consequently, the zone for transmitting the delay amount notice packet shown in C-13 of FIG. 59C can be slightly reduced. As a result, even when the maximum number of effective branches is not less than three, the effect due to the path diversity can be obtained to the maximum extent while suppressing the deterioration in transmission efficiency as compared with the second embodiment.

Eighth Embodiment

In the fifth embodiment, only the source wireless station of the broadcast packet has received the response packet responsive to the broadcast packet. In contrast with this, according to an eighth embodiment, the wireless stations other than the source of the broadcast packet also receive the response packets transmitted by other wireless stations. Since the configuration of the wireless transmission system and the block configuration of the wireless station other than that, and the negotiation procedure of the channel information between the systems are similar to those in the fifth embodiment, description thereof will be omitted.

Hereinafter, referring to FIGS. 55A through 55C, and FIGS. 65A through 65C, a procedure in which the wireless stations 1-1 through 1-n in accordance with the present embodiment negotiate with each other to decide the delay amount that each wireless station gives to the packet during the multi-station simultaneous transmission will be described focusing on the difference from the fifth embodiment.

Figures 64A, 64B, 65A:
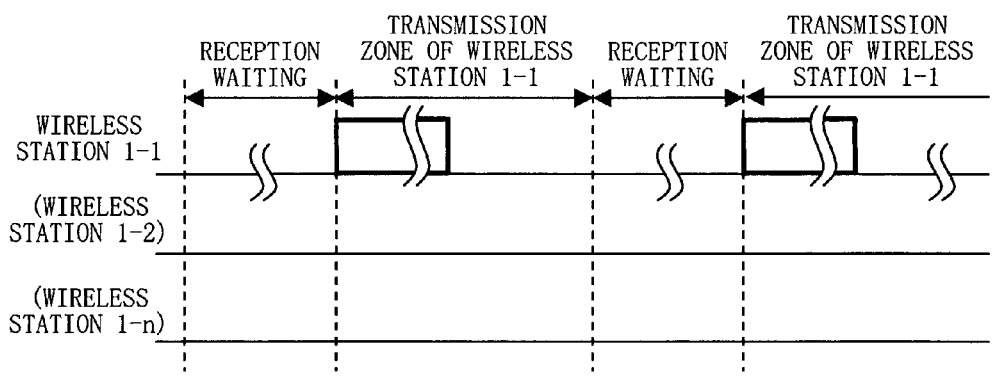
FIG. 64A is a diagram illustrating an example of the delay amount record table according to the fifth through eighth embodiments of the present invention.
FIG. 64B is a diagram illustrating an example of the delay amount record table according to the fifth through eighth embodiments of the present invention.
FIG. 65A is a diagram illustrating an operation of the wireless station and a delay amount decision procedure according to the eighth embodiment of the present invention.
Figure 65B:
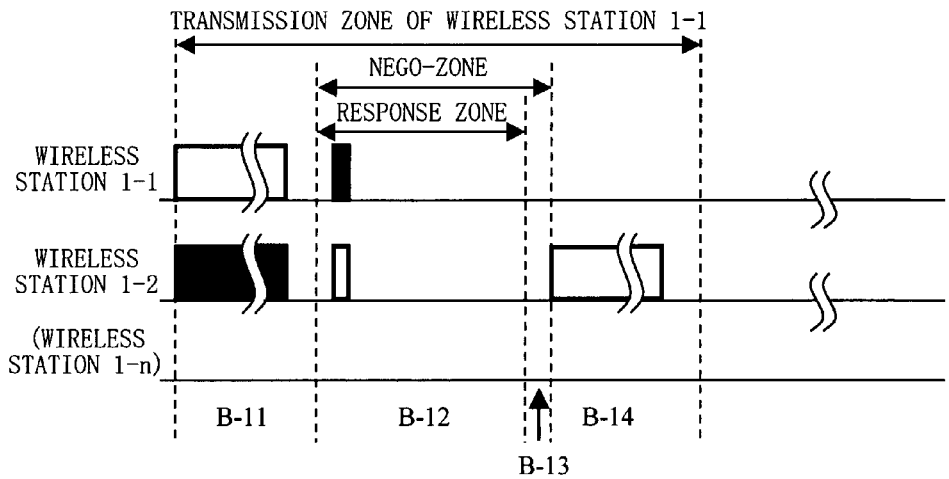
FIG. 65B is a diagram illustrating the operation of the wireless station and the delay amount decision procedure according to the eighth embodiment of the present invention.
Figure 65C:
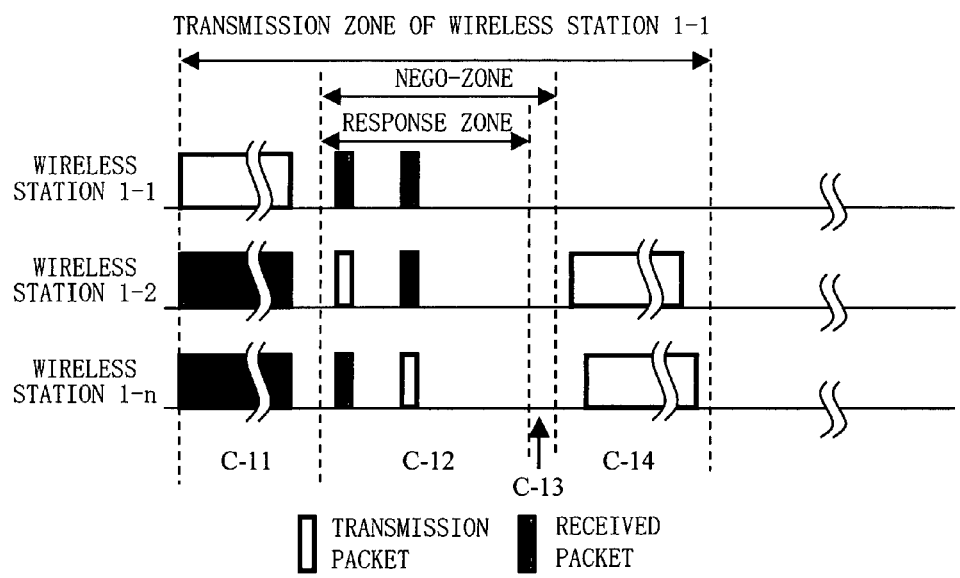
FIG. 65C is a diagram illustrating the operation of the wireless station and the delay amount decision procedure according to the eighth embodiment of the present invention.

FIGS. 65A through 65C are diagrams illustrating an example of the procedure in accordance with the fourth embodiment after the one wireless station 1-1 is generated, the wireless station 1-1 constitutes the group, and it becomes the group configuration shown in FIG. 1, until the multi-station simultaneous transmission of the broadcast packet transmitted from the wireless station 1-1 is performed with the proper time difference during the relay transmission. FIGS. 65A through 65C correspond to FIGS. 55A through 55C, respectively, and illustrate the transmission/reception timing of the packet in the wireless station. First, the operation of the wireless stations 1-1 and 1-2 having the group configuration shown in FIG. 55A or FIG. 55B is similar to that of the fifth embodiment. However, as is understood from the comparison between FIG. 54B and FIG. 65B, a zone shown in FIG. 65B for deciding the delay amount and recording the delay amount on the delay amount record table 37 by each wireless station can be reduced significantly compared with that of the fifth through seventh embodiments shown so far. This reason will be described later.

Next, a case where the group configuration changes from the state shown in FIG. 55B to the state shown in FIG. 55C will be described. First, the wireless station 1-n, while observing the common channel for the predetermined period in a manner similar to that of the first embodiment, searches for the existing neighboring management station according to the procedure shown in FIG. 50. Thereafter, the wireless stations 1-2 and 1-n, upon receiving the broadcast packet transmitted by the wireless station 1-1 (FIG. 65C: C-11), generates the response packet responsive to the broadcast packet transmitted by the wireless station 1-1 according to the procedure shown in FIG. 52 if its own-station is in a state of capable of performing the relay of the packet, and transmits the response packet in the response zone at random timing (FIG. 65C: C-12).

The wireless station 1-1 receives the response packet transmitted from the wireless stations 1-2 and 1-$n$. Additionally, in this response zone, the wireless station 1-2 also receives the response packet transmitted by the wireless station 1-$n$, and the wireless station 1-$n$ also receives the response packet transmitted the wireless station 1-2. This is different point from the fifth embodiment.

Thus, in the wireless station 1-2, the delay amount determining section 36 can recognize the wireless station 1-$n$ as the station capable of the relay of the wireless station 1-1 even when it does not receive the delay amount notice packet from the wireless station 1-1. Similarly, in the wireless station 1-$n$, the wireless station 1-2 can be recognized as the station capable of the relay of the wireless station 1-1.

As is understood, the wireless station 1-2 receives the response packets transmitted by other wireless station 1-$n$ responsible to the broadcast packet transmitted by the wireless station 1-1, recognizes that other wireless station 1-$n$ can perform the relay transmission of the broadcast packet transmitted by the wireless station 1-1 based on the source ID (neighboring station information) included in the response packet, and recognizes that the number of stations capable of the relay, which performs the multi-station simultaneous transmission is two including its own-station. Similarly, the wireless station 1-$n$ also recognizes that other wireless station 1-2 can perform the relay transmission of the broadcast packet transmitted by the wireless station 1-1 by receiving the response packet transmitted other wireless station 1-2, and recognizes that the number of stations capable of the relay, which performs the multi-station simultaneous transmission is two 2 including its own-station. Each wireless station then decides the delay amount to be allocated to each wireless station upon relay-transmission of the broadcast packet of the wireless station 1-1. Incidentally, each wireless station decides the delay amount to be allocated to each wireless station according to a delay amount decision rule defined in advance, so that the delay amount decided to the same wireless station may not be different values.

Thus, each wireless station decides the delay amount individually. As a result, since it is not necessary to prepare the area for transmitting the delay amount notice packet as the fifth embodiment (FIG. 54C: C-13), a time for deciding the delay amount can be extremely reduced. Hence, the maximum path diversity effect can be certainly provided while suppressing the deterioration in transmission efficiency as compared with the fifth embodiment.

In the present embodiment, it is assumed as the delay amount decision rule that, among predetermined candidate values of the plurality of delay amounts according to the maximum number of effective branches, and the number of stations capable of the relay obtained from the neighboring station information notified by the ending time of the response zone, a smaller value is given to the wireless station in the order of previously transmitting the response packet. Incidentally, it is assumed in the present embodiment that are known parameters of the modulation/demodulation scheme used for a wireless communication system and the maximum number of effective branches defined by constraints on implementation of the wireless station.

For example, when the maximum number of effective branches is 4, it is assumed as the delay amount that, among two delay amounts of 0 and $\tau$ when the number of during the relay transmission multi-stations is two stations, three delay amounts of 0, $\tau/2$, and $\tau$ when the number of multi-stations is three stations, and four delay amounts of 0, $\sigma/3$, $2\tau/3$, $\tau$ when the number of multi-stations is not less than four stations, a smaller value is given to the wireless station in the order of previously transmitting the response packet. According to this delay amount decision rule, when, as shown in FIG. 65C, the wireless stations 1-2 and 1-$n$ sequentially return the response packets responsive to the broadcast packet of the wireless station 1-1, the delay amount record table shown in FIG. 56A will be kept in each wireless station in the same manner as that of the first embodiment. Incidentally, it is assumed here that the delay amount $\tau$ is not more than the maximum delay, and the delay amount $\tau/3$ is not less than the delay resolution. Incidentally, the delay amount decision rule is not limited to this, but for example, a larger value may be given to the wireless station in the order of previously transmitting the response packet, or a smaller value may be given to the wireless station in the order of the ID number of the wireless station that has transmitted the response packet.

Incidentally, it has been described in the present embodiment a case where the number of the wireless stations capable of communicating with each other is three stations, but even when it becomes not less than four stations, each wireless station, while receiving the response packet transmitted from other wireless stations in the response zone of C-12 shown in FIG. 65C, can certainly set a suitable delay amount during the multi-station simultaneous transmission to each of the wireless stations according to the predetermined rule in the zone of C-13.

Incidentally, in the above fifth through eighth embodiments, the nego-zone has been provided each time upon transmitting the broadcast packet. Here, the nego-zone may not be provided each time but may be provided irregularly. In this case, for example, only when the wireless station newly participates in the same group, the wireless station disappears from the group, the wireless station, which has been in a state of capable of performing the relay transmission until now, become incapable of performing the relay transmission, or in a case contrary to that, those wireless stations transmit the negotiation request packet for requesting to perform the negotiation again to the existing wireless stations, and each wireless station transmits the broadcast packet as the source station for the first time after the negotiation request packet is transmitted, the nego-zone may be provided. Anyway, since the negotiation is certainly performed when the number of wireless stations changes, namely, when the number of multi-stations changes, the multipaths with the proper TDOA can be generated during the multi-station simultaneous transmission even when the number of multi-stations changes according to the present invention, and thus allowing the path diversity effect to be certainly provided.

In the above fifth through eighth embodiments, one channel has been defined in advance as the common channel, and the newly generated wireless station has observed the common channel first, but the common channel does not need to be defined as one channel in advance. For example, the wireless station that exists first may exclusively define one of a plurality of communication channels as the common channel for negotiating with another wireless station generated later, or a communication channel used for the communication with a terminal of its own-station and the common channel may be shared. Incidentally, in that case, the wireless station first perform a channel search for recognizing which channel of the plurality of communication channels the common channel is along with the search for the neighboring management station.

Incidentally, it has been described in the fifth through eighth embodiments that the reference timing (T0) is the timing after a lapse of the predetermined time from the timing when the wireless station completes the reception of the broadcast packet. Here, the reference timing (T0) may be a timing after a lapse of the predetermined time from the timing when the wireless station detects the unique word included in the packet. Moreover, by use of a beacon signal for synchronizing between the wireless stations, a timing after a lapse of the predetermined time from the timing when the reception of the beacon signal is completed may be set as the reference timing (T0). Alternatively, each wireless station may obtain the reference timing from a time entry obtained from a radio-controlled clock, or each wireless station may have a GPS (Global Positioning System) to obtain the reference timing from a time entry included in a GPS signal.

Incidentally, in the fifth through eighth embodiments, as shown in FIG. 56A, FIG. 61A, and FIG. 64A, the delay amounts of the delay amounts allocated to all the wireless stations have been recorded on the delay amount record table 37 that each wireless station which performs the multi-station simultaneous transmission keeps. Here, each wireless station may record only the delay amount allocated to its own-station on the delay amount record table. FIG. 64B is a diagram illustrating an example of the delay amount record table when each wireless station records only the delay amount allocated to its own-station. For example, as shown in FIG. 64A, when the delay amount allocated to each wireless station is decided, the delay amount record table that each wireless station keeps will be one shown in FIG. 64B.

Thus, memory capacity required for storing the delay amount record table can be reduced. As a result, an increase in memory capacity required for storing the delay amount record table can be suppressed even when the number of stations capable of performing the multi-station simultaneous transmission is increased.

Incidentally, when there is any available room in the memory capacity of the wireless station, it is desirable to provide, as the delay amount record table, the same delay amount record table that records the delay amounts of all the wireless stations as shown in FIG. 56A, FIG. 61A, and FIG. 64A to each wireless station, as shown the example of the delay amount record table in the first through fourth embodiments. The reason is that even when the number of the wireless stations which constitutes the wireless system is reduced as shown from FIG. 66A and FIG. 66B, if the timing change rule of the remaining wireless stations is defined in advance, the transmission timing of each wireless station can be appropriately decided without transmitting the delay amount notice packet described in the fifth through seventh embodiments, so that the maximum path diversity effect can be certainly provided while suppressing the deterioration in transmission efficiency without the need of the area for transmitting the delay amount notice packet. This will be described below.

Figure 66A:
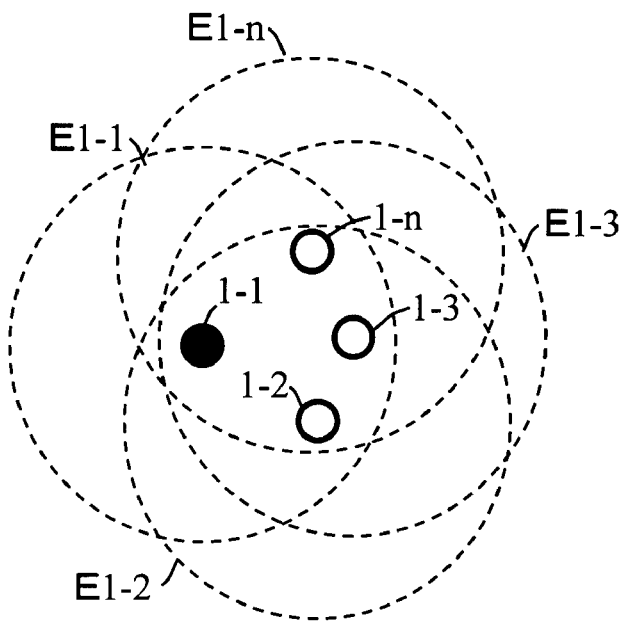
FIG. 66A is a diagram illustrating an example of a configuration change of a wireless transmission group according to the fifth through eighth embodiments of the present invention.
Figure 66B:
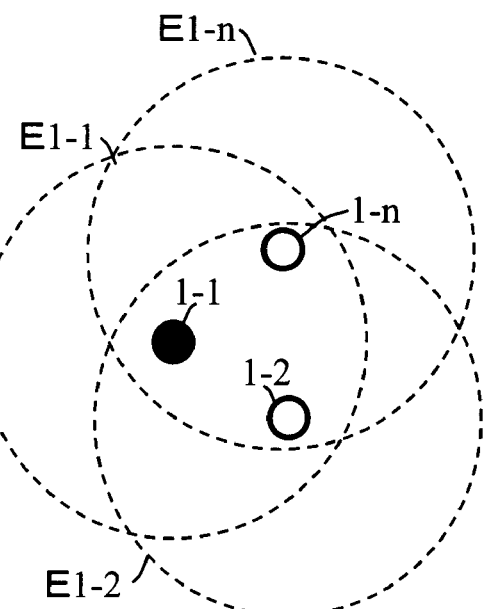

There will be described a case as an example where a group configuration shown in FIG. 66B is provided by decreasing one wireless station from the group configuration as shown in FIG. 66A in which four wireless stations exist. Incidentally, in the systems shown in FIGS. 66A and 66B, there will be described a case as an example where the maximum number of effective branches is three. In addition, it is assumed that each wireless station keeps the delay amount record table shown in FIG. 67A during configuring the group shown in FIG. 66A.

The value τ in the delay amount record table is a value not more than the upper-limit value (maximum delay) which can provide the path diversity effect (for example, when the spectrum spread scheme is used for the modulation/demodulation scheme, it is a value not more than the spread code length), and the value τ/2 is a value that does not drop below the lower-limit (delay resolution) which can provide the path diversity effect (for example, when the spectrum spread scheme is used for the modulation/demodulation scheme, it is a value not less than one chip time of the spread code).

In this group, the timing change rule when the number of wireless stations is reduced will be defined in advance as follows, for example.

(1) A case where the number of remaining wireless stations in the group is not less than the maximum number of effective branches When the wireless station to which the same delay amount is allocated as the wireless station which has disappeared from the group exists, the delay amount allocated to each wireless station is not changed. When the wireless station to which the same delay amount is allocated as the wireless station which has disappeared from the group does not exist, the wireless station to which the same delay amount is allocated among the remaining wireless stations in the group exists. Hence, the delay amount allocated to the wireless station with a larger wireless station ID among the wireless stations to which the same delay amount is allocated is changed to the delay amount allocated to the wireless station that has disappeared from the group.

(2) A case where the number of remaining wireless stations in the group is less than the maximum number of effective branches When the wireless station to which the same delay amount is allocated among the remaining wireless stations exists, the delay amount allocated to the wireless station with a larger wireless station ID among the wireless stations to which the same delay amount is allocated is changed to the delay amount allocated to the wireless station that has disappeared from the group. When the wireless station to which the same delay amount is allocated among the remaining wireless stations does not exist, the delay amount allocated to each wireless station is not changed.

According to the above-mentioned rules (1) and (2), for example, even when the number of wireless stations is reduced from four to three as shown from FIG. 66A to FIG. 66B, each wireless station can independently change to the same delay amount record table (FIG. 67B when the wireless stations 1-1 has disappeared and the number thereof is reduced, FIG. 67C when the wireless stations 1-2 has disappeared and the number thereof is reduced, FIG. 67D when the wireless stations 1-3 has disappeared and the number thereof is reduced, and FIG. 67E when the wireless stations 1-n has disappeared and the number thereof is reduced).

Incidentally, when the number of the wireless stations is more than the maximum number of effective branches, it is desirable, as shown in FIG. 67A, to make the number of candidate values of the delay amount to be a number equal to the maximum number of effective branches, or to be a number smaller than the maximum number of effective branches. The reason is similar to that of the first embodiment.

Meanwhile, if the number of the wireless stations is more than the maximum number of effective branches, even when the multi-station simultaneous transmission can be performed, a wireless station which is not allowed to perform the multi-station simultaneous transmission may be provided. FIG. 68A is a diagram illustrating an example of the delay amount record table that each wireless station keeps, when the maximum number of effective branches in the receiving station is three. In this case, as shown in FIG. 68A, when wireless stations 1-1 through 1-3 serves as the source station of the broadcast packet, the wireless station 1-n does not perform the multi-station simultaneous transmission of the broadcast packet. Meanwhile, when the wireless station 1-n serves as the source station of the broadcast packet, the wireless station 1-3 does not perform the multi-station simultaneous transmission of the broadcast packet. As is understood, even when the multi-station simultaneous transmission can be performed, the wireless station which is not allowed to perform the multi-station simultaneous transmission (wireless station represented by the delay amount of "-" in FIG. 68A) may be provided.

Note herein, in order to provide the wireless station which is not allowed to perform the multi-station simultaneous transmission even when the multi-station simultaneous transmission can be performed, what is necessary is to generate the delay amount notice packet not including the delay amount to transmit it to some wireless stations, when a certain wireless station transmits the delay amount notice packet, for example. Subsequently, the wireless station which has received the delay amount notice packet not including the delay amount for its own-station, upon receiving the broadcast packet from the source wireless station of this delay amount notice packet, may not relay-transmit the broadcast packet. As is understood, by limiting the number of the wireless station for performing the multi-station simultaneous transmission, the effect due to the path diversity can be certainly obtained without increasing the load on the wireless station.

Note herein, when another wireless stations other than the wireless station which has transmitted the multi-station simultaneous transmission request packet receives more response packets transmitted by the other wireless stations than the maximum number of effective branches in number, the wireless station which has received more response packets than the maximum number of effective branches in number may not transmit the response packet. Thus, it is possible to prevent the useless response packet from being transmitted, and by limiting the number of the wireless station for performing the multi-station simultaneous transmission, the effect due to the path diversity can be certainly obtained without increasing the load on the wireless station.

Moreover, as described above, in the system which restricts the number of multi-stations increasing blindly, and has the multi-station the number of which is equal to the maximum number of branches transmit when the number of the wireless stations is more than the maximum number of effective branches, for example, the timing change rule when the number of wireless stations is reduced will be defined in advance as follows, for example.

(3) A case where the number of remaining wireless stations in the system is not less than the maximum number of effective branches A wireless station with the largest wireless station ID among the wireless stations which has not participated in the multi-station simultaneous transmission till then while having a capability of the multi-station simultaneous transmission among the remaining wireless stations in the system changes its timing to the same timing as that of a wireless station with the largest wireless station ID among the reduced wireless stations.

According to the above-mentioned rule (3), when each of the wireless stations with the system configuration shown in FIG. 66A keeps the delay amount record table shown in FIG. 68A, for example, even when the number of the wireless stations is reduced from four to three as shown in FIG. 66B, each wireless station can independently change the delay amount record table that its own-station keeps.

FIG. 68B is a diagram illustrating the delay amount record table changed from that shown in FIG. 68A according to the above-mentioned rule when the wireless station 1-1 disappears. In a case where the wireless station 1-1 has existed, when performing the multi-station simultaneous transmission of the broadcast packet when the wireless stations 1-2 and 1-3 have been the source stations, the wireless station 1-1 has transmitted at the timing after a lapse of the delay amount zero from the reference timing. Hence, according to the above-mentioned rule, zero is allocated to the wireless station 1-$n$ as the delay amount during the multi-station simultaneous transmission as shown in FIG. 68B. FIG. 68C is a diagram illustrating an example of the delay amount record table when the wireless station 1-2 disappears. In this case, the delay amount allocated to the wireless station 1-2 is allocated to the wireless station 1-$n$ as the delay amount during the multi-station simultaneous transmission. The FIG. 68D is a diagram illustrating an example of the delay amount record table when the wireless station 1-3 disappears. In this case, the delay amount allocated to the wireless station 1-3 is allocated to the wireless station 1-$n$ as the delay amount during the multi-station simultaneous transmission. FIG. 68 E is a diagram illustrating an example of the delay amount record table when the wireless station 1-$n$ disappears. In this case, the delay amounts allocated to the wireless stations 1-1 through 1-3 as the delay amount during the multi-station simultaneous transmission is not changed.

As is understood, each wireless station keeps the delay amount record table which stores the delay amounts of all the wireless stations capable of performing the multi-station simultaneous transmission, and decides in advance a transmission timing modification procedure when a situation of the multi-station, such as the number of multi-stations changes. Thus, each of the remaining wireless stations can set the suitable delay amount without transmitting the response packet and the delay amount notice packet. Hence, even when the situation of the multi-station changes, the nego-zone shown in a delay amount setting procedure of the fifth through eighth embodiments, the maximum path diversity effect can be certainly provided while suppressing the deterioration in transmission efficiency.

Moreover, in the present embodiment, as can be seen from the delay amount record table shown in FIG. 68A, the delay amount of each wireless station during the multi-station simultaneous transmission is decided for every source station. Namely, when a certain wireless station transmits the broadcast packet for the first time as the source station, the delay amount setting shall always be performed by either of the delay amount setting procedure of the above-mentioned fifth through eighth embodiments. Here, only when the broadcast packet is transmitted for the first time after the situation change of the multi-station within the group, or only when the channel information packet is transmitted for the first time after the situation of the multi-station change within the group, the delay amount is decided based on the numbers of the packets and the response packets transmitted responsive to this packets, and the wireless station ID, so that the delay amount of each wireless station during the multi-station simultaneous transmission may be decided not depending on the source station.

Figure 69:
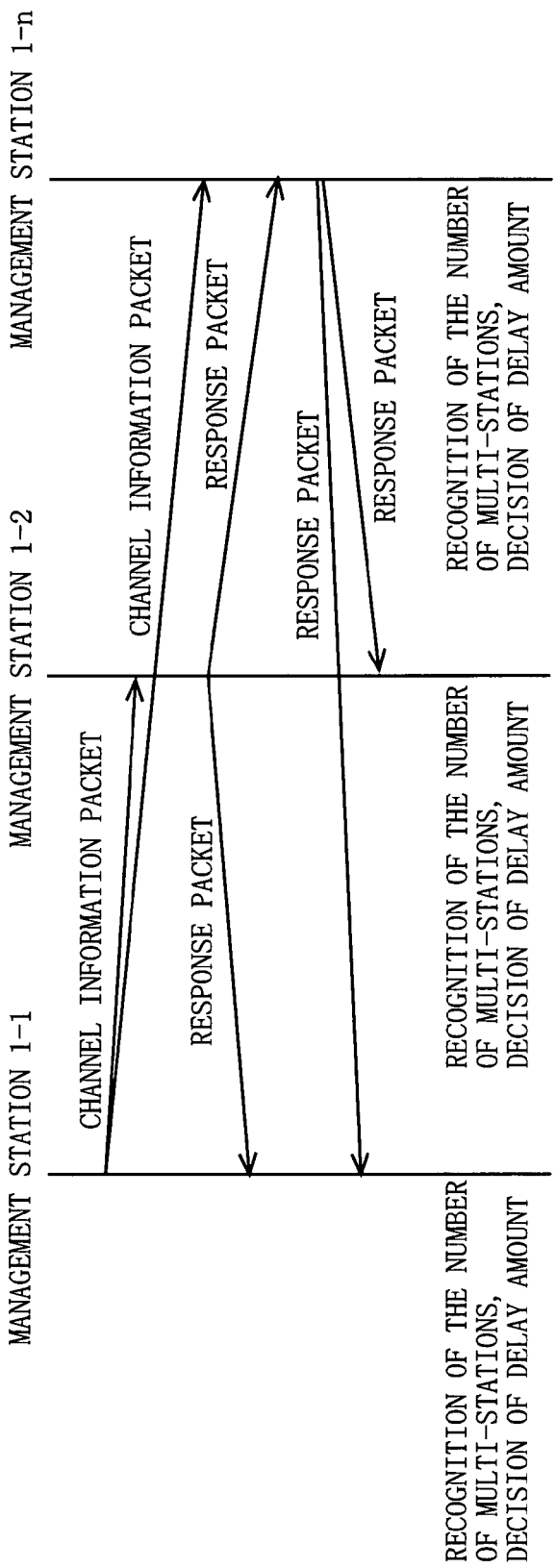

FIG. 69 is a sequence diagram illustrating operation of the wireless stations 1-1 through 1-$n$ when each wireless station decides the delay amount to be given to the packet during the multi-station simultaneous transmission based on one-time transmission of the channel information packet. The wireless stations 1-2 and 1-$n$, upon receiving the channel information packet transmitted by the wireless station 1-1, will generate and transmit the response packets. The wireless station 1-1 receives the response packet transmitted by the wireless stations 1-2 and 1-$n$. Further, the wireless station 1-2 also receives the response packet transmitted by the wireless station 1-n, while the wireless station 1-n receives the response packet transmitted by the wireless station 1-2. The wireless stations 1-1 through 1-n determine that the total number of the received channel information packets and response packets is the number of wireless stations capable of performing the multi-station simultaneous transmission upon relay transmission of the broadcast packet. Subsequently, the wireless stations 1-1 through 1-n, when their own-stations perform the multi-station simultaneous transmission, decide the delay amounts to be given to the packets according to the above-mentioned predetermined rule. As is understood, if each wireless station decides the delay amount by one-time transmission of the channel packet, the procedure for deciding the delay amount can be made simpler.

Incidentally, it has been assumed in the above-mentioned fifth through eighth embodiments that all packet lengths of the broadcast packets transmitted by respective wireless stations have been the same, and by adjusting the transmission start timing of this packet, namely, a starting position of the packet by the allocated delay amount among respective wireless stations according to a predetermined procedure, the path diversity effect could be certainly provided. However, the adjustment position for the transmission timing of the packet is not limited to this. For example, when preamble lengths of the broadcast packets during the multi-station transmission are different according to respective wireless stations, a portion where an increase in reliability of the data transmission is desired due to the path diversity effect may be adjusted by the predetermined delay amount. For example, when the preamble lengths of the packets are different according to respective wireless stations as described above, the transmission timing of the unique word in the packet may be adjusted by the predetermined delay amount from the reference timing defined in advance in each wireless station to be transmitted.

Example

Lastly, there will be described an example of the wireless transmission system which can certainly provide the path diversity effect by use of the above-mentioned wireless transmission method of either of the fifth through eighth embodiments. There will be described, as one example, a case where the communication is performed in a short distance within premises or the like by use of the QPSK-VP scheme for the modulation/demodulation scheme in the wireless station on condition that a transmission rate between wireless zones is 2 Mbps.

It is known that when an electric wave is transmitted from one station within premises, a multipath occurs because the electric wave is reflected to a wall, a ceiling, or the like in a room, and when a transmitting station is located beyond the horizon (for example, next room or the like), a received power distribution in a neighborhood where distances between transmission and reception are almost the same generally shows a Rayleigh distribution. Additionally, in premise transmission, since the room is generally as small as several square meters in size, it is also known that variation in time difference (hereinafter, called delay spread) when the multipaths generated during the transmission from one station arrive at the receiving station will be about several nanoseconds to ten nanoseconds.

The simulation result of evaluating the relation between the time difference $\tau$ between two waves and the bit error rate (BER) under the two-wave Rayleigh fading environment (delay spread for every wave is 0) of the PSK-VP scheme is similar to that shown in FIG. 41A.

It turned out from FIG. 41A that the bit error rate characteristic can be greatly improved by selecting a suitable value as $\phi m$ when the TDOA is between 0.1 through 0.8 symbols, as compared with a case where propagation time difference=0.

A simulation result of indicating a relation between a received signal strength and BER of the QPSK-VP scheme when only one wave arrives (A), when two waves arrive with the proper time difference (B), and when three waves arrive with the proper time difference (C), at the receiving station on condition that the delay spread for every wave is 0 and the waves are independently subjected to Rayleigh fading is similar to that shown in FIG. 41B. Although the BER characteristic in the multipath environment of the PSK-VP scheme changes according to a waveform shaping method a band limit condition, when, for example, a waveform shaping method and a band limit condition (Parabolic, $\phi m=\pi$, Gauss, BT=1.3) shown in Non-patent Document 1 are used, it turned out, as shown in FIG. 41B, that the effect due to the path diversity is obtained and the BER characteristic is greatly improved by performing the multi-station simultaneous transmission as compared with a case where one wave, namely, one station transmits the packet.

In addition, according to these simulation results, it turns out that the value of $\tau$ in FIG. 56A, FIG. 61A, and FIG. 64A may be set as, for example, $\tau$=about 0.5 symbols when the number of multi-stations is two stations, and $\tau$=about 0.4 symbols when the number of multi-stations is not less than three stations.

The delay spread value (about several nanoseconds to ten nanoseconds) for every station under the above-mentioned in-premise transmission environment is very small compared with the symbol time length (1 microsecond) to the transmission rate (2 Mbps) of this example. Hence, when the wireless communication is performed in the short distances between the rooms by use of, for example, the QPSK-VP scheme with the above-mentioned conditions, it is considered that almost the same BER characteristic as the simulation result shown in FIG. 36 can be obtained.

FIG. 70A is a diagram illustrating the relative position between the wireless stations 1-1 through 1-n when the wireless stations are arranged within the premises. As shown in FIG. 70A, it is assumed that there are six rooms with 4 m square within the premises, and the wireless stations 1-1 through 1-n are arranged near the center of the rooms, respectively. At this time, the propagation time difference to a difference between propagation distances (at most 4 m) from other wireless stations (for example, the wireless stations 1-1 through 1-3) to an arbitrary certain wireless station (for example, the wireless station 1-n) is at most about ten nanoseconds. This propagation time difference is very small compared with the symbol time length (one microsecond). Hence, when the delay amount of the wireless station which performs the multi-station simultaneous transmission during the relay transmission is decided according to the above-mentioned procedure, by setting the time difference $\tau$ between the transmission timings of two wireless stations (for example, the wireless stations 1-2 and 1-3 when the source station is the wireless station 1-1) between 0.2 symbols (200 nanoseconds) and 0.8 symbols (800 nanoseconds), the path diversity effect corresponding to two branches can be provided. Moreover, when the number of the wireless stations which perform the multi-station simultaneous transmission is three during the relay transmission, if the multi-station simultaneous transmission is performed while keeping the delay amount record table as shown in FIG. 64A in the wireless station by setting the delay amount τ as, for example, about 0.5 symbols, the path diversity effect corresponding to three branches can be provided.

For example, supposing that required quality of the communication area is BER=$10^{-5}$, it turns out from the result of FIG. 41B that, as compared with during the single station transmission (A), a path diversity gain of about 20 dB during the multi-station simultaneous transmission of two stations (B), and about 23 dB during the multi-station simultaneous transmission of three stations (C) is obtained. When an expansion effect of the communication area due to this gain is calculated while considering a propagation loss as a free space loss for simplification of the description, area expansion of about 10 times during the multi-station simultaneous transmission of two stations, and about 14 times during the multi-station simultaneous transmission of three stations can be expected as compared with during the single station transmission. Actually, since a transmission loss or the like due to the wall or the like is added as the propagation loss, such expansion may not be expected, but by providing the suitable time difference τ using either of the methods of the fifth through eighth embodiments described above to thereby perform the multi-station simultaneous transmission during the relay transmission, area expansion of several times can be still expected as compared with during the single station transmission.

For example, when a transmission power of the wireless station is decided assuming that the communication area during the single station transmission has a radius of about 10 m, by performing the multi-station simultaneous transmission during the relay transmission, the communication area can be expanded to at least about 20 m to 30 m. Hence, if the house has such a size as shown in FIG. 70A, the broadcast packet can be transmitted throughout the premises. Meanwhile, when the houses are comparatively close to each other, the management station (for example, the wireless station 1-1) of a wireless group 1 transmits the broadcast packet including the channel information used in the wireless group 1 where there is a home of A as shown in FIG. 70B, and the wireless stations (for example, the wireless stations 1-2 and 1-3) in the same group near the management station perform the multi-station simultaneous transmission of this packet, so that it is possible to have this packet arrive at a neighboring house, and thus the channel interference between the wireless groups respectively constituted by the neighboring houses can be avoided.

Note herein, it has been described, in the fifth through eighth embodiments described above, that the PSK-VP scheme is used as the modulation/demodulation scheme. Here, since the modulation/demodulation scheme may be the modulation/demodulation scheme having the anti-multipath characteristic, it is not limited to the PSK-VP scheme. For example, the spectrum spread schemes, such as the DSSS scheme or the like, the OFDM scheme, the PSK-RZ scheme, or the DSK (Double Shift Keying) system in which the anti-multipath characteristic is provided by carrying information towards the phase change added within the transmission symbol (the maximum delay is less than 0.5 bit) may be used therefore, and the equalizer may be used for the demodulation section. The DSK system is described in detail in Non-patent Document 3.

The transmission timing of each wireless station during the multi-station simultaneous transmission is decided using respective wireless stations performing the exchange (negotiation) of some packets with each other before the multi-station simultaneous transmission is performed so that the difference between the transmission timings of respective wireless stations may be not less than the delay resolution and not more than the maximum delay for each modulation/demodulation scheme, and thus the multipaths with the proper TDOA can be generated during the multi-station simultaneous transmission even when the number of multi-stations changes, and thus the path diversity effect can be certainly provided.

Incidentally, as described in the paragraph of the background art, the delay resolution and the maximum delay of each modulation/demodulation scheme are the time lengths respectively decided by several times less than the symbol length and not more than one symbol in the case of the PSK-RZ scheme, several times less than the symbol length and not more than 0.5 symbols in the case of the DSK system one chip time and spread code length in the case of the DSSS scheme, inverse number of the frequency bandwidth and guard interval length in the case of the OFDM scheme, and symbol time and the number of taps in the case of using the equalizer.

Moreover, it has been described in the fifth through eighth embodiments that each wireless station transmits the packet. Here, the information that each wireless station simultaneously transmits to the plurality of stations is not limited to the packet, but the present invention is applicable also in a case where, for example, the wireless stations transmit the same information with each other over a long period of time.

Incidentally, while the wireless station has controlled the transmission timing of the packet transmitted from the antenna by means of controlling the timing of outputting the transmission start signal in the first through eighth embodiment, as an option, the timing of outputting the modulated baseband signal may be directly controlled as shown in FIG. 71.

FIG. 71 is a block diagram illustrating a configuration of the management station 1 when the modulation section gives the delay to the modulated baseband signal. The management station 1 shown in FIG. 71 is different from the wireless stations shown in FIG. 5 and FIG. 48 in that a modulation section 41f receives the delay amount signal outputted by the delay amount determining section 36. Since the configuration other than that is similar to that shown in FIG. 5 and FIG. 48, the same symbol is given thereto and description thereof will be omitted.

FIG. 72 is a block diagram illustrating a configuration of the modulation section 41f shown in FIG. 71. The modulation section 41f shown in FIG. 72 is different from the modulation section 41 in accordance with the first embodiment shown in FIG. 6 in that a delay adding section 48 is further provided. Since other components are similar to those shown in FIG. 6, the same symbol is given thereto and description thereof will be omitted.

FIG. 73 is a block diagram illustrating an example of a detailed configuration of the delay adding section 48 shown in FIG. 72. In FIG. 73, the delay adding section 48 has a delay section 491 and a selector 492, and delays the inputted signal by the predetermined delay amount to output it. The delay section 491 is constituted by the shift register and delays the signal obtained from the waveform output section 46 by the predetermined time T. The selector 492 selects and outputs a signal outputted from the delay section 491, or a signal outputted from the waveform output section 46. The selector 492 decides either of the signals to be selected according to the delay amount signal decided by the delay adding section 48. For example, when the delay amount signal indicates "T", the selector 492 selects the signal outputted from the delay section 491. Meanwhile, when the delay amount signal indicates "0", the selector 492 selects the signal obtained from the waveform output section 46. The selector 492 then outputs the selected signal to the D/A converter 47. As is understood, the transmission timing of the packet can be controlled by directly delaying the modulated baseband signal.

Incidentally, it has been described in FIG. 73 a case where there are two candidate values of the delay amount selected by the delay adding section 48 as an example, but there may be three or more candidate values of the delay amount.

Meanwhile, it has been described in FIG. 72 a case where the signal is delayed on the digital circuit as an example, but the signal may be delayed on an analog circuit. In that case, the delay adding section 48 may be provided in the subsequent stage of the D/A converter 47.

Further, the delay adding section may be provided between the read control section and the waveform output section to thereby add the predetermined delay amount to the address signal outputted from the read control section. FIG. 74 is a block diagram illustrating a configuration of the modulation section 41g when the delay adding section is provided between the read control section and the waveform output section.

A delay adding section 48g that the modulation section 41g has delays the address signal to input it to the waveform output section 46 according to the delay amount signal decided by the delay amount determining section 36. Incidentally, since the configuration and the operation of the delay adding section 48g are similar to those of the delay adding section 48 shown in FIG. 72, description thereof will be omitted. As is understood, even in a case where the configuration shown in FIG. 74 is implemented, the transmission timing of the packet transmitted from the antenna 31 can be controlled in a manner similar to that of the first through eighth embodiments. Moreover, as long as it is a method in which the plurality of wireless stations add the predetermined delay amounts to the reference timing to thereby transmit the data, it is not limited to the example described above.

Incidentally, in the wireless transmission systems in the first through eighth embodiments, the following points are common. Any wireless transmission system can perform the multi-station simultaneous transmission of the data by wireless. Any wireless transmission system is provided with the plurality of wireless stations for transmitting/receiving the data, wherein a path diversity system is formed by a transmitter-side wireless station, a multipath channel, and a receiver-side wireless station. At least one of the plurality of wireless stations decides, in accordance with a response packet responsive to a multi-station simultaneous transmission request packet transmitted by the wireless station or other stations, a plurality of delay amounts relative to a reference timing during the multi-station simultaneous transmission in the wireless transmission system. Each difference between the plurality of delay amounts is set to not less than the predetermined delay resolution. The difference between the maximum and minimum values in the plurality of delay amounts is set to not more than the predetermined maximum delay.

Incidentally, each functional block, such as the delay amount determining section, the transmission timing control section, or the like described in each embodiment with which the wireless station is provided, is typically implemented as LSI which is an integrated circuit. These may be individually integrated into 1-chip, or may be integrated into 1-chip so as to include a part or all of them.

Incidentally, it is needless to say that as long as the operation described in each embodiment can be realized the wireless station of the present invention may be constituted by means of a functional block and/or means other than the functional blocks shown in the drawings.

As mentioned above, although the present invention has been described in detail, the above-mentioned description is only an exemplification of the present invention in all aspects, and is not intended to limit the scope. It is needless to say that various improvements and modifications can be made without departing from the scope of the present invention.

INDUSTRIAL APPLICABILITY

According to the resent invention, in the multi-station simultaneous transmission system in which the plurality of wireless stations arranged adjacently to each other transmit the same data, even when the relative position between the wireless stations or the number of wireless stations for performing the multi-station simultaneous transmission of the data is changed, the effect due to the path diversity can be certainly obtained, so that it is useful in a field, such as a wireless communication or the like.

The invention claimed is:

1. A wireless transmission system capable of performing a multi-station simultaneous transmission of data by wireless, comprising a plurality of wireless stations for transmitting/receiving the data, wherein a path diversity system is formed by a transmitter-side wireless station, a multipath channel, and a receiver-side wireless station, wherein at least one wireless station among the plurality of wireless stations decides, in accordance with a response packet responsive to a multi-station simultaneous transmission request packet transmitted by its own-station or other stations, a plurality of delay amounts relative to a reference timing during the multi-station simultaneous transmission in the wireless transmission system, wherein each difference between the plurality of delay amounts is set to not less than a predetermined delay resolution, and a difference between the maximum and minimum values in the plurality of delay amounts is set to not more than a predetermined maximum delay.

2. The wireless transmission system according to claim 1, wherein the predetermined delay resolution and the predetermined maximum delay are set to values for the wireless station at the receiving end to be able to perform a path diversity reception of a plurality of delayed waves, respectively.

3. The wireless transmission system according to claim 1, wherein the plurality of wireless stations includes a plurality of management stations for managing at least one terminal station which exists within a certain communication area, each of the management stations transmits and receives, prior to communication, the multi-station simultaneous transmission request packet and the response packet as a negotiation packet for establishing a communicatable state, at least the one wireless station is a source management station for transmitting the data to a management station which performs the multi-station simultaneous transmission among the plurality of management stations, and the source management station includes a delay amount determining section for recognizing, based on the negotiation packet, a management station capable of performing the multi-station simultaneous transmission to thereby determine the plurality of delay amounts when the multi-station simultaneous transmission is performed by the management station which has been recognized.

4. The wireless transmission system according to claim 1, wherein
the plurality of wireless stations includes a plurality of management stations for managing at least one terminal station which exists within a certain communication area,
each of the management stations transmits and receives, prior to communication, the multi-station simultaneous transmission request packet and the response packet as a negotiation packet for establishing a communicatable state,
at least the one wireless station is each of the management stations, which becomes a management station capable of performing the multi-station simultaneous transmission based on the negotiation packet, among the plurality of management stations, and
each of the management stations decides the delay amounts given to the data of its own-station.

5. The wireless transmission system according to claim 1, wherein
the wireless transmission system is a system for causing other wireless stations to relay a packet from a source wireless station to transmit the packet to a destination wireless station,
the plurality of wireless stations include the source wireless station, the wireless station for relaying the packet, and the destination wireless station,
each of the wireless stations includes
when there is the packet to be simultaneously transmitted, a broadcast section for broadcasting the multi-station simultaneous transmission request packet for requesting other wireless stations to perform the multi-station simultaneous transmission,
when the multi-station simultaneous transmission request packet is received, a broadcast response packet generating/transmitting section for generating and transmitting a broadcast response packet responsive to the multi-station simultaneous transmission request packet,
when the broadcast response packet is received, a simultaneous transmission station determining section for determining, based on the broadcast response packet, the wireless station capable of performing the multi-station simultaneous transmission,
a delay amount determining section for determining the plurality of delay amounts for the packets simultaneously transmitted to the plurality of stations by a wireless station capable of performing the multi-station simultaneous transmission, which is determined by the simultaneous transmission station determining section,
when own-station is a source wireless station, a simultaneous transmission canceling section for notifying, upon receiving the broadcast response packet from the destination wireless station responsive to the packet to be simultaneously transmitted, other wireless stations to cancel the multi-station simultaneous transmission.

6. The wireless transmission system according to claim 1, wherein
the wireless transmission system is a system for causing other wireless stations to relay the packet from a source wireless station to transmit the packet to a destination wireless station,
the plurality of wireless stations include the source wireless station, the wireless station for relaying the packet, and the destination wireless station,
each of the wireless stations includes
when there is the packet to be simultaneously transmitted, a broadcast section for broadcasting the multi-station simultaneous transmission request packet for requesting other wireless stations to perform the multi-station simultaneous transmission,
when the multi-station simultaneous transmission request packet is received, a broadcast response packet generating/transmitting section for generating and transmitting a broadcast response packet responsive to the multi-station simultaneous transmission request packet,
when the broadcast response packet is received, a simultaneous transmission station determining section for determining, based on the broadcast response packet, the wireless station capable of performing the multi-station simultaneous transmission,
a delay amount determining section for determining the plurality of delay amounts for the packets simultaneously transmitted to the plurality of stations by a wireless station capable of performing the multi-station simultaneous transmission, which is determined by the simultaneous transmission station determining section,
when own-station is a source wireless station, a simultaneous transmission canceling section for notifying, upon receiving a notice from the relay station which has received the broadcast response packet from the destination wireless station responsive to the packet to be simultaneously transmitted in that the broadcast response packet from the destination wireless station is received, other wireless stations to cancel the multi-station simultaneous transmission.

7. The wireless transmission system according to claim 1, wherein the multi-station simultaneous transmission request packet is a channel information packet on communication channel that each of the wireless stations uses.

8. The wireless transmission system according to claim 1, wherein
the plurality of wireless stations includes a plurality of management stations for managing at least one terminal station which exists within a certain communication area,
each of the management stations transmits and receives, prior to communication, the multi-station simultaneous transmission request packet and the response packet as a negotiation packet for establishing a communicatable state,
the at least one wireless station is either of the plurality of management stations, and
the at least one wireless station includes a delay amount determining section for recognizing, based on the negotiation packet, a management station capable of performing the multi-station simultaneous transmission to thereby determine the plurality of delay amounts when the multi-station simultaneous transmission is performed by the management station which has been recognized.

9. The wireless transmission system according to claim 1, wherein the multi-station simultaneous transmission request packet is a request-to-send packet RTS (Request To Send) to be transmitted regardless of the availability of the multi-station simultaneous transmission, and the broadcast response packet is a response packet CTS (Clear To Send) responsive to the request-to-send packet RTS.

10. The wireless transmission system according to claim 1, wherein the multi-station simultaneous transmission request packet is the packet to be simultaneously transmitted, or a part of the packet to be simultaneously transmitted.

11. The wireless transmission system according to claim 1, wherein
 the wireless transmission system is a system for causing other wireless stations to relay a packet from a source wireless station to transmit the packet to a destination wireless station,
 the plurality of wireless stations include the source wireless station, the wireless station for relaying the packet, and the destination wireless station,
 each of the wireless stations includes
  when there is the packet to be simultaneously transmitted, a broadcast section for broadcasting the multi-station simultaneous transmission request packet for requesting other wireless stations to perform the multi-station simultaneous transmission,
  when the multi-station simultaneous transmission request packet is received, a broadcast response packet generating/transmitting section for generating and transmitting a broadcast response packet responsive to the multi-station simultaneous transmission request packet,
  when the broadcast response packet is received, a simultaneous transmission station determining section for determining, based on the broadcast response packet, the wireless station capable of performing the multi-station simultaneous transmission,
  a delay amount determining section for determining the plurality of delay amounts for the packets simultaneously transmitted to the plurality of stations by a wireless station capable of performing the multi-station simultaneous transmission, which is determined by the simultaneous transmission station determining section, and
  when the multi-station simultaneous transmission request packet is received from the source wireless station, a relay availability determining section for determining whether or not its own-station can relay a packet transmitted from the source wireless station, and
 the broadcast response packet generating/transmitting section generates and transmits the broadcast response packet including a determination result of the relay availability determining section.

12. The wireless transmission system according to claim 1, wherein
 the wireless transmission system is a system for causing other wireless stations to relay a packet from a source wireless station to transmit the packet to a destination wireless station,
 the plurality of wireless stations include the source wireless station, the wireless station for relaying the packet, and the destination wireless station,
 each of the wireless stations includes
  when there is the packet to be simultaneously transmitted, a broadcast section for broadcasting the multi-station simultaneous transmission request packet for requesting other wireless stations to perform the multi-station simultaneous transmission,
  when the multi-station simultaneous transmission request packet is received, a broadcast response packet generating/transmitting section for generating and transmitting a broadcast response packet responsive to the multi-station simultaneous transmission request packet,
  when the broadcast response packet is received, a simultaneous transmission station determining section for determining, based on the broadcast response packet, the wireless station capable of performing the multi-station simultaneous transmission,
  a delay amount determining section for determining the plurality of delay amounts for the packets simultaneously transmitted to the plurality of stations by a wireless station capable of performing the multi-station simultaneous transmission, which is determined by the simultaneous transmission station determining section, and
  when the multi-station simultaneous transmission request packet is received from the source wireless station, a relay availability determining section for determining whether or not its own-station can relay a packet transmitted from the source wireless station, and
  when it is determined by the relay availability determining section that the relay transmission is available, the broadcast response packet generating/transmitting section generates and transmits the broadcast response packet.

13. The wireless transmission system according to claim 1, wherein the at least one wireless station determines the delay amount according to the number of the wireless stations which can perform the multi-station simultaneous transmission.

14. The wireless transmission system according to claim 1, wherein the at least one wireless station notifies the delay amount to a wireless station which can perform the multi-station simultaneous transmission.

15. The wireless transmission system according to claim 1, wherein a source wireless station which has transmitted the data to a wireless station capable of performing the multi-station simultaneous transmission retransmits the data based on a delay amount allocated to its own-station among the plurality of delay amounts.

16. The wireless transmission system according to claim 1, wherein
 among the plurality of delay amounts, a delay amount to be allocated, upon retransmitting the data to a source wireless station which transmits the data to a wireless station capable of performing the multi-station simultaneous transmission, is determined by the source wireless station, and
 the source wireless station sets a delay amount of a wireless station capable of performing the multi-station simultaneous transmission other than its own-station to 0 to thereby retransmit the data based on a delay amount allocated thereto.

17. The wireless transmission system according to claim 1, wherein the at least one wireless station determines the delay amount in the order of receiving the response packet.

18. The wireless transmission system according to claim 1, wherein
 a wireless station for performing the multi-station simultaneous transmission includes a storage section for storing a delay amount record table for recording the delay amount determined by the at least one wireless station, and
 the wireless station for performing the multi-station simultaneous transmission refers to the delay amount record table to thereby transmit the data to be simultaneously transmitted at a timing delayed by the delay amount allocated to its own-station.

19. The wireless transmission system according to claim 18, wherein only a delay amount allocated to its own-station is recorded on the delay amount record table.

20. The wireless transmission system according to claim 18, wherein delay amounts allocated to all the wireless stations which perform the multi-station simultaneous transmission are recorded on the delay amount record table.

21. The wireless transmission system according to claim 1, wherein each of the wireless stations includes
  a packet transmitting section for transmitting a packet to be simultaneously transmitted to a wireless station capable of performing the multi-station simultaneous transmission,
  when the multi-station simultaneous transmission is available, a packet receiving section for receiving a packet to be simultaneously transmitted by the other wireless stations,
  a transmission timing control section for using the timing delayed by the delay amount as a transmission timing of the data, and
  a multi-station simultaneous transmission section for transmitting the packet received by the packet receiving section at the transmission timing determined by the transmission timing control section.

22. The wireless transmission system according to claim 1, wherein if the number of the wireless stations capable of performing the multi-station simultaneous transmission is more than the maximum number of effective branches, the at least one wireless station reduces the number of the wireless stations determined to be able to perform the multi-station simultaneous transmission to not more than the maximum number of effective branches.

23. The wireless transmission system according to claim 1, wherein
  the wireless transmission system is a system for causing other wireless stations to relay a packet from a source wireless station to transmit the packet to a destination wireless station,
  the plurality of wireless stations include the source wireless station, the wireless station for relaying the packet, and the destination wireless station, and
  when there is any packet to be simultaneously transmitted, and when the response packet transmitted by the other wireless station responsive to the multi-station simultaneous transmission request packet in number more than the maximum number of effective branches is received, each of the wireless stations does not transmit the response packet.

24. The wireless transmission system according to claim 1, wherein the at least one wireless station, if the number of management stations capable of performing the multi-station simultaneous transmission is more than the maximum number of effective branches, reduces the number of delay amounts to be determined to not more than the maximum number of effective branches.

25. A wireless station used for a wireless transmission system capable of performing a multi-station simultaneous transmission of the data by wireless,
  wherein a path diversity system is formed by a transmitter-side wireless station, a multipath channel, and a receiver-side wireless station,
  the wireless station comprising:
    a response packet receiving section for receiving a response packet responsive to a multi-station simultaneous transmission request packet transmitted by its own-station or other stations, and
    in response to the response packet being received by the response packet receiving section, a delay amount determining section for determining a plurality of delay amounts relative to a reference timing during the multi-station simultaneous transmission in the wireless transmission system,
  wherein each difference between the plurality of delay amounts is set to not less than a predetermined delay resolution, and
  a difference between the maximum and minimum values in the plurality of delay amounts is set to not more than a predetermined maximum delay.

26. A method used for a wireless transmission system capable of performing a multi-station simultaneous transmission of data by wireless, wherein
  the wireless transmission system comprises a plurality of wireless stations for transmitting/receiving the data, wherein a path diversity system is formed by a transmitter-side wireless station, a multipath channel, and a receiver-side wireless station,
  the method including:
    in accordance with a response packet responsive to a multi-station simultaneous transmission request packet transmitted by its own-station or other stations, determining, by at least one wireless station among the plurality of wireless stations, a plurality of delay amounts from a reference timing during the multi-station simultaneous transmission in the wireless transmission system;
    setting each difference between the plurality of delay amounts to not less than a predetermined delay resolution; and
    setting a difference between the maximum and minimum values in the plurality of delay amounts to not more than a predetermined maximum delay.

* * * * *